United States Patent [19]

Gove et al.

[11] Patent Number: 5,606,520

[45] Date of Patent: Feb. 25, 1997

[54] ADDRESS GENERATOR WITH CONTROLLABLE MODULO POWER OF TWO ADDRESSING CAPABILITY

[75] Inventors: Robert J. Gove, Plano; Karl M. Guttag, Missouri City, both of Tex.; Keith Balmer; Nicholas K. Ing-Simmons, both of Bedford, England

[73] Assignee: Texas Instruments Incorporated, Dallas, Tex.

[21] Appl. No.: 484,540

[22] Filed: Jun. 7, 1995

Related U.S. Application Data

[62] Division of Ser. No. 263,504, Jun. 21, 1994, Pat. No. 5,471,592, which is a continuation of Ser. No. 135,754, Oct. 12, 1993, abandoned, which is a continuation of Ser. No. 933,865, Aug. 21, 1992, abandoned, which is a continuation of Ser. No. 435,591, Nov. 17, 1989, abandoned.

[51] Int. Cl.⁶ ............................. G06F 7/38; G06F 12/00
[52] U.S. Cl. ........................... 364/746; 395/421.07
[58] Field of Search ......................... 364/715.01, 736, 364/736.5, 746, 768, 784, 786

[56] References Cited

U.S. PATENT DOCUMENTS

| | | | |
|---|---|---|---|
| 4,742,479 | 5/1988 | Kloker et al. | 364/746 |
| 4,794,517 | 12/1988 | Jones et al. | 364/736 X |
| 4,833,602 | 5/1989 | Levy et al. | 395/421.07 |
| 4,935,867 | 6/1990 | Wang et al. | 364/746 X |

*Primary Examiner*—Chuong D. Ngo
*Attorney, Agent, or Firm*—Robert D. Marshall, Jr.; James C. Kesterson; Richard L. Donaldson

[57] ABSTRACT

A data processing address generator includes a plurality of address registers, a plurality of index address registers, a modulo register storing a plurality of carry break indicators and an arithmetic unit. The arithmetic unit adds or subtracts a selected address register and a selected index register. The arithmetic unit generates a normal carry between a particular bit and the next more significant bit if a corresponding carry break indicator stored in said modulo register has a first digital state. The arithmetic unit breaks any carry between the particular bit and the next more significant bit if the corresponding carry break indicator has a second digital state. The carry break may be dependent upon a modulo qualifier bit being in an enabling state. The modulo qualifier bit may be stored in one of a plurality of qualifier registers corresponding to the address registers.

44 Claims, 35 Drawing Sheets

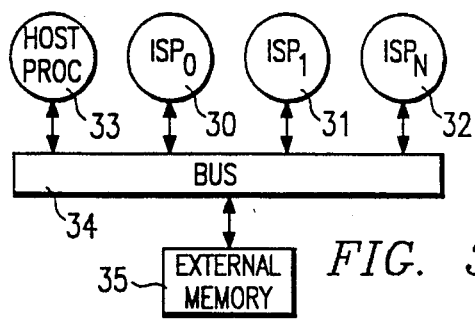
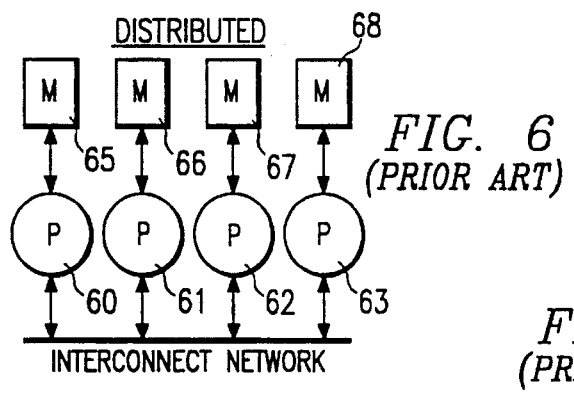
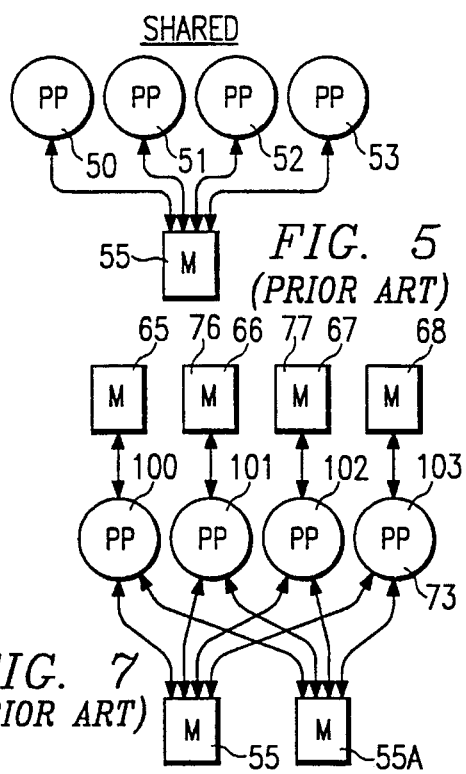
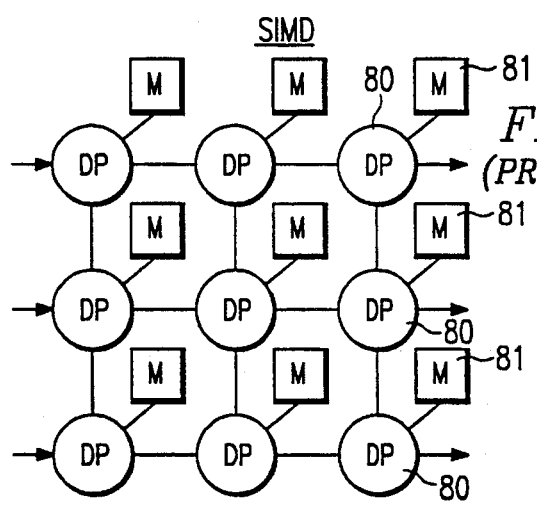
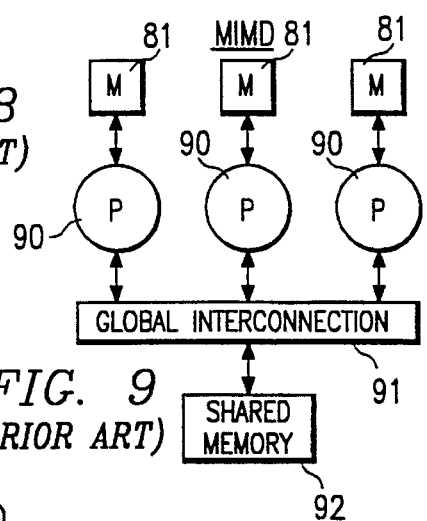
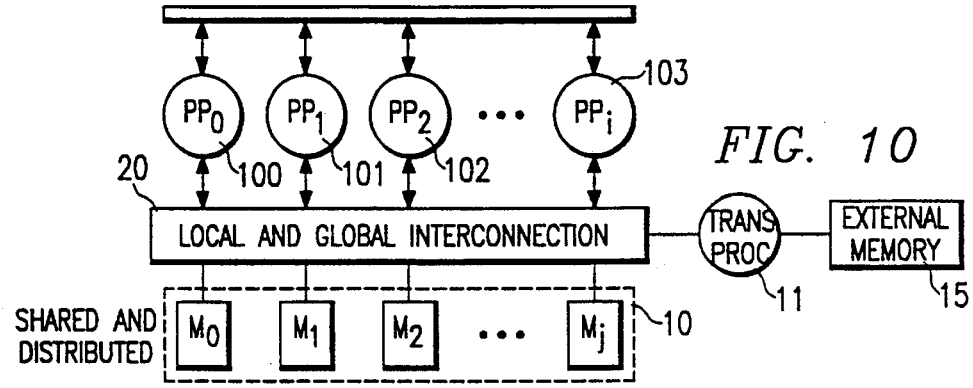

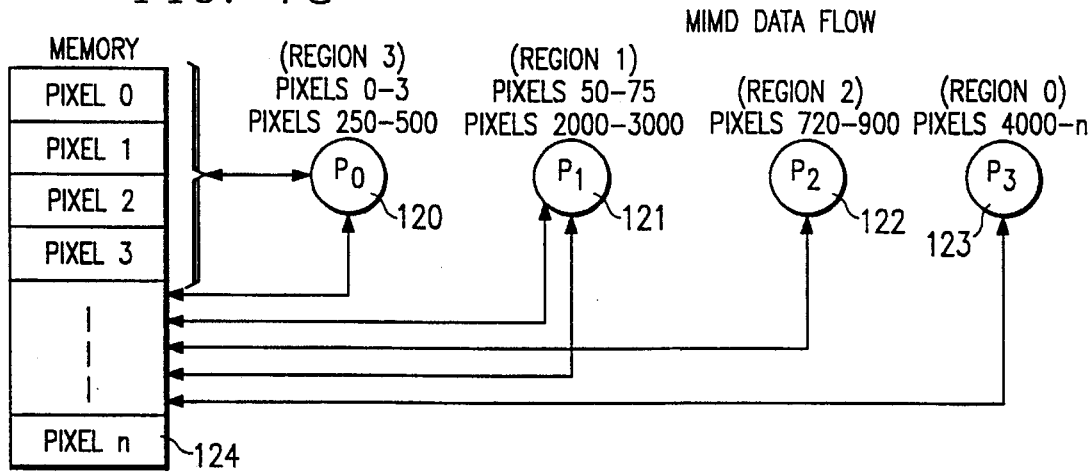
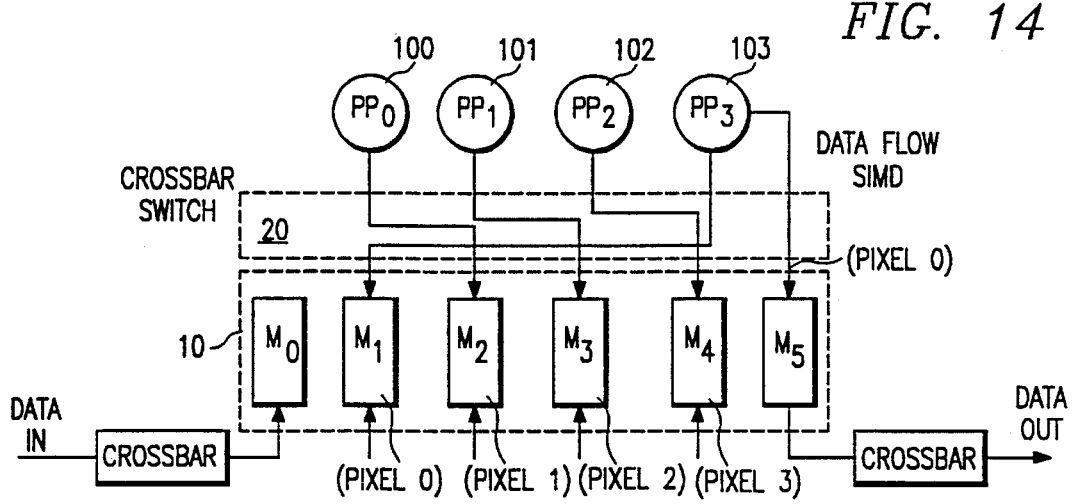
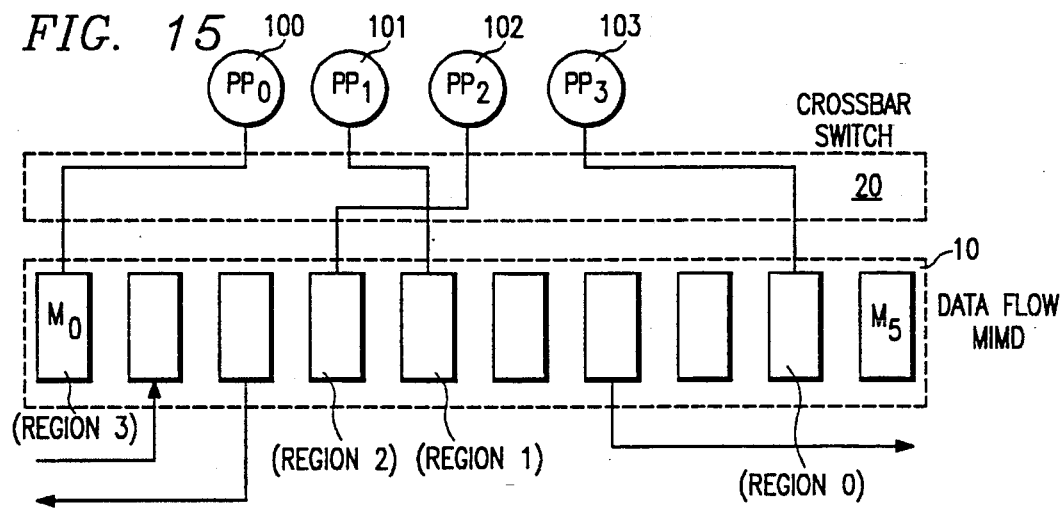

| >0000 | >0800 | >1000 | >1800 | >2000 | >2800 | >3000 | >3800 |
|---|---|---|---|---|---|---|---|
| 64 PIXELS | 64 PIXELS | 64 PIXELS | >1900 >193F | >2100 >213F | 64 PIXELS | 64 PIXELS | 64 PIXELS |
|  |  |  | >1940 |  |  |  |  |
| >07FF | >0FFF | >17FF | >1FFF | >27FF | >2FFF | >37FF | >3FFF |
| 0 | 1 | 2 | 3 | 4 | 5 | 6 | 7 |

NORMAL ARITHMETIC
```
 >193F  -  0 0 0 1 1 0 0 1 0 0 1 1 1 1 1 1
      +
 >0001  -  0 0 0 0 0 0 0 0 0 0 0 0 0 0 0 1
      =
 >1940  -  0 0 0 1 1 0 0 1 0 1 0 0 0 0 0 0
```

SLICE NUMBER

SLICED ARITHMETIC
```
     >193F     -  0 0 0 1 1 0 0 1 0 0 1 1 1 1 1 1
 (SLICE MASK)     0 0 0 0 0 1 1 1 1 1 1 0 0 0 0 0
                              CARRY
           +
     >0001     -  0 0 0 0 0 0 0 0 0 0 0 0 0 0 0 1
           =
     >2100     -  0 0 1 0 0 0 0 1 0 0 0 0 0 0 0 0
```

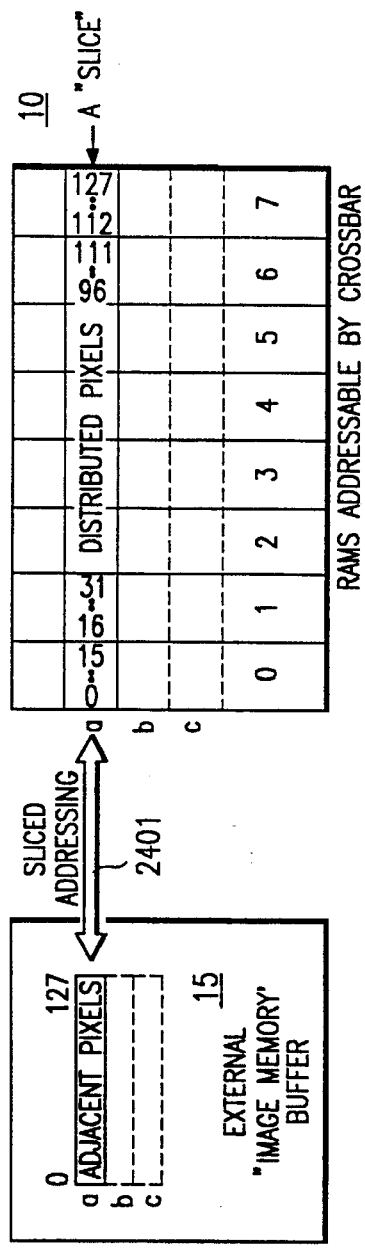
FIG. 24
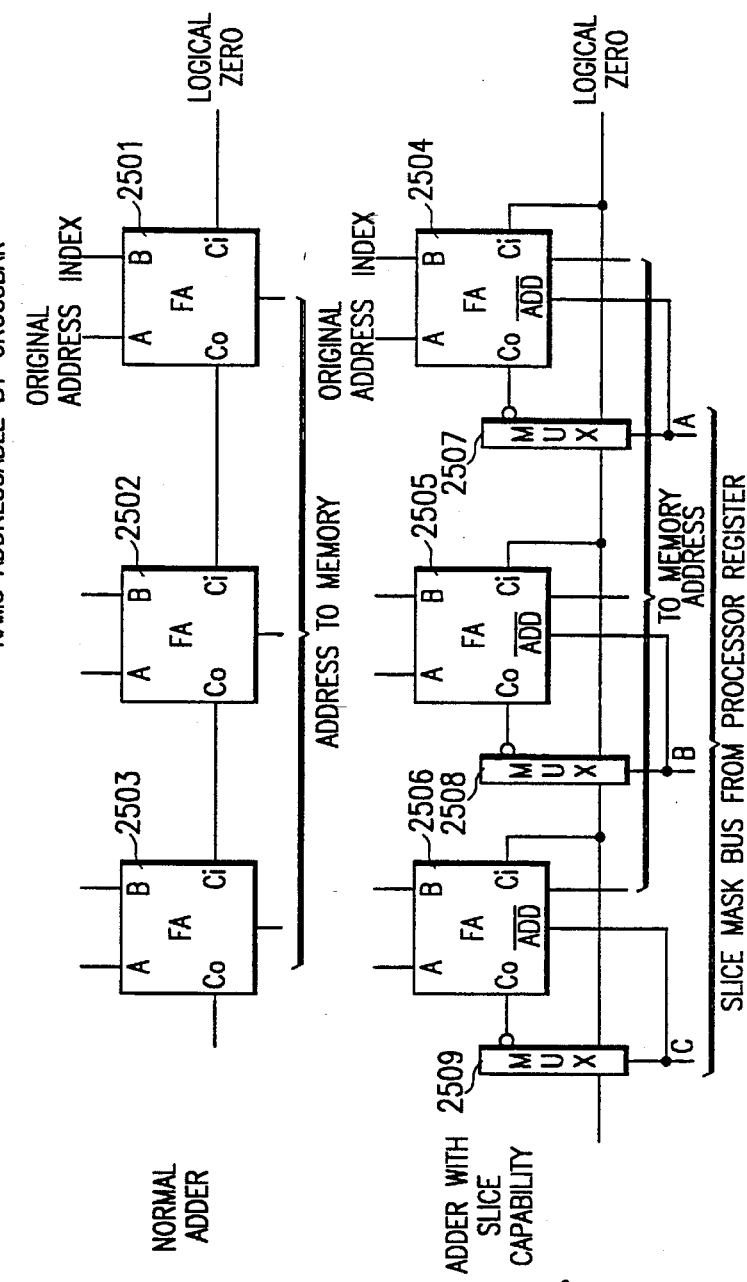
FIG. 25 (PRIOR ART)
FIG. 26

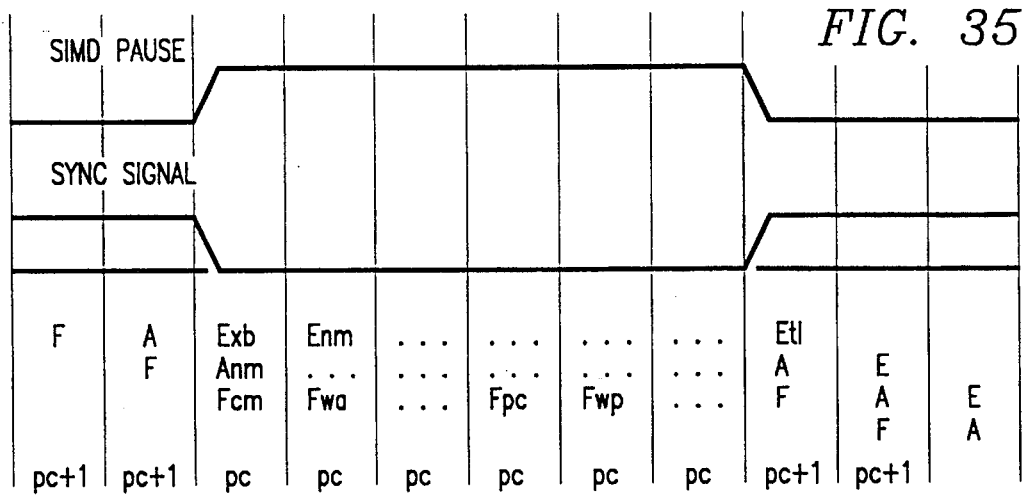

FIG. 35

Fcm — CACHE-MISS
Anm — NO MASTER PHASE OF THE ADDRESS UNIT, THUS NO REGISTER MODIFY.
Exb — CROSSBAR ACCESS(ES) OCCUR. STORES COMPLETE TO MEMORY. LOADS COMPLETE INTO TEMPORARY LATCHES, MASTER PHASE OF DATA UNIT OPERATIONS KILLED.
Enm — NO MASTER PHASE OF DATA UNIT.
Fwa — WAIT FOR CACHE-MISS ACKNOWLEDGE FROM TP.
Fpc — TRANSFER PC AND SEGMENT NUMBER TO TP
Fwp — WAIT FOR SUBSEGMENT PRESENT FLAG TO BECOME SET.
EtL — TEMPORARY LATCH DATA (LOADS) COMPLETE INTO DESIGNATION REGISTER(S). DATA UNIT PERFORMS ITS ALU/MPY OPERATIONS.

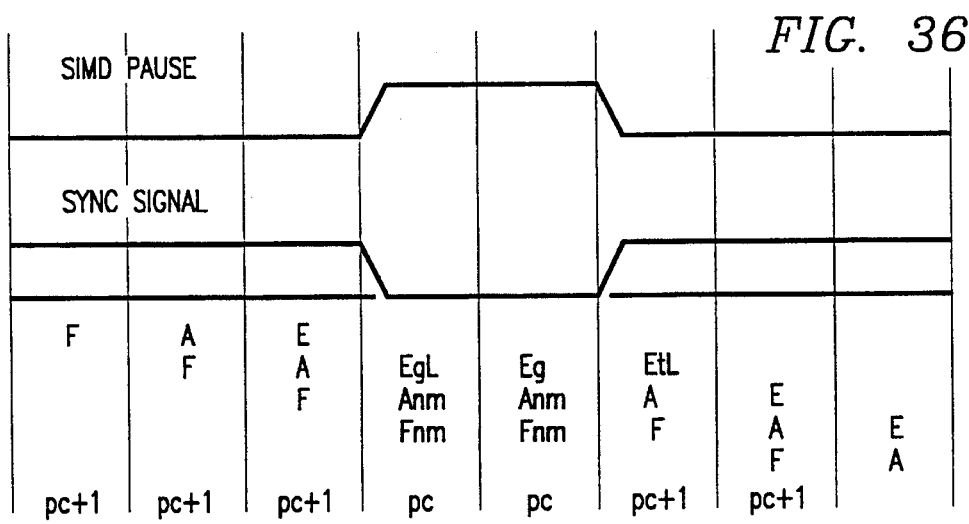

FIG. 36

EgL — CONTENTION DETECTED ON BOTH GLOBAL AND LOCAL BUSES. NO MASTER PHASE IN DATA UNIT.
Fnm — NO MASTER PHASE ON FETCH. PIPE NOT LOADED.
Eg — CONTENTION DETECTED ON GLOBAL BUS. LOCAL BUS TRANSFER OCCURS. STORE TO MEMORY, OR LOAD TO TEMP REGISTER. NO MASTER PHASE IN DATA UNIT.
EtL — TEMPORARY LATCH DATA (LOADS) COMPLETE INTO DESTINATION REGISTER(S). DATA UNIT PERFORMS ITS ALU/MPY OPERATIONS.
Anm — NO MASTER PHASE IN ADDRESS UNIT. ADDRESS REGISTER NOT MODIFIED.

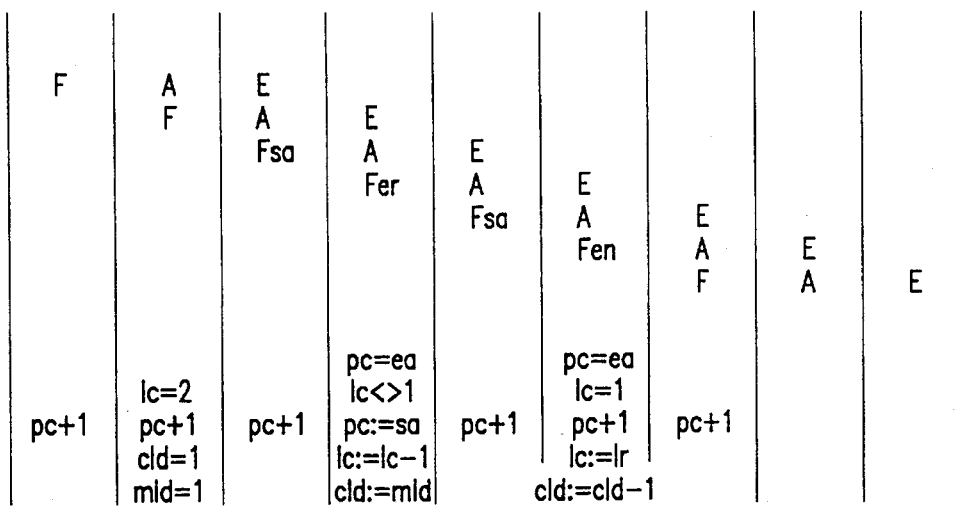

Fsa – START ADDRESS OF LOOP. PC INCREMENTS NORMALLY.
Fer – END ADDRESS, REPEAT LOOP. LOOP COUNTER NOT ONE. LOAD PC
   WITH START ADD.
Fen – END ADDRESS, NO-REPETITION. LOOP COUNTER IS ONE. PC
   INCREMENTS NORMALLY.

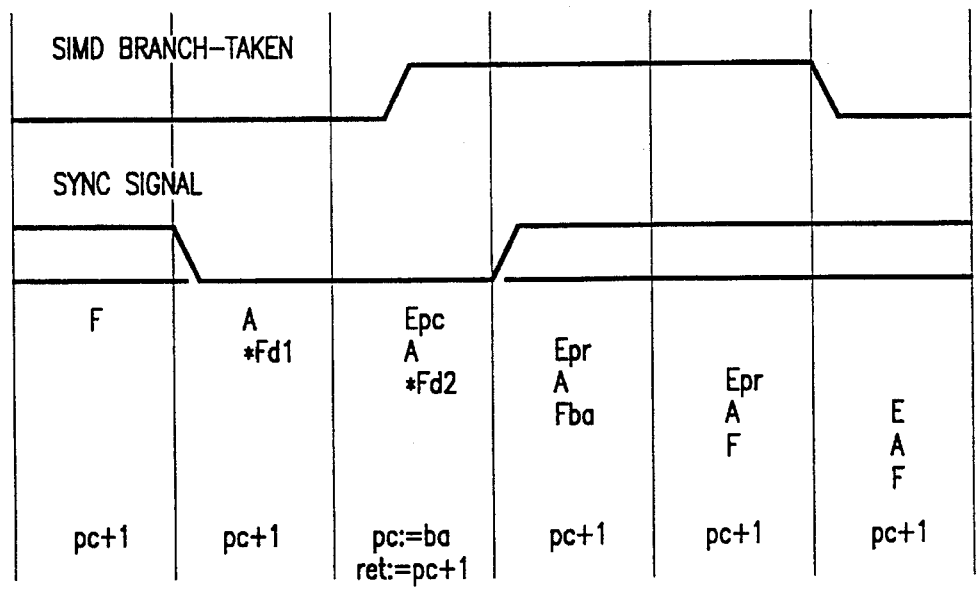

Epc – COPY PC+1 INTO RET. LOAD PC WITH BRANCH ADDRESS.
Epr – PUSH RET IF A CALL. (EITHER Epr CAN PUSH THE RETURN ADDRESS).
Fd1 – DELAY SLOT 1 INSTRUCTION FETCH.
Fd2 – DELAY SLOT 2 INSTRUCTION FETCH.
Fba – FETCH INSTRUCTION FROM BRANCH ADDRESS.
 *  – INTERRUPTS LOCKED OUT.

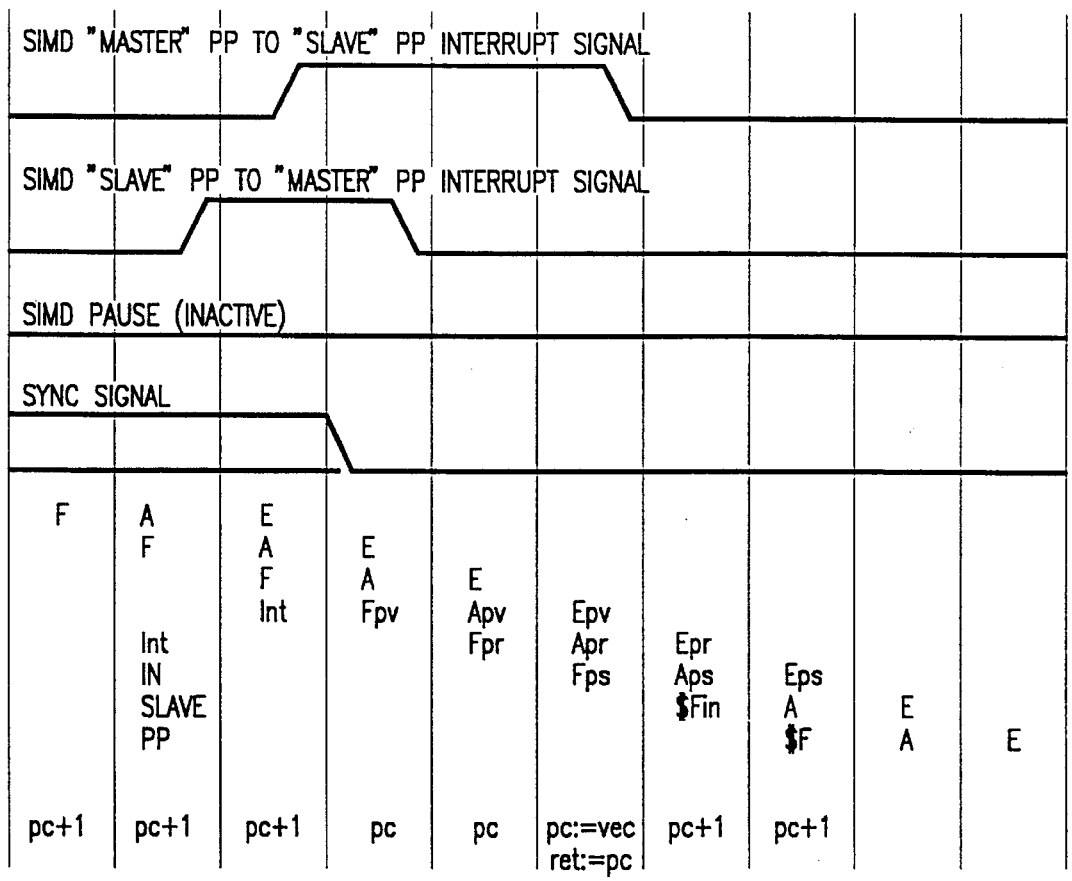

Int — INTERRUPT OCCURS.
Fpv — PSEUDO INSTRUCTION. (PC TO RET. VECTOR FETCH INTO PC).
Apv — CALCULATE INTERRUPT VECTOR ADDRESS.
Epv — COPY PC TO RET. FETCH INTERRUPT VECTOR INTO PC.
Fpr — PSEUDO INSTRUCTION. (PUSH RET).
Apr — CALCULATE STACK PUSH ADDRESS.
Epr — PUSH RET ONTO STACK.
Fps — PSEUDO INSTRUCTION. (PUSH SR).
Aps — CALCULATE STACK PUSH ADDRESS.
Eps — PUSH SR ONTO STACK. CLEAR S, I AND CLD BITS IN SR.
Fin — FIRST INSTRUCTION OF INTERRUPT ROUTINE.
$ — SYNC, INTERRUPTS AND LOOPING DISABLED UNTIL AFTER SR HAS BEEN PUSHED. NEITHER OF FIRST TWO INSTRUCTIONS OF INTERRUPT ROUTINE MAY BE A LCK.

FIG. 39

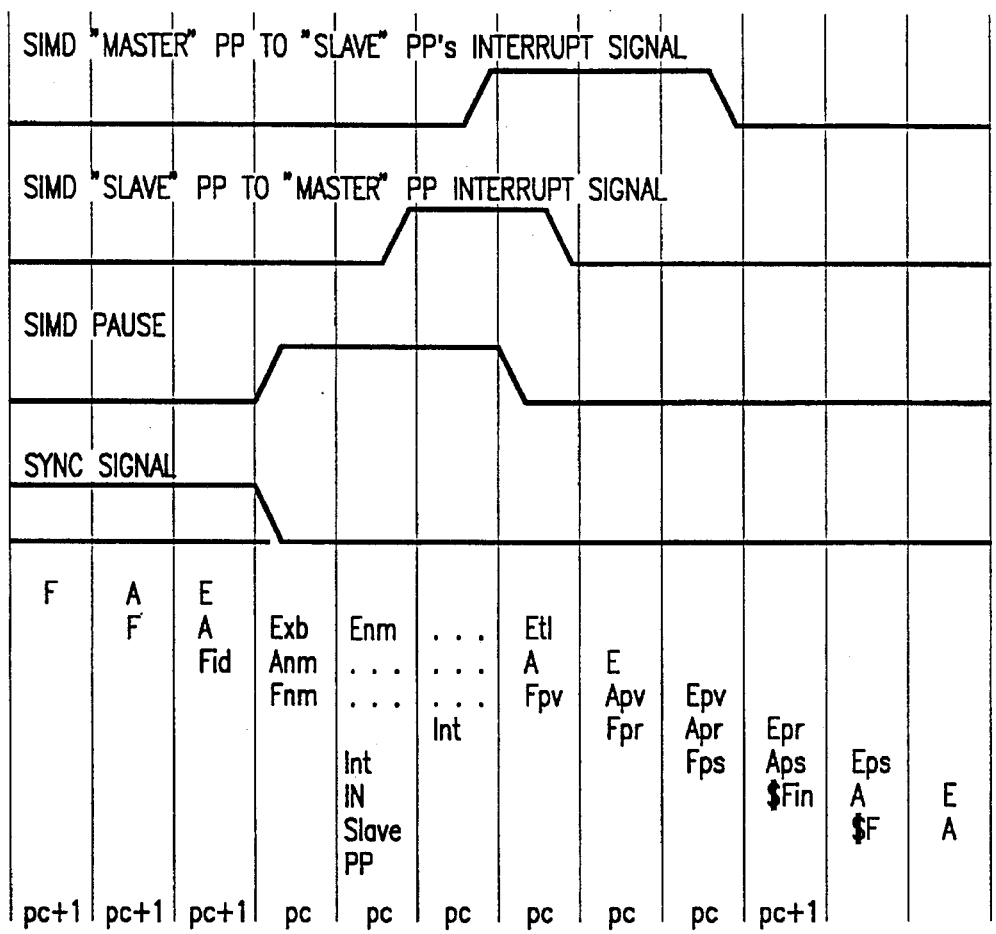

Fid — IDLE INSTRUCTION FETCHED.
Fnm — NO MASTER PHASE ON INSTRUCTION FETCH. PIPELINE NOT LOADED.
Anm — NO MASTER PHASE ON INSTRUCTION FETCH. ADDRESS REGISTERS NOT MODIFIED.
Exb — CROSSBAR ACCESS(ES) OCCUR. STORES COMPLETE TO MEMORY. LOADS COMPLETE INTO TEMPORARY LATCHES. MASTER PHASE OF DATA UNIT OPERATIONS KILLED.
Enm — NO MASTER PHASE IN DATA UNIT.
Int — INTERRUPT OCCURS.
EtL — TEMPORARY LATCH DATA (LOADS) COMPLETE INTO DESTINATION REGISTER(S). DATA UNIT PERFORMS ITS ALU/MPY OPERATIONS.
Fpv — PSEUDO INSTRUCTION. (PC TO RET. VECTOR FETCH INTO PC).
Apv — CALCULATE INTERRUPT VECTOR ADDRESS.
Epv — COPY PC TO RET. FETCH INTERRUPT VECTOR INTO PC.
Fpr — PSEUDO INSTRUCTION. (PUSH RET).
Apr — CALCULATE STACK PUSH ADDRESS.
Epr — PUSH RET ONTO STACK.
Fps — PSEUDO INSTRUCTION. (PUSH SR).
Aps — CALCULATE STACK PUSH ADDRESS.
Eps — PUSH SR ONTO STACK. CLEAR S, I AND CLD BITS IN SR.
Fin — FIRST INSTRUCTION OF INTERRUPT ROUTINE.
$ — SYNC, INTERRUPTS AND LOOPING DISABLED UNTIL AFTER SR HAS BEEN PUSHED. NEITHER OF FIRST TWO INSTRUCTIONS OF INTERRUPT ROUTINE MAY BE A LCK.

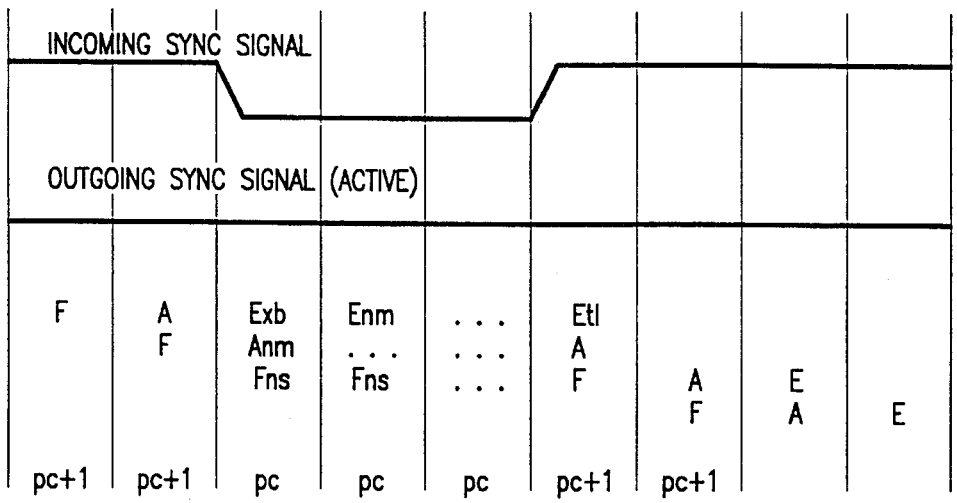

Fns – NO SYNC CONDITION. PIPE NOT LOADED. PC UNALTERED.
Anm – NO MASTER PHASE IN ADDRESS UNIT. ADDRESS REGISTERS NOT MODIFIED.
Exb – CROSSBAR ACCESS(ES) OCCUR. STORES COMPLETE TO MEMORY. LOADS COMPLETE INTO TEMPORARY LATCHES. MASTER PHASE OF DATA UNIT OPERATIONS KILLED.
Enm – NO MASTER PHASE IN DATA UNIT.
EtL – TEMPORARY LATCH DATA (LOADS) COMPLETE INTO DESIGNATION REGISTER(S). DATA UNIT PERFORMS ITS ALU/MPY OPERATIONS.

FIG. 42

LOADS: (ASSUMING NO SIGN-EXTENSION)

```
                         BYTE NO.
          SOURCE DATA:   3 2 1 0
                         -------
             0000h  =    D C B A     (MEMORY)
             0004h  =    H G F E

DESTINATION =  ? ? ? ?     (REGISTER)
```

| OP. | ADD. | 16-BIT LOADS... | REG VALUE | OP. | ADD. | 32-BIT LOADS... | REG VALUE |
|-----|-------|-----------------|-----------|-----|-------|-----------------|-----------|
| LD  | 0000h | 0 0 B A         | 0 0 B A   | LD  | 0000h | D C B A         | D C B A   |
| LDU | 0002h | – – – –         | 0 0 B A   | LDU | 0004h | – – – –         | D C B A   |
| LD  | 0001h | – – – B         | ? ? ? B   | LD  | 0001h | – D C B         | ? D C B   |
| LDU | 0003h | 0 0 C –         | 0 0 C B   | LDU | 0005h | E – – –         | E D C B   |
| LD  | 0002h | 0 0 D C         | 0 0 D C   | LD  | 0002h | – – D C         | ? ? D C   |
| LDU | 0004h | – – – –         | 0 0 D C   | LDU | 0006h | F E – –         | F E D C   |
| LD  | 0003h | – – – D         | ? ? ? D   | LD  | 0003h | – – – D         | ? ? ? D   |
| LDU | 0005h | 0 0 E –         | 0 0 E D   | LDU | 0007h | G F E –         | G F E D   |

STORES:

SOURCE DATA: = D C B A   (REGISTER)

DESTINATION DATA: = BYTE NO.
3 2 1 0

0000h = ? ? ? ?   (MEMORY)
0004h = ? ? ? ?

| OP. | ADD. | 16-BIT STORES... | 0000h 0004h | OP. | ADD. | 32-BIT STORES... | REG VALUE |
|---|---|---|---|---|---|---|---|
| ST | 0000h | 0 0 B A | ? ? B A<br>? ? ? ? | ST | 0000h | D C B A | D C B A<br>? ? ? ? |
| STU | 0002h | - - - - | ? ? B A<br>? ? ? ? | STU | 0004h | - - - - | D C B A<br>? ? ? ? |
| ST | 0001h | - - A - | ? ? A ?<br>? ? ? ? | ST | 0001h | C B A - | C B A ?<br>? ? ? ? |
| STU | 0003h | - B - - | ? B A ?<br>? ? ? ? | STU | 0005h | - - - D | C B A ?<br>? ? ? D |
| ST | 0002h | - A - - | ? A ? ?<br>? ? ? ? | ST | 0002h | B A - - | B A ? ?<br>? ? ? ? |
| STU | 0004h | B - - - | B A ? ?<br>? ? ? ? | STU | 0006h | - - D C | B A ? ?<br>? ? D C |
| ST | 0003h | A - - - | A ? ? ?<br>? ? ? ? | ST | 0003h | A - - - | A ? ? ?<br>? ? ? ? |
| STU | 0005h | - - - B | A ? ? ?<br>? ? ? B | STU | 0007h | - D C B | A ? ? ?<br>? D C B |

*FIG. 43*

| ADD WITH SATURATE | MAXIMUM | TRANSPARENCY |
|---|---|---|
| ADDM D0, D1, D2<br>MRGM D2, D3, D2 | SUBM D0, D1, D2<br>MRGM D0, D1, D2 | CMPM D0, D1<br>MRGM D0, D2, D3 |
| D0 = 89 23 CD 67<br>+D1 = 01 AB 45 EF | D0 = 89 23 CD 67<br>−D1 = 01 AB 45 EF | D0 = 89 23 CD 67<br>(−)D1 = 23 23 23 23 |
| D2: = 8A CE 12 56<br>MFLAGS: = ?? ?? ?? ?3 | D2: = 88 67 88 67<br>MFLAGS: = ?? ?? ?? ?5 | (= 66 00 8A 44)<br>MFLAGS: = ?? ?? ?? ?4 |
| D2 = 8A CE 12 56<br>D3 = FF FF FF FF | D0 = 89 23 CD 67<br>D1 = 01 AB 45 EF | D0 = 89 23 CD 67<br>D2 = 87 65 43 21 |
| D2: = 8A CE FF FF | D2: = 89 AB CD EF | D3: = 89 65 CD 67 |

| COLOUR EXPANSION | COLOUR COMPRESSION | GUIDED COPY |
|---|---|---|
| LD *A0, MFLAGS<br>MRGM D0, D1, D2 | CMPM D0, D1, D2 | LD *A0, MFLAGS<br>MRGM D0, D1, D1 |
| | D0 = 89 23 CD 67<br>(−)D1 = 89 89 89 89 | |
| | (= 00 89 44 CD) | |
| MFLAGS = XX XX XX X6 | MFLAGS = ?? ?? ?? ?8 | MFLAGS = XX XX XX XC |
| D0 = 11 11 11 11<br>D1 = 88 88 88 88 | | D0 = 89 23 CD 67<br>D1 = 87 65 43 21 |
| D2: = 11 88 88 11 | | D1: = 87 65 CD 67 |

FIG. 44

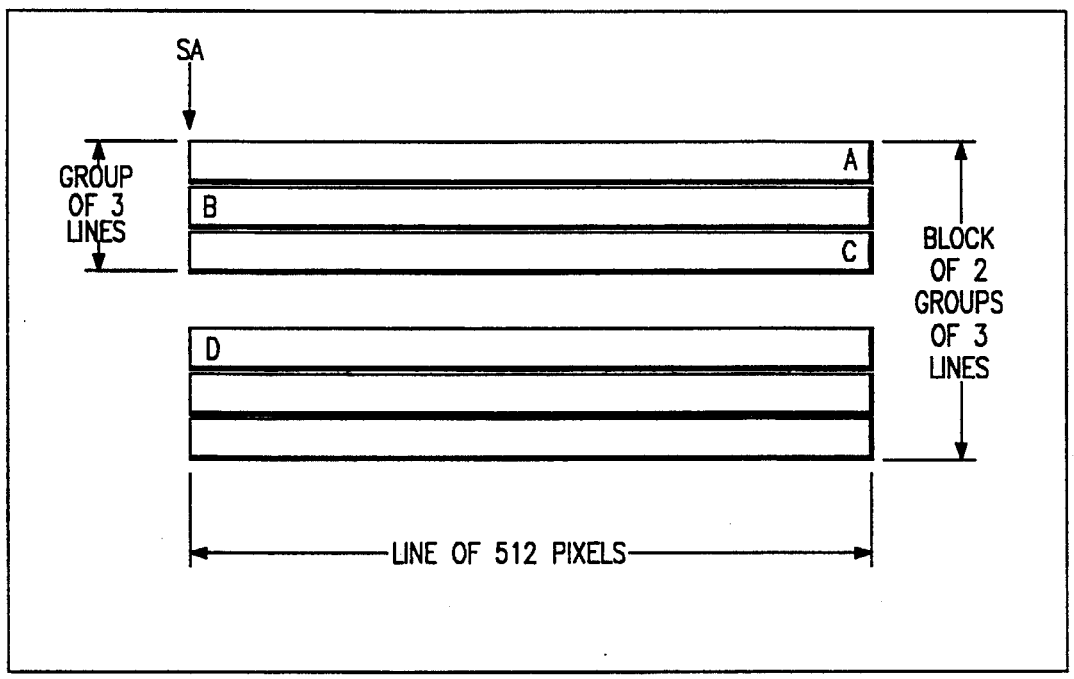

FIG. 45

ADDRESS GENERATOR WITH CONTROLLABLE MODULO POWER OF TWO ADDRESSING CAPABILITY

This application is: a divisional of U.S. patent application Ser. No. 08/263,504 filed Jun. 21, 1994 now U.S. Pat. No. 5,471,592; which is a continuation of U.S. patent application Ser. No. 08/135,754 filed Oct. 12, 1993 now abandoned; which is a continuation of U.S. patent application Ser. No. 07/933,865 filed Aug. 21, 1992, now abandoned; which is a continuation of U.S. patent application Ser. No. 07/435,591 filed Nov. 17, 1989, now abandoned.

CROSS REFERENCE TO RELATED APPLICATIONS

All of the following patent applications are cross-referenced to one another, and all have been assigned to Texas Instruments Incorporated. These applications have been concurrently filed and are hereby incorporated in this patent application by reference.

U.S. patent application Ser. No. 08/263,504 filed Jun. 21, 1994, now U.S. Pat. No. 5,471,592 issued Nov. 28, 1995 and entitled MULTI-PROCESSOR WITH CROSSBAR LINK OF PROCESSORS AND MEMORIES AND METHOD OF OPERATION; which is a continuation of U.S. patent application Ser. No. 08/135,754 filed Oct. 12, 1993, now abandoned; which is a continuation of U.S. patent application Ser. No. 07/933,865 filed Aug. 21, 1992, now abandoned; which is a continuation of U.S. patent application Ser. No. 07/435,591 filed Nov. 17, 1989, now abandoned.

U.S. patent application Ser. No. 07/437,858 filed Nov. 17, 1989, now U.S. Pat. No. 5,212,777 issued May 18, 1993 and entitled MULTI-PROCESSOR RECONFIGURABLE IN SINGLE INSTRUCTION MULTIPLE DATA (SIMD) AND MULTIPLE INSTRUCTION MULTIPLE DATA (MIMD) MODES AND METHOD OF OPERATION.

U.S. patent application Ser. No. 08/264,111 filed Jun. 22, 1994, now U.S. Pat. No. 5,522,083 issued May 28, 1996 and entitled RECONFIGURABLE MULTI-PROCESSOR OPERATING IN SIMD MODE WITH ONE PROCESSOR FETCHING INSTRUCTIONS FOR USE BY REMAINING PROCESSORS; which is a continuation of U.S. patent application Ser. No. 07/895,565 filed Jun. 5, 1992, now abandoned; which is a continuation of U.S. patent application No. 07/437,856 filed Nov. 17, 1989, now abandoned.

U.S. patent application Ser. No. 08/264,582 filed Jun. 22, 1994 now pending and entitled REDUCED AREA OF CROSSBAR AND METHOD OF OPERATION; which is a continuation of U.S. patent application Ser. No. 07/437,852 filed Nov. 17, 1989, now abandoned.

U.S. patent application Ser. No. 08/032,530 filed Mar. 15, 1993 now pending and entitled SYNCHRONIZED MIMD MULTI-PROCESSING SYSTEM AND METHOD; which is a continuation of U.S. patent application Ser. No. 07/437,853 filed Nov. 17, 1989, now abandoned.

U.S. patent application Ser. No. 07/437,946 filed Nov. 17, 1989, now U.S. Pat. No. 5,197,140 issued Mar. 23, 1993 and entitled SLICED ADDRESSING MULTI-PROCESSOR AND METHOD OF OPERATION.

U.S. patent application Ser. No. 07/437,857 filed Nov. 17, 1989, now U.S. Pat. No. 5,339,447 issued Aug. 16, 1994 and entitled ONES COUNTING CIRCUIT, UTILIZING A MATRIX OF INTERCONNECTED HALF-ADDERS, FOR COUNTING THE NUMBER OF ONES IN A BINARY STRING OF IMAGE DATA.

U.S. patent application Ser. No. 07/437,851 filed Nov. 17, 1989, now U.S. Pat. No. 5,239,654 issued Aug. 24, 1993 and entitled DUAL MODE SIMD/MIMD PROCESSOR PROVIDING REUSE OF MIMD INSTRUCTION MEMORIES AS DATA MEMORIES WHEN OPERATING IN SIMD MODE.

U.S. patent application Ser. No. 07/911,562 filed Jun. 29, 1992, now U.S. Pat. No. 5,410,649 issued Apr. 25, 1995 and entitled IMAGING COMPUTER AND METHOD OF OPERATION; which is a continuation of U.S. patent application Ser. No. 07/437,854 filed Nov. 17, 1989, now abandoned.

U.S. patent application Ser. No. 07/437,875 filed Nov. 17, 1989, now U.S. Pat. No. 5,226,125 issued Jul. 6, 1993 and entitled SWITCH MATRIX HAVING INTEGRATED CROSSPOINT LOGIC AND METHOD OF OPERATION.

TECHNICAL FIELD OF THE INVENTION

This invention relates generally to multi-processor systems and more particularly to such systems and methods where the several processors are interconnectable to many different memory addressing spaces.

BACKGROUND OF THE INVENTION

In the world of computers and processors there is an unrelenting drive for additional computing power and faster calculation times. In this context, then, systems in which several processors can be combined to work in parallel with one another are necessary.

Imaging systems which obtain visual images and perform various manipulations with respect to the data and then control the display of the imaged and stored data currently require large amounts of computations and memory. Such imaging systems are prime candidates for multi-processing where different processors perform different tasks concurrently in parallel. These processors can be working together in the single instruction, multiple data mode (SIMD) where all of the processors are operating from the same instruction but obtaining data from various sources, or the processors can be working together in the multiple instruction, multiple data mode (MIMD) where each processor is working from a different set of instructions and working on data from different sources. For different operations, different configurations are necessary.

There is thus a need in the art for a system which handles multi-processors having multi-memories such that the address space from all of the memories is available to one or more processors concurrently even when the processors are handling different instruction sets.

There is a further need in the art for a multi-processing system which is constructed with a switch capable of allowing both SIMD and MIMD operation on an interchangeable basis.

One method of solving the huge interconnection problem in complex systems such as the image processing system shown in one embodiment of the invention is to construct the entire processor as a single device. Conceptually this might appear easy to achieve, but in reality the problems are complicated.

First of all, an architecture must be created which allows for the efficient movement of information while at the same time conserving precious silicon chip space. The architecture must allow a very high degree of flexibility since once fabricated, it cannot easily be modified for different applications. Also, since the processing capability of the system will be high, there is a need for high band width in the movement of information on and off the chip. This is so since the physical number of leads which can attach to any one chip is limited.

It is also desirable to design an entire parallel processor system, such as an image processor, on a single silicon chip while maintaining the system flexible enough to satisfy wide ranging and constantly changing operational criteria.

It is further desirable to construct such a single chip parallel processor chip where the processor memory interface is easily adaptable to operation in various modes, such as SIMD and MIMD, as well as adaptable to efficient on-off chip data communications.

SUMMARY OF THE INVENTION

These problems have been solved by designing a multi-processing system to handle image processing and graphics and by constructing a crossbar switch capable of interconnecting any processor with any memory in any configuration for the interchange of data. The system is capable of connecting n parallel processors to m memories where m is greater than n.

The problems inherent with constructing a single chip image processor having a high degree of versatility have been solved by the architecture of establishing a multi-link, multi-bus crossbar switch between the individual processors and the individual memories. This architecture, coupled with the design of the high density switch, allows for full access of all processors to all memories. The crossbar switch is constructed with different length links serving different functions so as to conserve space while still providing a high degree of operational flexibility.

In one embodiment a transfer processor operates to control on-chip/off-chip communications while a master processor serves to control communications to a common memory. In operation, any processor can access any of a number of memories, while certain memories are dedicated to handling instructions for the individual processors.

A multi-processing system operates with n processors, each processor operable from instruction sets provided from a memory source for controlling a number of different processes, which rely on the movement of data to or from one or more addressable memories, each memory having a unique addressable space and including a switch matrix connected to the memories and connected to the processors and adapted for selectively and concurrently enabling the switch matrix on a processor cycle-by-cycle basis for interconnecting any of the processors with any of the memories for the interchange between the memories and the connected processors of instruction sets from one or mere addressable memory spaces and data from other addressable memory spaces.

BRIEF DESCRIPTION OF THE DRAWINGS

For a more complete understanding of the present invention and for further advantages thereof, reference is now made to the following detailed description taken in conjunction with accompanying drawings in which

FIG. 3 shows a series of image processing systems interconnected together into an expanded system;

FIG. 5 shows a prior art parallel processor configuration using shared memories;

FIG. 6 shows a prior art parallel processor configuration using distributed memories;

FIG. 7 shows an improved configuration;

FIG. 8 shows a prior art SIMD processor configuration;

FIG. 9 shows a prior art MIMD processor configuration;

FIG. 10 shows some reconfigurable modes of operations of an improved multi-processor;

FIG. 13 shows an example of the pixel data flow in the MIND mode using sliced addressing;

FIG. 14 shows an example of data access in the SIMD in accordance with this invention;

FIG. 15 shows an example of data access in the MIMD mode in accordance with this invention;

FIG. 24 shows an example of pixel data distribution using sliced addressing;

FIG. 25 shows an example of a prior art address adder;

FIG. 26 shows the address adder of this invention using sliced addressing;

FIG. 35 is a graph of waveforms of the pipeline sequence for a cache miss;

FIG. 36 is a graph of waveforms of the pipeline sequence for contention resolution;

FIG. 37 is a graph of waveforms of the pipeline sequence for loop control;

FIG. 38 is a graph of waveforms of the pipeline sequence for a branch or call instruction;

FIG. 39 is a graph of waveforms of the pipeline sequence for an interrupt;

FIG. 40 is a graph of waveforms of the pipeline sequence for an IDLE instruction;

FIG. 41 is a graph of waveforms of the pipeline sequence for a synchronized processor waiting for a synchronization signal;

FIG. 42 is an example of an nonaligned data load operation;

FIG. 43 is an example of a nonaligned data store operation;

FIG. 44 is an example of the operations that can be performed with a splittable arithmetic logic unit;

FIG. 45 is an example of a complex pixel data block that can be specified in a single packet request;

DETAILED DESCRIPTION OF THE INVENTION

Prior to beginning a discussion of the operation of the system, it may be helpful to understand how parallel processing systems have operated in the prior art.

FIG. 5 shows a system having parallel processors 50–53 accessing a single memory 55. The system shown in FIG. 5 is typically called a shared memory system where all of the parallel processors 50–53 share data in and out of the same memory 55.

FIG. 6 shows another prior art system where memory 65–68 is distributed with respect to processors 60–63 on a one-for-one basis. In this type of system, the various processors access their respective memory in parallel and thus operate without memory contention between the processors. The system operating structures shown in FIGS. 5 and 6, as will be discussed hereinafter, are suitable for a particular type of problem, and each is optimized for that type of problem. In the past, systems tended to be either shared or distributed.

As processing requirements become more complex and the speed of operation becomes critical, it is important for systems to be able to handle a wide range of operations, some of which are best performed in the shared memory mode, and some of which are best performed in a distributed memory mode. The structure shown in FIGS. 1 and 2 accomplishes this result by allowing a system to have parallel processing working both in the shared and in the distributed mode. While in these modes, various operational arrangements such as SIMD and MIMD can be achieved.

Multi-Processors and Memory Interconnection

Figure 1:
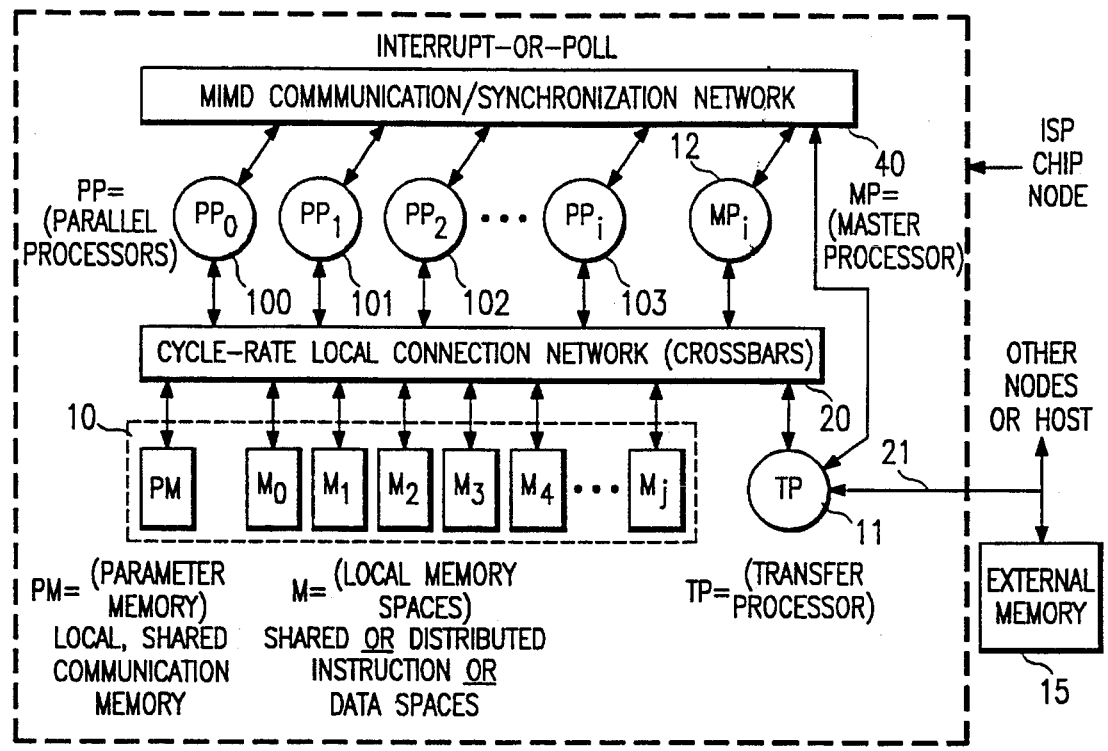
FIG. 1 shows an overall view of the elements of the image processing system.

As shown in FIG. 1, there is a set of parallel processors 100–103 and a master processor 12 connected to a series of memories 10 via a cycle-rate local connection network switch matrix 20 called a crossbar switch. The crossbar switch, as will be shown, is operative on a cycle by cycle basis to interconnect the various processors with the various memories so that different combinations of distributed and shared memory arrangements can be achieved from time to time as necessary for the particular operation. Also, as will be shown, certain groups of processors can be operating in a distributed mode with respect to certain memories, while other processors concurrently can be operating in the shared mode with respect to each other and with respect to a particular memory.

Figure 2:
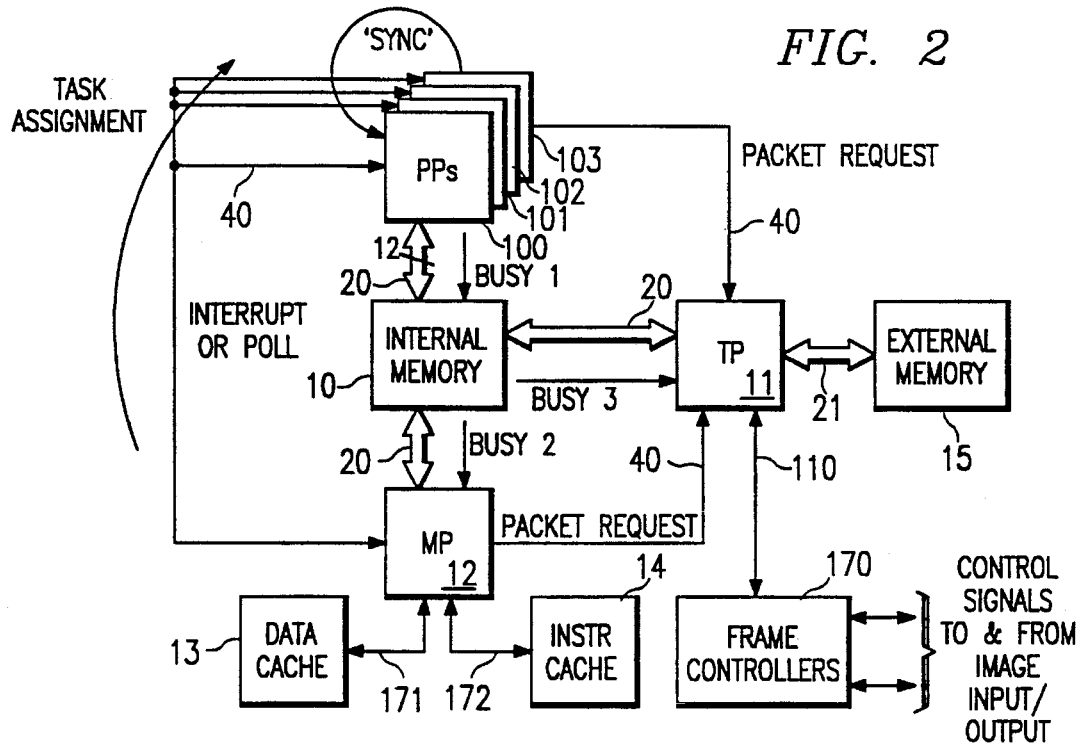
FIG. 2 shows an alternative view of the elements of the image processing system.

Another view of the system is shown in FIG. 2 in which the four parallel processors 100, 101, 102, 103 are shown connected to memory 10 via switch matrix 20 which is shown in FIG. 2 as a distributed bus. Also connected to memory 10 via crossbar switch 20 is transfer processor 11 and master processor 12. Master processor 12 is also connected to data cache 13 via bus 171 and instruction cache 14 via bus 172. The parallel processors 100 through 103 are interconnected via communication bus 40 so that the processors, as will be discussed hereinafter, can communicate with each other and with master processor 12 and with transfer processor 11. Transfer processor 11 communicates with external memory 15 via bus 21.

Also in FIG. 2, frame controllers 170 are shown communicating with transfer processor 11 via bus 110. Frame controllers 170 serve to control image inputs and outputs as will be discussed hereinafter. These inputs can be, for example, a video camera, and the output can be, for example, a data display. Any other type of image input or image output could also be utilized in the manner to be more fully discussed hereinafter.

Crossbar switch 20 is shown distributed, and in this form tends to mitigate communication bottlenecks so that communications can flow easily between the various parts of the system. The crossbar switch is integrated on a single chip with the processors and with the memory thereby further enhancing communications among the system elements.

Also, it should be noted that fabrication on a chip is in layers and the switch matrix may have elements on various different layers. When representing the switch pictorially, it is shown in crossbar fashion with horizontals and verticals. In actual practice these may be all running in the same direction only separated spatially from one another. Thus, the terms horizontal and vertical, when applied to the links of the switch matrix, may be interchanged with each other and refer to spatially separated lines in the same or different parallel planes.

Digressing momentarily, the system can operate in several operational modes, one of these modes being a single instruction multiple data (SIMD) mode where a single instruction stream is supplied to more than one parallel processor, and each processor can access the same memory or different memories to operate on the data. The second operational mode is the multiple instruction, multiple data mode (MIMD) where multiple instructions coming from perhaps different memories operate multiple processors operating on data which comes from the same or different memory data banks. These two operational modes are but two of many different operational modes that the system can operate in, and as will be seen, the system can easily switch between operational modes periodically when necessary to operate the different algorithms of the different instruction streams.

Returning briefly to FIG. 1, master processor 12 is shown connected to the memories via crossbar switch 20. Transfer processor 11, which is also shown connected to crossbar switch 20, is shown connected via bus 21 to external memory 15. Also note that as part of memory 10, there are several independent memories and a parameter memory which will be used in conjunction with processor interconnection bus 40 in a manner to be more fully detailed hereinafter. While FIG. 2 shows a single parameter memory, in actuality the parameter memory can be several RAMS (random access memories) per processor which makes communication more efficient and allows the processors to communicate with the RAMS concurrently.

Figure 4:
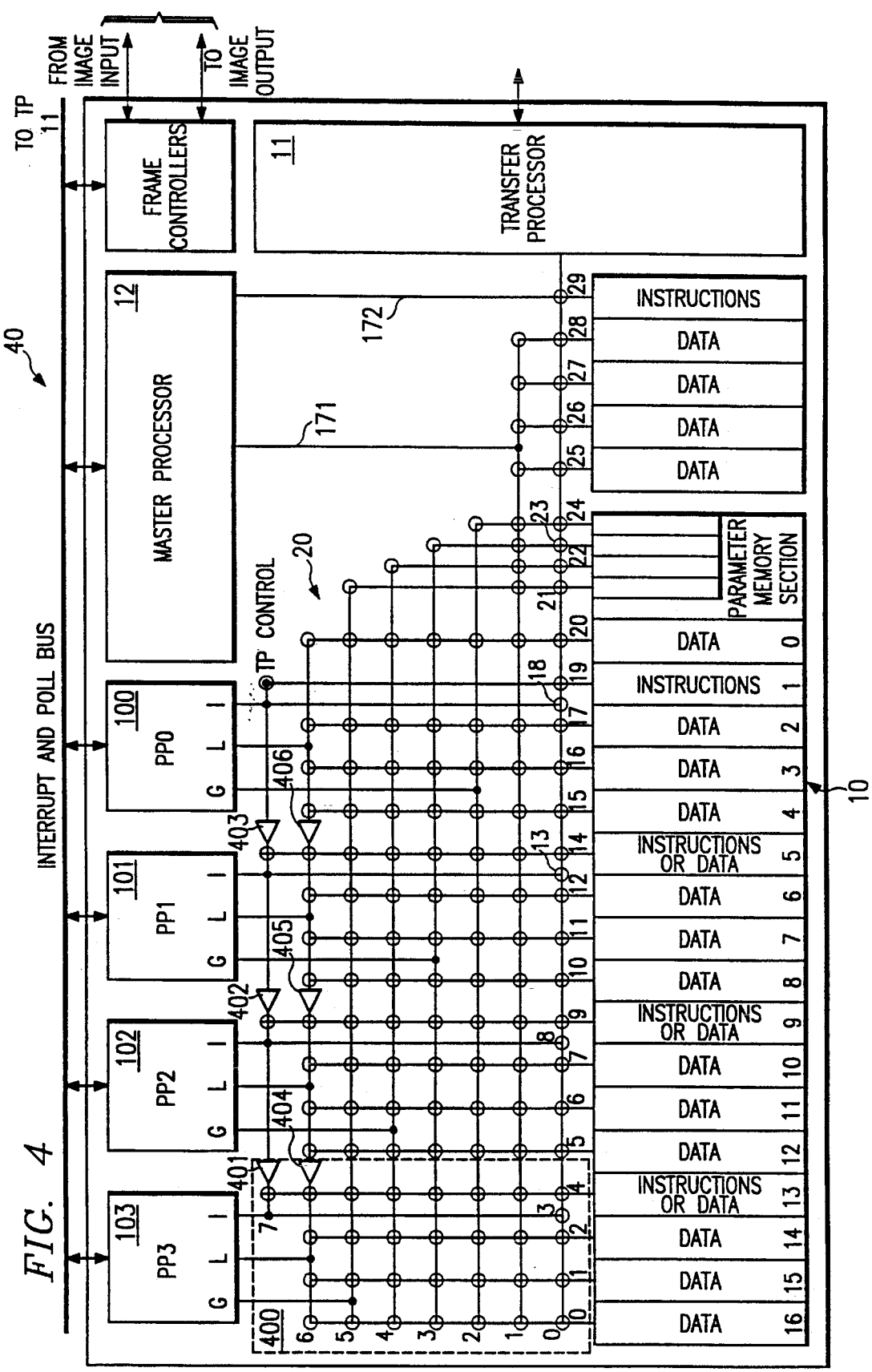
FIG. 4 shows details of the crossbar switch matrix interconnecting the parallel processors and the memories.
Figure 19:
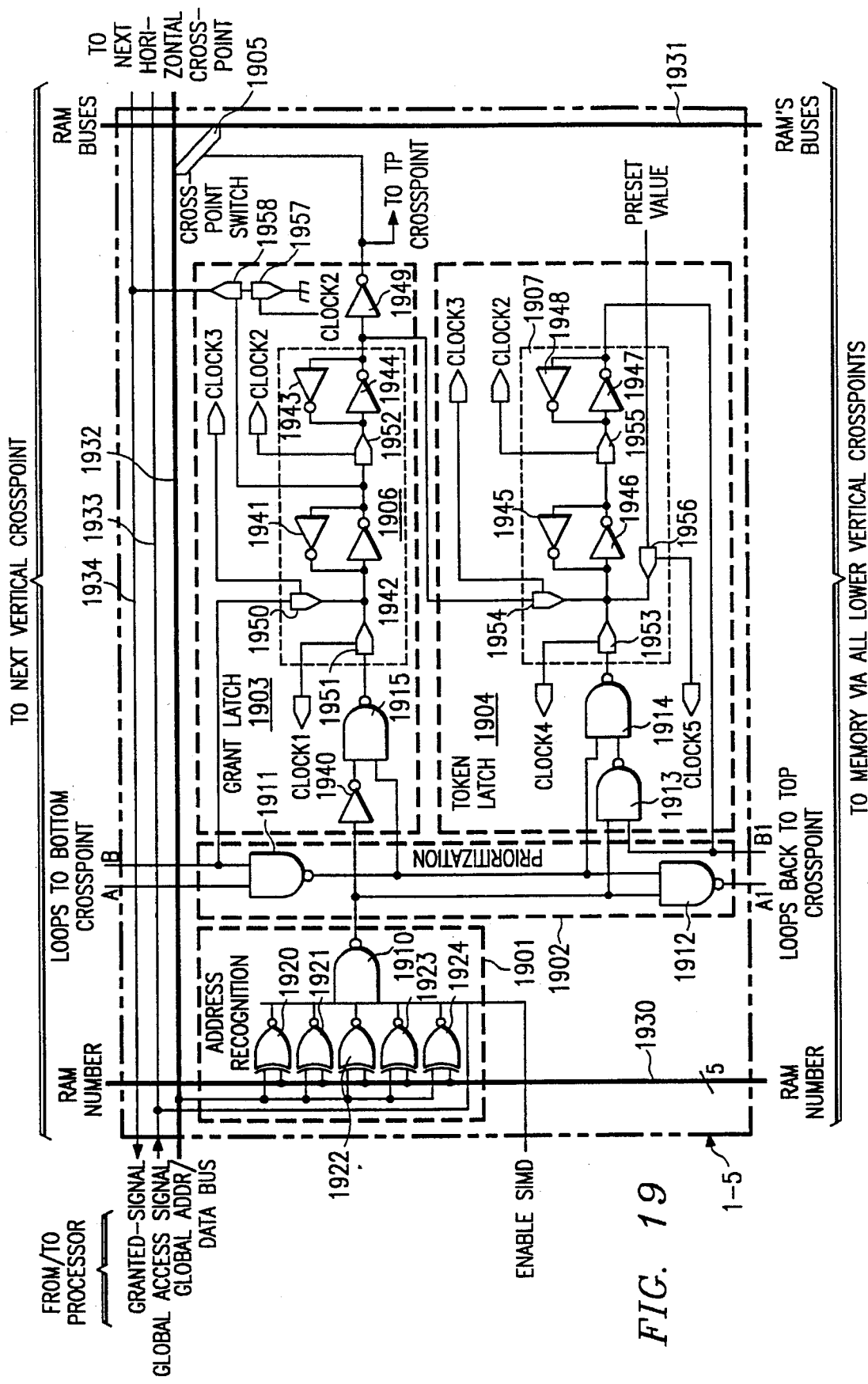

FIG. 4 shows a more detailed view of FIGS. 1 and 2 where the four parallel processors 100–103 are shown interconnected by communication bus 40 and also shown connected to memory 10 via crossbar switch matrix 20. The various crosspoints of the crossbar switch will be referred to by their coordinate locations starting in a lower left corner with 0-0. In the numbering scheme, the vertical number will be used first. Thus, the lower left corner crosspoint is known as 0-0, and the one immediately to the right in the bottom row would be 1-0. FIG. 19 which will be discussed hereinafter, shows the details of a particular crosspoint, such as crosspoint 1-5. Continuing now in FIG. 4, the individual parallel processors, such as parallel processor 103, are shown having a global data connection (G), a local data connection (L) and an instruction connection (I). Each of these will be detailed hereinafter, and each serves a different purpose. For example, the global connection allows processor 103 to be connected to any of the several individual memories of memory 10, which can be for data from any of the various individual memories.

The local memory ports of the parallel processors can each address only the memories that are served by three of the vertical switch matrix links immediately opposite the processors. Thus, processor 103 can use verticals 0, 1 and 2 of crossbar 20 to access memories 10-16, 10-15 and 10-14 for data transfer in the MIMD mode. In addition, while in the MIMD mode, memory 10-13 supplies an instruction stream to processor 103. As will be seen, in SIMD mode all of the instructions for the processors come from memory 10-1. Thus, instruction memory 10-13 is available for data. In this situation, the switch is reconfigured to allow access via vertical 4 of crossbar 20. The manner in which crossbar 20 is reconfigured will be discussed hereinafter.

As shown in FIG. 4, each parallel processor 100–103 has a particular global bus and a particular local bus to allow the processor access to the various memories. Thus, parallel processor 100 has a global bus which is horizontal 2 of crossbar 20, while parallel processor 101 has a global bus which is horizontal 3 of crossbar 20. Parallel processor 102 has as its global bus horizontal 4, while parallel processor 103 has as its global bus horizontal 5.

The local buses from all of the processors share the same horizontal 6. However, horizontal 6, as can be seen, is separated into four portions via three-state buffers 404, 405 and 406. This effectively provides isolation on horizontal 6 so that each local input to each processor can access different memories. This arrangement has been constructed for efficiency of layout area on the silicon chip. These buffers allow the various portions to be connected together when desired in the manner to be detailed hereinafter for the common communication of data between the processors. This structure allows data from memories 10-0, 10-2, 10-3 and 10-4 to be distributed to any of the processors 100–103.

When the processor is operating in the MIMD operational mode, the instruction port of the processors, for example, the instruction port of processor 103, is connected through crosspoint 4-7 to instruction memory 10-13. In this mode crosspoints 4-2, 4-3, 4-4, 4-5 and 4-6, as well as 4-1, are disabled. In this mode crosspoint 4-0 is a dynamically operative crosspoint, thereby allowing the transfer processor to also access instruction memory 10-13, if necessary. This same procedure is available with respect to crosspoint 9-7 (processor 102) and crosspoint 14-7 (processor 101).

When the system is in the SIMD mode crosspoint 4-7 is inactive, and crosspoints 4-2 through 4-6 may be activated, thereby allowing memory 10-13 to become available for data to all of the processors 100–103 via vertical 4 of crossbar 20. Concurrently, while in the SIMD mode buffers 401, 402 and 403 are activated, thereby allowing instruction memory 10-1 to be accessed by all of the processors 100–103 via their respective instruction inputs. If buffer 403 is activated, but not buffers 401 and 402, then processors 100 and 101 can share instructor memory 10-1 and operate in the SIMD mode while processors 102 and 103 are free to run in MIMD mode out of memories 10-13 and 10-9 respectively.

Crosspoints 18-0, 13-0, 8-0 and 3-0 are used to allow transfer processor 11 to be connected to the instruction inputs of any of the parallel processors. This communication can be for various purposes, including allowing the transfer processor to have access to the parallel processors in situations where there are cache misses.

FIG. 7 is a stylized diagram showing the operation of parallel processors 100–103 operating with respect to memories 55 and 55A in the shared mode (as previously discussed with respect to FIG. 5) and operating with respect to memories 65–68 in the distributed mode (as previously discussed with respect to FIG. 6). The manner of achieving this flexible arrangement of parallel processors will be discussed and shown to depend upon the operation of crossbar switch 20 which is arranged with a plurality of links to be individually operated at crosspoints thereof to effect the different arrangements desired.

Before progressing to discuss the operation of the crossbar switch, it might be helpful to review FIG. 3 and alternate arrangements where a bus 34 can be established connected to a series of processors 30–32, each processor having the configuration shown in FIG. 2 with respect to FIGS. 1 and 2. External memory 35 is shown as a single memory 15, the same memory discussed previously. This memory could be a series of individual memories, both local and located remotely. The structure shown in FIG. 3 can be used to integrate any number of different type of processors together with the image system processor discussed herein, assuming that all of the processors access a single global memory space having a unified addressing capability. This arrangement also assumes a unified contention arrangement for the memory access via bus 34 so that all of the processors can communicate and can maintain order while they each perform their own independent operations. Host processor 33 can share some of the policing problems between the various processors 30–32 to assure an orderly flow of data via bus 34.

Image Processing

In image processing there are several levels of operations that can be performed on an image. These can be thought about as being different levels with the lowest level being simply to message the data to perform basic operations without understanding the contents of the data. This can be, for example, removal of extraneous specks from an image. A higher level would be to operate on a particular portion of the data, for example, recognizing that some portion of the data represents a circle, but not fully understanding that the circle is one part of a human face. A still higher operational aspect of image processing would be to process the image understanding that the various circles and other shapes form a human image, or other image, and to then utilize this information in various ways.

Each of these levels of image processing is performed most efficiently with the processors operating in a particular type of operational mode. Thus, when operations are performed on data locally grouped together without an attempt to understand the entire image, it is usually more efficient to use the SIMD operational mode where all, or a group of, processors operate from a single instruction and from multiple data sources. When operating in a higher mode where image pixel data is required from various aspects of the entire image in order to understand the entire image, the most efficient operational mode would be the MIMD mode where the processors each operate from individual instructions.

It is important to understand that when the system is operating in the SIMD mode, the entire pixel image can be processed through the various processors operating from a single instruction stream. This would be, for example, when the entire image is to be cleaned, or the image is enhanced to show various corners or edges. Then all of the image data passes through the processors in the SIMD mode, but at any one time data from various different areas of the image cannot be processed in a different manner for different purposes. The general operational characteristic of a SIMD operation is that at any period of time a relatively small amount of the data with respect to the entire image is being operated on. This is followed, in sequential fashion, by more data being operated on in the same manner.

This is in contrast to the MIMD mode where data from various parts of the image is being processed concurrently, some using different algorithms. In this arrangement, different instructions are operating on different data at the same time to achieve a desired result. A simple example would include many different SIMD algorithms (like clean, enhance, extract) operating concurrently or pipelined on many different processors. Another example with MIMD would include the implementation of algorithms with the same data flow although using unique arithmetic or logical functions.

FIGS. 8 and 9 show the prior art form of the SIMD and MIMD processors with their respective memories. These are the preferred typologies for SIMD/MIMD for image processing. The operational modes of the system will be discussed more fully with respect to FIGS. 59–64. In general, data paths 80 of FIG. 8 corresponds to data paths 6010, 6020, 6030 and 6040 of FIG. 60, while processors 90 of FIG. 9 corresponds to processors 5901, 5911, 5921, 5931 of FIG. 59. The controller (6002 of FIG. 60) for the data paths is not shown in FIG. 8.

Reconfigurable SIMD/MIMD

FIG. 10 shows the reconfigurable SIMD/MIMD topology of this invention where several parallel processors can be interconnected via crossbar switch 20 to a series of memories 10 and can be connected via a transfer processor 11 to external memory 15, all on a cycle by cycle basis.

One of the problems of operating in the MIMD topology is that data access can require high bandwidth as compared to operation in the SIMD mode where the effective data flow is on a serial basis or is emulated in the topology. Thus, in the SIMD mode, the data typically flows sequentially through the various processors from one processor to the next. This can be a blessing as well as a problem. The problem arises in that all of the data of the image has to be processed in order to arrive at a certain point in the processing. This is accomplished in the SIMD mode in a serial fashion. However, the MIMD mode solves this type of a problem because data from the individual memories can be obtained at any time in the cycle, as contrasted to the operation in the SIMD where the shared memory can only be accessed upon a serial basis as the data arrives.

However, the MIMD mode has operational bottlenecks when it is required to have interprocessor communication since then one processor must write the data to a memory and then the other processor must know the information is there and then access that memory. This can require several cycles of operational time and thus large images with vast pixel data could require high processing times. This is a major difficulty. In the structure of FIG. 10, as discussed, these problems have been overcome because the crossbar switch can serve to, on a cycle by cycle basis if necessary, interconnect various processors together to work from a single instruction for a period of time or to work independently so that data which is stored in a first memory can remain in that memory while a different processor is for, one cycle or for a period of time, connected to that same memory. In essence, in some of the prior art, the data must be moved from memory to memory for access by the various processors, which in the instant system the data can remain constant in the memory while the processors are switched as necessary between the memories. This allows for complete flexibility of processor and memory operation as well as optimal use of data transfer resources.

Figure 12:
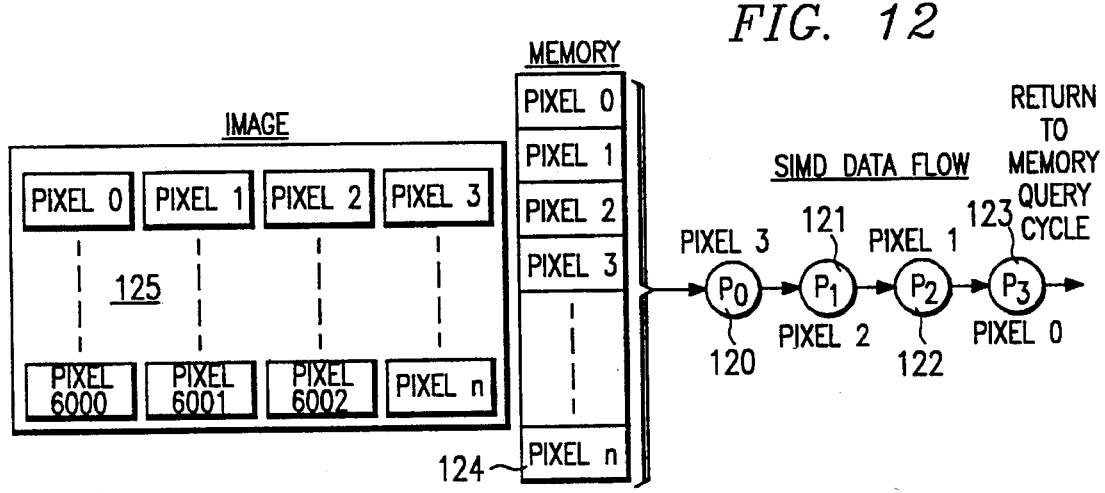
FIG. 12 shows an example of the pixel data flow in the SIMD mode.

A specific example of the processing of data in the various SIMD and MIMD modes can be shown with respect to FIGS. 12 and 13. In FIG. 12 there is shown an image 125 having a series of pixels 0–n. Note that while in the image a row is shown having only four pixels, this is by way of example only, and a typical image would have perhaps a thousand rows, each row having a thousand pixels. At any one point in time the number of pixels in a row and the number of rows will vary. For our purposes, we will assume that the row has four pixels. One way of representing these pixels in memory 124 is to put them into individual addressable spaces shown as pixels 0, pixel 1 down to pixel n in memory 124. Of course, this can be one memory or a series of memories, as will be discussed hereinafter. The memories could be arranged such that each row is stored in a different memory.

Assume now that it is desirable to process all of the data, either for all of the pixels or for any subgroup of the pixels, so that all of the data is processed by the same instruction and is returned back to memory. In this manner the data from memory 124 pixel 0 would be loaded into processor 120 and then shifted from processors 120 to 121, to 122, to 123, and at each shift new data would be entered. Using this approach, each of the processors 120–123 has an opportunity to perform a function on the data as well as to observe the functions previously performed on the data. When the chain is finished, the data is returned to memory. This cycle can continue so that all of the pixels in the subset, or all of the pixels in the image, can be processed sequentially through the system. This type of operation is performed best in the SIMD mode.

This is in contrast to the arrangement shown in FIG. 13 where the MIMD data flow is illustrated. In such a system, it is perhaps desirable to have pixels 0 through 3 and 250–500 processed in a particular manner, while other pixels from other image regions (which differ from a certain region 3 of the image) are processed in a different manner. In this way then processor 120 would be arranged to process pixels 0–3 and pixels 250–500 while processor 121 is arranged to process pixels 50–75 and pixels 2000–3000. Each region can then be processed using different algorithms or by the same algorithm but with program flow changes that are dependant on the data contents. These pixels are all processed in parallel and stored at various memory locations. In this mode the MIMD operation would be faster than the SIMD operation except in situations where data would have to move from processor 121 to processor 120, in which case there would have to be a movement of data in the memory bank. This interprocessor data movement could be required, for example, in situations where data processed from a particular region is important in determining how to process data from another region, or for determining exactly what the total image represents. Just as it is difficult to determine the shape of an elephant from a grasp of its trunk, it is equally difficult to obtain meaningful information from an image without access to different portions of the pixel data.

Turning now to FIG. 14, there is graphically illustrated a system utilizing the present invention. Crossbar switch 20 allows processors 100–103 to access individual memories M1–M4 of memory 10, and on a cycle by cycle basis. The structure shown in FIG. 14 allows the operation described in FIG. 12 with respect to the SIMD operation such that the data in the memory elements, M1–M4 remains stationary and the connections from the processor switch. The continual flow of the process is enhanced by having more memory elements than actually utilized by the processors at a given instance. Thus, data can move in and out from these "extra" memory elements, and these extra elements can be cycled into the operational stream. In such an arrangement, data in and data out memory elements would, on a cycle by cycle basis, be different memory elements. Note that the data in and data out memories are switched through the crossbar and thus can be positioned in any of the memory elements. Thus, instead of moving the data between memories, the processor connection is sequentially changed.

Turning now to FIG. 15, the MIMD mode is shown such that processors 100–103 are connected through crossbar switch 20 to various memories. Typically, these connections would last through several cycles and thus, the processors each would be connected to the respective memories for a period of time. While this is not necessary, it would be the most typical operation in the MIMD mode. For any processor, or group of processors operating in the MIMD mode of FIG. 15, crossbar switch 20 can, on a cycle by cycle basis, be operated so that data from a particular memory element is immediately made available to any of the other processors so that the data can either be cycled through the other processors or operated on a one-time basis.

Reconfigurable Interprocessor Communication

Figure 16:
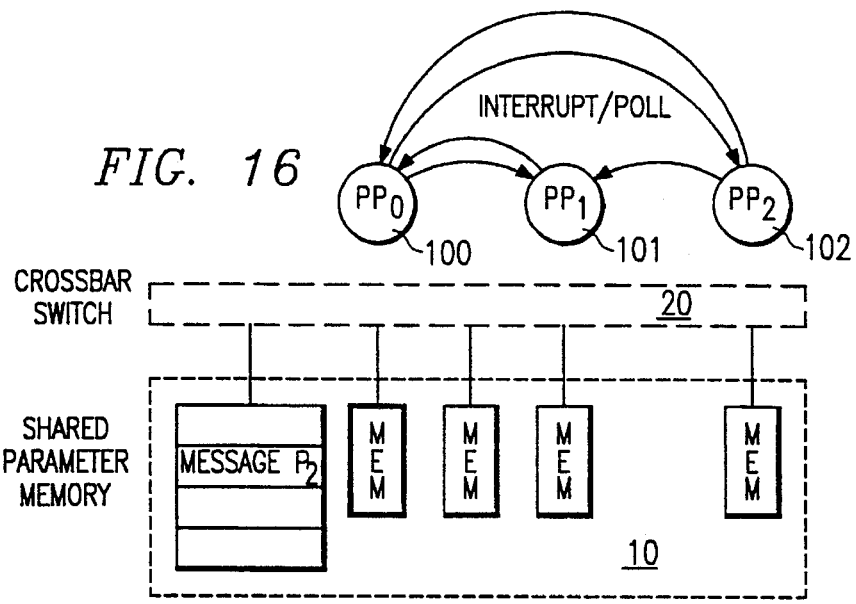
FIG. 16 shows the interrupt polling communication between the processors.

FIG. 16 shows the diagram of interprocessor communication when the system is operating in the MIMD mode when the various processors must communicate with each other. A processor, such as processor 100, sends a message through crossbar switch 20 to the shared parameter memory while at the same time registering a message (interrupt) in the destination processor that a parameter message is waiting. The destination processor, which can be any one of the other processors such as processor 102, then via crossbar switch 20 accesses the shared parameter memory to remove the message. The destination processor, for example, then could reconfigure itself in accordance with the received message. This reconfiguration can be internal to provide a particular system mode of operation or can be an instruction as to which memories to access and which memories not to access for a period of time.

The question of accessing memories (contention) is important because a processor can waste a lot of time trying to access a memory when another processor is using that memory for an extended period. The efficient operation of the system would be very difficult to achieve without the interprocessor coupling via the communication link.

Another type of message which is communicated between the processors relates to the synchronization of the processors. These messages and the precise manner in which synchronization is accomplished will be discussed hereinafter. FIG. 2 shows the full system arrangement where the processors are interconnected for interrupting or polling between them to control sync, memory and crossbar allocation on a cycle by cycle basis.

It is the communication links between the processors which function outside of the crossbar switch that supports a more efficient utilization of the memory. The number of cycles that are required to switch operational modes, for example between SIMD and MIMD, is dependent upon the amount of other operations which must be performed. These other operations are, for example, loading of code in various instruction memories and the loading of data into data memories for subsequent operation. The external communications help this function by establishing which memories a particular processor may access and instructing all of the processors as to their ability to access memories so that the processors are not waiting in line for access when the access is being denied.

The instructions between processors can be by interrupt and by polling. The interrupt can be in any one of the well-known interrupt configurations where data can be transmitted with a flag to point to particular message locations within the shared parameter memory or can operate directly on a pointer basis within the processor. The ability to establish on a cycle by cycle basis which processor has access to which memory is important in establishing the ability of the system to operate in the MIMD mode so that data can reside in a particular memory, and the processors which have access to that data are continually shifted. Using this arrangement then, several cycles of time, which would be required to move data from memory to memory if the memories were on a fixed relationship to processors, are dramatically eliminated. The communication link includes the master processor.

Transfer Processor

Figure 57:
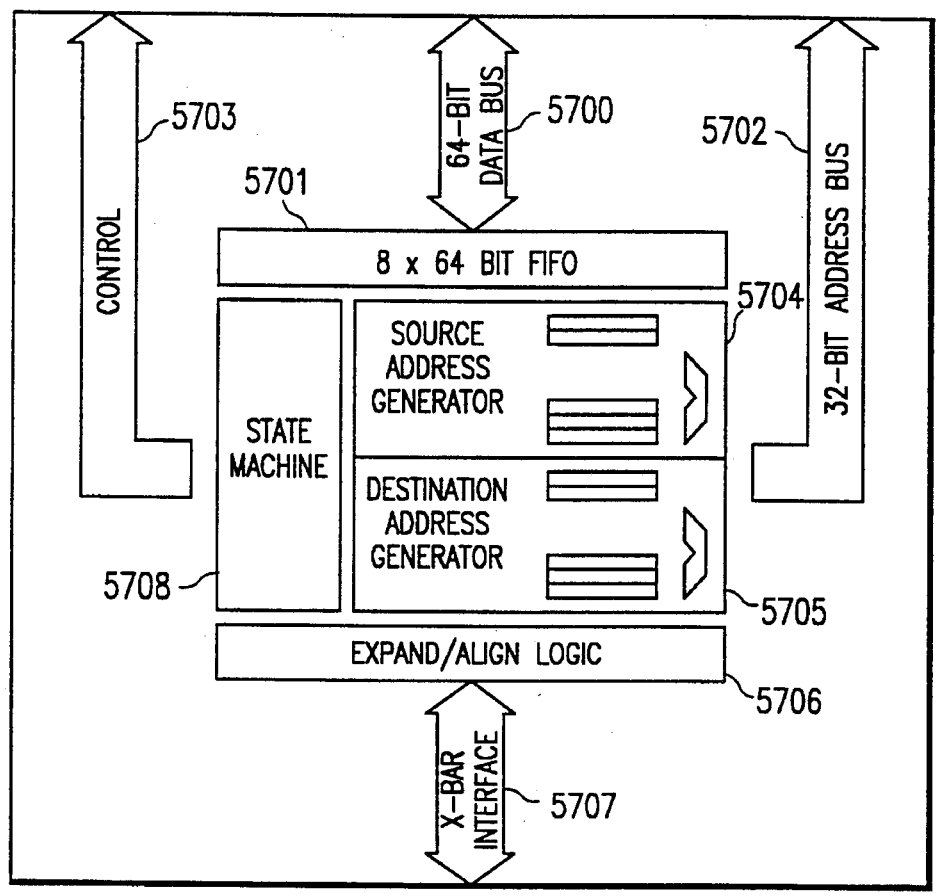
FIG. 57 shows a block diagram of the transfer processor.

Transfer processor 11 shown in FIGS. 1 and 2 and in FIG. 57 transfers data between external memory and the various internal memory elements. Transfer processor 11 is designed to operate from packet requests such that any of the parallel processors or the master processor can ask transfer processor 11 to provide data for any particular pixel or a group of pixels or data, and the transfer processor will transfer the necessary data to or from external and internal memory without further processor intervention instructions. This then allows transfer processor 11 to work autonomously and to process data in and out of the system without monitoring by any of the processors. Transfer processor 11 is connected to all of the memories through switch matrix 20 and is arranged to contend with the various links for access to the memories. Transfer processor 11 for any particular link may be assigned the lowest priority and access a memory when another processor is not accessing that memory. The data that is being moved by the transfer processor is not only the data for processing pixels, but instruction streams for controlling the system. These instruction streams are loaded into the instruction memory via crossbar switch 20. Transfer processor 11 can be arranged with a combination of hardware and software to effect the purpose of data transfer.

Master Processor

Figure 29:
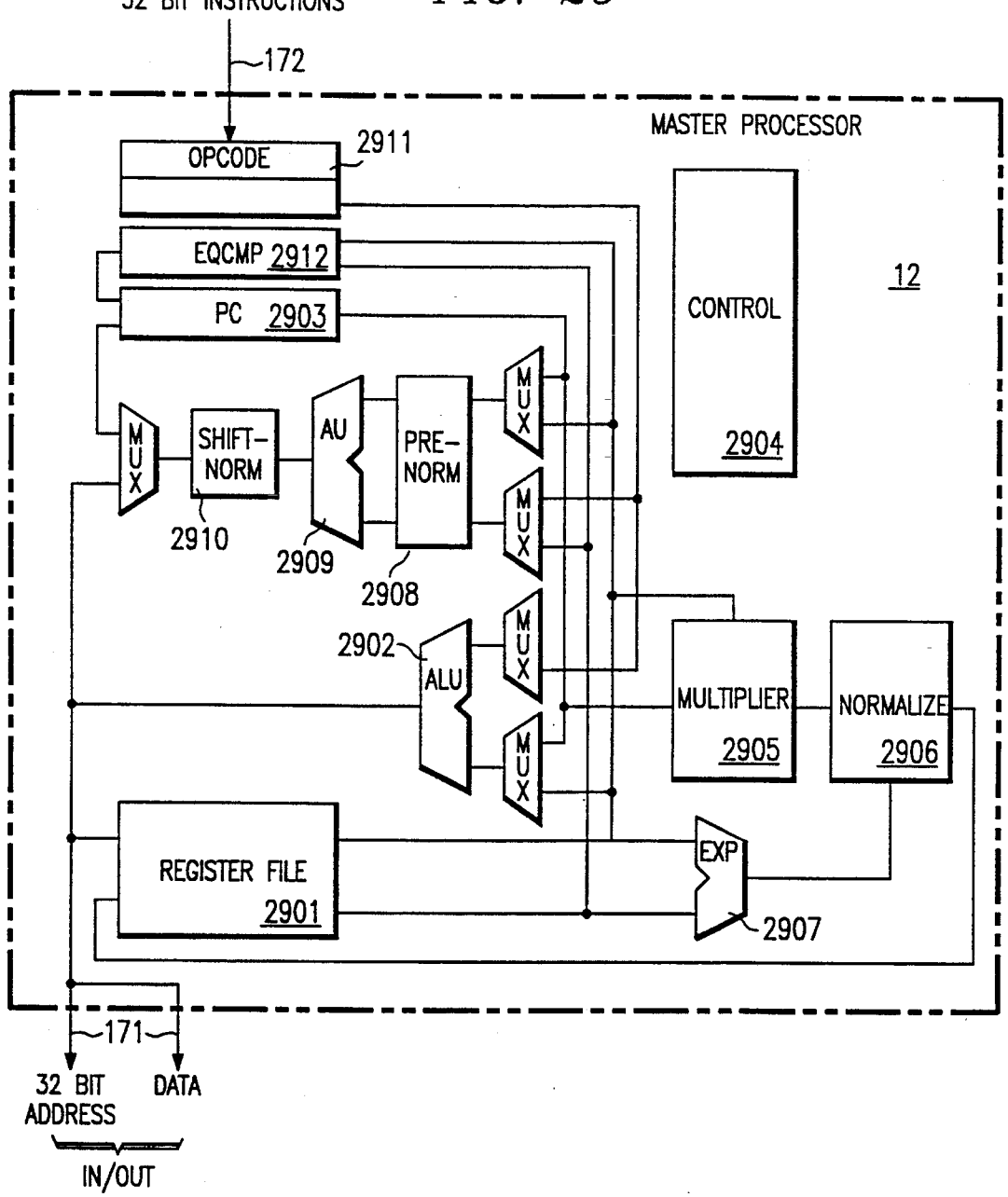
FIG. 29 shows details of a master processor.

The master processor, shown in more detail in FIG. 29, is used for scheduling and control of the entire system, including the control of the transfer processor as well as the interaction between the various processors. The master processor has a connection through the crossbar switch to all of the memories and is interconnected with the other processors on the communication channel. The master processor can control the type of data and the manner in which the data is obtained by the transfer processor depending upon the pixel information and the particular purpose for which the information is being obtained. Thus, regions of the image can be scanned under different scan modes depending upon the purpose for the scan. This is controlled by the master processor working in conjunction with the parallel processors. The parallel processors may each also control the transfer processor, either alone or in conjunction with the master processor, again depending upon the purpose for the operation.

The contention for the memory to the crossbar switch can be arranged such that the parallel processors have higher priority, the master processor has lower priority, and the transfer processor has third or lowest priority for any particular memory on a particular link.

Figure 11:
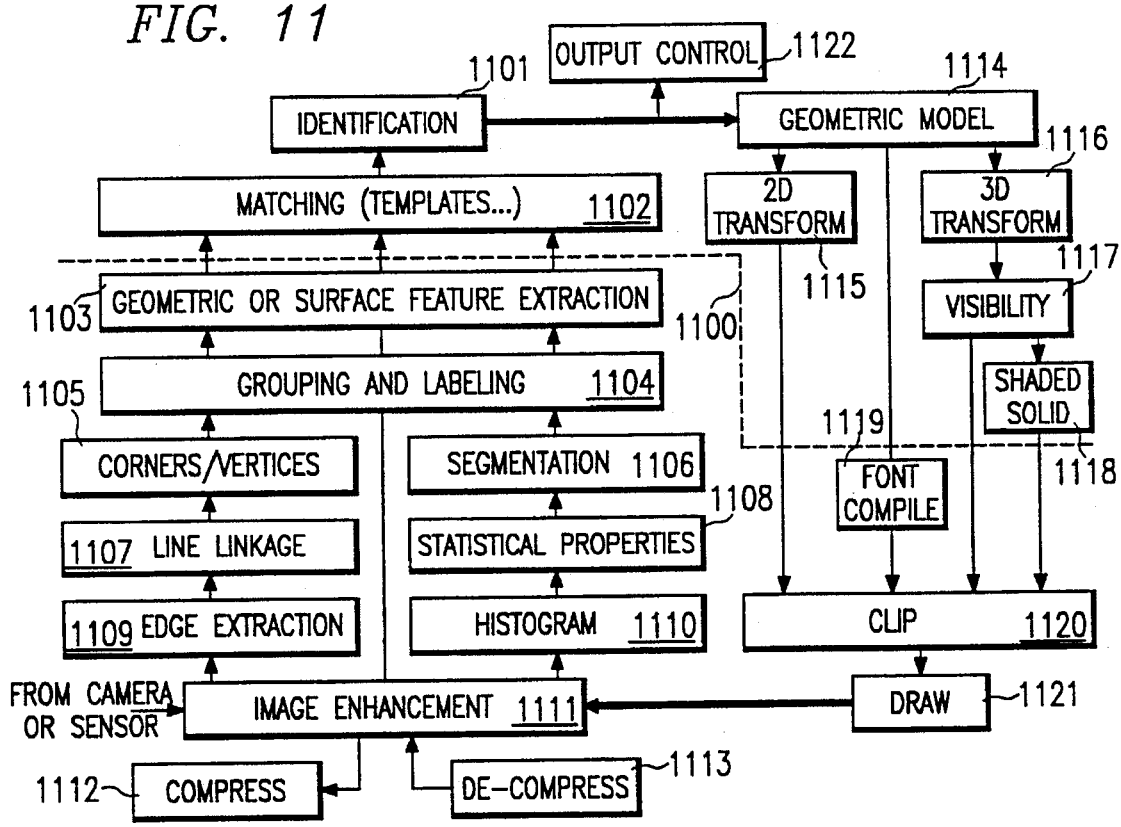
FIG. 11 is a graph showing some algorithms and control for the image processing system.

FIG. 11 shows a listing of various operations or algorithms which the imaging processing system would typically perform. A typical type of operation would be optical character recognition, target recognition or movement recognition. In each of these situations, the associated image processing would be controlled by the kind of operations to be performed.

In FIG. 11, the types of operations which are typically performed by the parallel processors are shown below line 1100 and the types of operations which are typically performed by the master processor are shown above line 1100. While this arrangement of operations is arbitrarily divided between the master processor and the parallel processors, the types of operations required to achieve the various operations shown tend to make them more suitable for either the master processor or the parallel processor.

As an example of image processing starting from an image and working higher in the hierarchy of operations, the image is first received by image enhancement 1111. In some situations it is necessary to compress or decompress the image via boxes 1112 and 1113. The image is then moved upwards through the various possibilities for edge extraction 1109, line linkage 1107, corner or vertices recognition 1105, histogram 1110, statistical properties 1108 and segmentation 1106. These boxes can all be skipped and the image provided directly to template matching 1102 for the purpose of determining the image identification 1101. There are various methods of achieving this identification, all of which are not necessary for every image, and all of which are well known in the art as individual algorithms or methods.

Enhancement block 1111 is a process which essentially cleans an image, removes extraneous signals and enhances details of the image, such as lines. Box 1109, edge extraction, is a process which determines the causes or existence of edges in an image. Box 1107 connects all the lines which have been extracted from the image and links them together to form longer lines. The process then removes extraneous dashes caused by inconsistencies in the data. Box 1105, corners and vertices, is an algorithm which determines where the corners of an image might be located. Once these geometric shapes are found, a process of grouping and labeling, block 1104, can then be used to identify major groupings of objects, such as circles and rectangles.

At this point, the operations have centered their focus on a smaller region of the image whereas in block 1111 the entire image is typically operated on. An alternate path after every enhancement is to perform statistical analysis, such as a histogram, 1110, of the intensities of the pixels. One purpose of a histogram is to discover the number of ones or the number of ones in a particular axis or projection which would then be useful statistical information to quantify the presence of some object or orientation of an object. This will be discussed hereinafter.

Block 1108, statistical properties, then extracts from these histograms the proper statistical properties. Continuing upward, block 1106 is a process of segmentation whereby the statistical properties could be used to segment different objects. As an example, several disconnected objects could then be quite easily segmented. Then through the progression to grouping and labeling 1104, where an image has different objects identified with specific labels. Connector component algorithms are typical in this area. At this point also certain geometric features can be analyzed 1103, particularly the perimeter of the object. Other shape descripters, Euler numbers, and a description of the surface can be obtained and used for future matching operations. Matching operations level 1102 is reached where similar information which is stored as templates or libraries are accessed and compared against the data that is extracted from the lower level. This can be either geometric, surface description or optical flow information. Once a match has occurred, these matches then are statistically weighted to determine the degree of certainty that an object has been identified as shown by block 1101. Once we have identified objects, we will in some applications such as stereopsis or motion have a three dimensional representation of the world knowing what the objects are and where they are placed in the world. At this point we can then re-render the scene using a graphics pipeline as shown by the right side of FIG. 11.

The first block, geometric model 1114, identifies a representation of this scene which basically is three coordinates showing position and a geometric description of the object such as its shape, density and reflective properties. At this point, depending upon the type of object, several different routes would be used to render the scene. If there were simple characters, two dimensional transforms would be employed. If they were more complex, three dimensional worlds would be created. A hand waving in front of a computer for use as a gesture input device would use this method and implement function 1116, which is a three dimensional transform. This would transform the input into a new coordinate system, either by translating scaling or rotating the three dimensional coordinates via 3D transform block 1116. Certain objects would be occluded by other objects. Again in the hand example, some fingers may be occluded by other fingers, and this operation using visibility block 1117 would then ignore the parts that were not visible. As we move down in FIG. 11 to shaded solid box 1118 we find a process which would generate gray scale or pixel information to give a smooth shaded solid image which would be more realistic and more lifelike than taking the other route down to clipping box 1120. Clipping box 1120 essentially clips things that are out of the field of view of the scene that is being generated.

In a special case of rendering fonts on a computer screen or on a laser printer or such, box 1119, font compilation, would be used to create sophisticated fonts of multiple sizes and shapes. Then the final process in the graphics program would be actually to draw the objects, via block 1121, which might be as simple as drawing dots and lines that connect the dots. We are now back at the original level of image enhancement 1111 and have recreated a synthetic representation of original image based upon a model which has been derived from that original image.

It is understood that once a character is recognized or a movement is recognized, an output can be obtained, either in binary code or otherwise, to control further processing of the same image via output control 1122 by the operation and the combination of the parallel processors and the master processor working with the image processing system.

Generally, the boxes shown below line 1100 are typically operationally efficient to be performed in the SIMD mode and require a vast amount of processing. These are performed with the parallel processing operation. The operations above line 1100 require relatively less processing capabilities and are less bandwidth intensive. Accordingly, they are performed by a single processor. Also note that with respect to the operations, as the hierarchy moves upwards on the chart the likelihood is that the MIMD operations would be the preferred operation. Often the SIMD and MIMD operations overlap, and both types of operational modes are required.

The main reason why two different types of processors are necessary is because of the level of the processing. High level processing, as performed by the master processor, preferably uses floating point arithmetic for high precision. High precision floating point processors require more real estate space and are slower to operate from non-floating point processors. Therefore, if all of the processors were the same, there could be fewer processors on a given chip which would increase the problem of bandwidth and slow down the operation of the system. On the other hand, the low level processors do not require floating point arithmetic and thus can be made faster and smaller, which in turn allows more processors to be constructed on a given chip. The bus structure shown utilizing a crossbar switch can therefore take several different types of processors as required and switch them into the system to perform portions of every operation if necessary.

The master processor is designed to operate primarily on lists such as information lists and display lists, whereas the parallel processors are intended to operate on arrays. At the low level image processing most of the information can be described as two dimensional arrays, whereas at the higher level, the information is described as lists of multidimensional coordinates. The manipulation of these two different types of data representations requires different processing structures which is another motivation for the master and parallel processors having different structures.

The master processor of the preferred embodiment would have features similar to a RISC (reduced instruction set computer) processor which is primarily intended for general purpose computing operations, whereas the parallel processors are more like digital signal processors (DSP) which tend to be specialized processors for arithmetic operations. Thus, the system could be optimized for the types of information processing required for image systems, while still maintaining the high degree of processing capability and the total flexibility achieved by using both types of processors on the same data.

Texas Instruments TMS 320 DSP processors are disclosed in coassigned U.S. Pat. Nos. 4,577,282, 4,713,748, and 4,912,636. Further background is disclosed in the publications *Second Generation TMS* 320 *Users Guide* and *Third Generation TMS* 320 *Users Guide* from Texas Instruments Incorporated. These patents, said application and publications are hereby incorporated herein by reference.

Memory Structure

Figure 17:
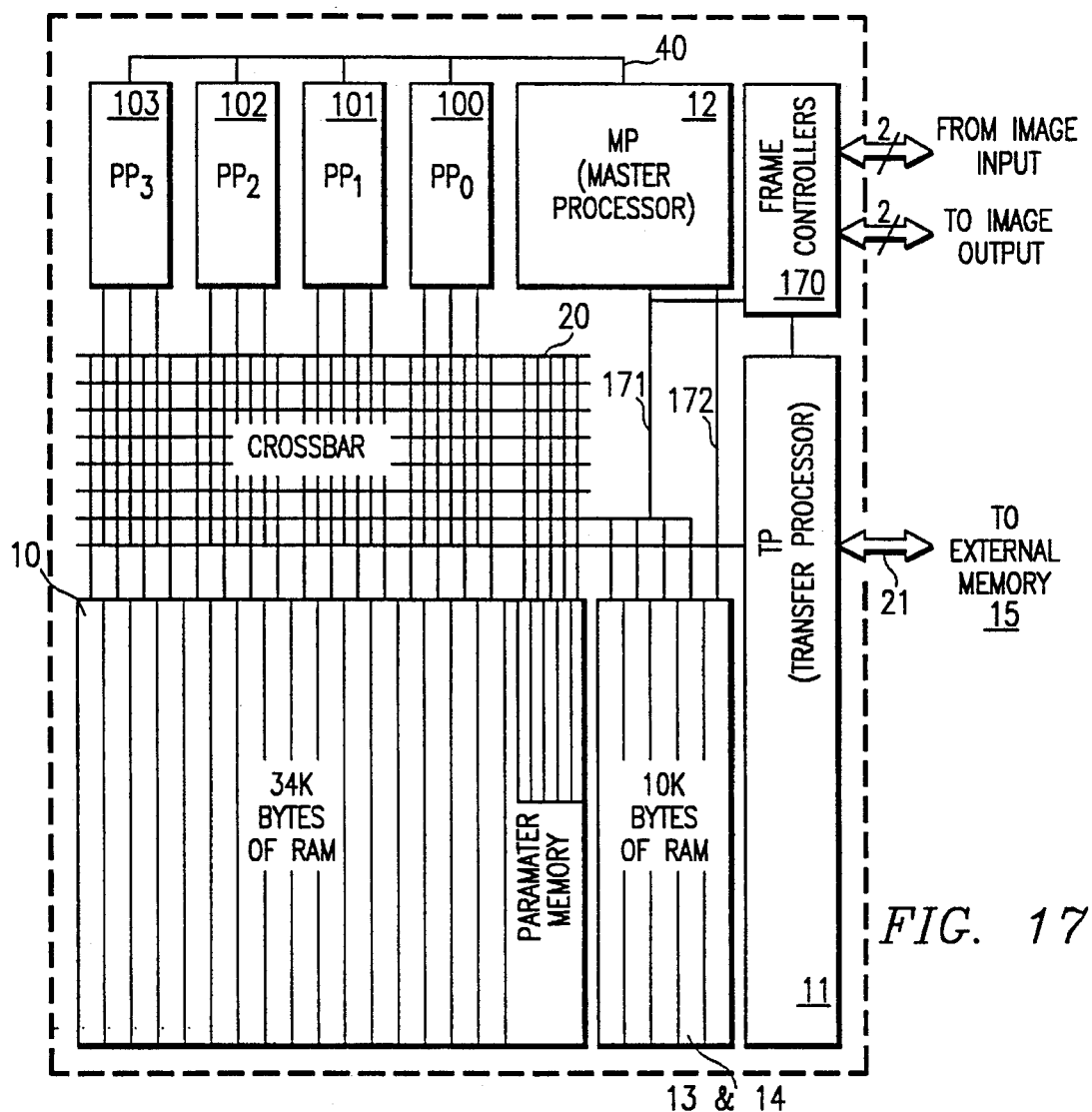
FIG. 17 shows a schematic representation of the layout of the processors and memory interconnected by the crossbar switch.

FIG. 17 shows a view of the image processing system, as discussed with respect to FIGS. 1 and 2, showing a particular layout of memory. It should be kept in mind, however, that the particular memory sizes have been selected for a particular project, and any type of arrangement of memory and memory capacities can be utilized with this invention. The parameter section of memory 10 can be incorporated within memory 10 or can be, if desired, a stand-alone memory. Under some conditions the parameter memory need not be present depending upon the communication requirements of the processors.

Crossbar Switch

Figure 18:
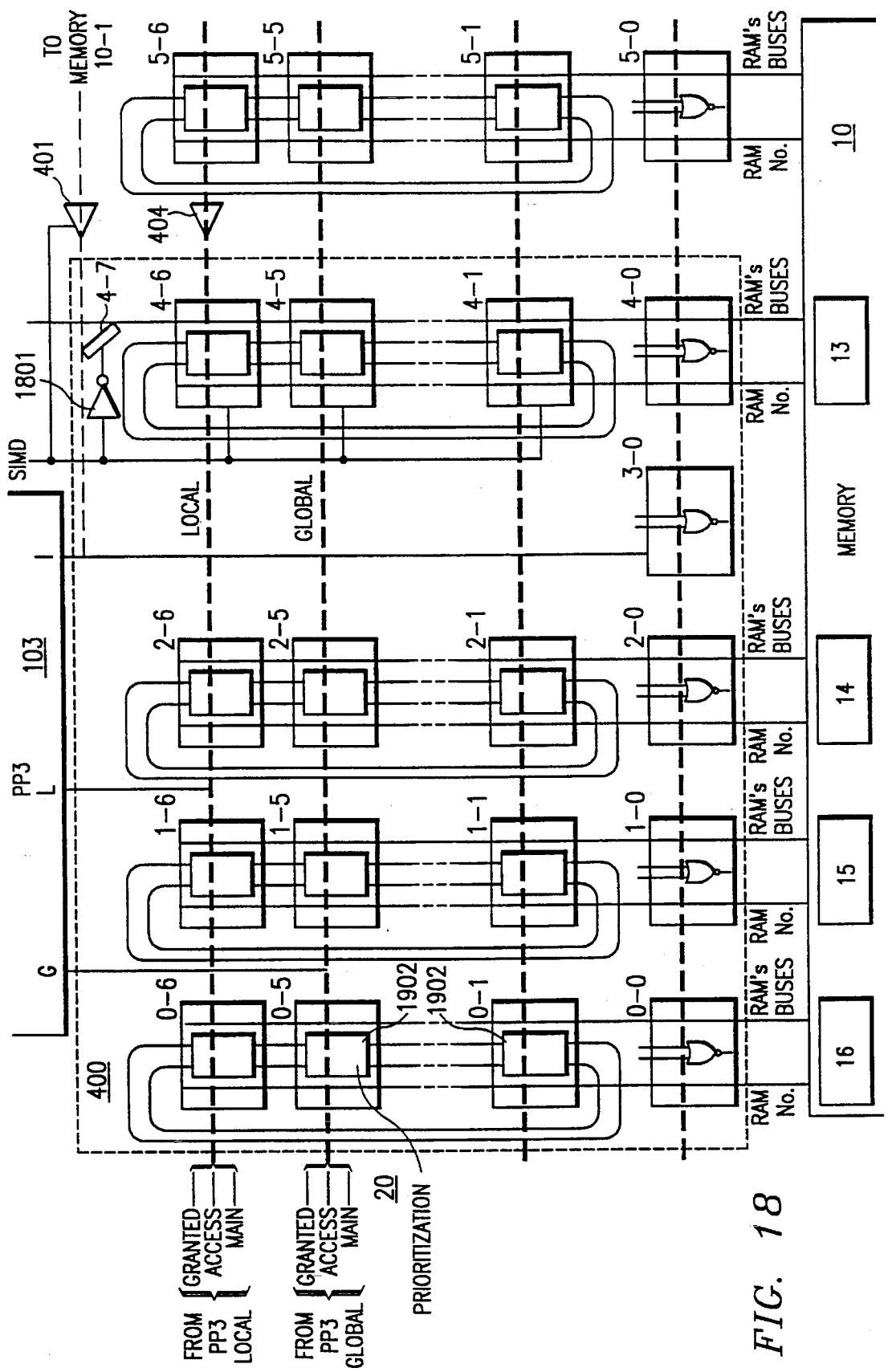
FIGS. 18 and 19 show details of the crosspoints of the crossbar switch.

FIG. 18 shows the prioritization circuitry of crossbar switch 20. Each vertical of the crossbar switch is connected in a round robin fashion to a prioritization circuit internal to the particular crosspoint. In every vertical the lowest horizontal, which is associated with the transfer processor, is not included in the prioritization wiring. This is so that when none of the other horizontals in the same vertical have been selected, the transfer processor has access to the memory. The exact manner in which the prioritization circuitry operates and the manner in which the lowest horizontal operates will be detailed more fully hereinafter with respect to FIGS. 19 and 20.

FIG. 18 also shows the special situation of the instruction vertical I for the parallel processors. The instruction vertical for parallel processor 103 is connected through crosspoint 4-7, which crosspoint is enabled by a signal on the SIMD lead via invertor 1801. This same signal is provided to every horizontal crosspoint 4-1 through 4-6 in the same vertical to render those crosspoints inactive. This signal and the manner in which the instruction vertical is connected to memory will be discussed hereinafter.

Turning now to FIG. 19, the details of an exemplary crosspoint 1-5 is shown in detail. In the figure, the five sided box with a control line entering the side is a control switch, typically a FET device.

The functionality of the crosspoint logic is described. The crosspoint logic contains four functional blocks. These will each be described. The first functional block is address recognition block 1901 which compares five bits of the address supplied by the processor on bus 1932 with the unique five bit value of the memory module 10-15 (connected to crosspoint 1-5 via vertical 1 as shown in FIG. 4) presented on bus 1930. The value presented on bus 1930 indicates the location of the memory within the address space. The comparison is achieved by five two-input exclusive-NOR gates 1920–1924 which perform individual bit comparisons. The outputs of these five gates are supplied to five of the inputs of the six input NAND gate 1910. The sixth input of gate 1910 is connected to the global access signal 1933 which indicates that a memory request is actually being performed and the address output by the processor should actually be compared. Only when signal 1933 is a logic one and the outputs of gates 1920–1924 are also all one will the output of gate 1910 be a logical zero. A logic zero indicates that a valid request for memory 10-15 is being made.

Digressing, a modification that can be made to this address recognition logic is to include a seventh input to gate 1910 (enable SIMD) that can be used as an enable signal for the crosspoint logic. A logical zero on the enable signal will cause the address recognition logic to be disabled, thus disabling the entire crosspoint. This is used on the crosspoints on vertical buses 4, 9, and 14 which connect to horizontal buses 1 to 6, to enable the crosspoints in SIMD mode and disable them in MIMD mode.

The second functional block is token latch 1904. This block outputs a signal B1 which is used to indicate the start point of the round-robin prioritization. Signal B1 connects to the input signal B of the next crosspoint logic vertically below crosspoint 1-5, (crosspoint 1-4). (Signal B1 of crosspoint 1-1 is wrapped around to connect to signal B of crosspoint 1-6 to create a circular prioritization scheme as shown in FIG. 18). Only one signal B1 within the crosspoint logics associated with vertical bus 1 will output a logical zero. All the others will output logical ones. This is achieved by only loading one crosspoint token latch 1904 with a value of zero at system initialization, and the other crosspoint token latches with a one. This is achieved by connecting the preset value signal to a logical zero on one crosspoint and a logical one on the others and activating clock5. This loads the preset value through transistor 1956 into the latch comprised of inverter 1946 and inverter 1945. This value in turn is clocked with clock2 through transistor 1955 into the latch comprising inverter 1947 and inverter 1948. The output of inverter 1947 is signal B1. This signal is supplied to one input of the two-input NAND gate 1913 whose other input is the output of gate 1910. The output of gate 1913 is supplied to one input of the two-input NAND gate 1914, whose other input comes from the output of gate 1911. The output of gate 1914 is clocked by clock4 through transistor 1953 into the earlier described latch of gates 1945 and 1946. It is arranged that clock2 and clock4 are never active simultaneously, and that clock4 is not active when clock5 is active.

The logic of the token latch records which crosspoint logic associated with memory 10-15 last gained access to the memory. This is indicated by a logical zero B1 signal being output by that crosspoint latch. The token latch logic works in conjunction with the prioritization block, to be described next, to cause the crosspoint which last accessed the memory to have the lowest priority access, if future multiple simultaneous accesses are attempted to the memory. How the token latch contents are altered will be described after the prioritization block has been described.

The prioritization block 1902 contains two two-input NAND gates 1911 and 1912. The two inputs of gate 1912 are supplied from the output of gates 1910 and 1911. The output of gate 1912 is signal A1 which connects to signal A of the vertically below crosspoint (1-4). One input of gate 1911 is the previously mentioned signal B which is connected to signal B1 from the token latch in the logic circuit associated with the next higher vertical (crosspoint 1-6). The other signal is also the previously described signal A which is connected to signal A1 from the prioritization block in the next higher vertical (crosspoint logic 1-6).

The prioritization logic forms a circular ripple path that begins with the crosspoint logic vertically below the last crosspoint to access the memory. This is indicated by a logical zero on a B1 signal. This causes the output of gate 1911 of the next vertical crosspoint below to be a logical one. This is gated by gate 1912 with the output of gate 1910 in order to produce signal A1. If the output of gate 1910 is a logical one, indicating that an address match by the address recognition logic wasn't found, then signal A1 will be a zero. This is passed to the next lower vertical crosspoint, causing its gate 1911 to output a one, and so on around the circular ripple path. If however the output of gate 1910 is a zero, then the signal A1 will be output to the next crosspoint as a logical one. This, in conjunction with a one on all subsequent B inputs (since only the ripple start point can output a zero B signal), causes all other gates 1911 around the ripple path to output logical zeros. Thus, a crosspoint can gain access to a memory only when it has a one on the output of its gate 1911 and it is producing a logical zero on the output of its gate 1910. This occurs only when an address match is found by the address recognition block and the crosspoint is the first to request a memory access from the start of the circular ripple path.

The management of the token latch contents will now be explained. Gates 1913 and 1914 are designed to make sure that the last crosspoint to gain memory access holds a zero in the token latch. Consider the following cases:

1. The token in token latch 1904 is a zero and no bus requires memory access. The zero ripples completely around the circular carry path and returns to signal A of the originating crosspoint as a zero, causing the output of gate 1911 to be a one. The zero already held in the token latch (signal B1) causes the output of gate 1913 to be a one. These two signals cause the output of gate 1914 to be a zero, which is loaded into the latch 1945/1946 by clock4 via transistor 1953, thus maintaining a zero in the token latch, thereby continuing the ripple propagation.
2. The token in token latch 1904 is a zero and one of the other crosspoints requires access to the memory. In this case, signal A will be received back as a one, which in conjunction with the one on input B will cause the output of gate 1911 to be a zero, causing the output of gate 1914 to be a one. This is then loaded into token latch 1904 by clock4 as a one. The token latch has thus become a one since another crosspoint has just gained memory access.
3. The token in token latch 1904 is a one and a crosspoint prioritized higher is requesting memory access. In this case A and B are both received as ones and, as in the above case, the token will similarly be loaded with a one.
4. The token in token latch 1904 is a one, the crosspoint is requesting memory access, and no higher priority crosspoint is requesting memory access. In this case either A or B will be received as a zero, causing the output of gate 1911 to be a one. The output of gate 1910 will be a zero, since the address recognition logic is detecting an address match. This will cause the output of gate 1913 to be a one. Since both inputs of gate 1914 are one, it will output a zero, which is loaded into token latch 1904 by clock4. The token latch has thus become a zero because it has just been granted memory access.

The fourth block of logic is the grant latch. The output of gate 1910 is passed through an inverter 1940 into one input of a two-input NAND gate 1915, whose other input is connected to the output of gate 1911. The one condition of a logical one on the output of gate 1911 and a zero on the output of gate 1910 causes the output of gate 1915 to be a zero. (Otherwise it is a one). This condition occurs when the crosspoint is successfully granted access to the memory, and can occur on only one of the crosspoints associated with the memory. The output of gate 1915 is loaded into latch 1941/1942 through transistor 1951 by clock1. (In practice clock1 and clock4 will operate together so that the token latch and the grant latch are updated together). The output of gate 1942 is loaded through transistor 1952 by clock2 into latch 1943/1944. The output of gate 1944 is passed to gate 1949 which produces the connect signal to the crosspoint switches 1905, which connect processor bus 1932 to memory bus 1931. These crosspoint switches can be individual n-type transistors in their simplest implementation.

The output of gate 1942 is also supplied to the gate of transistor 1958 which connects between signal 1934 and the source of transistor 1957, whose drain connects to ground, and whose gate is connected to clock2. Transistors 1957 and 1958 cause signal 1934 to be connected to ground when the crosspoint has successfully been granted memory access. This indicates to the processor that it can proceed with the memory access. If however signal 1934 does not go low when a memory access is attempted, then another crosspoint has gained memory access and the processor must halt and re-request access to the memory. The round-robin prioritization scheme described ensures that only a limited number of retries need be performed before access is granted.

Figure 20:
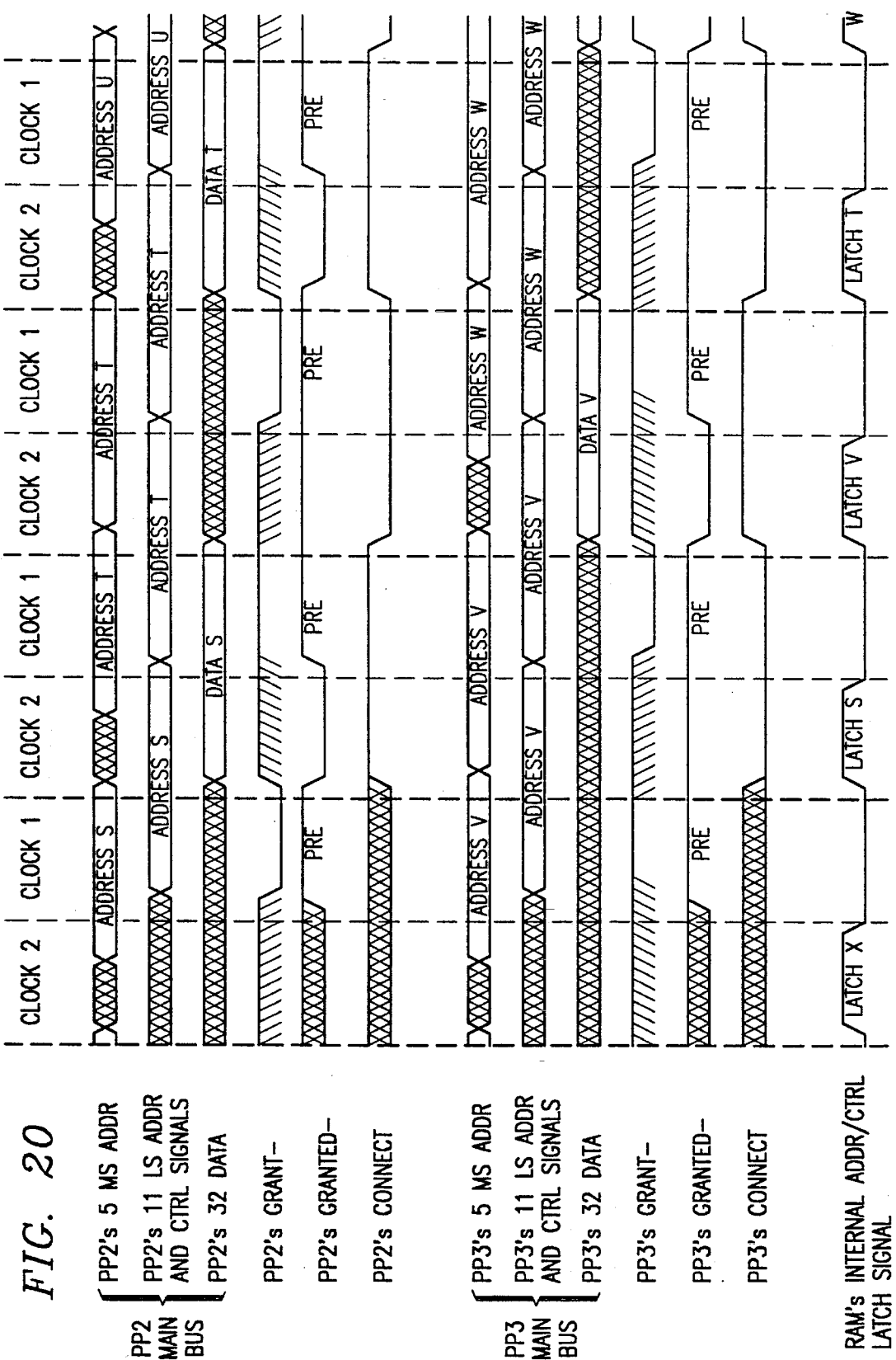
FIG. 20 is a graph of wave forms of the contention logic for memory access.

An example of the timing of the crossbar signals is given in FIG. 20. In this figure PP2 and PP3 are both trying to access the same RAM every cycle, but the round-robin priority logic causes them to alternate. PP2 is calculating and outputting addresses S, T and U, and PP3 is calculating and outputting addresses V and W. It can be seen from the 5 MS ADDR signals how the GRANTED-signal is used to multiplex between the last address (in the case of a retry) and the new address being calculated. The PPs assume that if the GRANTED- signal is not active by the end of the slave phase then contention occurred, and the master update phases of the fetch, address and execute pipeline stages are killed.

Integration of the Switch Matrix

As discussed herein, memory contention is handled by a token passing arrangement having logic circuitry individual to each crosspoint. In one embodiment, the logic circuitry is positioned in direct association with each crosspoint. Thus, since the crosspoints are spatially distributed across the substrate in conjunction with their respective ports, the contention control logic is likewise distributed spatially. In addition to saving space the actual logic of the circuit can grow as the switch grows. In this manner the logic can be positioned in one of the layers of the silicon so that no additional silicon chip area is consumed. This has the advantage of conserving space while also minimizing connections to and from the token passing circuit.

Synchronized MIMD

Figures 21, 27:
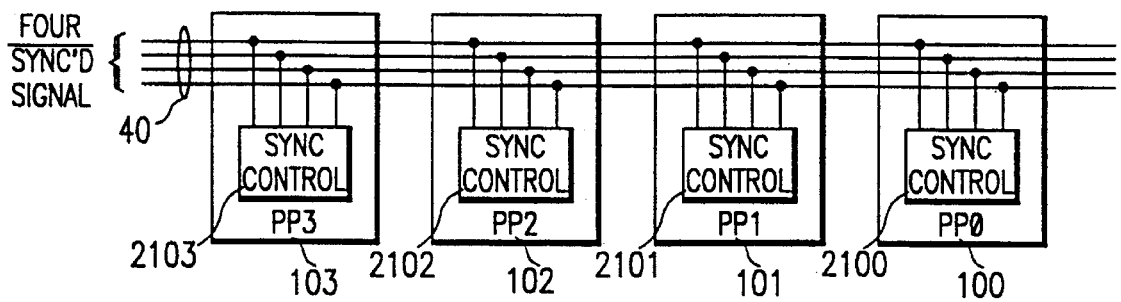
FIG. 21 shows the relationship between the synchronization register of each processor and the synchronization bus.
FIG. 27 shows an example of the arithmetic employed in sliced addressing.

Each processor 100–103, as shown in FIG. 21, has associated with it a register 2100–2103 respectively for indicating if synchronized operation is required. Also included, as will be seen, is a register for holding the address (identity) of the other processors synchronized with that processor. The instruction stream contains instructions which indicate the beginning and end of a series of instructions that must be executed in synchronization with the processors. Once the code for starting a synchronized instruction stream arrives at a processor, that processor, and all the processors in the synchronized set, can only execute instructions in lock step with each other until such time as the end of synchronized code instruction is encountered.

Using this approach, no messages need be transferred between processors, and the processors will remain in step for one cycle, or a number of cycles, depending upon the instruction stream being executed. No external control, other than the instruction stream, is required to establish the synchronization relationships between processors.

Figure 22:
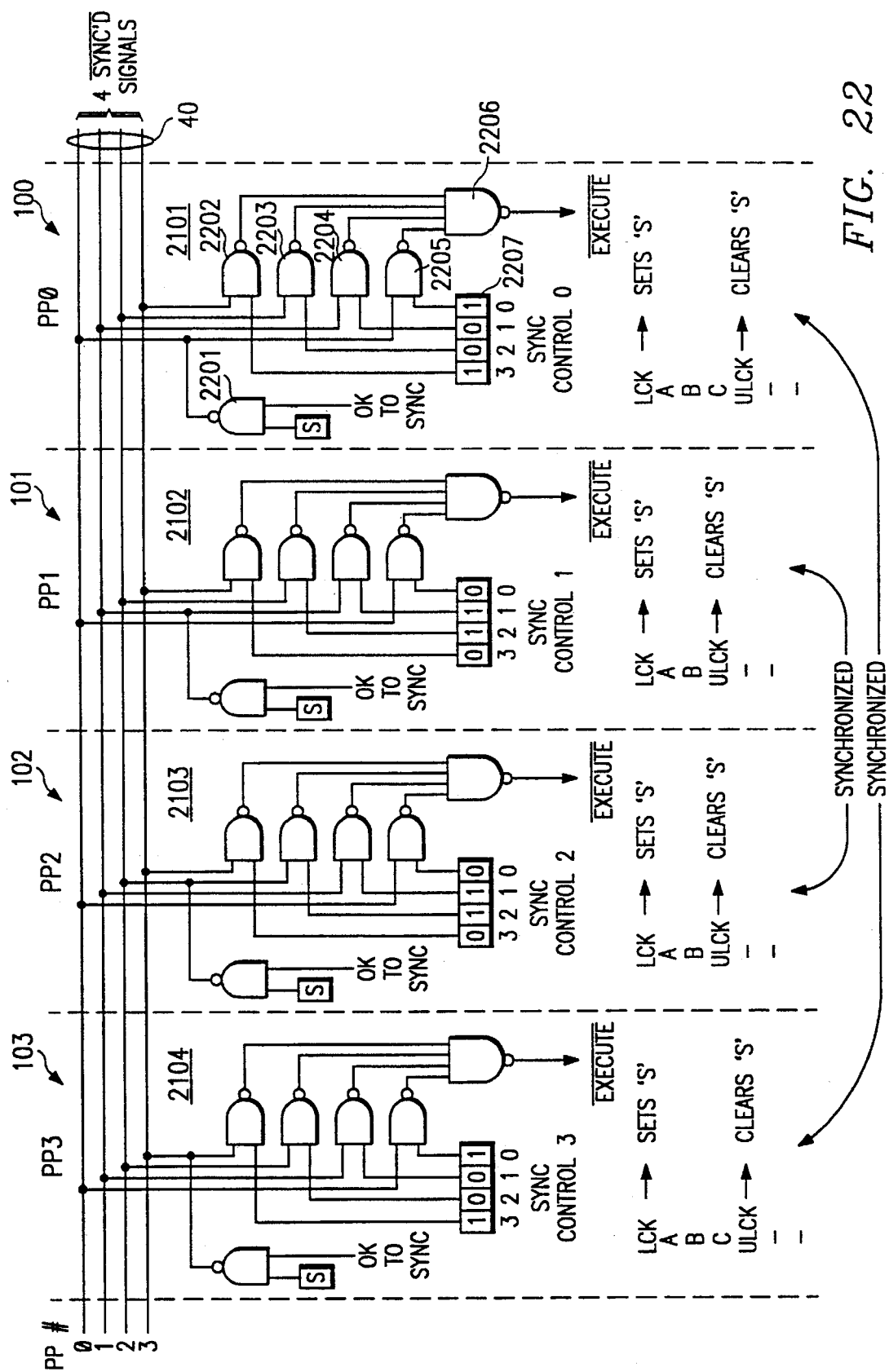
FIG. 22 shows further details of the synchronization register and synchronization logic within each processor.

Turning to FIG. 22, within each parallel processor 100–103, there is a sync register 2207 containing four bits labelled 3, 2, 1, 0 that relate to processors 103, 102, 101 and 100 respectively. One bit relates to each processor 100–103. The other processor(s) to which a particular processor will synchronize is indicated by writing a one to the bits corresponding to those processors. The other processor(s) which are expecting to be synchronized will similarly have set the appropriate bits in their sync register(s).

Code that is desired to be executed in synchronization is indicated by bounding it with LCK (Lock) and ULCK (Unlock) instructions. The instructions following the LCK, and those up to and including the ULCK, will be fetched in lock-step with the other parallel processor(s). (There must, therefore, be the same number of instructions between the LCK and ULCK instructions in each synchronized parallel processor).

It is more usually synchronized data transfer that is required rather than synchronized fetching of instructions. It is a consequence of the parallel processors' pipelines however that the transfer(s) coded in parallel with the LCK instruction and those up to and including the instruction immediately preceding the ULCK instruction, will be synchronous. They may not necessarily (due to memory access conflicts) occur in exactly the same machine cycle, but the transfers coded in the following instruction will not proceed until all the synchronized transfers of the previous instruction have occurred. The order of the load and store would otherwise be upset by memory access conflicts.

The knowledge that synchronized code is being executed is recorded by the S (synchronized) bit in each status register. (This bit is not actually set or reset until the master phase of the address pipeline stage of the LCK or ULCK instructions, respectively, but the effect of the LCK or ULCK instruction affects the fetch of the next instruction during the slave phase). This bit is cleared by reset and by interrupts once the status register has been pushed.

Continuing in FIG. 22, the four bits for each of the sync registers 2207 are set by software depending upon the desired synchronization between the various processors. Thus, assuming that processor 100 is to be synchronized with processor 103, then the bits shown would be loaded into the respective registers 2207. These bits would be 1, 0, 0, 1 showing that processor 3 is to be synchronized with processor 0. Also as shown, as processors 101 and 102 are to be synchronized, their respective sync control registers would each contain the bits 0, 1, 1, 0.

Turning now to processor 100, it should be noted that the presence of a 0 in any bit of sync register 2207 causes a logic one to appear on the output of the respective NAND gate. Thus, with the example shown, the NAND gates 2203 and 2204 would have logic ones on their respective output. These ones are supplied to the input of NAND gate 2206. NAND gate 2206 will not allow processor 100 to execute any more instructions of code until all of its respective inputs are one. Note that the presence of the zeros in the bit positions 1 and 2 of register 2207 causes the respective gates 2203 and 2204 to ignore the presence of any signals on leads 1 and 2 of bus 40. Thus, the execution of code was controlled by gate 2206, in this case in response to the information on leads 0 and 3 of bus 40. The lock instruction will cause the S bit to become set which is a logic 1 to one of the inputs to gate 2201. For the moment we will ignore the presence of the okay to sync signal which is a signal which controls the timing of the actual execute for the processor. The output of gate 2201 for each of the processors sync registers is connected to a different lead. Thus, gate 2201 from processor 100 is connected to lead 0, while gate 2201 from processor 101 is connected to lead 1, etc. Note that the output of gate 2201 from processor 100 is connected to the 0 input of gates 2205 of all of the other processor registers. Since in processor 101 and 102, gates 2205 are connected to logic zero, this has no effect. However, in processor 103 where gate 2205 is connected to a logic 1 of the register, it is thus controlled by the output on lead 0 of bus 40 which in fact is controlled by the output of gate 2201. Thus, processor 103 is controlled by the actions which occur within processor 100, which is exactly what we desire if processor 103 is to be synchronized with processor 100. A review of the circuitry would show that the same function operates in reverse from processor 103 to processor 100 since in processor 103 gate 2201 is associated with lead 3 of bus 40, which in turn is associated with gate 2202 of processor 100, which in turn is also controlled by a one in sync register 2207.

Now returning to the signal on gate 2201 which is the okay to sync signal. When that signal goes to logic 1, then it is okay to execute code, and all of the other processors having a one in the sync register bit 0 position of the respective register will operate in synchronization with that signal. Thus, if the okay to sync signal goes low signifying a problem with the cache memory or any other problem with the execution of code, all of the processors synchronized therewith will wait until the problem is clear. Thus, we have full synchronization between processors as controlled by the codes periodically stored in the respective registers. All of the processors can be synchronized or any combination of processors can be synchronized with each other, and there can be any number of different synchronizations occurring between processors.

Since it is the instruction fetch that is synchronized, it is possible to interrupt synchronized code. This will immediately cause the parallel processor's okay to sync signal to become inactive. Cache misses and contention will have a similar effect, keeping the machines in step. In the case of contention, however, the two instructions following the one experiencing contention will have already been fetched into the pipeline before the pipeline pauses.

It is possible to put idle instructions into synchronized code, thus pausing the operation of all the synchronized parallel processors until a particular parallel processor has been interrupted and returned from its interrupt routine.

Since it is necessary to be able to interrupt synchronized code, any instruction that specified the program counter PC in any one processor as a destination will immediately disable the effect of the S bit of the status register (with the same timing as the ULCK instruction), but the S bit will remain set. Once the two delay slot instructions have completed, the effect of the S bit is re-enabled. This mechanism prevents problems with being unable to interrupt synchronized delay slot instructions. The sync logic therefore treats branches, calls and returns (implemented as a PC load followed by two delay slot instructions) as a single instruction. The sync signal will be driven inactive during the two delay slot instructions and they will be fetched without looking at the sync signals. If a LCK instruction is put in a delay slot, it will take effect after the delay slot instructions have been executed. Synchronized loops behave like normal code because their branches operate in the fetch pipeline stage and not the execute stage.

Figure 23:
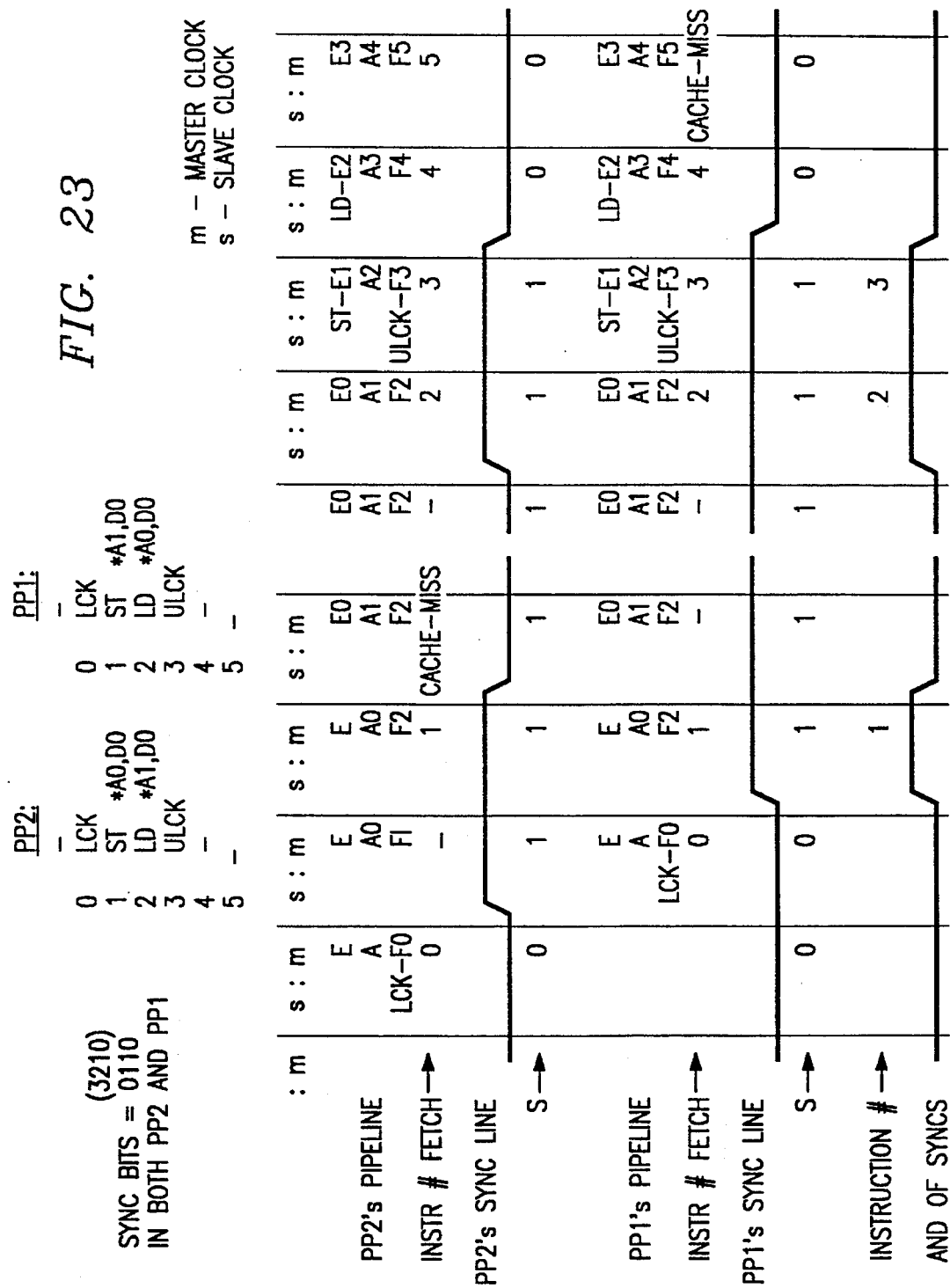
FIG. 23 is a graph showing the processes and waveforms for processor synchronization.

An example of how synchronization works is given in FIG. 23. In this case, parallel processor 2 and parallel 1 exchange the contents of their data D0 registers (FIG. 33), assuming that A0 and A1 contain the same addresses in each parallel processor. It also assumes that A0 and A1 point to different RAMs to avoid contention. (It would still work if they pointed to the same RAM, but would take extra cycles).

In this example parallel processor 1 arrives at its LCK instruction one cycle after parallel processor 2 arrives at its LCK instruction. Parallel processor 2 has thus waited one cycle. They then perform the stores simultaneously but parallel processor 2 then has a cache miss when fetching the load instruction. Both parallel processors wait until the cache miss has been serviced by the transfer processor. They then execute the loads simultaneously and similarly the ULCKs. Parallel processor 1 then experiences a cache miss when fetching instruction 4, but since the parallel processors are now unlocked, parallel processor 2 carries on unimpeded.

Synchronization in SIMD is implicit, so the LCK and ULCK instructions have no purpose and so will have no effect if coded. The S bit in the status register will have no effect if anyone should set it to one.

The instructions shown in the appendix (LCK) is used to begin a piece of MIMD synchronized parallel processor code. It will cause the parallel processor to wait until all the parallel processors indicated by ones in the sync register are in sync with each other. The following instructions will then be fetched in step with the other MIMD parallel processors. Execution of the address and execute pipeline stages will occur as each successive instruction is synchronously fetched. The S bit of the status register is set during the address pipeline stage of this instruction.

The instruction shown in the appendix (ULCK) unlocks the MIMD parallel processors from each other. They then resume independent instruction execution on the next instruction fetch.

Sliced Addressing

Sliced addressing is a technique for taking adjacent information from one memory space and distributing it in a manner to a number of separate different memory spaces so that the information when it has been distributed can be accessed simultaneously by a number of processors without contention.

As an example, reference is made to FIG. 24 where there is shown an external image memory buffer 15 having a row of adjacent pixels numbered 0–127, and this row has the letter "a" referencing it. This information is transferred, using the sliced addressing technique, via bus 2401, into memory subsystem 10 whereby the first sixteen pixels (0–15) are placed into the first memory 10-0 referred to by address 0-15. Then the next sixteen pixels are placed into memory 10-1. In this example this process is continued through eight memories such that pixels 112–127 are placed into final memory 10-7. The sliced addressing logic 2401 is implemented in the transfer processor and also in the crossbar address units of the parallel processors which will be described hereinafter.

The prior art means of address calculation would produce in the given example 128 consecutive addresses. This would mean that the data would be placed within one memory. In the given example the data would appear at consecutive addresses within memory 10-0. This would not allow a number of processors simultaneous access to that information without contention since they would all be trying to access the same memory. Thus, in the prior art, pixels 0–15 would be in row A of memory 0 with bits 16–31 in row B and bits 32–47 in row C, etc., until all of the 127 adjacent pixels would be in various rows of memory 0. Since the various different processors are working in parallel to process information, they could all contend for access to memory 0 to various pixel bytes, and accordingly time would be wasted, and the value of the parallel processing would be mitigated.

FIG. 25 shows a prior art adder which is used for controlling the location of the address for various bits. FIG. 25 shows three single bit adders 2501, 2502, 2503, which are part of a full adder having a number of single bits equal to the address range of the memory. These adders work such that one bit of the address is provided to each A input of the various adders 2501–2503. The least significant bit of the address would go to adder 2501, and the most significant bit would go to the highest single bit adder 2503.

The B input receives the binary representation of the amount to be indexed for the address for storage purposes. The combination of adders 2501–2503 will produce a resulting address which is used for accessing memory. Each individual adder will output a carry signal to the next highest numbered adder carry input signal. Each individual adder bit will take in the three inputs A, B and carry in, and if there are two or three ones present on any of those inputs, then the carry out from that cell will be a one. This is supplied to the next most significant carry in input of the adder. This process is repeated for each individual adder bit to produce a resultant address of the size required to access the memory space. The fact that each carry out connects directly to the next most significant carry in, means that the resultant address is always part of a contiguous address space. In the previous example, if an index of value one is supplied to the B inputs of the adder, then the resultant address output to memory will be one greater than the original address supplied on the A inputs.

With reference to FIG. 26, the modification to the previously described normal adder is made whereby the carry out of each cell is multiplexed with the carry in signal supplied to each cell, such that the signal that is passed to the next most significant carry in inputs of the adder can be selected to be either the carry out of the previous cell or the carry in for that previous cell. As an example, consider cell 2505. Its carry out signal is supplied to the multiplexer 2508, and the multiplexer's other input is the carry in signal to 2505. Signal B is used to control the multiplexer causing either the carry out or the carry in of cell 2505 to be passed on the carry in input of the next most significant cell.

Another modification to the standard cell is to include a control input labelled $\overline{ADD}$ which is supplied by the same control signal that controls the multiplexer signal B. If a logical one is supplied on signal B, then the carry in signal of 2505 is supplied to the carry in signal of the next most significant cell. The presence of a logical one on signal B also inhibits the add function of cell 2505 such that the original address supplied on input A is passed straight through to the output without modification. This has the effect of protecting the address bit associated with the presence of a one on input B. It can be seen that by supplying a number of ones to the control signals of the modified adder, the carry out of a cell from the least significant bit can be propagated a number of cells along the length of the adder before being supplied to the carry in of a cell which will perform the add function. This would be the next most significant cell which had a zero on the $\overline{ADD}$ control signal. The effect of this is to protect the address contained within the cells which have been bypassed so that a number of bits of the address range have been protected from modification. With reference to the previously described example, by supplying ones on the multiplexer and $\overline{ADD}$ control signals, an address increment from pixel 15 in memory 0 can be made to pixel 16 in memory 1 so that the memory can be addressed as one continuous address space. The multiplexer control signals are referred to as a sliced mask because they will mask out certain bits from the address range and cause the data which has been distributed in memory to be accessed as a slice indicated in FIG. 24.

It should be noted that this circuitry is used both for storing adjacent information or for retrieving adjacent information. Also, some information should be provided and stored in the same memory and should not be sliced, and this is denoted by providing all zeros to the ABC leads of the slice mask. When this occurs, the individual adders 2504–2506 act in the same manner as the prior art adders 2501–2503. It is also important to keep in mind that there are different types of distributed data that should be sliced across several memories and not just pixel information. This would occur anytime when it is conceivable that several processors would be accessing the same type of information at the same time for whatever processing would be occurring at that point.

It is also important to keep in mind that to distribute memory as disclosed in the sliced addressing mode does not in any way waste memory because the rows B and C which are not used for the particular pixel or other information to be stored would be used for other information. The only "penalty" that conceivably could occur is the additional chip space required to construct the multiplexers and the additional interconnections of the adders. This is a minor penalty to pay for the result of dramatically increased speed of access of memories for parallel processing while still allowing the flexibility of both distributing the adjacent information across many memories and allowing the information to be stored in a single memory under control of an external control. Using this approach, there is no fixed relationship for any particular piece of information so that at various times the information can be distributed across many memories or the same information at different times can be stored in the same memory depending upon the use of the information.

For example, if information which at one time is sliced because it is being used in a parallel processing mode is later determined to be used for a single processor for a single period of time, it would be advantageous to provide all zeros on the slice mask for that time period thereby storing the information in a single memory so that a single processor can then access the single memory, in this way again gaining valuable time over the slice method. This then gives a high degree of flexibility to the design of the system and to the operational mode for storing data.

Turning now to FIG. 27, an example of the way in which a typical quantity of pixels may be distributed over a number of memories is shown. In this example each individual memory is two kilobytes in size, and the start and end addresses of each of these memories are indicated. For example, memory 0 begins at address all zeroes and finishes as address 07FF. Memory 1 begins at 0800 and ends at 0FFF and so on through to memory 7 which begins at 3800 and ends at 3FFF. A quantity of pixels are shown distributed in a slice across these memories, 64 pixels per memory. Consider for a moment stepping through the 64 pixels within the slice of memory 3. We can see that the pixels are arranged from addresses 1900–193F. The next adjacent piece of information is not resident at the next address 1940 because the information was distributed over the memory system in a sliced manner. This means that the next piece of contiguous information is at address 2100 in memory 4. The prior art method of addition, as shown in FIG. 27, would add an index of one onto the address 193F to produce the address 1940. As previously mentioned, this is not the next piece of information required which is resident in the next memory at 2100. With reference to the bottom of the figure where the operation of addition using sliced arithmetic is shown, we can see that the value 193F is represented in binary form, and beneath that is the slice mask information similarly in binary form. As previously described, the presence of ones within the slice mask causes the carry out from an individual adder cell to be passed further along the carry path than the next most significant adjacent cell. In this example five adder cells are bypassed by the carry signal because there are five contiguous ones within the slice mask. Thus, when the index of one which is supplied to the B inputs of the modified adder is added to the value of 193F supplied to the A inputs of the modified adder, the carry out from the sixth least significant bit bypasses the seventh through eleventh significant bits and is passed into the carry in input of the twelfth least significant bit. This has the effect of incrementing those bits of the address including the twelfth and beyond significant bits which, because each memory is two kilobytes in size, has the effect of incrementing to the required address 2100 in the next memory.

Reconfigurable Memory

Before beginning a detailed description of how the MIMD/SIMD operational modes change the reconfigure of the memory, it would be good to review FIG. 4 with respect to the processors' memory and crossbar interconnections thereof. It will be recalled that in the MIMD mode the various processors each obtain their instructions from a separate memory. Thus, in the embodiment shown, processor 100 is connected over its instruction vertical through crosspoint 19-7 to instruction memory 10-1. Crosspoint 19-7 is normally closed except when the transfer processor is accessing the instruction memory in which case a signal is provided to crosspoint 19-7 to control the crosspoint and turn the crosspoint off.

In similar manner, processor 101 is connected via its instruction vertical and crosspoint 14-7 to instruction memory 10-5. Processor 102 is connected via its instruction vertical through crosspoint 9-7 to instruction memory 10-9 while processor 103 is connected via its instruction vertical through crosspoint 4-7 to instruction memory 10-13. This is the arrangement for the memory processor configuration when the system is in the MIMD operational mode.

When all or part of the system is switched to the SIMD operational mode, it is desired to connect memory 10-1 to two or more of the processors or to a group of processors depending upon whether both SIMD and MIMD are operating together or SIMD is operating on just a group of processors. In the embodiment shown we will assume that the SIMD operation is with respect to all four processors 100–103. In this case instruction memory 10-1 is connected to processor 100 via crosspoint 19-7 and three state buffer 403 is activated along with crosspoint 14-7 to connect memory 10-1 directly to the instruction vertical of processor 101. In similar manner three state buffers 402 and 401 are both operated to connect memory 10-1 to the respective instruction verticals of processors 102 and 103, via crosspoints 9-7 and 4-7, respectively.

At this point the system is constructed so that all of the processors 100–103 are operating from a single instruction stream provided from memory 10-1. Memories 10-5, 10-9 and 10-13, which were used for instructions in the MIMD mode, are now free to be used for other purposes. To increase memory capacity, at least on a temporary basis, these memories become available for access by all of the processors. The precise manner in which this is all accomplished will now be discussed.

Figure 28:
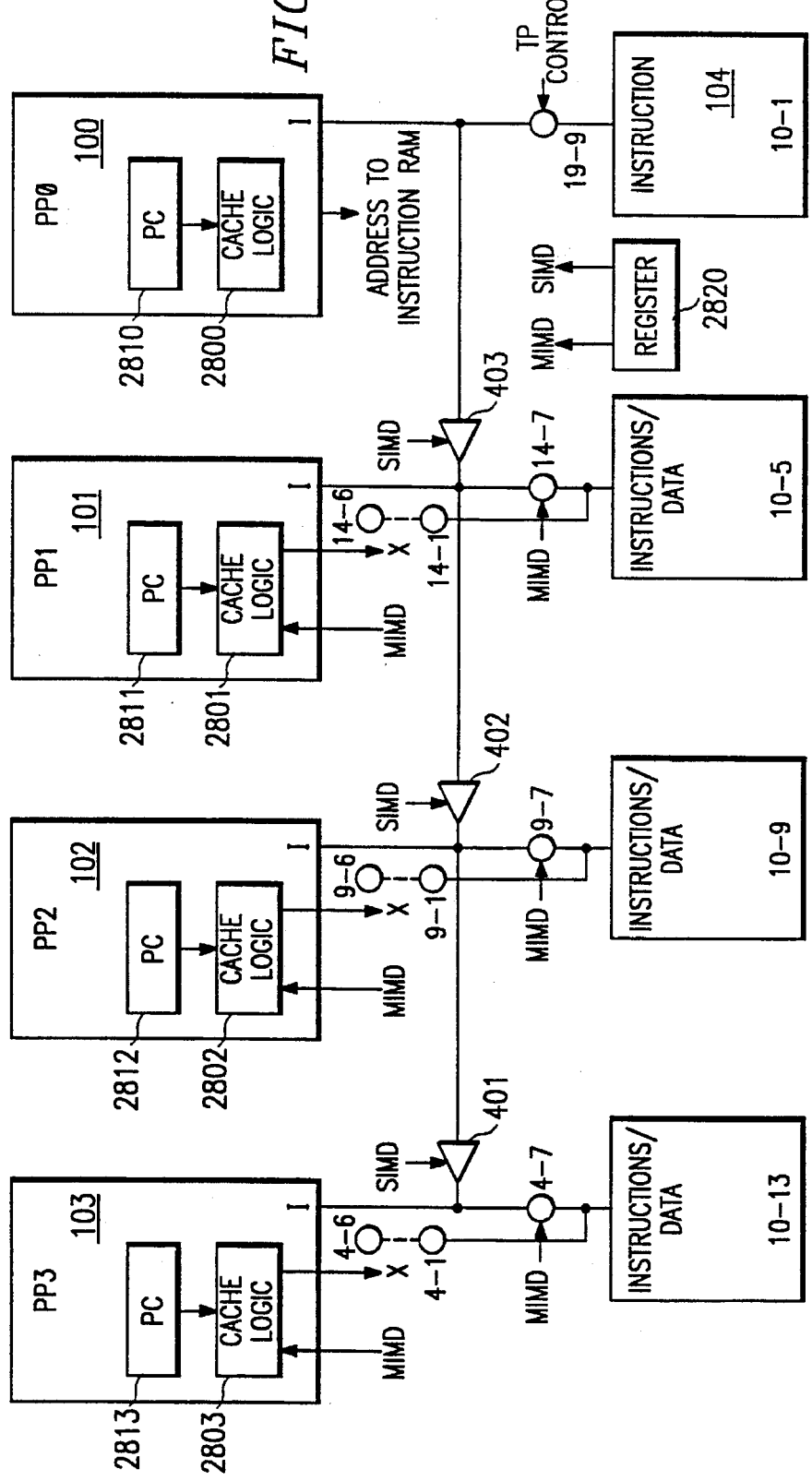
FIG. 28 shows details of the rearrangement of the instruction data memory for the SIMD/MIMD operational modes.

Turning now to FIG. 28. Register 2820 contains the current operating mode of the system. This register contains bits which indicate whether the system is MIMD, SIMD, or some combination (hybrid) of SIMD and MIMD. From this register two signals are supplied, one indicating MIMD, the other SIMD. While the embodiment shows one pair of signals, in actual practice an individual pair of signals for each processor could be supplied. These signals are routed to the crosspoints and three state buffers to select the appropriate instruction streams for the appropriate configurations. In the MIMD configuration, processors 101, 102 and 103 are each executing their own instruction streams. These instruction streams are pointed to by program counters 2811, 2812 and 2813, respectively. These program counters are supplied to the cache logics 2801, 2802 and 2803, respectively. These have the effect of indicating if the instructions pointed to by the program counter are currently resident in the memory modules 10-5, 10-9 and 10-13, respectively. If the instructions indicated by the program counter are present, then the MIMD instruction address is output from the cache logic to the respective memory, and the appropriate instruction stream fetched back from that memory on the instruction vertical to the respective processor. If the instructions are not present within memory at this time, then the instruction execute will cease, and with reference to FIG. 4, crosspoints 13-0, 8-0 or 3-0 may be made to the transfer processors' bus. These are used by the respective processors for communicating the external address of the instructions required to be executed, and also the place within the instruction memory 10-5, 10-9 or 10-13, respectively, where the next sequence of instructions are to be stored. Once the transfer processor has fetched these instructions, an acknowledged signal is passed to the parallel processors from the transfer processor indicating that the code has now been fetched. The parallel processor can then perform instruction execution, again from the memory until such occasion as the instruction stream is found to be absent and the process is again repeated.

In the SIMD configuration because processors 101, 102 and 103 are executing from the same instruction stream, the cache logics 2801, 2802 and 2803 within the processors are disabled because they perform no function. The program counters 2811, 2812 and 2813 contents are irrelevant because they perform no purpose in fetching instructions because in the SIMD configuration all instructions are fetched by processor 100. In the SIMD configuration, therefore, it is desirable to use memories 10-5, 10-9 and 10-13 for storing data. In order to do this, crosspoints 14-1 through 14-6, 9-1 through 9-6 and 4-1 through 4-6 are enabled, thus allowing those memories to be accessed by the processors for data. This means that the memory utilization in the system is maintained at its optimum level for both SIMD and MIMD configurations.

Imaging Personal Computer

Figure 46:
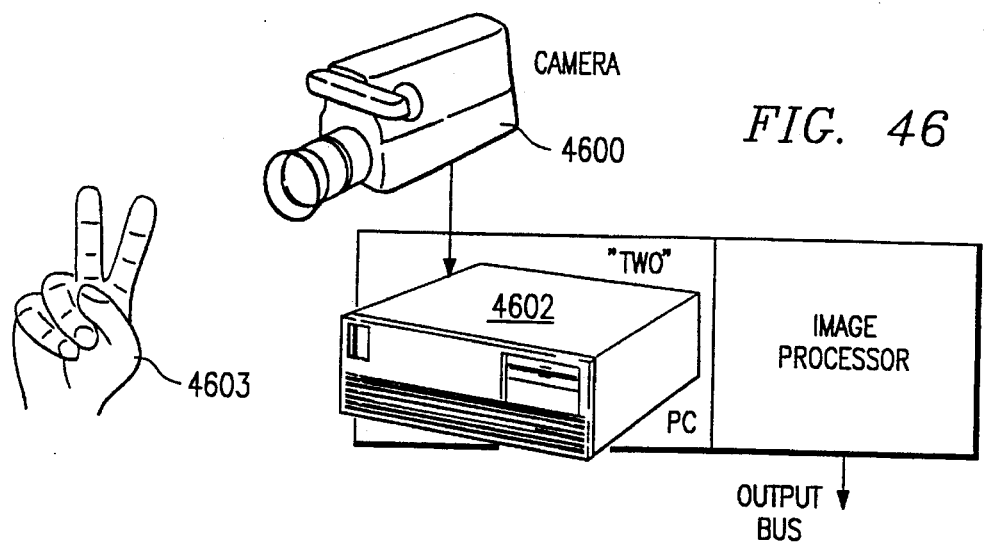
FIG. 46 shows an example of an imaging personal computer.
Figure 47:
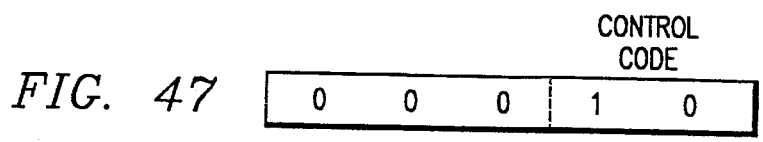
FIG. 47 shows the data on the output bus of the imaging personal computer of FIG. 46.
Figure 48:
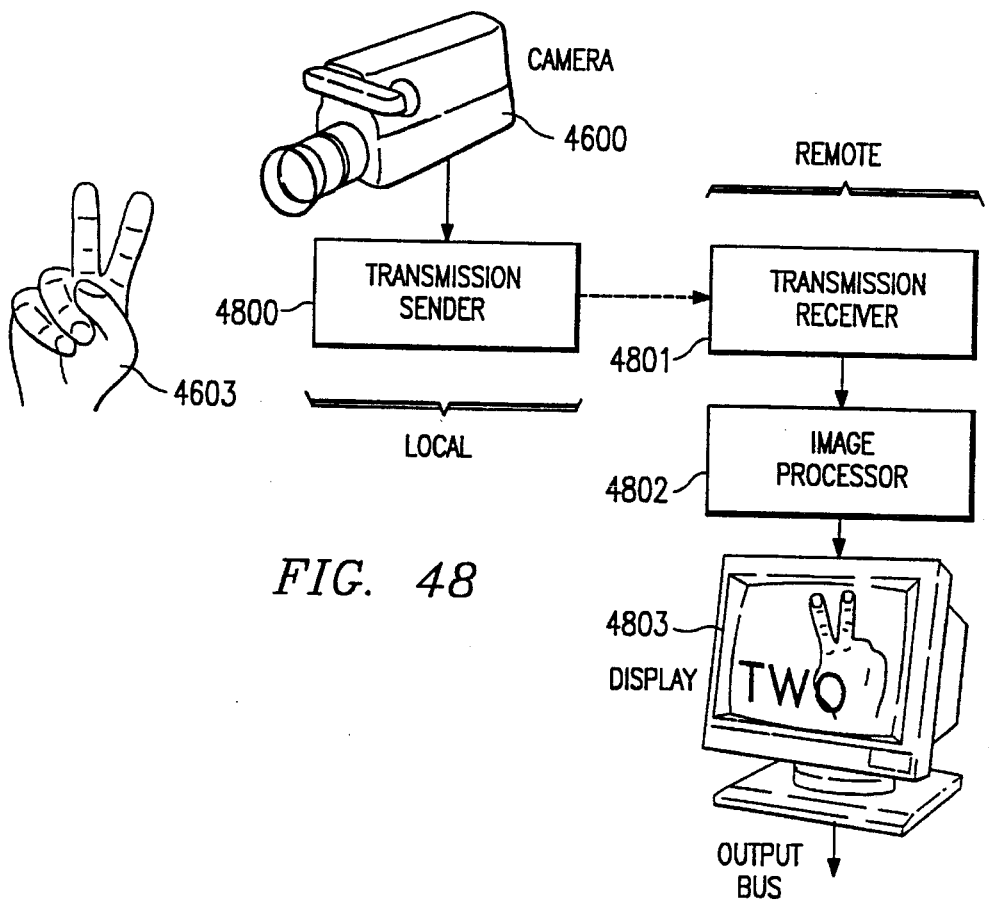
FIG. 48 shows a further example of an imaging personal computer employing image transmission and reception.

The imaging personal computer (PC) shown in FIGS. 46–52, can be constructed of three major elements, a camera sensing device 4600, shown in FIG. 46, an imaging processing device 4602 and a display device 4801 (FIG. 48). The imaging PC is not restricted to the use of a camera 4600 or a display 4803 and many forms of image input/output can be used.

Camera 4600 could be focused in front of display device 4803 of the PC and a hand 4603 can be used to input information by "signing" as typically done for deaf communication. The "signing" could be observed by the camera, and the screen could be used to display either the sign "two" or can be used to further process the information as discussed previously with respect to FIG. 11. The output bus from the PC could also contain the digital representation of the information being input via camera 4600, in this case the binary bits representing two. Thus, the user could utilize spreadsheets and other information obtaining information both from a keyboard or other traditional manner in ASCII (American standard code for information interchange) code as well as from a visual or video source such as camera 4600 or video recorder device or any other type of video input using an imaging code input. The video input can be recorded on tape, on disc or on any other media and stored in the same manner as information is currently stored for presentation to a PC.

Some of the features that an imaging PC can have are 1) acquiring images from cameras, scanners and other sensors; 2) understanding the information or objects, in a document; 3) extracting pertinent information from a document or picture; 4) navigating through a data base combining images as well as textual documents; 5) providing advanced imaging interfaces, such as gesture recognition.

The PC can be used to create instant data bases since the information put into the system can be read and the informational content abstracted immediately without further processing by other systems. This creates a data base that can be accessed simply by a match of particular words, none of which had been identified prior to the storage. This can be extended beyond words to geometric shapes, pictures and can be useful in many applications. For example, a system could be designed to scan a catalog, or a newspaper, to find a particular object, such as all of the trees or all of the red cars or all trucks over a certain size on a highway. Conceptually then, a data base would be formed by words, objects, and shapes which the image processor would abstract and make useful to the user.

One use of such a PC with imaging capability is that both still and moving pictures and video can be integrated into a system or into any document, simply by having the picture scanned by the PC. The information then would be abstracted as discussed with respect to FIG. 11, and the output made available to the imaging PC for further processing under control of the user.

One of the reasons why so much imaging capability is available under the system shown is that the single chip contains several processors working in parallel together with several memories, all accessible under a crossbar switch which allows for substantially instantaneous rearrangement of the system. This gives a degree of power and flexibility not heretofore known. This then allows for a vast increase in the amount of imaging processing capability which can be utilized in conjunction with other processing capability to provide the type of services not known before. Some examples of this would be restoration of photographs and other images, or the cleaning of facsimile documents so that extraneous material in the background is removed yielding a received image as clear or clearer than the sending image. This entire system can be packaged in a relatively small package mainly because of the processing capability that is combined into one operational unit. Bandwidth limitations and other physical limitations such as wiring connections, are eliminated.

An expansion of the concept would be to have the imaging PC built into a small unit which can be mounted on a wrist and the large video display replaced by a small flat panel display so that the user can wave a finger over top of the display for input as shown in FIG. 46. The imaging system, as previously discussed, would recognize the various movements and translate the movements into an input. This would effectively remove the problems of keyboards and other mechanical input devices and replace them with a visual image as an input. The input in this case could also be a display, serving a dual purpose. This then makes optical character recognition an even more important input tool than as presently envisioned.

FIG. 47 shows the binary output code of two as determined from the image of the two fingers under control of the imaging PC and the algorithms of FIG. 11 implemented by the structure of FIGS. 1 and 2.

FIG. 48 shows a remote transmission system using the imaging PC.

Figure 49:
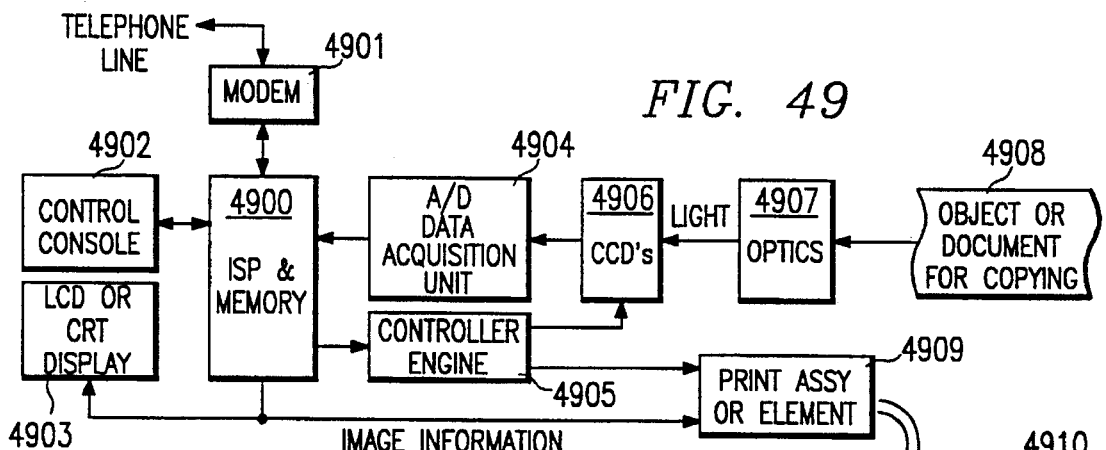
FIG. 49 is a block diagram of an example imaging personal desk top computer.

FIGS. 49–52 show various implementations of an image system processor PC with various applications. For example, FIG. 49 shows a personal desk top imaging PC which has multiple input and output devices. As shown, an object or document for copying 4908 would be imaged or sensed with optics 4907 and CCD (charge coupled device) 4906. This sensed information is then converted from analog to digital information with A/D data acquisition unit 4904 which provides sensed digital information for the ISP imaging system processor 4900.

Controller engine 4905 provides the necessary timing signals to both CCD unit 4906 and print assembly 4909. This print assembly will provide documents 4910. Another input or output capability would be a telephone line shown by modem 4901 providing communication to other units. Control console 4902 could consist of a keyboard, mouse or other imaging devices previously described. LCD (liquid crystal display) or CRT (cathode ray tube) display 4903 would be used for providing information to the user. Display 4903 and ISP and memory 4900 and element 4909 are connected by an image information bus, which contains data of images which have been processed.

Figure 50:
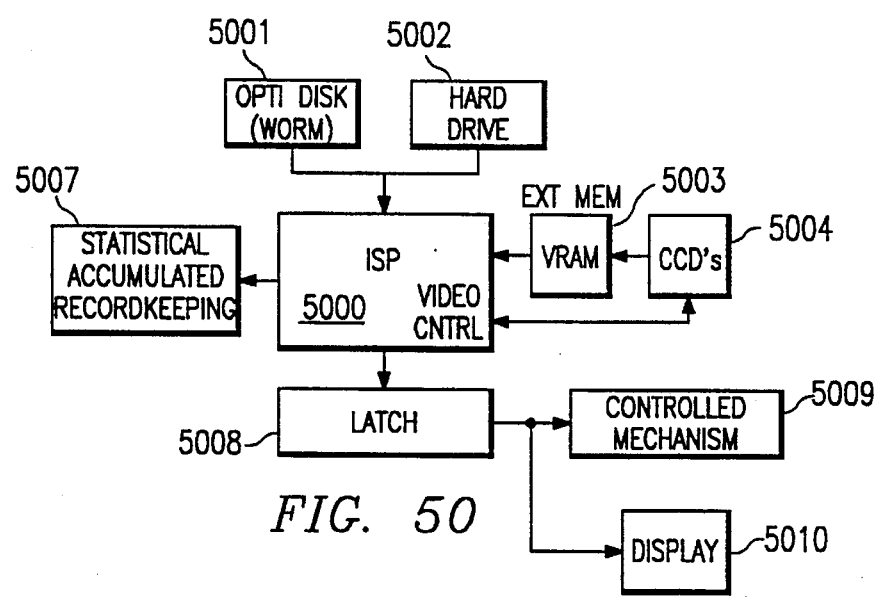
FIG. 50 is a block diagram of an imaging computer imbedded in a application product.

FIG. 50 describes an imbedded application of the image system processor 5000. In this case images are sensed again via CCD's 5004 or other sensors which collect information from the world, such as the presence of an intruder in a security application. This information is placed in a frame buffer or VRAM 5003 which is the external memory for the image system processor 5000. Alternatively, the ISP can be used as a pattern (or person) recognizer and output control information fed to latch 5008. This information would be used to control a mechanism 5009, such as a door lock or factory process or the like. Also, the output from latch 5008 could be presented to output display 5010. The program or instructions have been previously stored in an optical disc 5001 or a hard drive 5002. These devices can also be used to store incidences of information such as again in a security application, the image of an intruder. The statistical accumulated record keeping 5007 maintains system status or occurrence of events which have occurred.

Figure 51:
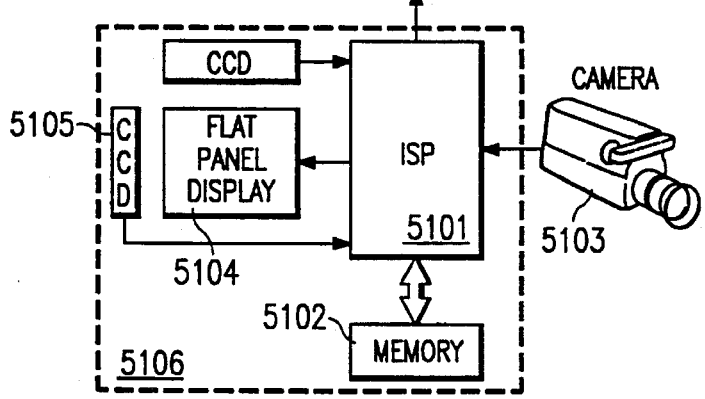
FIG. 51 is a block diagram of a handheld imaging personal computer.

FIG. 51 depicts a handheld imaging PC. In this case the image system processor 5106 accepts input from two charge couple devices 5105 which provide position input which is then processed to extract user supplied gestures and control of the PC. The position and orientation of the user's hand or pseudo pen would then be used to control the device or in conjunction with the ISP to extract meaningful messages or characters. Flat panel display 5104 provides an output information display of this handheld PC. Optionally, an external camera 5103 would allow the user to collect images outside of the scope of the handheld PC's memory. A host or printer port would also be provided to allow the user to download or print information contained in the handheld PC.

Figure 52:
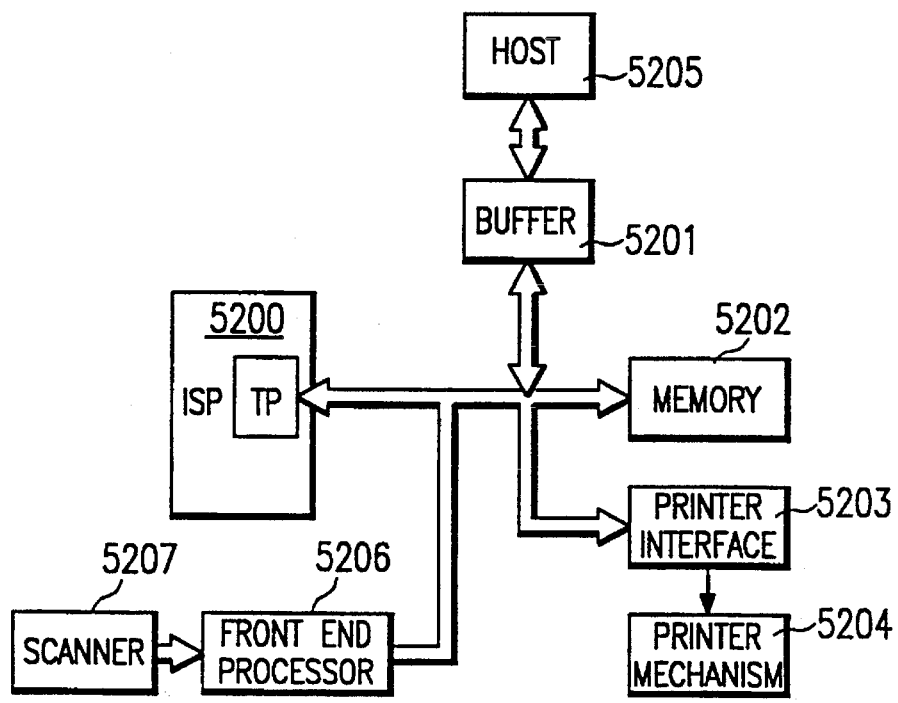
FIG. 52 is a block diagram of node of a network of imaging computer.

FIG. 52 describes an application of the ISP in a network configuration with a host 5205 which provides necessary image information collected off-line either remotely or in some central office and then distributed to buffer 5201 which is then used by the imaging PC configuration to provide information to the image system processor 5200. An alternative method of obtaining information is via scanner 5207 working in conjunction with front end processor 5206. This reduced cost version of the imaging PC (with respect to FIG. 49) would permit the resource sharing by networking image collection devices. A printer port would also be provided via printer interface 5203 and its connection to printer mechanism 5204 which would allow the user to print the compound documents which contain the normal textual and graphic information in addition to images or enhanced images via the image system processor.

The compact structure of the image processing system, where all of the parallel processing and memory interaction is available on a single chip coupled with a wide flexibility of processor memory configurations and operational modes, all chip controlled, contributes to the ability of the imaging PC to accept image data input as well as ASCII input and to allow the two types of data to be simultaneously utilized.

Ones Counting Circuit

Figure 53:
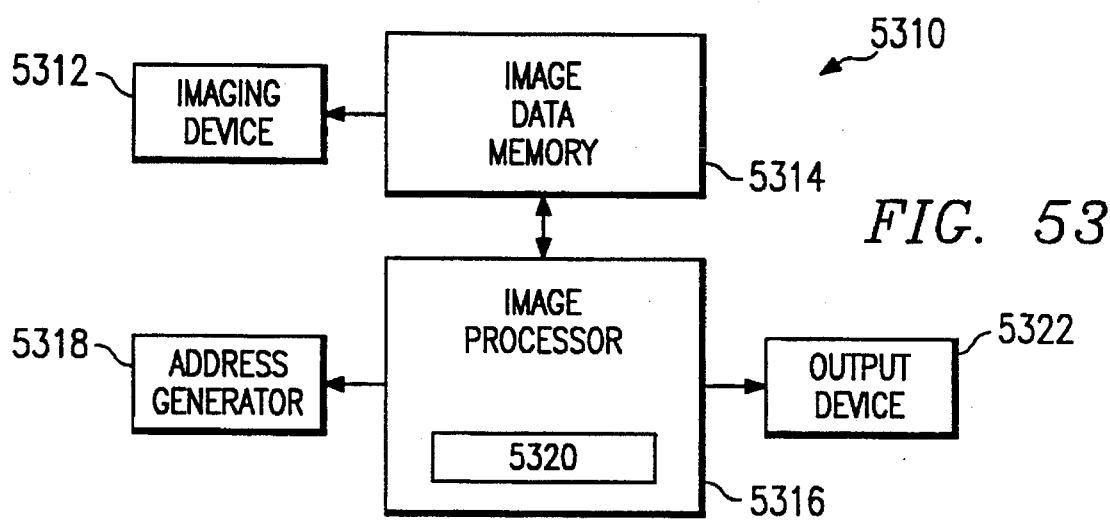
FIG. 53 is a functional block diagram of an imaging system.

FIG. 53 shows an imaging system 5310 operable to process image data using combinations of various processing algorithms. An imaging device 5312, such as a video camera, a still image camera, a bar code reader and the like, is used to capture images and provides them to an image data memory 5314. The captured images are stored in image data memory 5314 until they are accessed by an image processor 5316 addressed by an address generator 5318. Image processor 5316, such as the processor shown in FIGS. 1 and 2, performs signal processing functions including statistical processes on the image data, such as histograms. A ones counting circuit 5320 is provided to generate a count of the number of "ones" in the image data. Information, such as the number of "ones" along a projection line in the image data, is used to provide a statistical analysis of the image data, which may be used for pattern recognition. The histogram of the image data may be compared to predetermined image patterns to recognize a pattern match. An output device 5322 is coupled to image processor 5316 and is available for displaying any output of imaging system 5310. The output device 5322 may be a monitor or a hard copy generating device.

It should be understood that the overview of the imaging system 5310 described above provides an example of an environment in which the present invention may advantageously operate, and the description above in no way limits the applicability of ones counting circuit 5320.

Figure 54:
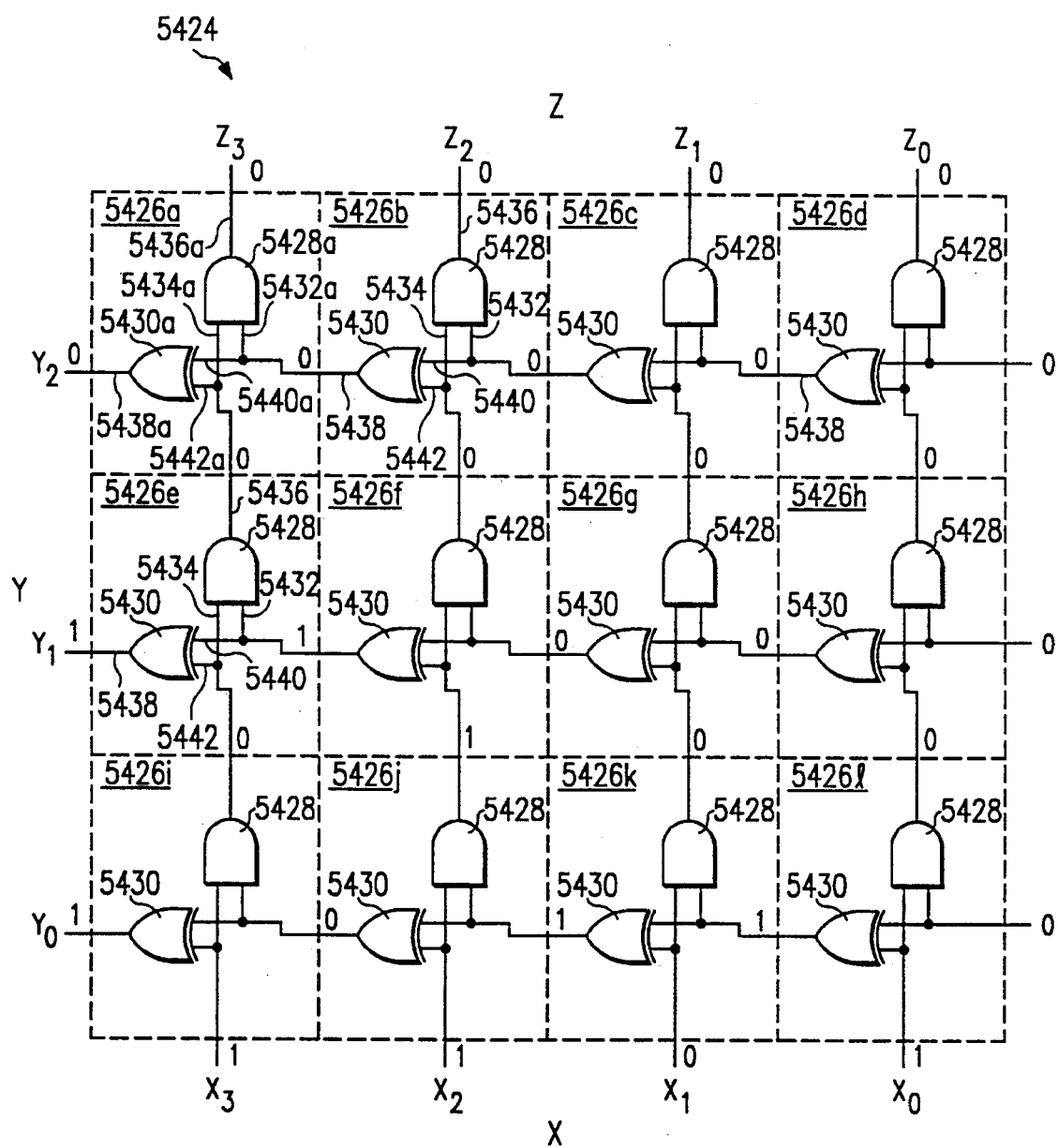
FIG. 54 is a logic schematic of the ones counting circuit matrix.

Referring to FIG. 54, a logic gate level implementation of a ones counting circuit 5320 is shown. The ones counting circuit 5320 consists of a matrix 5424 having M number of rows and N number of columns of count cells 5426a through 5426l, where M is equal to three and N is equal to four in the embodiment shown in FIG. 54. For an input binary string of $X_n$ number of bits, M may be determined by:

$$M = \log_2 (X_n + 1)$$

rounded up to the nearest integer, and N may be determined by:

$$N = X_n.$$

The matrix 5424 receives a binary string denoted by X, and produces a binary number denoted by Y, indicative of the number of "ones" in the binary string. Another output, denoted by Z, is used in a minimized ones counting circuit matrix, to be discussed in detail below.

Each count cell 5426a through 5426l in matrix 5424 includes an AND gate 5428 and an XOR gate (exclusive-OR) 5430. For example, count cell 5426a includes an AND gate 5428a coupled to an XOR gate 5430a. An AND gate, such as AND gate 5428a, performs an AND function in which the output is equal to a logic level "one" if, and only if, all of the inputs are of logic level "one." AND gate 5428a includes inputs 5432a and 5434a, and an output 5436a. Therefore, output 5436a becomes a "one" if the logic level on inputs 5432a and 5434a are both "ones," and output 5436a is a "zero" if one of the inputs is a "zero."

An XOR gate generates a logic level "one" at an output only if an odd number of "ones" are present at its input. For example, XOR gate 5430a will produce a "one" at output 5438a if a "one" is present at only one of its inputs 5440a and 5442a.

In count cell 5426a, like all other count cells in matrix 5424, AND gate 5428a is coupled to XOR gate 5430a. Input 5432a of AND gate 5428a is connected to input 5440a of XOR gate 5430a. Input 5434a of AND gate 5428a is connected to input 5442a of XOR gate 5430a. Thus, arranged in this manner, AND gate 5428a receives the same inputs as XOR gate 5430a.

Count cells 5426a through 5426l are arranged in rows and columns in matrix 5424. The interconnections of count cells 5426a, 5426b and 5426e will be used to illustrate the interconnections of the whole matrix 5424. As shown in FIG. 54, count cell 5426a is arranged to be left of count cell 5426b and above count cell 5426e. Count cell 5426a is connected to count cell 5426b, where output 5438 of XOR gate 5430 of count cell 5426b is connected to inputs 5432a and 5440a of count cell 5426a. Count cell 5426a is connected to count cell 5426e, where output 5436 of AND gate 5428 of count cell 5426e is connected to both input 5434a of AND gate 5428a and also input 5442a of XOR 5430a gate of count cell 5426a. The interconnections just described may be expanded to the whole matrix by using the connection between count cells 5426a and 5426e for inter-row connections and the connection between count cells 5426a and 5426b for inter-column connections. It is appropriate to note that matrix 5424 may be implemented with the rows as the columns and vice versa, and the matrix itself transposed without departing from the teachings of the present invention.

In order to further describe the structure of matrix 5424, the following convention will be used when referring to the rows and columns: rows have row numbers zero through (M−1), and columns have column numbers zero through (N−1), where the bottommost row is row zero and the right most column is column zero. In the example shown in FIG. 54, M is three and N is four. Furthermore, references may be made to a count cell at a position (x,y). The coordinates x and y indicate the column number and row number, respectively, of a count cell. For example, count cell 5426a is at position (3,2).

Accordingly, matrix 5424 comprises interconnected count cells 5426a through 5426l arranged in rows and columns where row zero receives the binary string X, row one receives the AND gate outputs of row zero, and row two produces output Z. Column-wise, column zero receives "zeros" from any source to begin the propagation, column one receives the XOR gate output of row zero, column two receives the XOR gate output of row one, and column three produces output Y indicative of the number of "ones" in binary string X. The logic level "zero" received by column zero may be produced by hardwiring the inputs to ground.

For the purpose of illustration, a binary string 1101 ($X_3$=1, $X_2$=1, $X_1$=0, $X_0$=1) is received by row zero of matrix 5424. AND gate 5428 of count cell 5426l produces a "zero" at its output, and XOR gate 5430 of count cell 5426l produces a "one" at its output. The logic level "one" from XOR gate 5430 of count cell 5426l is propagated down row zero, and the outputs of the XOR gates of each cell toggles each time there is a "one" in the corresponding X input. Therefore, the output of XOR gate 5430 of count cell 5426k remains at logic level "one," the output of XOR gate 5430 of count cell 5426j toggles to a "zero," and the output of XOR gate 5430 of count cell 5426i toggles again to a "one." This produces a "one" at the output of row zero, which makes $Y_0$ equal to "one."

In row one, the XOR gates toggle their outputs in a similar fashion. The output of XOR gate 5430 count cell 5426h is a "zero," having received a "zero" from AND gate 5428 of count cell 5426l. The output of XOR gate 5430 of count cell 5426g remains at logic level "zero," having received "zeros" from both XOR gate 5430 of count cell 5426h and AND gate 5428 of count cell 5426k. Subsequently, the output of XOR gate 5430 of count cell 5426f toggles to a "one," having received a "zero" from XOR gate 5430 of count cell 5426g and a "one" from AND gate 5428 of count cell 5426j. The output of XOR gate 5430 of count cell 5426e is a "one", having received a "one" from XOR gate 5430 of count cell 5426f and a "zero" from AND gate 5430 of count cell 5426i. As a result, a "one" is produced at the output of row one, which makes $Y_1$ equal to "one."

In row two, the output of XOR gate 5430 of count cell 5426d is a "zero," having received the hardwired zero and another "zero" from AND gate 5428 of count cell 5426h. The output of XOR gate 5430 of count cell 5426c remains at logic level "zero," having received "zeros" from both XOR gate 5430 of count cell 5426d and AND gate 5428 of count cell 5426g. Subsequently, the outputs of XOR gates 5430 of both count cells 5426a and 5426b also produce "zeros," which produce a "zero" at the output of row two, making $Y_2$ equal to "zero." Therefore, for the example input binary string X=1101, the output is the binary number Y=011, which is three. Indeed, there are exactly three "ones" in the example binary string input X=1101.

It can be appreciated that the ones counting circuit 5320 is an asynchronous circuit, which receives inputs and generates outputs without requiring clock signals. Thus, in matrix 5424, an output is available as soon as the inputs are received and the signals are propagated through the matrix. The longest propagation time through the matrix would be the time it takes for the signals to propagate through the longest path which includes count cells 5426l, 5426h, 5426d, 5426c, 5426b, and 5426a.

Matrix 5424 shown in FIG. 54 is rectangular and comprises identical count cells 5426. These characteristics make the ones counting circuit compact and easily laid out for semiconductor mask production. However, matrix 5424 may be minimized by using fewer count cells and/or fewer gates.

Figure 55:
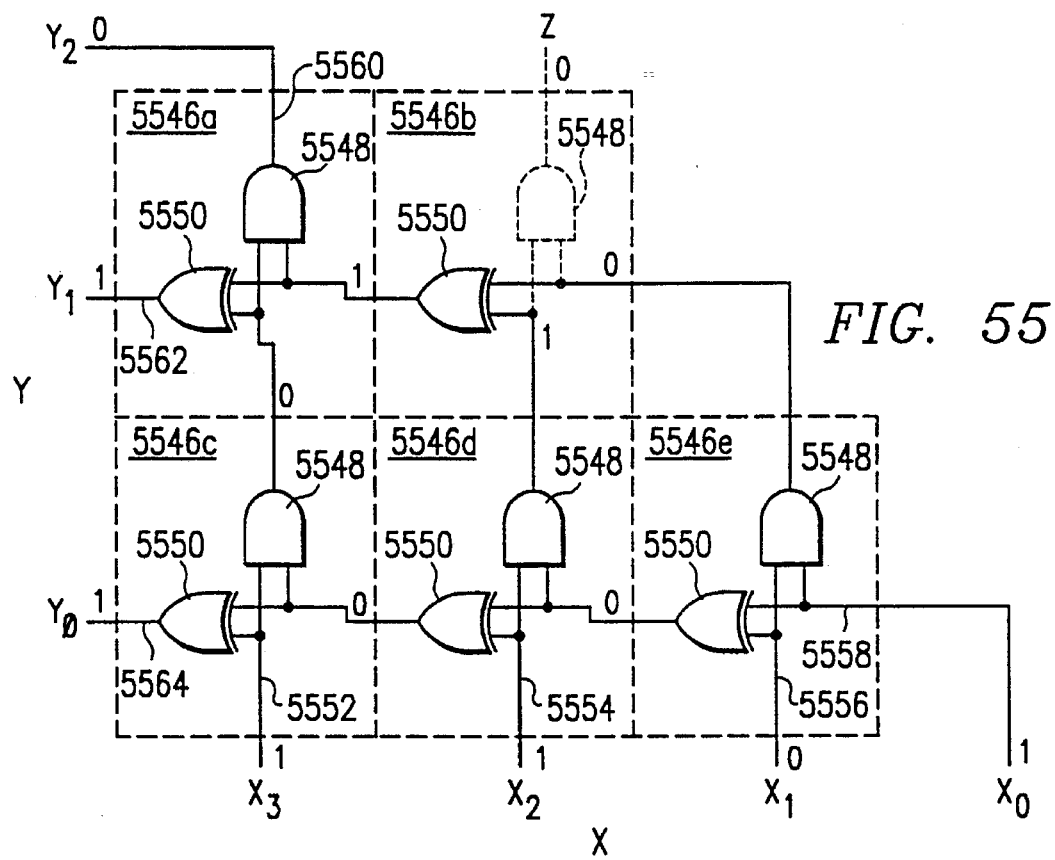
FIG. 55 is a logic schematic of a minimized matrix of the ones counting circuit.

Referring to FIG. 55, a minimized ones counting circuit matrix 5544 for a four bit binary string input is shown. Matrix 5544 includes interconnected count cells 5546a through 5546e. For a minimized matrix, the number of rows M, and the number of count cells in each row N, are determined as follows:

$M = \log_2 X_n$ rounded up to the nearest integer, and for each row $N = X_n - 2^r$, where $X_n$ is the number of bits in the input binary string X, and r is the row number ranging from zero to (M−1). In the example shown in FIG. 55, the number of bits $X_n$ of the input binary string X is four. Using the above formulas, the number of rows, M, is equal to two. To calculate for N for the first row, r is equal to zero, which makes N equal to three. For the second row, r is equal to one, which makes N equal to two. Thus, a minimized matrix of three count cells in the first row and two count cells in the second row, totaling five count cells, can compute the number of "ones" in a four bit binary string, as compared with the twelve count cells in the full matrix 5424 (FIG. 54).

Each count cell 5546a through 5546e comprises an AND gate 5548 coupled to an XOR gate 5550, identical to the count cells of the full matrix 5424 shown in FIG. 54. The binary input string X is received by the inputs to count cells 5546c through 5546e; the output binary number Y is produced at the outputs of count cells 5546a and 5546c.

In the example shown in FIG. 55, $X_3$ is received by the inputs 5552 to AND gate 5548 and XOR gate 5550 of count cell 5546c; $X_2$ is received by the inputs 5554 to AND gate 5548 and XOR gate 5550 of count cell 5546d. $X_1$ is received by the inputs 5556 to AND gate 5548 and XOR gate 5550 of count cell 5546e; $X_0$ is received by the other inputs 5558 to AND gate 5548 and XOR gate 5550 of count cell 5546e.

The most significant bit of the binary number output Y, $Y_2$, is produced at output 5560 of AND gate 5548 of count cell 5546a. $Y_1$ is produced at output 5562 of XOR gate 5550 of count cell 5546a. The least significant bit $Y_0$ is produced at output 5564 of XOR gate 5550 of count cell 5546c.

Because the minimized matrix 5544 is not rectangular, the interconnections between the count cells are modified. In particular, if a count cell at position (x,y) is not present as compared with the full matrix, the count cell in the row immediately "below" it is connected to the input of the XOR gate of the count cell (x+1,y) immediately to the left of the missing cell. If more than one count cell is absent, for example, count cells at positions (x,y) and (x+1,y), then only the output of the AND gate of the count cell at position (x+1,y−1) need to be connected to the input of the XOR gate of the count cell at position (x+2,y). In the embodiment shown in FIG. 55, the count cells at positions (0,1) and (1,1) are absent, so the output of AND gate 5548 of the count cell 5546e at position (1,0) is connected to the inputs of AND gate 5548 and XOR gate 5550 of count cell 5546b at position (2,1). Further, the count cell at position (0,0) is also absent as compared with the full matrix implementation. The input $X_0$, then, is directly connected to inputs 5558 of AND gate 5548 and XOR gate 5550, respectively, of count cell 5546e at position (1,0). The count cell at position (3,2) is also absent, so the output $Y_2$ is directly provided by the output 5560 of AND gate 5548 of count cell 5546a at position (3,1).

Using the prior example X=1101, where $X_3$=1, $X_2$=1, $X_1$=0, and $X_0$=1, the output of AND gate 5548 of count cell 5546e is a "zero," and the output of XOR gate 5550 of the same count cell 5546e is a "one." The logic level "one" from XOR gate 5550 of count cell 5546e is propagated down row zero and the outputs of XOR gates of each cell toggle each time there is a "one" in the corresponding X input. Therefore, the output of XOR gate 5550 of count cell 5546d toggles to a "zero," and the output of XOR gate 5550 of count cell 5546c toggles again to a "one." This produces a "one" at the output of row zero, which makes $Y_0$ equal to "one."

In the second row, the output Z of AND gate 5548 of count cell 5546b is a "zero," having received a "zero" from AND gate 5548 of count cell 5546e. XOR gate 5550 of count cell 5546b outputs a "one," having received a "zero" from count cell 5546e and a "one" from count cell 5546d. XOR gate 5550 of count cell 5546a outputs a "one," having received a "zero" from count cell 5546c and a "one" from count cell 5546b. This produces a "one" at the output of row one, making $Y_1$ equal to "one." In addition, $Y_2$, which is the output of AND gate 5548 of count cell 5546a, is a "zero." Therefore, the output binary number is equal to Y=011, indicating that there are three "ones" in the input binary string X=1101.

Matrix 5544 may be further minimized by eliminating some logic gates, such as AND gate 5548 of count cell 5546b, shown in broken outline. Since the output Z of AND gate 5548 is not required to assemble output binary number Y, AND gate 5548 can be eliminated. Therefore, in a minimized matrix, AND gates of count cells immediately adjacent to absent count cells in the same row may be removed to further reduce the size of the ones counting circuit.

It can be appreciated that the present invention is not limited in scope to the circuit implementation described and shown herein. In particular, alternative embodiments may include circuit implementations derivable from the present embodiment by Boolean logic as known in the art. For example, an AND gate such as AND gate 5548 may be equally implemented by a NAND gate coupled to an inverter. Furthermore, by De Morgan's theorem as known in the art, an AND function may be implemented by an OR gate with an inverter coupled to its output and with the input signals to the OR gate inverted. Such alternate circuits derivable from the present embodiment are within the scope of the invention.

Figure 56:
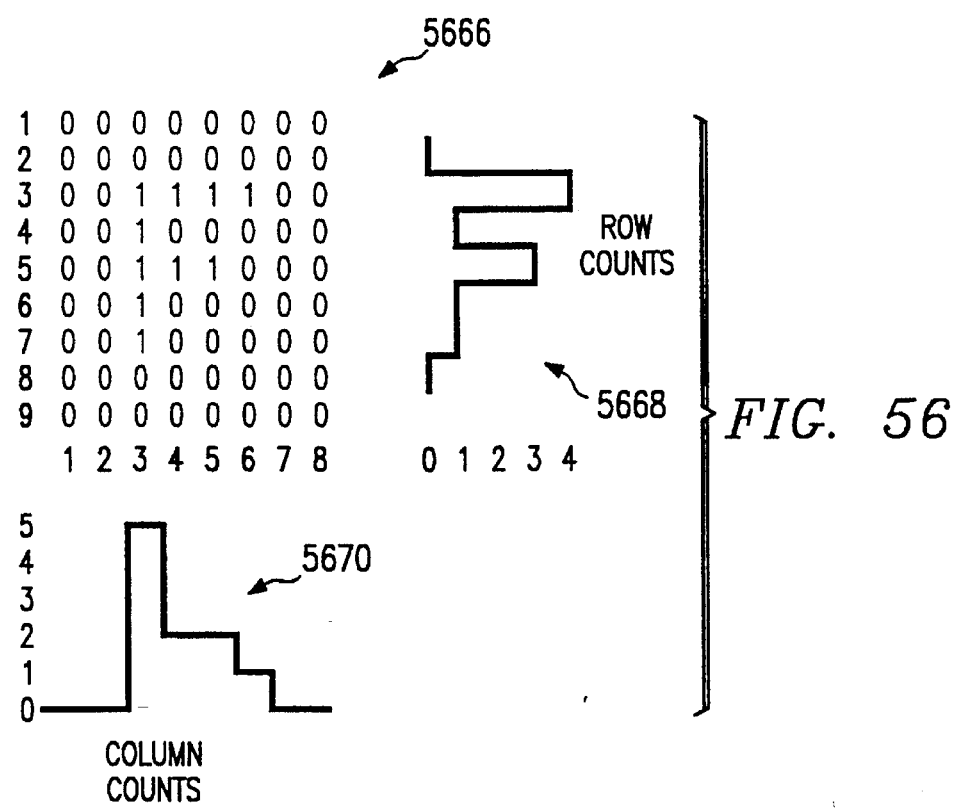
FIG. 56 is an example of an application of a ones counting circuit.

Referring now to FIG. 56, an example application in character recognition of the present invention is shown. A matrix of pixels 5666 consists of "zeros" and "ones" forming a letter "F." The pixels 5666 may be gathered by an aforementioned imaging device and stored in an image data memory. The matrix of pixels 5666 is processed row-wise and column-wise to generate row counts 5668 and column counts 5670 of the number of "ones" present in each row and column, respectively. The row counts 5668 are generated by providing each row of the pixel matrix 5666 as binary string input X to the ones counting circuit. Thus, a count of the number of "ones" of each row is generated. In the example shown in FIG. 56, the capital letter "F" has no "one" pixels in the first two rows. In row three, there are four "ones" forming the first horizontal line in the letter. In row four, there is only one "one". Row five has three "ones" which form the second horizontal line in the letter "F." In each of rows six and seven, there is one "one".

Similarly, column counts 5670 are generated by providing each column of the pixel matrix 5666 to the input of the ones counting circuit. Columns one and two contain no "ones." In column three, there are five "ones" forming the vertical line in the letter "F." In column four, there are two; in column five, there are also two; in column six, there is one; and in columns seven and eight, there are none.

Therefore, the row counts and column counts of all characters and any image pattern may be generated and stored as histograms in a pattern recognition system, so that they may be used as a standard for comparison against new character image samples.

While the preferred embodiment of the present invention counts the number of "ones" in an input binary string, it is conceivable to implement a "zero" counting circuit operable to count the number of "zeros" in a binary string in an alternate embodiment by adding inverters at the input of the ones counting circuit matrix. Such a "zero" counting circuit is an alternate embodiment and is within the teachings of the present invention.

Although the present invention has been described in detail, it should be understood that various changes, substitutions and alterations can be made hereto without departing from the spirit and scope of the invention as defined by the appended claims.

PROCESSOR DETAILS

The following discussion pertains to the master processor, the parallel processors, and the transfer processor as detailed in FIGS. 29–45. While not necessary for an understanding of the operation of the invention claimed, this discussion may be helpful to give a specific embodiment of many such embodiments. The precise system used will depend upon the system requirements and can, in fact, vary substantially from the following discussion.

Parallel Processor

Master Processor

Turning now to FIG. 29, we can look at workings of master processor 12 which serve to control the operation of the entire image system processor including controlling the synchronization and other information flowing between the various parallel processors. Master processor 12 executes instructions which can be 32 bit words having opcodes controlled by opcode circuit 2911 and register file 2901. Program counter 2903 operates under the control of control logic 2904 to control the loading of instructions from bus 172 into opcode register 2911. Control logic 2904 then decodes the instruction and controls the operation on master processor 12 based on the information presented.

In addition to integer execution unit (ALU—arithmetic logic unit) 2902, there is a floating point execution unit comprised of two parts. Part one is a floating point multiplier comprised of multiplier 2905, normalized circuit 2906 and exponent adder 2907. Part two is a floating point adder comprised of prenormalizer 2908 and arithmetic unit 2909 and postnormalizing shifter 2910.

Program counter register 2903 is used to provide the address output along bus 171 when it is required to read 32 bit instructions. Acting in accordance with the instructions decoded from opcode register 2911, integer execution unit 2902 can provide addresses which are output over bus 171 to control the reading of data from a data cache external to the master processor. Data is returned over the data part of bus 171 and stored in register file 2901.

The Instruction bus 172 and data bus 171 each consist of an address part and a data part. For instruction bus 172, the address part comes from the program counter 2903 and the data part is returned to opcode register 2911. For data bus 171, the address part comes from the output of the integer ALU 2902 and the data either comes from register file 2901 if it is a write cycle or is returned to register file 2901 if it is a read cycle.

The manner in which the various elements of master processor 12 interact with each other are well-known in the art. One example of the workings of a graphics processor is shown in copending U.S. patent application of Karl Guttag, David Gulley, and Jerry Van Aken, entitled "Graphics Processor Having a Floating Point Coprocessor", Ser. No. 387,472, filed Jul. 28, 1989, which application is hereby incorporated by reference herein.

Parallel Processor Operation

The four processors 100–103 shown in FIGS. 1 and 2 (abbreviated PP herein) perform most of the system's operations. The PP's each have a high degree of parallelism enabling them to perform the equivalent of many reduced instruction set computer (RISC)-like operations per cycle. Together they provide a formidable data processing capability, particularly for image and graphics processing.

Each PP can perform three accesses per cycle, through the crossbar switch to the memory, one for instructions and two for data. A multiply and an ALU operation can also be performed by each PP every cycle, as well as generating addresses for the next two data transfers. Efficient loop logic allows a zero cycle overhead for three nested loops. Special logic is included for handling logical ones, and the ALU is splittable for operating on packed pixels.

As discussed previously, to allow flexibility of use, the PPs can be configured to execute from the same instruction stream (Single Instruction Multiple Data (SIMD) mode) or from independent instruction streams (Multiple Instruction Multiple Data (MIMD) mode). MIMD mode provides the capability of running the PPs together in lock-step allotting for efficient synchronized data transfer between processors.

In order to relieve the programmer of the worries of accidental simultaneous access attempts of the same memory, contention prioritization logic is included in the crossbar, and retry logic is included in the PPs.

All the PPs 100–103 are logically identical in design, but there are two differences in their connections within the system. Firstly, each PP will be supplied with a unique hardwired two-bit identification number that allows a program to generate PP specific information such as addresses. The other difference is that when configured as SIMD, one PP 100 will act as the "master" SIMD machine and will perform the instruction fetches on behalf of all the PPs. The other PPs 101–103 will act as "slave" machines simply executing the provided instruction stream.

Internal Interfaces

Figure 30:
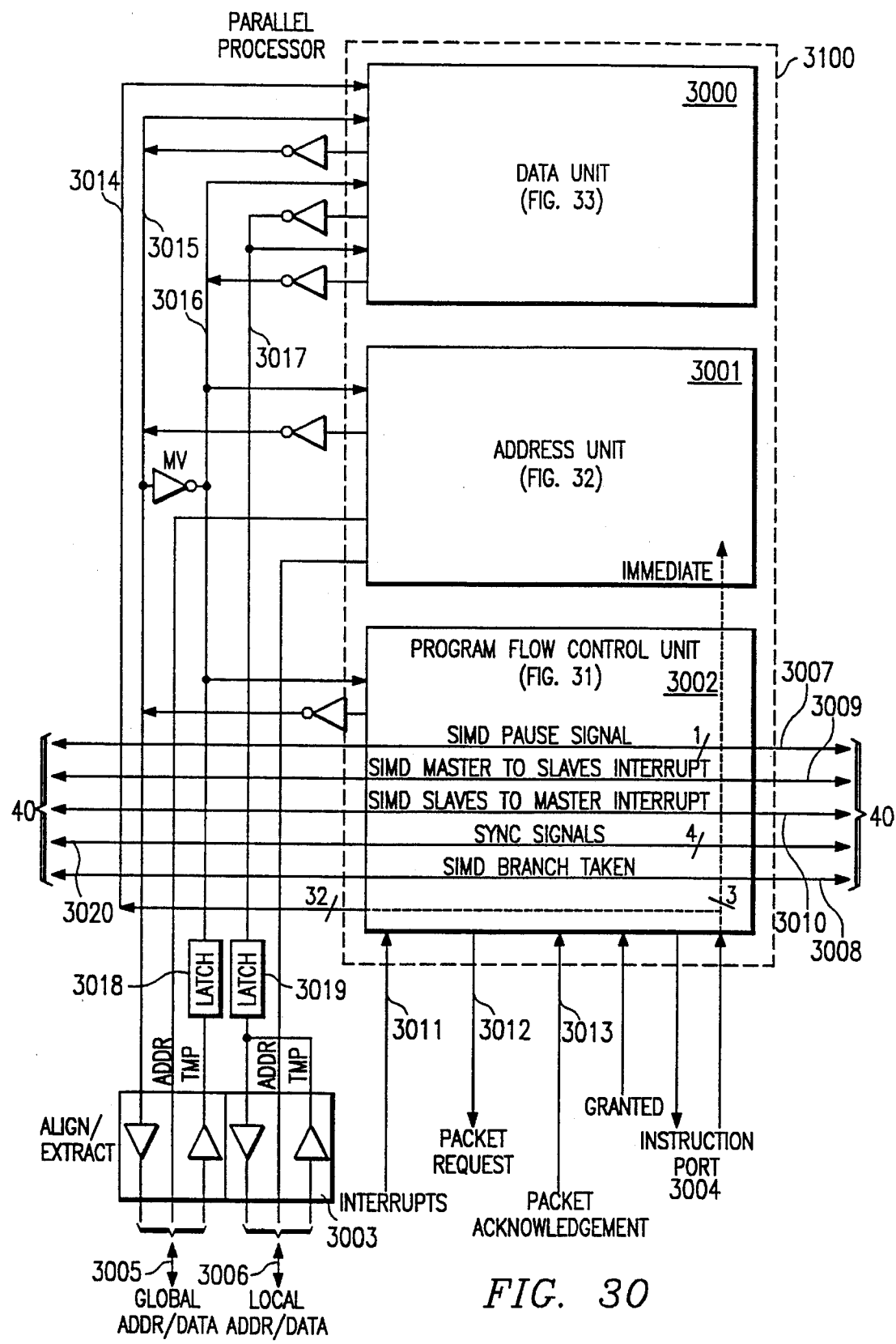
FIG. 30 shows the general structure of the parallel processors.

As shown in FIG. 30, each PP 100–103 connects to the rest of the system via a number of interfaces, such as instruction port 3004, global port 3005 and local port 3006, as well as an interprocessor communication link 40.

Instruction port 3004 is connected to its own instruction RAM 10-1 (10-5, 10-9 or 10-14) in the MIMD mode or connected to the other PP's instruction buses in the SIMD mode. Only the "master" SIMD PP 100 will output addresses onto its instruction bus when configured as SIMD. Instruction port 3004 is also used to communicate cache-miss information to transfer processor 11.

Global port 3005 is attached to the PP's own dedicated bus that runs the length of the crossbar. Via this bus the PP can reach any of the crossbar'd RAMs 10. Data transfer size is typically 8, 16 or 32 bits. A contention detect signal 3210 (FIG. 32) associated with this port is driven by the crossbar logic, indicating when a retry must be performed.

Local port 3006 is similar in function to global port 3005, but it may only access the four crossbar'd RAMs physically opposite each PP. In SIMD mode however it is possible to specify a "common" read with the four local PP buses 6 series connected, allowing all (or some subset of) PPs to be supplied with the same data (from one RAM 10-0, 10-2, 10-3 or 10-4). In this situation only the "master" SIMD PP 100 will supply the address of the data.

In MIMD configuration, there is the capability to execute PP programs in lock-step. The programmer indicates these sections of code by bounding them with LCK and ULCK instructions. Four signals 3020, one output by each PP, are routed between the PPs indicating when each is in this section of code. By testing these signals the PPs can execute code synchronously.

As mentioned above, global ports 3005 and local ports 3006 have signals 3210 and 3211 (FIG. 32) to know when contention has occurred and a retry is required. When configured in SIMD mode, it is essential that all PPs pause instruction execution until all contentions have been resolved. There is thus a signal 3007 running between all PPs which is activated when any PP detects contention. The next instruction is only loaded by the PPs when this signal becomes inactive. This signal is also activated when the "master" SIMD PP 100 detects a cache-miss. In MIMD configuration signal 3007 is ignored.

In SIMD configuration stack coherency between the PPs must be maintained. When performing conditional calls, a signal 3008 is required therefore from the "master" SIMD PP 100 to the "slave" SIMD PPs 101–103 that indicates that the condition was true and that the return address should be pushed by the "slave" PPs 101–103.

Another time when SIMD stack coherency must be maintained is when interrupts occur. In order to achieve this there is a signal 3009 which is activated by the "master" SIMD PP 100 which is observed by the "slave" PPs 101–103. All PPs 100–103 will execute the interrupt pseudo-instruction sequence when this signal is active.

Another SIMD interrupt-related signal 3010 indicates to the "master" PP 100 that a "slave" PP 101–103 has an enabled interrupt pending. This allows "slave" PPs 101–103 to indicate that something has gone wrong with a SIMD task, since "slave" PPs 101–103 shouldn't normally expect to be interrupted.

A number of interrupt signals 3011 are supplied to each PP. These allow a PP to be interrupted by any other PP for message-passing. Master processor 12 can similarly interrupt a PP for message-passing. The master processor can also interrupt each PP in order to issue them with new tasks. In SIMD the interrupt logic in the "slave" PPs 101–103 must remain active for stack consistency and interrupts are handled slightly differently. This is discussed later.

The PP indicates with a signal 3012 to the transfer processor when a packet request is required. The transfer processor indicates when a packet request has been serviced with another signal 3013. In SIMD configuration only the "master" PP 100 will output packet requests to the Transfer Processor.

Internal Structure

The bus structure of a PP is shown in FIG. 30. There are three main units within the PP. These are the program flow control unit 3002, the address unit 3001 and the data unit 3000. Each of these will now be discussed.

Figure 31:
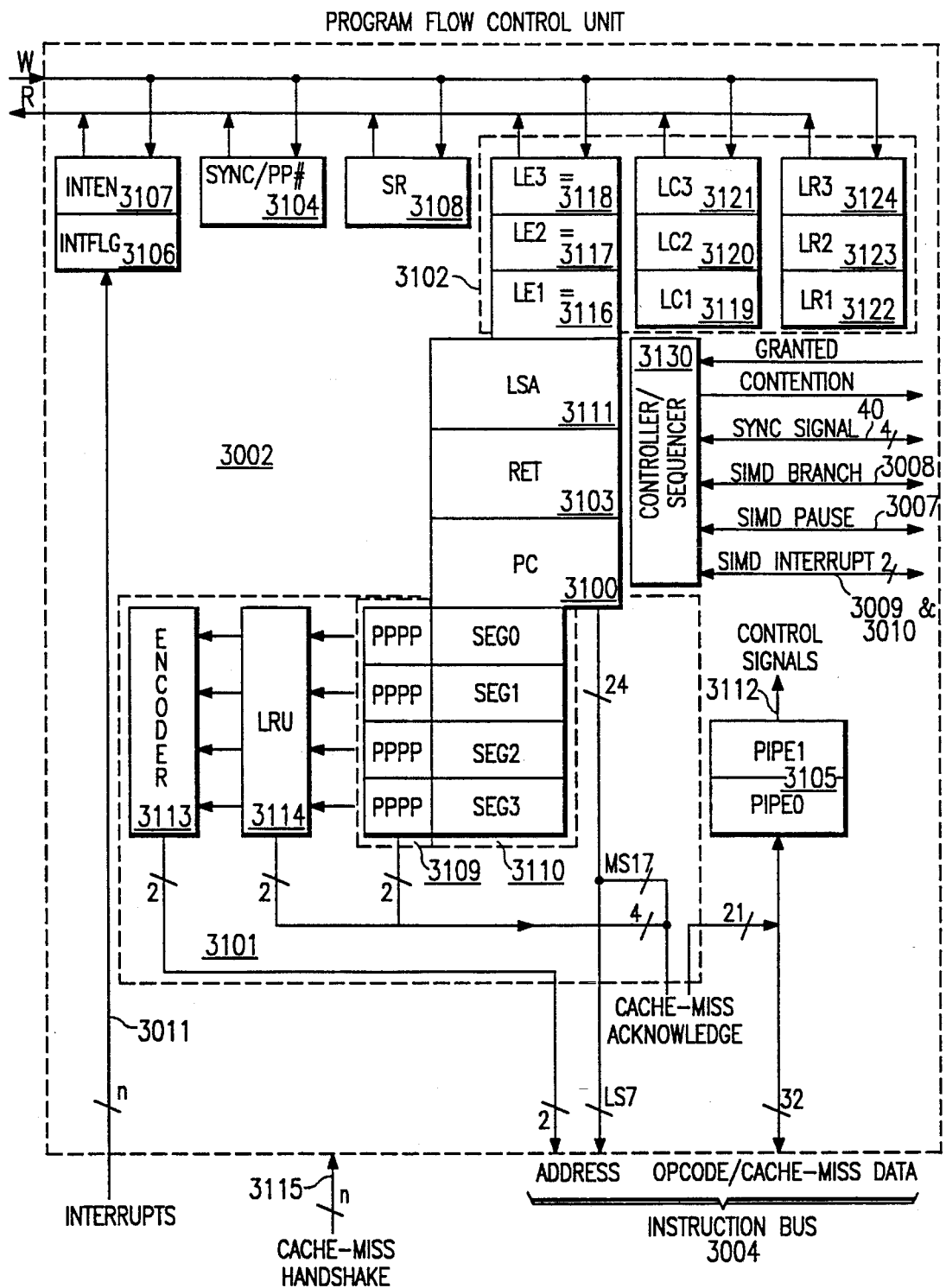
FIG. 31 shows further detail of the structure of the program flow control unit of each parallel processor.

Program flow control (PFC) unit 3002 shown in FIG. 31 contains the logic associated with the program counter 3100, i.e., the instruction cache control 3101, the loop control 3102, the branch/call logic (RET) 3103 and the PP synchronization logic 3104. This logic controls the fetching of opcodes from the PP's instruction RAM 10-1, 10-5, 10-9 or 10-14. When a cache-miss occurs, it also communicates the segment address and the sub-segment number to the transfer processor so that the code can be fetched.

Instruction pipeline 3105 is in the PFC Unit 3002. The PFC unit 3002 will therefore generate the signals 3112 necessary to control the address unit 3001 and data unit 3000. The immediate data specified by certain opcodes are also extracted from the instruction pipeline and routed to the data unit as required.

Interrupt enable 3107, interrupt flags 3106 and interrupt vector address generation logic is also in the PFC unit 3002. This prioritizes the active interrupts and injects a sequence of pseudo instructions into the pipeline 3105 to read the vector, save the program counter 3100 and the status register 3108, and branch to the interrupt routine.

Packet request handshake signals 3012 and 3013 will also connect to the PFC unit 3002.

The PFC unit is the part of the PP whose behavior differs between PPs when configured in SIMD mode. The "master" SIMD PP 100 will behave more-or-less normally, but the "slave" PPs 101–103 will disable their cache logic 3101 and flush the present flags 3109. Their loop logic 3102, synchronization logic 3104 and packet request signals 3012 and 3013 are also disabled. The interrupt logic behavior is modified so that all PPs can behave identically.

Figure 32:
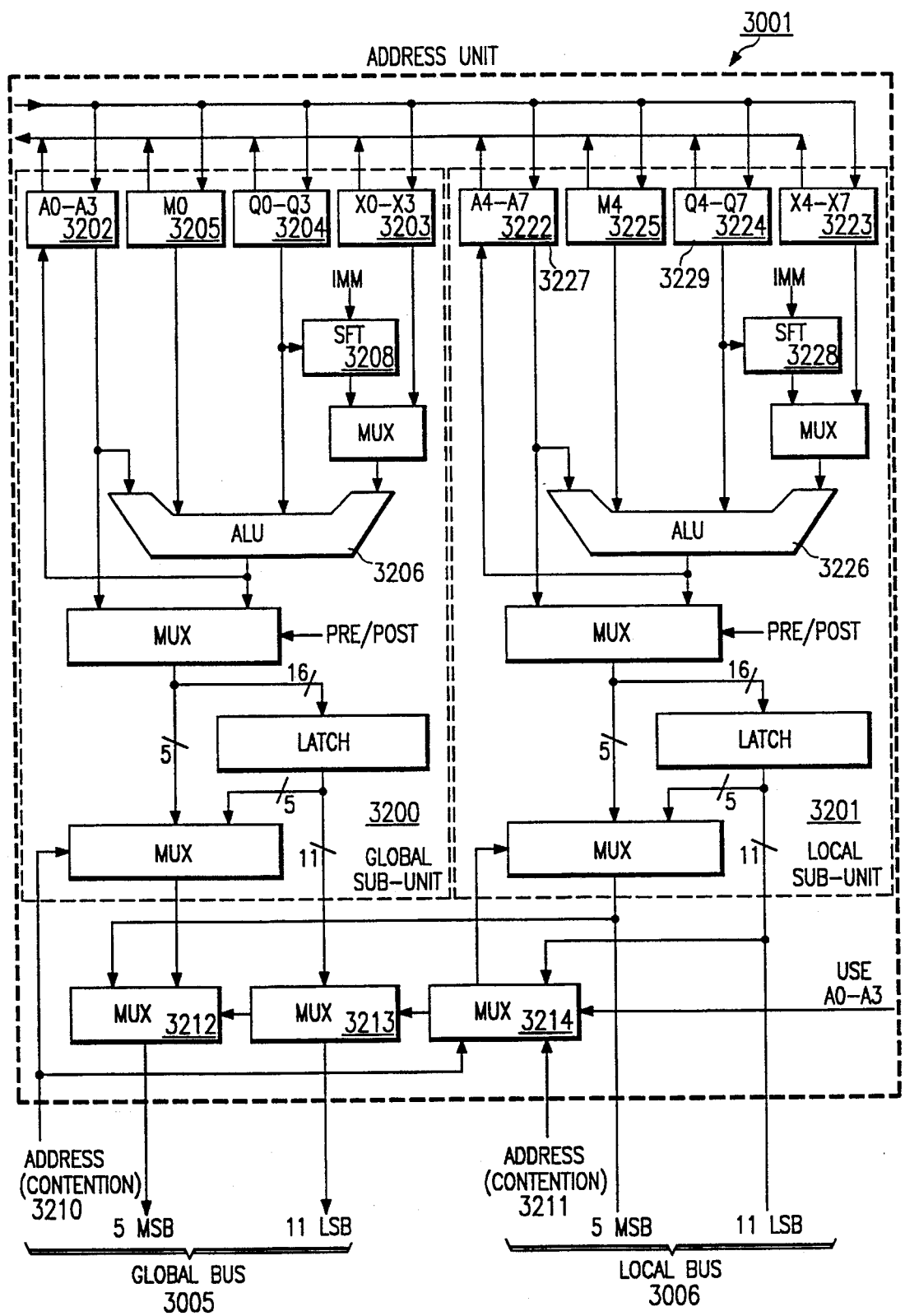
FIG. 32 shows further detail of the structure of the address unit of each parallel processor.

Address unit 3001 shown in FIG. 32 contains two identical subunits 3200 and 3201 each capable of generating a 16-bit byte address of a data location in the crossbar'd RAM 10. Within each subunit are four address registers 3202/3222, four index registers 3203/3223, four qualifier registers 3204/3224, a modulo register 3205/3225 and an ALU 3206/3226. When two parallel data accesses are specified in the opcode, subunit 3200 outputs the address through global port 3005 and the other subunit (3201) through the local port 3006. When only one access is specified, then this address can come from either subunit 3200 or 3201, unless a single common SIMD read is specified, in which case it is required to come from the "local" subunit 3201.

Address unit 3001 also supports retries if contention is detected on either, or both, global 3005 and local buses 3006.

Addressing modes are pre- and post-indexing, by a short immediate or an index register, with or without address register modify. The address(es) can be further qualified to be in data or I/O (input/output) space, with or without power-of-2 modulo, with or without bit-reversed addressing, and a common SIMD read.

Address unit 3001 also controls the aligner/extractors 3003 (FIG. 30) on global and local ports 3005 or 3006. These are essentially byte multiplexers that allow the transfer of bytes, half-words or words over the crossbar to/from the RAMs 10. They also allow non-aligned (but byte aligned) half-words or words to be loaded or stored. Sign extension of loads is also provided if required.

Data unit 3000 (shown in FIG. 33) contains 8 multi-port data registers 3300, a full 32-bit barrel shifter 3301, a 32-bit ALU 3302, left-most-1 right-most-1 and number-of-1s logic 3303, divide iteration logic and a 16×16 single-cycle multiplier 3304. Various multiplexers 3305–3309 are also included for routing data.

Special instructions are included to allow multiple pixel arithmetic operations. The ALU 3302 is splittable into 2 or 4 equal pieces upon which adds, subtracts and compares can be performed. These operations can be followed with a merge operation that allows saturation, min, max and transparency to be performed. This same logic also facilitates color expansion, color compression and masking operations.

All data unit instructions execute in a single cycle and are register-to-register operations. They all allow one or two separately coded loads or stores from/to crossbar'd memory 10 to be performed in parallel with the data unit operation. If an immediate is specified then this replaces the parallel moves in the opcode. Operations can also be performed on registers other than the 8 data registers 3300, but, as with immediates, the parallel moves cannot be specified in this case.

Bus Structure

As can be seen from FIG. 30, there are four buses 3014–3017 which run the length of the PP data path. These are used for all the data movement, and are a compromise between the number of buses (and read and write ports of registers) and the allowed sources and destinations for data unit operations.

The left-most bus 3014 carries the 16-bit immediates (after left/right justification and sign-extension) to data unit 3000. This is also used to load immediates by passing them through ALU 3302 then out onto the register write bus 3016.

The next bus from the left 3015 carries any address unit 3001 or PFC unit 3002 register source to the data unit 3000. It is also used to carry the source data of stores going to memory 10 on global port 3005. It also carries the source of a register-to-register move occurring in parallel with an ALU operation.

The next bus 3016 is used by loads from memory 10 on global port 3005 to any register, and by the results of a data unit operation to be written to any register. This bus carries a latch 3018 which is used temporarily for holding load data when the pipeline pauses through contention, synchronization or cache-misses.

The right-most bus 3017 is used entirely by the Local port 3006 for loads and stores of data unit registers 3300 from/to memory 10. This bus cannot access any registers other than the data unit's registers 3300. This bus carries a latch 3019 which is used temporarily for holding load data when the pipeline pauses through contention, synchronization or cache-misses.

Pipeline Overview

The PPs' pipelines have three stages called fetch, address and execute. The behavior of each pipeline stage is summarized below:

FETCH: The address contained in program counter 3100 is compared with the segment registers 3110 and present flags 3109 and the instruction fetched if present. PC 3100 is post-incremented or reloaded from the loop start address 3111. If MIMD synchronization is active, then this allows/inhibits the instruction fetch.

ADDRESS: If the instruction calls for one or two memory accesses, then the address unit 3001 will generate the required address(es) during this stage. The five most-significant bits of the address(es) are supplied to crossbar 20 for contention detection/prioritization.

EXECUTING: All register-to-register data unit 3000 operations and any other data movements occur during this stage. The remaining 11 bits of crossbar address(es) are output to the RAMs 10 and the data transfer(s) performed. If contention is detected, then this stage is repeated until it is resolved. If the PC 3100 is specified as a destination (i.e., a branch, call or return) then the PC 3100 is written to during this stage, thus creating a delay slot of two instructions.

MEMORY

Each PP accesses three separate memory spaces, 64M bytes of off-chip word-aligned code space. (From on-chip cache).

64K bytes of on-chip crossbar'd memory 10. This is referred to as data space.

64K bytes of on-chip I/O space in which resides the Parameter RAMs, the message registers and the semaphore flags.

The I/O spaces for each PP 100–103 are isolated from each other so that code need not calculate addresses unique to each PP when accessing I/O space. Thus each PP sees its own parameter RAM at the same logical address. The same applies for the message registers and semaphore flags. The master processor, however, can uniquely address each PP's I/O space.

The 64K bytes of memory is for one embodiment only and any expansion or modification can be made thereto.

Program Flow Control Unit

The logic within program flow control unit 3002, (FIG. 31), works predominantly during the fetch pipeline stage, affecting the loading of the instruction pipeline. However since the instruction pipeline is resident in the PFC unit 3002, it must also issue signals 3112 to the address 3001 and data units 3000 during the address and execute pipeline stages. It also receives signals from address unit 3001 that indicate when contention has occurred, thus pausing the pipeline.

Cache Control

The 512-instruction cache has four segments, each with four sub-segments. Each sub-segment therefore contains 32 instructions. There is one present flag 3109 for each sub-segment. Since program counter 3100 is 24 bits, the segment registers 3110 are each 17 bits. The instruction opcodes are 32-bits wide.

The 9-bit word address used to access the instruction RAM is derived from the least-significant 7 bits of program counter 3100 and two bits from the segment address compare logic 3113. This compare logic must work quickly so as to avoid significantly delaying the RAM access.

If the most-significant 17 bits of program counter 3100 are not matched against one of the segment address registers 3110, then a segment-miss has occurred. The least recently used segment is chosen to be trashed by logic 3114, and its sub-segment present flags 3109 are cleared. If, however, the most-significant 17 bits of the program counter 3100 are matched against one of the segment address registers 3110 but the corresponding sub-segment flag 3109 is not set, then a sub-segment miss has occurred.

If either type of cache-miss occurs, the pipeline is paused, and a cache-miss signal 3115 sent to transfer processor 11. When a cache-miss acknowledge signal is supplied by the TP 11, the most-significant 17 bits of the PC 3100, and the 4 bits representing the sub-segment to be filled are output onto the TP's bus. (This requires a crossbar connection 0-3, 0-8, 0-13 or 0-18 between the PP's instruction bus, horizontal 7, and the TP's bus, horizontal 0). The TP's acknowledge signal 3115 is then deactivated. When the sub-segment has been filled by TP 11, a cache-filled signal 3115 is sent to the PP which causes the appropriate sub-segment present flag 3109 to be set, deactivates the PP's cache-miss signal 3115, and instruction execution recommences.

If the PP is interrupted at any time while waiting for a cache-miss request to be serviced, the cache miss service is aborted. This prevents needless fetches of unwanted code.

In SIMD configuration the present flags 3109 of the "slave" PP's 101–103 will be held cleared and the cache logic 3101 ignored. The "slave" PP's 101–103 will load instructions (supplied by the "master" PP 100) into their pipeline whenever the SIMD pause signal 3007 is inactive. The "master" PP's cache 3101 behaves normally, but it too will pause its pipeline whenever the SIMD pause signal 3007 is active. (Such a condition will occur if one of the "slave" PPs 101–103 detects contention). In MIMD configuration the SIMD pause signal 3007 is ignored by all processors.

The ability to flush the PPs' caches 3101 can be provided by a memory mapped register accessible by the master processor 12. This function will clear all the present flags in the PP(s) selected.

Loop Control

Three nested loops that execute with zero cycle overhead are included to allow operations such as convolution to be coded with the appropriate address sequence without speed penalty, rather than using dedicated logic in the address unit 3001.

There is a multiplicity of registers to support this feature, namely, three 16-bit loop end values 3116–3118, three 16-bit loop counts 3119–3121, three 16-bit loop reload values 3122–3124 and one 24-bit loop start address value 3111. It is a restriction that the three loops have a common start address. This restriction can be removed simply by adding two more 24-bit loop start address registers.

The number of instructions required to load the loop registers 3111 and 3116–3124 is reduced by simultaneously loading loop counter registers 3119–3121 whenever the associated loop reload registers 3122–3124 are written. This saves up to three instructions. When restoring saved loop registers, e.g., after a context switch, the loop reload registers 3122–3124 must therefore be restored before the loop counter registers 3119–3121.

Figures 33, 34:
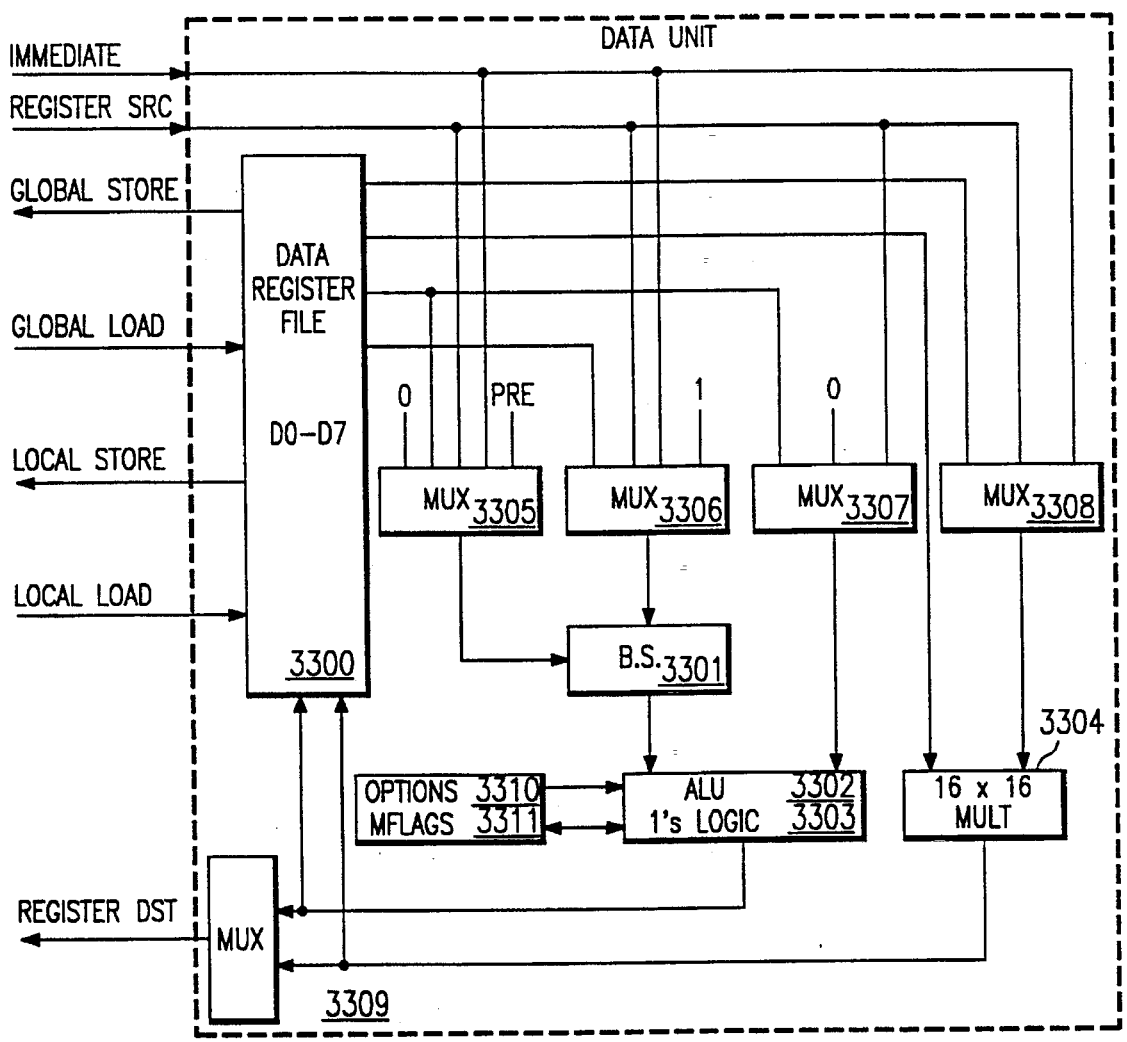
FIG. 33 shows further detail of the structure of the data unit of each parallel processor.
FIG. 34 shows the status register of each parallel processor.

Within status register 3108, FIG. 34, are two bits (25) and (24) that indicate how many loops are required to be activated. These are called the maximum looping depth (MLD) bits. There are also two bits (23) and (22), implemented as a two bit decrementer, that indicate the current depth of looping. These are called the current looping depth (CLD) bits. These indicate which loop end address register 3116–3118 should be compared with the PC 3100. These CLD bits will be cleared to zero (no loops active) by reset, and by interrupts once the SR 3108 has been pushed. Loops are numbered 1 to 3 with 1 being the outer-most loop. The user must set the MLD and CLD bits to the desired values in order to activate the loop logic. When all loops have been completed the CLD bits will be zero.

Since the CLD bits are automatically decremented by the loop logic during the fetch pipeline stage, the status register 3108 should not be written to during the last two instructions within a loop.

Once the loop logic 3102 has been activated (by a non-zero value in the CLD bits) the 16-bit loop end address register (one of 3116–3118) indicated by the CLD bits is compared during each instruction fetch with the 16 least-significant bits of the unincremented PC 3100. If they are equal and the associated loop counter (one of 3119–3121) is not 1, then the loop start address register 3111 contents are loaded in the PC 3100, the loop counter (one of 3119–3121) is decremented and the MLD bits are copied into the CLD bits.

If, however, the unincremented PC 3100 and loop end address register (one of 3116–3118) are equal and the relevant loop counter (one of 3119–3121) is 1, then the CLD bits are decremented by 1, the relevant loop counter (one of 3119–3121) is reloaded from its associated loop reload register (one of 3122–3124), and the PC 3100 increments to the next instruction.

Since the loop end address registers 3116–3118 are only 16-bits, this means that loops cannot be more than 64K instructions long. Care should also be taken if branching or calling out of loops as the 16-bit value of the currently in-use loop end address register (one of 3116–3118) may be encountered accidentally. Users should set the CLD bits to zero before attempting this to be certain of not having a problem. Loop end address compare is disabled during the two delay slot instructions of a branch or call in order to help returns from interrupts.

Since the loop logic operates during the fetch pipeline stage it is possible to combine looping with MIMD synchronization if desired. Interrupting loops is similarly not a problem. Looping in SIMD is controlled by the "master" 100 SIMD PP's loop logic. The "slave" PPs' 101–103 loop logic can still operate since their program counters 3100 are ignored.

There are various permutations on the above arrangement which can be used. A slightly more user friendly method is to have three 24-bit loop end registers with comparators, and three 24-bit loop start address registers. Each loop would be enabled by a single bit in the status register.

When executing MIMD programs that are working on a common task, there is usually the need to communicate between processors. The system supports both message-passing and semaphores for "loose" communication, but when executing tightly-coupled programs, the need to exchange information on a cycle-by-cycle basis is required. This is where synchronized execution is of benefit.

Within each PP's SYNC/PP# 3104, register there are four bits one relating to each PP. The other PP(s) to which a particular PP will synchronize is indicated by writing a one to the bits corresponding to those PP(s). The other PP(s) which are expecting to be synchronized will similarly have set the appropriate bits in their SYNC/PP# 3104 register(s).

Code that is desired to be executed in synchronization is indicated by bounding it with LCK (Lock) and ULCK (Unlock) instructions. The instructions following the LCK, and those up to and including the ULCK, will be executed in lock-step with the other PP(s). There must therefore be the same number of instructions between the LCK and ULCK instructions in each synchronized PP.

The knowledge that synchronized code is being executed is recorded by the "S" (synchronized) bit (26) in status register 3108. This bit is not set or reset until the master phase of the address pipeline stage of the LCK or ULCK instructions respectively, but the effect of the LCK or ULCK instruction affects the fetch of the next instruction during the slave phase. This bit (26) is cleared by reset and by interrupts, once the status register 3108 has been pushed.

When a PP encounters a LCK instruction (decoded during the slave phase of the address pipeline stage) it will output a signal 40 to the other PPs 100–103 saying that it is executing a piece of synchronized code. It will then AND the incoming sync signals from the other PPs with which it is desiring to be synchronized, and only when all those processors are outputting sync signals 40 will the next instruction be fetched into the pipeline. This will occur coincidentally in all the synchronized PPs because they too will not proceed until the same set of matching sync signals are active. It is therefore possible to have two different synchronized MIMD tasks running concurrently, because each will ignore the sync signals of the other.

Since it is the instruction fetch that is synchronized, it is possible to interrupt synchronized code. This will immediately cause the PP's sync signals 40 to become inactive. Cache-misses and contention will have a similar effect, keeping the machines in-step. In the case of contention, however, the instruction following the one experiencing contention will have already been fetched into the pipeline before the pipeline pauses.

It is possible to put IDLE instructions into synchronized code, thus holding the operation of all the synchronized PPs until a particular PP has been interrupted and returned from its interrupt routine.

Since it is necessary to be able to interrupt synchronized code, any instruction that specifies the PC 3100 as a destination will immediately disable the effect of the S bit (26) of status register 3108 (with the same timing as the ULCK instruction), but the S bit (26) will remain set. Once the two delay slot instructions have completed, the effect of the S bit (26) is re-enabled. This mechanism prevents problems with being unable to interrupt synchronized delay slot instructions. The sync logic 3104 therefore treats branches, calls and returns (implemented as a PC 3100 load followed by two delay slot instructions) as a single instruction. The sync signals 40 will be driven inactive during the two delay slot instructions and they will be fetched without looking at the sync signals 40. If a LCK instruction is put in a delay slot, it will take effect after the delay slot instructions have been executed. Synchronized loops behave like normal code because their "branches" operate in the fetch pipeline stage and not the Execute stage.

An example of how synchronization works is given in FIG. 23. In this case PP2 102 and PP1 101 exchange the contents of their D0 registers, assuming that A0 and A1 contain the same addresses in each PP 101 and 102. It also assumes that A0 and A1 point to different RAMs to avoid contention. (It would still work even if they pointed to the same RAM, but would take extra cycles.)

In this example PP1 arrives at its LCK instruction one cycle after PP2 arrives at its. PP2 has thus waited for one cycle. They then perform the stores simultaneously but PP2 then has a cache-miss when fetching the load instruction. Both PPs wait until the cache-miss has been serviced by transfer processor 11. They then execute the loads simultaneously and similarly the ULCKs. PP1 then experiences a cache-miss when fetching instruction 4, but since the PPs are now unlocked PP2 carried an unimpeded.

It should be noted that this simple example can be further simplified by combining instructions 0 with 1, and 2 with 3. (i.e., LCK11 ST followed by ULCK11 LD). This way just the loads are synchronized, but that is all that is required in this case.

Synchronization in SIMD is implicit, so the LCK and ULCK instructions have no purpose and so have no effect if coded. The S bit (26) in the Status Register 3108 will have no effect if a program should set it to one.

Interrupts and Returns

Interrupts must be locked-out during the two delay slots after the PC 3100 has been loaded. This prevents having to save both the current PC 3100 value, and the branch address, and restore them on the return. Loads of the PC 3100 are forbidden during delay slot instructions, but if a user somehow does this, then the lock-out period isn't extended; otherwise, it would be possible to lock-out interrupts indefinitely.

Like many processors, there is a global interrupt enable bit (27) (I) in status register 3108. This can be set/reset by the user to enable/disable all interrupts, except the master task interrupt, and the illegal operation code interrupt. Bit (27) is cleared by reset and by the interrupt pseudo-instructions after status register 3108 has been pushed.

Returns from interrupts are executed by the sequence POP SR, POP PC, DELAY1, DELAY2. The I (27), S (26) and CLD (23) and (22) bits of status register 3108 are loaded by the POP SR before the DELAY2 instruction, but their effects are inhibited until the branch (POP PC) instruction has completed. This prevents them becoming effective before the return has completed.

There is provision for up to 16 interrupt sources on each PP 100–103. Of these, eleven are assigned, the others are left for future expansion. Those assigned are:

| | |
|---|---|
| Master Task | The master processor wishes the PP(s) 100–103 to run a new task. (Always enabled) |
| Illop | An illegal opcode was detected. (Always enabled) |
| SIMD error | Applicable only to the "master" SIMD PP 100. It is an OR of all enabled interrupts of the three "slave" PPs 101–103. |
| Illadd | A non-existent on-chip address was accessed. |
| Contention | Contention was detected. Interrupt is taken after contention is resolved in the normal manner. |
| Packet Request | The transfer processor has exhausted the PP's packet request linked-list. |
| Master Message | Occurs when the master processor 12 writes to the PP's message register. |
| PP0 Message | Occurs when PP0 writes to the PP's message register. |
| PP1 Message | Occurs when PP1 writes to the PP's message register. |
| PP2 Message | Occurs when PP2 writes to the PP's message register. |
| PP3 Message | Occurs when PP3 writes to the PP's message register. |

Interrupt Registers

There are two registers that control interrupts; the interrupt flag register 3106 (INTFLG), and the interrupt enable register 3107 (INTEN).

Interrupt enable register 3107 has individual enable bits for each interrupt, except for the master task and illop interrupts which have their associated enable bits hard-wired to one. This register is cleared to all zeros (except the two wired to one) by reset. Bits 15 to 0 are unimplemented.

Interrupt flag register 3106 has an individual flag for each interrupt source. This flag is latched by the source signals which are each active for a single cycle. This register is cleared to all zeros by reset. Bits 15 to 0 are unimplemented. Those marked as reserved will also be hardwired to zero. Any flag can be cleared by writing a 1 to it. Writing a zero has no effect. This allows the flags to be polled and cleared by software if desired instead of generating interrupts. When an interrupt is taken, the associated flag will be cleared automatically by the hardware. If a flag is being set by a source at the same time as it is being cleared, then the set will dominate.

Interrupt flag register 3106 can be written with ones and zeros like a normal data register once the R (restore registers) bit (19) of status register 3108 is set. This allows task state restoring routines to restore the interrupt state.

When interrupts are enabled, by setting the I bit (27) in status register 3108, the interrupts are prioritized. Any enabled interrupt whose flag becomes set will be prioritized, and an interrupt generated at the next possible opportunity. A sequence of three pseudo-instructions is generated which 1. generates the address of interrupt vector and fetches it into the PC 3100, having first copied the PC into RET 3103, and clears the interrupt flag in 3106 unless it is being simultaneously set again;
2. Pushes PET 3103; and
3. Pushes SR 3108 and clears the S (26), I (27) and CLD (22) and (23) bits in SR 3108. It also disables the functions associated with these bits until the execute stage has completed.

Contention resolution must be supported by the above sequence, so it may take more than three cycles to execute. Similarly a cache-miss on either of the first two instructions of the interrupt routine will cause the pipeline to pause.

The interrupt vectors are fetched from the PPs' own Parameter RAM 10. Since these exist at the same logical address for each PP 100–103, the interrupt logic in each PP 100–103 generates the same vector addresses.

It is a consequence of the pipelining that neither of the first two instructions of an interrupt routine can be a LCK instruction. For similar reasons the interrupt logic must disable interrupts 3106, SYNC/PP# 3104 and loop logic 3102 until the execute stage of the third pseudo-instruction has completed. This prevents these functions from being active during the fetching of the first two instructions of the interrupt routine.

Interrupts are handled slightly differently in SIMD from MIMD. In order to maintain stack coherency there is a signal from the "master" PP 100 to the "slave" PPs 101–103 that indicates that it is taking an interrupt. This causes the "slave" PPs 101–103 to execute their sequence of interrupt pseudo-instructions. It really doesn't matter which interrupt vector they fetch since their PCs 3100 are ignored anyway.

In SIMD configuration there is also the need to pass back to the "master" PP 100 the fact that a "slave" PP 101–103 has detected an enabled interrupted event. This could be contention, or an illegal address access or a message interrupt. Since any one of these is almost certainly an error they are handled by only one interrupt level on the, "master" PP 100. There is one signal 3010 running from the "slave" PPs 101–103 to the "master" PP 100 which is the logical OR of all the "slave" PPs 101–103 enabled interrupts. The slave(s) 101–103 issuing the interrupt won't execute the interrupt pseudo-instructions until the "master" to "slaves" interrupt signal 3009 becomes valid.

If an interrupt occurs (from the "master" PP 100) while the SIMD pause signal 3007 is active, the issuing of the "master" to "slaves" interrupt signal 3009 will be delayed until the cause of the pause has been removed. If the cause of the pause is a cache-miss, the cache-miss will be aborted and the interrupt can be taken immediately.

Branches and Calls

Branches and calls are achieved by writing into the PC 3100, which is an addressable register like any other PP register at the same time that the branch address is written into the PC 3100 the value of PC+1 is copied into the return address register, RET 3103. This is the value required for a return if the branch is really a call. This RET register 3103 is then programmed to be pushed onto the stack by either of the delay slot instructions in order to make it into a call. To allow conditional calls there is an instruction for conditionally pushing the return address. This only occurs if the branch is taken.

As described earlier, instructions specifying the PC 3100 as the destination will lock-out interrupts until after the second delay instruction has been fetched. This prevents problems with the branch address and/or return address getting lost. During this period synchronization is also disabled as described earlier. In order to prevent problems on returns from interrupts with loop logic 3102 becoming activated too early, loop end address compare is also disabled during the two delay slot instructions.

Status Register

Status Register 3108 is resident in the PFC unit 3002 and shown in FIG. 34. Each bit's function is described in the following sections.

The N—Negative bit (31) is set by certain instructions when the result was negative. Writing to this bit in software will override the normal negative result setting mechanism.

The C—Carry bit (30) is set by certain instructions when a carry has occurred. Writing to this bit in software will override the normal result carry setting mechanism.

The V—Overflow bit (29) is set by certain instructions when an overflow has occurred. It is not a permanently latched overflow. Its value will only be maintained until the next instruction that will set/reset it is executed. Writing to this bit in software will override the normal result overflow setting mechanism.

The Z—Zero bit (28) is set by certain instructions when the result was zero. Writing to this bit in software will override the normal zero result setting mechanism.

The I—Interrupt Enable bit (27), which is set to zero by reset and interrupts, is a global interrupt enable. It enables all the interrupts whose interrupt enable bits are set. Due to normal pipeline delays changing the value of this bit will have no effect until after the execute stage has completed.

The S—Synchronized code execution bit (26), which is set to zero by reset and interrupts, indicates that synchronous MIMD code execution is operating. Instructions will only be fetched when all the PPs indicated by the SYNC bits in the SYNC/PP# 3104 register are outputting active sync signals 40. This bit's value is ignored in SIMD configuration.

The MLD—Maximum looping depth bits (24) and (25), which are set to zero by reset, indicate how many levels of loop logic are operating. 00—indicates no looping, 01—just loop 1, 10—loops 1 and 2, 11—all three loops active.

The CLD—Current looping depth bits (22) and (23), which are set to zero by reset, indicate which of the Loop End registers is currently being compared against the PC. 00—indicates no looping, 01—Loop End 1, 10—Loop End 2, 11—Loop end 3. These bits are set to zero by reset and by interrupts once status register 3108 has been pushed.

The R—Restoring registers bit (19), which is set to zero by reset, is used when restoring the state of the machine after a task switch. When set to a one, it allows interrupt flag register 3106 to be written with ones and zeros like a normal register, and also the message registers to be restored without causing new message interrupts. It also enables the Q bit (17) of status register 3108 to be written to for similar reasons. The R bit (19) will therefore only be used by task restoring routines.

The U—Upgrade packet request priority bit (18), which is set to zero by reset, is used to raise normal background priority packet requests to foreground. Its value is transmitted to transfer processor 11 and is used in conjunction with the Q bit's value to determine the priority of transfer requests. This bit remains set until reset by software.

The Q—Queued packet request bit (17), which is set to zero by reset, indicates that the PP has a packet request queued. It becomes set one cycle after the P bit (16) of the status register 3108 is written with a one. This bit's value is transmitted to transfer processor 11 and used in conjunction with the U bit's (18) value to determine the priority of transfer requests. This bit is cleared by transfer processor 11 once the PP's linked-list of packet requests has been exhausted. If this bit is being set (via the P bit (16)) by software at the same time as transfer processor 11 is trying to clear it, then the set will dominate. Writing to this bit directly has no effect, unless the R bit (19) in status register 3108 is set, when this bit can be written with a one or zero. This can be used to de-queue unwanted packet requests, but is more normally needed for restoring interrupted tasks.

The P—Packet Request bit (16), which is set to zero by reset, is a one-shot single-cycle bit, used to set the Q bit (17) in status register 3108. This initiates a packet request to transfer processor 11. The P/Q bit mechanism is to allow read-modify-write operations on status register 3108 without accidentally initiating packet requests if the packet request bit was cleared by the TP 11 between the read and write.

All unimplemented status register bits 3108 will read as zero. Writing to them has no effect. They should only be written with zeros to maintain future device compatibility.

Synchronization Indicators

The four SYNC bits, which are set to zero by reset, are used to indicate to which PP a MIMD PP wishes to synchronize. When executing code bounded by LCK and ULCK instructions, instruction fetches will not proceed unless al those processors indicated by one in the corresponding SYNC bits are outputting sync signals 40. These bit values are ignored in SIMD configuration.

The two PP# bits are unique to each PP 100–103. They are hardwired to allow software to determine which PP it is running on, and thus calculate correct unique addresses. Writing to these bits has no effect.

The coding of these bits is; 00—PP0 100, 01—PP1 101, 10—PP2 102 and 11—PP3 103. PP0 100 is the "master" SIMD PP. The associated start addresses of the PPs' Local crossbar RAMs are; 0000h—PP0 100, 2000h—PP1 101, 4000h—P2 102 and 6000h—PP3 103.

Pipeline control can be difficult. The reason for this is the number of concurrent operations that interrelate as demonstrated below:
Instruction fetch with associated cache management.
Address generations with various addressing modes.
Crossbar access requests with independent contention resolution.
Memory transfers.
Loop address compare, with PC load/increment.
Loop count decrement/reload.
Looping depth count decrement/reload.
Multiply.
Shift.
Add/subtract.
Synchronization with other PPs.
Interrupt detection/prioritization.

The pipeline "events" that cause an "abnormality" in the straightforward execution of linear code are:
Instruction cache-miss
Contention on the Global and/or Local buses
Loops
Branches and calls
Interrupts
Idling
Synchronization In the following sections the events are shown diagrammatically. The abbreviations "pc+1" and "pc" indicate whether the program counter 3100 is incremented normally, or not, respectively. The pipeline boundaries marked are the Stages, which consist of the slave clock phase followed by the master clock phase, ie. ls:ml. Where cycles may be repeated an indefinite number of times this is shown by " |. . . |".

Cache-miss Pipeline Sequence

The pipeline sequence for a cache-miss is shown in FIG. 35. The cache-miss is detected during the slave phase causing the PP's sync signals 40 to become inactive, the SIMD pause 3007 to become active, the PC 3100 not to be incremented and the pipeline 3105 not be loaded. The pipeline pauses. The previous instruction is left generating address(es), but not modifying address registers 3202 and 3222. The previous instruction to that is left repeating the data unit operations, but not storing the results. The crossbar accesses however complete to memory in the case of stores, or to temporary holding latches 3018 and 3019, in the case of loads. These accesses are not reperformed on further repetitions of the execute stage.

A cache-miss service request signal 3115 is sent to the TP 11. The PP 100–103 waits until this is acknowledged, then transfers the cache-miss information to the TP 11. The PP 100–103 again waits until the present flag is set by a signal from the TP 11. Once the present flag is set, sync signals 40 can again become active, the SIMD pause signal 3007 becomes inactive and the instruction fetching and PC 3100 incrementing can recommence. This releases address unit 3001 and data unit 3000 to complete their operations. Loads complete from the temporary holding latches 3018 and 3019 into their destination registers.

If an interrupt should occur (which can't by definition be in the two delay slot instructions after a PC 3100 load) during a cache-miss, then the cache-miss is aborted by taking the cache-miss service request signal 3115 inactive. This prevents needlessly waiting for code to be fetched which may not then be required. The TP 11 will abort a cache-miss service in progress if it sees the cache-miss service request signal 3115 go inactive.

Contention Resolution Pipeline Sequence

The pipeline sequence for contention resolution is shown in FIG. 36. In this example, contention is experienced on both local bus 3006 and global bus 3005. Contention is defined as two or more PP local buses 3006 and/or global buses 3005 outputting addresses within the same memory at the same time. They can be any mixture of loads and/or stores. Contention is indicated by the crossbar or address contention signals 3210 and 3212 to global bus 3005 and local bus 3006, respectively, during the slave phase of the execute pipeline stage. The PP's sync signal 40 is driven inactive and the SIMD pause signal 3007 active.

The execute pipeline stage repeats with each bus 3005 and 3006 re-outputting the address which was latched in the address unit during the address pipeline stage. When successful, stores complete to memory 10 and loads complete to temporary holding latches. In fact the load only goes to a holding latch 3018 or 3019 on the first bus to resolve contention. The second port can complete directly into the destination register if a load.

In this example local bus 3006 is successful at the first retry. If it is a store, then it goes straight to memory 10. If it is a load, the data is written to a temporary holding latch 3019. Global bus 3005 in this example has to perform two retries before being able to proceed with the transfer.

While the retries are being performed, instruction fetching has ceased. The next instruction was fetched before contention was detected but doesn't begin to execute until contention is fully resolved. The following instruction is repeatedly fetched, but not loaded into the pipeline.

Once contention is resolved, sync signal 40 can again become active, the SIMD pause signal 3007 becomes inactive, and instruction fetching can recommence.

Loop Control Pipeline Sequence

The pipeline sequence for loop control is shown in FIG. 37. In this example only one loop is defined (using Loop End 1 3116, Loop Count 1 3119 and Loop Reload 1 3122 registers). It contains 2 instructions, and the loop counter value before starting the loop is 2. The principles can be extended to all three loops.

In this example, when PC 3100 is found (during the slave phase) to be equal to loop end register 3116, loop counter 3119 is compared to 1. As it is not equal, the PC 3100 is reloaded from start address register 3111, loop counter 3119 is decremented by 1 and the current looping depth bits 3108 (bits (22) and (23)) are reloaded from the maximum looping depth bits 3108 (bits (24) and (25)) (in this example the CLD bits values don't change).

The loop is repeated again, but this time when the end of loop is detected, loop counter 3119 is 1, so PC 3100 is incremented to the next instruction instead of being loaded from start address register 3111. Loop counter 3119 is reloaded from loop reload register 3122 and current looping depth bits 3108 (bits (22) and (23)) are decremented by 1.

The pipeline sequence for a branch or call is shown in FIG. 38. When the branch address is written into the PC 3100 the value of pc+1 (calculated during the slave phase) is loaded into RET 3103. This is the address of the instruction after the second delay instruction, and is the return address for a call.

The branch address can come from memory, a register, an immediate 24-bit value or by adding a 24-bit index to the current PC value in 3100.

Difficulties with saving the branch address and the return address would occur if interrupts were allowed during the delay slot instructions. In order to prevent this interrupts are locked out during the fetch pipeline stage of the two delay slot instructions. This requires decoding a PC 3100 destination during the slave phase of the address pipeline stage. Lockout of interrupts will occur with conditional branches, as the condition isn't testable until after the two delay slot instructions have been fetched.

As described in the synchronization section, branches and calls are treated as one instruction as far as synchronization is concerned. Thus the PP's sync signal 40 goes inactive during the two delay slot instructions, with the timing shown. This is also true for conditional branches and calls regardless of the condition.

Also, since conditional calling is done by pushing RET 3103 (return address) only if the conditional branch is taken, then there is a potential problem with conditional calls in SIMD, since the "slave" PPs 101–103 don't know if the branch was taken. They therefore wouldn't know if they should push RET 3103, and thus could lead to stack inconsistency. In order to fix this the signal "SIMD branch-taken" 3008 is output from the "master" SIMD PP 100 to the "slave" PPs 101–103 which they use to determine if their PRET instructions should push RET 3103. This is taken active (or left inactive) with the timing shown.

Interrupts

The pipeline sequence for an interrupt is shown in FIG. 39. The sequence is that for any machine in MIMD or SIMD, but if the interrupt source is a "slave" SIMD PP 101–103 then the sequence is kicked off by the "slave" PP to "master" PP interrupt signal 3010 as shown. The "slave" PP 101–103 will wait for the "master" PP 100 to output the "master" PP to "slave" PPs interrupt signal 3009 as shown.

Once an enabled interrupt is detected, the sequence of pseudo-instructions is commenced. The first instruction calculates the interrupt vector address and fetches the vector into the PC 3100 and copies the old PC value (return address) into RET 3103. The second instruction pushes RET 3103. The third instruction pushes the SR 3108 and clears its S, I and CLD bits.

Note that the first two instructions of the interrupt routine are being fetched before the SR 3108 has been pushed and its S, I and CLD bits cleared. The functions of the S, I and CLD bits are thus disabled by the interrupt logic until SR 3108 has been pushed, and the S, I and CLD bits cleared.

IDLE Pipeline Sequence

The pipeline sequence for an IDLE instruction is shown in FIG. 40. The IDLE instruction is decoded before the end of the slave phase of its address pipeline stage, allowing it to stop the PC 3100 from being incremented and the pipeline from being loaded with the next instruction. The MIMD pause is taken inactive and the SIMD pause signal is activated. Instruction fetching halts until the interrupt logic detects an enabled interrupt. This will kick off the sequence of pseudo-instructions once an enabled interrupt is detected. If the interrupt source comes from a "slave" SIMD PP 101–103, then the interrupt sequence isn't kicked off until the "master" PP to "slave" PPs interrupt signal 3009 is activated.

If parallel transfers are coded with an IDLE instruction they will occur when the interrupt occurs, before the interrupt routine is executed.

Synchronization

The pipeline sequence for a synchronized MIMD or SIMD PP waiting for an incoming sync signal to become valid is shown in FIG. 41. The next instruction is not fetched into the instruction pipe until all the desired PPs are outputting active sync signals.

Address Unit

The logic within address unit 3001 works predominantly during the address pipeline stage, calculating the address(es) required for the crossbar'd memory 10 access(es) during the execute stage. The memory access(es) during the execute stage however are also under the control of this unit as it must independently resolve crossbar contention on the two ports 3005 and 3006. There is thus feedback from address unit 3001 to PFC unit 3002, in order to pause the pipeline while contention is being resolved. There is also control logic which performs the register accesses and the aligner/extractor 3003 operations during the execute stage.

A block diagram of address unit 3001 is given in FIG. 32. As can be seen from this diagram the majority of the unit consists of two identical 16-bit subunits 3200 and 3201, one for generating addresses from registers A0–A3 3202, the other from registers A4–A7 3222. These are referred to as the global and local subunits 3200 and 3201 respectively.

The naming of the local subunit 3201 is a slight misnomer since if a single memory access is specified, and it is not a common SIMD load, then it can come from either subunit 3200 or 3201, and will be performed on the global bus 3005. This is the purpose of the multiplexers 3212–3214 which are not within the subunits. If two parallel accesses are specified then they do come from their respectively named subunits. Common SIMD loads (on the local port 3006) must use the local subunit 3201.

While the subunits 3200 and 3201 operate on and generate 16-bit addresses, user software should not rely on rolling round from FFFFh to 0000h, or vice-versa, as future designs may have subunits capable of generating larger addresses.

Normal pipeline delays force a restriction upon the user that an address register 3202 and 3222, index register 3203 and 3223, qualifier register 3204 and 3224 or modulo register 3205 or 3225 which is modified by an instruction cannot be referenced by the following instruction. They may be referenced by the next-but-one instruction. This allows interrupts to occur without undesired consequences.

The global and local subunits 3200 and 3201 are identical apart from the register numbers, so one description will serve for both. There are however slight differences in how the two units are connected and used which will be highlighted, but the internal content of the subunits is the same.

Within each subunit are four 16-bit address registers 3202 (A0–A3) or 3222 (A4–A7). These contain indirect addresses which are either used unchanged or to which indices are added. If an index is added, then there is the option of replacing the previous address register value in the address registers 3202 and 3222 by the value created by indexing.

The values within the address registers 3202 and 3222 are always interpreted as byte addresses, regardless of the data size being transferred. Non-aligned word or half-word transfers can be specifically coded but this requires two instructions. This is discussed later.

All address accesses of the PPs 100–103 must be sourced from an address register 3202 or 3222. The capability of coding an immediate address within the opcode is not provided. This is considered to be of low significance since SIMD tasks would not normally wish to specify the same address for each PP. It is also thought to be of low importance for MIMD since MIMD algorithms should be written in such a manner that they can be run on any PP.

Address register A7 3227 is reserved as the stack pointer. It can be referenced like any other address register 3202 or 3222, but obviously care must be taken if adjusting A7's value, as interrupts can occur at any time. PUSH, POP and interrupts treat pushes as pre-decrement, and pops as post-increment.

Within each subunit 3200 or 3201 are four 16-bit index registers (X0–X3) 3203 and (X4–X7) 3223. The contents of these can be requested by the opcode to be added to, or subtracted from, the contents of the specified address register 3202 or 3222, in order to perform indexed addressing. This addition/subtraction can be performed either before or after the address is put out onto crossbar 20, thus allowing pre- or post-indexing respectively. The address created by pre-indexing can optionally be stored back into address register 3202 or 3222. This is compulsory for post-indexing.

If only one access is specified by the opcode, then any one of the four index registers 3203 and 3223 within the same subunit as the address register 3202 or 3222 can be specified as the index source, (eg. A0 and X2, A6 and X4, ... ). The indexing modes that can be specified are pre- or post-, addition or subtract, with or without address register 3202 or 3222 modify.

If two parallel accesses are specified, then the index register 3203 or 3223 with the same suffix as the address register 3202 or 3222 is used (eg. A2 and X2, A5 and X5), and only post-addition-indexing is available.

The values contained within the index registers 3203 and 3223 are always interpreted as byte addresses, regardless of the data size being transferred.

An alternative indexing method to index register indexing is short-immediate or implied immediate indexing. Short-immediate indexing, which is available when only one access is specified, allows a 3-bit short immediate value to be used as the index. As with index register indexing this can be either pre- or post-, addition or subtraction, with or without address register 3202 or 3222 modify.

If two parallel access are coded then only an implied immediate of +1 with post-indexing, and −1 with pre-indexing, can be specified. These allow stacks of 8, 16 or 32 bits to be accessed even when two parallel transfers are coded.

When specifying short-immediate or implied immediate, the immediate value is shifted 0, 1 or 2 bits left by shifter 3208 or 3228 if the specified word size is 8, 16 or 32 bits, respectively, before being added to the value from address register 3202 or 3222. The short-immediate index is thus 0–7 "units" and the implied immediate is ±1 "unit" where a "unit" is the data size The address register is not shifted as it always contains a byte address.

Associated with each address register (A0–A3) 3202 or (A4–A7) 3222 is an 8-bit address qualifier register (Q0–Q3) 3206 or (Q4–Q7) 3224. These qualifier registers contain extra information required for the access which cannot be fitted into the opcode. This information typically isn't required to be modified on a cycle-by-cycle basis.

Since A7 3227 is assigned to be the stack pointer, bits 6-0 of Q7 3229 are hardwired to 0000010 respectively. The individual bit functions of the Q registers 3204 and 3224 are described below:

A PP's address space is divided into two halves; data space (the crossbar'd memory 10) and I/O space (the parameter RAMs, message registers and semaphore flags). This is controlled by an address space select bit. If this bit is a 1, then the access is performed to the I/O space. Setting this bit to 0 directs the access to the crossbar'd RAM 10.

If a power-of-2 modulo bit has value 1, then it indicates the desire to break the carry path on the address adder 3206 or 3226 at the position indicated by a 1 (or perhaps several 1s) in the modulo register, M0 3205 or M4 3225, associated with the subunit 3200 or 3201. This allows power-of-2 dimension matrix addressing to be performed. If this bit is 0 then the address adder 3206 or 3226 behaves as a normal 16-bit adder/subtracter.

If a reverse-carry addressing bit is set to a 1, then reverse-carry addressing is enabled. This causes the carry path of the address adder/subtracter 3206 or 3226 to reverse its direction. When specifying indexed addressing with a power-of-2 index (eg. 8, 16, 32 etc.) this has the effect of counting in a manner required by FFTs and DCTs. If this bit is 0 then the address adder 3206 or 3226 behaves as a normal 16-bit adder/subtracter.

A common SIMD load bit when set to 1 specifies that if a load is specified, then it should be a common SIMD load. This bit, due to the nature of the common SIMD load, is only relevant to Q4–Q6 3224 of the "master" SIMD PP 100 when specifying a load. This will cause local buses 3006 of the PPs to be series connected for the duration of the load. If this bit is zero, then the common SIMD load function will be disabled. Setting this bit in "slave" PPs 100–103, or other than Q4–Q6 of the "master" SIMD PP, will have no effect. Stores are unaffected by this bit value.

When a sign extend bit is set to a 1, loads of half-words or bytes will have bit 15 or bit 7, respectively, copied to all the most-significant bits when loaded into the PP register. This is a function of the aligner/extractor. If this bit is a 0, then all the most-significant bits will be zero-filled.

A two size bits specify the size of the data to be transferred. The codings are 00—8 bits, 01—16 bits, 10—32 bits, 11—reserved. These bits control the function of the align/extractor 3003, the byte strobes on stores, and the sign extend function.

Address ALUs 3206 and 3226 are normal 16-bit adder/subtracters except they can have the direction of their carry paths reversed or broken.

When performing in-place FFTs (Fast Fourier Transforms) the addresses of either the source data or the results are scrambled in a way that make them difficult to access. The scrambling however has an order to it that allows fairly easy unscrambling if the direction of the carry path of address adder 3206 or 3226 is reversed. This feature which is common on DSPs is usually referred to as reverse-carry addressing, or bit-reversed addressing.

A power-of-2 index (eg. 8, 16, 32 . . .) equal to the power-of-2 number of points in the FFT divided by 2, is added onto the address from the address register 3202 or 3222 using a reversed carry ripple path. The resulting value is used as the address and stored in the address register 3202 or 3222. This produces the sequence of addresses required to unscramble the data, e.g., if the index is 8 and the initial address register value was 0, then the sequence 0, 8, 4 C, 2, A, 6, E, 1, 9, 5, D, 3, B, 7, F is produced.

The reverse-carry feature will operate with any indices other than power-of-2 numbers, but may not yield any useful results. This feature is only operative when the reverse-carry bit in Q register 3204 or 3224 associated with the specified A register is set to 1.

When distributing data around crossbar memories 10, there may well be situations where a "wrap-around" is required in a particular dimension, in order to access consecutive data, handle boundary conditions or address arrayed data. In order to easily support this, the ability to break the carry path of address adder 3206 or 3226 at one or more chosen places is provided.

The location of the break(s) is determined by modulo register M0 3205 or M4 3225. A 1 located in bit n of a Modulo register will break the carry path between bits n−1 and n of the address adder. This allows a $2^n$ modulo buffer to be implemented. Any number of 1s can be programmed into the Modulo registers 3205 or 3225 as desired. This allows multi-dimensional arrays to be implemented, with each dimension being a power-of-2 modulo amount.

This feature is only active when the power-of-2 modulo bit in qualifier register 3204 or 3224 associated with specified address register 3202 or 3222 is set to 1. Otherwise normal linear addressing applies.

Local and Global Ports

The main feature of global ports 3005 and local ports 3006 are the aligner/extractors 3003. They handle the movement of 8, 16 and 32-bit data, sign-extension, non-aligned access and common SIMD loads. To achieve these functions the aligner/extractors 3003 are basically a collection of byte multiplexers, wired to give the required operations. Each global port 3005 or local port 3006 operates independently, so a description of one applies for the other. Common SIMD load is the exception to this statement and is discussed with the other functions below:

The data size of a load or store is defined within qualifier register 3204 or 3224 associated with the specified address register 3202 or 3222. Valid options are 8, 16 or 32 bits. The data size can thus vary on a cycle-by-cycle basis, dependant upon which address register 3202 or 3222 is accessed and the values within its qualifier register 3204 or 3224.

A full 32-bit word of data is always transferred across the crossbar between memory 10 and the PP 100–103, or vice-versa, even when the specified word size is 8 or 16 bits. When performing loads of 8 or 16-bit quantities, the appropriate byte(s) are extracted from the 32-bit word according to the LS bits of the address and the word size. This is right-shifted if required, to right-justify the data into the PP register destination. The upper bytes are filled either with all zeros, or if sign extension was specified in the qualifier register 3204 or 3222, the MS bit (either 15 or 7) is copied into the most significant bytes.

When storing 8 or 16-bit quantities to the crossbar'd memory 10 the (right-justified) data is repeated 4 or 2 times, respectively, by aligner/extractor 3003, to create a 32-bit word. This is then written across crossbar 20 accompanied by four byte strobes which are set according to the LS bits of the address and the data size. The appropriate byte(s) are then written into the memory.

The above description of data loads and stores assumes that the addresses are aligned. That is, 16-bit accesses are performed to/from addresses with the LS bit=0, and 32-bit accesses are performed to/from addresses with the two LS bits—00. (8-bit quantities are always aligned).

Provision however is made to allow accesses of non-aligned 16 or 32-bit data. This is not automatic, but requires the user to specifically encode loads or stores of the upper and lower parts of the data separately. There are thus four instructions available that "load upper", "load lower", "store upper" and "store lower" parts of the data. These instructions use the byte address and data size to control aligner/extractor 3003 and, in the case of loads, only load the appropriate part of the destination register. This requires the registers to have individual byte write signals. For this reason non-aligned loads will be restricted to data registers 3200 only.

In practice the "load lower" and "store lower" instructions are the normal load and store instructions. If the address is aligned then the transfer is completed by the one instruction. If followed (or preceded) with the "upper" equivalent operation, then nothing will be transferred. If the address is not aligned, then only the appropriate byte(s) will be stored to memory or loaded into a register.

Some examples of non-aligned operation may help the explanation here and are shown in FIGS. 42 and 43. These are all little-endian examples which are self explanatory.

Common SIMD Load

There is sometimes the need, such as in convolution, to perform two accesses in parallel in each machine each cycle. One of these is data coming from anywhere in the crossbar'd memory 10 via global ports 3005, and the other is information "common" to each PP 100–103, such as a kernel value. This would therefore be entering via local port 3006. In order to pass this information to all local ports 3006 simultaneously from one source of data, there are unidirectional buffers that series-connect local crossbar data buses 6.

These series connections are only made in SIMD, when an address register 3222 in the local address subunit 3201 is accessed with the common SIMD load bit set in its associated qualifier register 3224, and a load is specified. Under all other conditions local data buses 6 are disconnected from each other. When the series connections are made, the addresses output by PPs 1–3 101–103 (the "slave" SIMD PPs) are ignored by the crossbar 20.

Since the series connecting buffers are unidirectional, the common data can only be stored in the four crossbar RAMS 10-0, 10-2, 10-3 and 10-4 opposite the "master" SIMD PP, PP0 100. (ie. in the address range 0000h–1FFFh).

Contention Resolution

The purpose of contention resolution is to allow the user to be freed from the worries of accidentally (or deliberately) coding two simultaneous accesses into the same RAM by any two devices in the system. There are seven buses connected to each crossbar RAM. It would therefore be a considerable constraint to always require contention avoidance.

In SIMD it is necessary for all PPs 100–103 to wait while contention is resolved. To achieve this a "SIMD pause" signal 3007 is routed between PPs 100–103, which can be activated by any PP 100–103 until their contention is resolved. Similarly in MIMD when executing synchronized code all synchronized PPs must wait until contention is resolved. This is signalled via sync signals 40.

The crossbar accesses are completed as soon as global ports 3005 and local ports 3006 are granted ownership of the RAM(s) they are attempting to access. In the case of stores they complete to memory 10 as soon as they are able. In the case of loads, if the PP is unable to resume execution immediately (because contention is continuing on the other port, or the SIMD pause signal 3007 is still active, or synchronized MIMD PPs are waiting for another PP, or a cache-miss has occurred) then the load(s) complete into holding latches 3018 and 3019 until execution is recommenced. This is because the data unit operation is also being held and its source data (i.e., a data register 3300) cannot be overwritten by a store. Similarly if a load and store are accessing the same data register and the store is delayed by contention, then the load data must be held temporarily in latch 3018 or 3019.

Data Unit

The logic within data unit 3000 works entirely during the execute pipeline stage. All of its operations use either registers only, or an immediate and registers. Indirect (memory) operands are not supported. Data transfers to and from memory are thus specifically coded as stores and loads.

A block diagram of data unit 3000 is given in FIG. 33. The major components of the unit consist of 8 Data registers 3300, 1 full barrel shifter 3301, a 32-bit ALU 3302, a single-cycle 16×16 multiplier 3304, special hardware for handling logical ones 3303, and a number of multiplexers 3305–3309. Also included are two registers 3310 or 3311 closely associated with the barrel shifter 3301 and the ALU 3302. They control the operation of these two devices when certain instructions are executed.

There are eight D (data registers 3300) within data unit 3000. These are general purpose 32-bit data registers. They are multi-ported and therefore allow a great deal of parallelism. Four sources can be provided to ALU 3302 and multiplier 3304 at the same time as two transfers to/from memory are occurring.

Multiplier 3306 is a single-cycle hardware 16×16 multiplier. A 32-bit result is returned to the register file 3300. The hardware will support both signed and unsigned arithmetic.

As can be seen from FIG. 33, there are many multiplexers feeding the various pieces of hardware within data unit 3000. The two multiplexers 3306 or 3307 feeding ALU 3302 (one via barrel shifter 3301) however are slightly different in that they support individual byte multiplexing. This is so that the "merge multiple (MRGM)" instruction can operate. This instruction uses the 4, 2 or 1 least-significant bits of the MFLAGS register 3311 to multiplex the individual bytes of each source with all zero bytes, so that what is passed into the ALU on one input is src1 bytes and 00h bytes intermixed according the M FLAGS. The opposite mix of 00h bytes and src2 is passed into the other ALU input. ALU 3302 can then do an ADD or an OR to produce a result which has some bytes from src1 (source 1) and the others from src2 (source 2). This is very useful for performing saturation, color expansion and compression, min and max, transparency and masking.

Barrel shifter 3301 resides on the "inverting" input to ALU 3302. This allows the possibility of performing shift and add, or shift and subtract operations using a predefined shift amount set up in the OPTIONS register 3310. This is very useful, especially since the multiplier has no result scaler. Barrel shifter 3301 can shift left or right by 0–31 bit positions, and can also do a 0–31 bit rotation.

The 32-bit ALU 3302 can perform all the possible logical operations, additions and subtractions. Certain instructions can cause ALU 3302 to be split into two half-words or 4 bytes for addition or subtraction, so that it can simultaneously operate on multiple pixels.

The "ones" logic 3303 performs three different operations. Left-most one detection, right-most one detection, and it can also count the number of ones within a word. These together have various uses in data compression, division and correlation.

The output of ALU 3302 has a one bit left-shifter which is used when performing divide iteration steps. It selects either the original source and shifts it left one place with zero insert, or else it selects the result of the subtraction of the two sources, shifts it left one bit, and inserts a 1.

"Multiple" flags register 3311 is a 32-bit register that is used for collecting the results of "add multiple", "subtract multiple" or "compare multiple" instructions. ALU 3302 can be split into 4, 2 or 1 pieces by the value of the ALU bits in options register 3310. The least-significant 4, 2 or 1 bits of "multiple" flags register 3311 are loaded by the carry, borrow or equate bits of the three instructions.

The options register 3310 contains two control fields, the ALU split bit for use with "multiple" instructions, and the barrel shifter predefined amount for shift and add, and shift and subtract instructions.

Three ALU bits in 3310 allow the potential for the ALU 3302 to be splittable into pieces of size 2, 4, 8, 16 and 32 bits each. The assigned codings are 000—2 bits, 001—4 bits, 010—8 bits, 011—16 bits, 100—32 bits. In the current implementation, however, the only permitted values are 8, 16 and 32 bits. These bit values control the operation of the ADDM (add multiple), SUBM (subtract multiple), MRGM (merge multiple), and CMPM (compare multiple) instructions.

Merge Multiple Instruction

FIG. 44 shows some complex operations that can be performed by the combination of the splitable ALU instructions that set the MFLAGS register with the Merge Multiple (MRGM) instruction utilizing the multplexer hardware of FIG. 33. The examples show only the data manipulation part of what would generally be a loop involving many of these operations.

In the add with saturate example of FIG. 44, the ADDM instruction does 4 8-bit adds in parallel and sets the MFLAG register according to whether a carry out (signalling an overflow) occurs between each 8-bit add. The 8-bit addition of Hex 67 to Hex EF and Hex CD to Hex 45 both cause a carry out of an 8-bit value which causes MFLAG bits 0 and 1 to get set (note only the 4 least significant bits of the MFLAG register will be significant to the MRGM instruction) resulting in the MFLAG register being set to "3". With D3 previously set to Hex FFFFFFFF, the MFLAG register values are used to select between the result of the previous operation contained in D2 or the saturation value of Hex "FF" stored in D3.

The Maximum function is obtained by doing a SUBM followed by using the same two registers with the MRGM instruction. The SUBM will set the bits of MFLAG register according to whether each 8-bits of a 32-bit value in one register is greater than the corresponding 8-bits in the other register as a result of 4 parallel 8-bit subtractions. As shown in the example, the MFLAG result of "5" (or binary "0101" for the 4 least significant bits) indicates that Hex "EE" was greater than Hex "67" and that Hex "AB" was greater than Hex "23". By using the MFLAG results with the MRGM instruction the greater of the corresponding values within registers D0 and D1 become the final result stored in D2.

With transparency, a comparision is made between a "transparent color" or protected color value (in the example shown the value "23" is transparent) which will later protect writing of those 8-bit values. The CMPM instruction performs 4 parallel 8-bit comparisons and sets the corresponding 4 MFLAG bits based on equal comparisons. In the example, only the third comparison from the right was "equal" signified by a "4" (binary "0100") in the MFLAG register. The MRGM instruction will then only use D0's values for the result except in the third 8-bits from the right.

Color expansion involves the selection of two multiple bit values based on a logic "1" or "0" in a binary map. In the example, the 4-bit value of Hex "6" (binary 0110) is moved into the MFLAG register. The MRGM instruction in this example simple selects between the 8-bit values in D0 and D1 according to the corresponding locations in the MFLAG register.

In color compression, a binary map is created based on whether or not the corresponding values match a specific color value. In this case the CMPM instruction's result in the MFLAG register is the result desired.

In the guided copy example, a binary pattern array is used to determine which values of the source are copies to the destination. In the example the upper two 8-bit values of D0 will be copied to D1.

In the examples above 8-bit data values have been used by way of example. The number and size of the data values is not limited however to four eight-bit values.

Several important combinations of the arithmetic multiple instructions used with the merge instruction are shown. Many other combinations and useful operations are possible. It is significant that a large number of useful operations can be obtained by using the arithmetic multiple instructions that set the mask register and are followed by the merge instruction.

Two OPT bits in options register 3310 specify the type of shift that barrel shifter 3301 will perform during shift and add, and shift and subtract instructions. The codings are 00—shift-right logical, 01—shift-right arithmetic, 10—shift-left logical, and 11—rotate.

The AMOUNT bits in options register 3310 specify the number of bits of shift or rotate of the type indicated by the OPT bits, and occurring when shift and add, or shift and subtract instructions are executed.

Appendix

The Appendix details each available instruction of the PPs 100–103. Dots (.) represent operation codes that can be assigned as desired. Some of these instructions have already been explained in the earlier text.

The order of instruction presentation is:
1. Data unit instructions (with or without parallel transfers) and single operation instructions (i.e., no parallel operations).
2. The transfers that can occur in parallel with data unit operations.

Transfer Processor

Transfer processor 11 is the interface between system memory 10 and the external world. In particular, it is responsible for all accesses to external memory 15.

Transfer processor 11, shown in detail in FIG. 57, mainly performs block transfers between one area of memory and another. The "source" and "destination" memory may be on- or off-chip and data transfer is via bus 5700 and FIFO buffer memory 5701. On-chip memory includes: crossbar data memory 10, PP's instruction caches 10, master processor instruction cache 14, and master processor data cache 13 (shown in FIGS. 1 and 2). Data memories 10 and data cache 13 can be both read and written. The instruction caches 14 are only written.

All operations involving the caches are requested automatically by the logic associated with the caches. In this case the amount of data moved will be the cache "line" size, and the data will be moved between external memory 15 specified by the appropriate segment register and a segment of the cache.

Transfers involving crossbar data memories 10 are performed in response to "packet requests" from parallel processors 100–103 or master processor 12 and are accomplished via bus 5707. The packet request specifies the transfer in terms of a number of parameters including the amount of data to be moved and the source and destination addresses.

Block Transfers

A packet request specifies a generalized block transfer from one area of memory to another. Both source address generator 5704, and destination address generator 5705 are described in the same way. A "block" may be a simple contiguous linear sequence of data items (bytes, half-words, words or long-words) or may consist of a number of such regions. The addressing mechanism allows an "array" of up to 3 dimensions to be specified. This allows a number of two dimensional patches to be manipulated by a single packet request.

Data items along the innermost dimension are always one unit apart. The distance between items of higher dimensions is arbitrary.

The counts of each dimension are the same for both source and destination arrays.

FIG. 45 is an example of a complex type of block that can be specified in a single packet request. It shows a block consisting of two groups of three lines each consisting of 512 adjacent pixels. This might be needed for example if two PPs where going to perform a 3×3 convolution, each working on one of the groups of lines.

The block is specified in terms of the following parameters as shown in FIG. 45:

| | |
|---|---|
| Run length | Number of contiguous items e.g. 512 pixels. |
| Level 2 Count | Number of "lines" in a group, e.g., 3 |
| Level 3 Count | Number of "groups" in a "block" e.g., 2 |
| Start Address | Linear address of the start of the block, e.g., address of pixel indicated as "SA". |
| Level 2 Step | Distance between first level groups, e.g., difference of the addresses of pixels "B" and "A". |
| Level 3 Step | Distance between second level groups, e.g., difference of the addresses of pixels "D" and "C". |

VRAM Auxiliary

Figure 58:
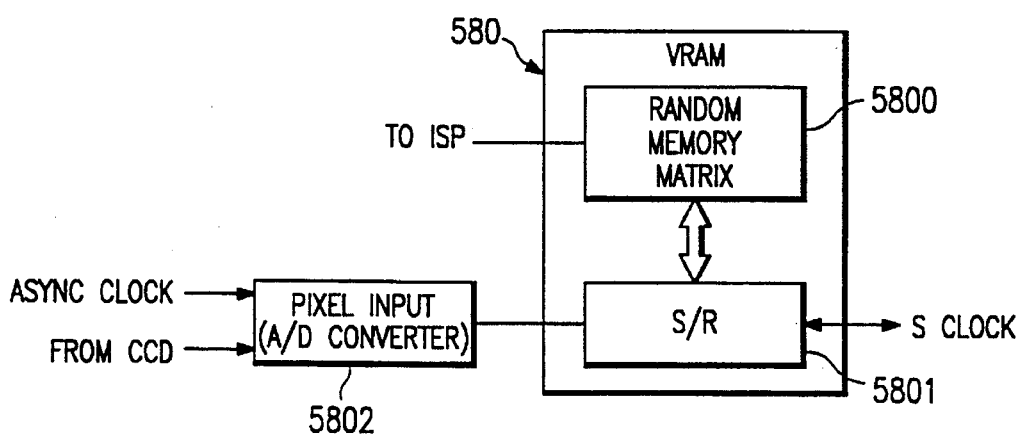
FIG. 58 shows a block diagram of the parallel processor system used with a VRAM (video random access memory)

The manner in which a video RAM would be used in conjunction with the multi-processor is described with respect to FIG. 58 where the CCD input from the video camera or other video signal input would be clocked by A/D converter 5802 into shift register 5801. Data can be shifted in or out of shift register 5801 into random memory matrix 5800 which in this case is the entire memory 15 shown in FIG. 1. The S clock input is used to control the shifting of the information in or out shift register 5801. Data out of the random memory matrix 5800 is controlled by the parallel processors in the manner previously discussed such that the information can be used in parallel or in serial to do image processing or image control or figure identification or to clean the specks from paper or other copies. The ISP accesses the data in the video RAM via port 21 in FIG. 58.

The purpose of the shift register interaction with the random memory matrix is so that information can come asynchronously from the outside and be loaded into random memory matrix without regard to the processor operational speed. At that point the transfer processor then begins the transfer of information in the manner previously discussed. The input information would typically include NTSC standards which would include the horizontal sync and blanking and vertical refresh signals, which could be used as timing signals to control the loading or unloading of information from random memory matrix 5800.

The parallel processors can do many things with the data in random memory matrix 5800. Some of these can be processed at the same time. For example, color information can be separated for later processing or for distribution in accordance with the intelligence of the data, as previously discussed, or the information content of the received data can be manipulated as discussed previously with respect to FIG. 11.

Operational Relationships

The number of controllers and data paths, and how they are configured with memory can be used to help classify architectures with respect to MIMD and SIMD. In simplest form a "processor" consists of one or more controllers and one or more data paths.

Figure 59:
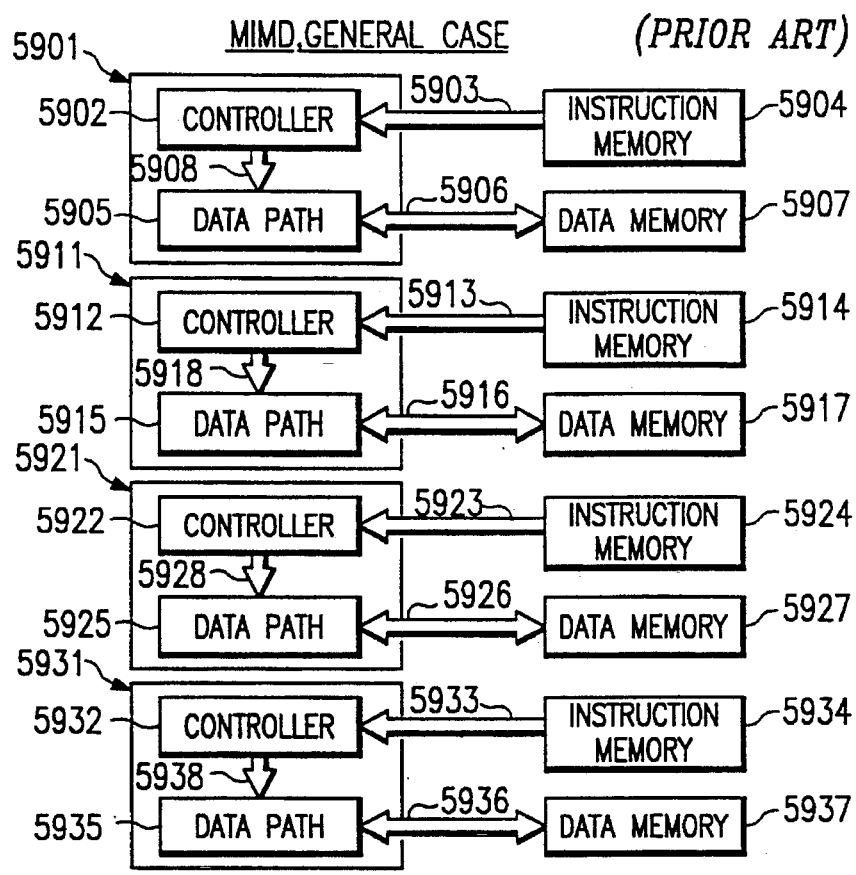
FIG. 59 shows the organization of processors, instruction memories and data memories for the MIMD mode in the prior art.

FIG. 59 shows a typical MIMD configuration of four separate processing elements (5901, 5911, 5921, and 5931) connected to instruction memories (5904, 5914, 5924, and 5934) and data memories (5907, 5917, 5927, and 5937). Note while the instruction and data memories are shown separately, they may actually be the same physical memory. Each processing element consists of two major blocks, the controller (5902, 5912, 5922, 5932) and data path (5905, 5915, 5925, 5935). The instruction memories provide control instructions to their respective controllers via instruction buses (5903, 5913, 5923, 5933). The data memories are accessed under control of the respective controller and go to the data paths via the data buses (5906, 5916, 5926, 5936). In some instances the instruction bus and data bus may in fact be the same physical bus, or the bus may actually be a set of buses configured in a crossbar arrangement. The controller controls the data path with a set of control signals (5908, 5918, 5928, 5938).

In the MIMD configuration of FIG. 59, each processor can be executing completely independent instructions on either distributed or shared data.

Figure 60:
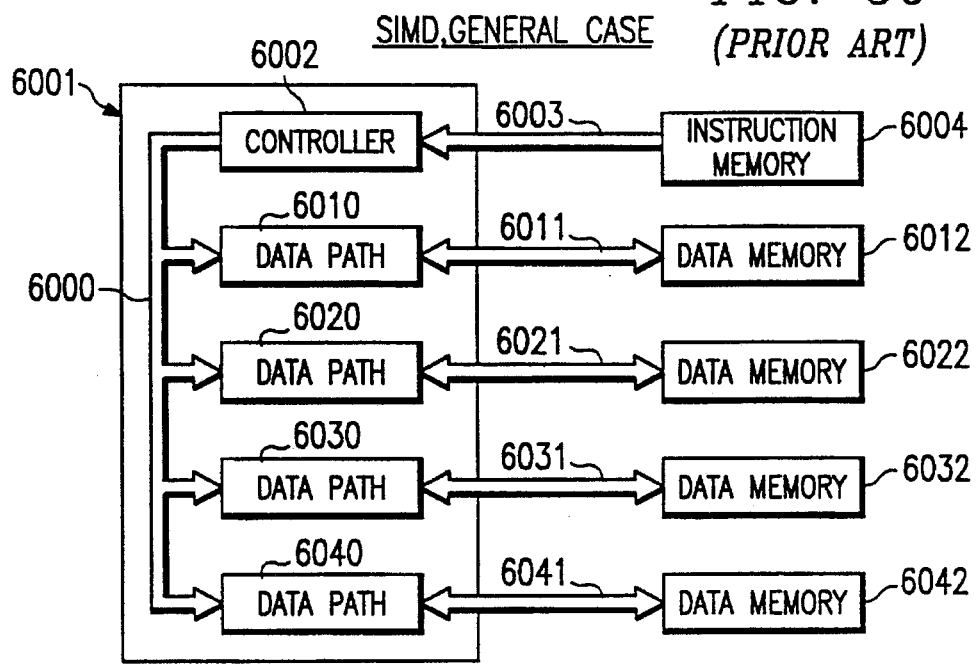
FIG. 60 shows the organization of processors, an instruction memory and data memories for the SIMD mode in the prior art.

FIG. 60 shows a general SIMD configuration with a single controller 6002 and instruction memory 6004. Instructions pass to the controller via bus 6003. The single controller generates a single set of control signals 6000 that drive multiple data paths (6010, 6020, 6030, and 6040). Each data path is shown connected to its own memory (6012, 6022, 6032, 6042) via buses (6011, 6021, 6031, 6041). While for simplicity each data path is shown having a single way of connecting to the data memories, there may in fact be various ways in which the data paths and data memories can be connected such as via a crossbar arrangement or via a sequential passing of data as shown in FIG. 8.

Figure 61:
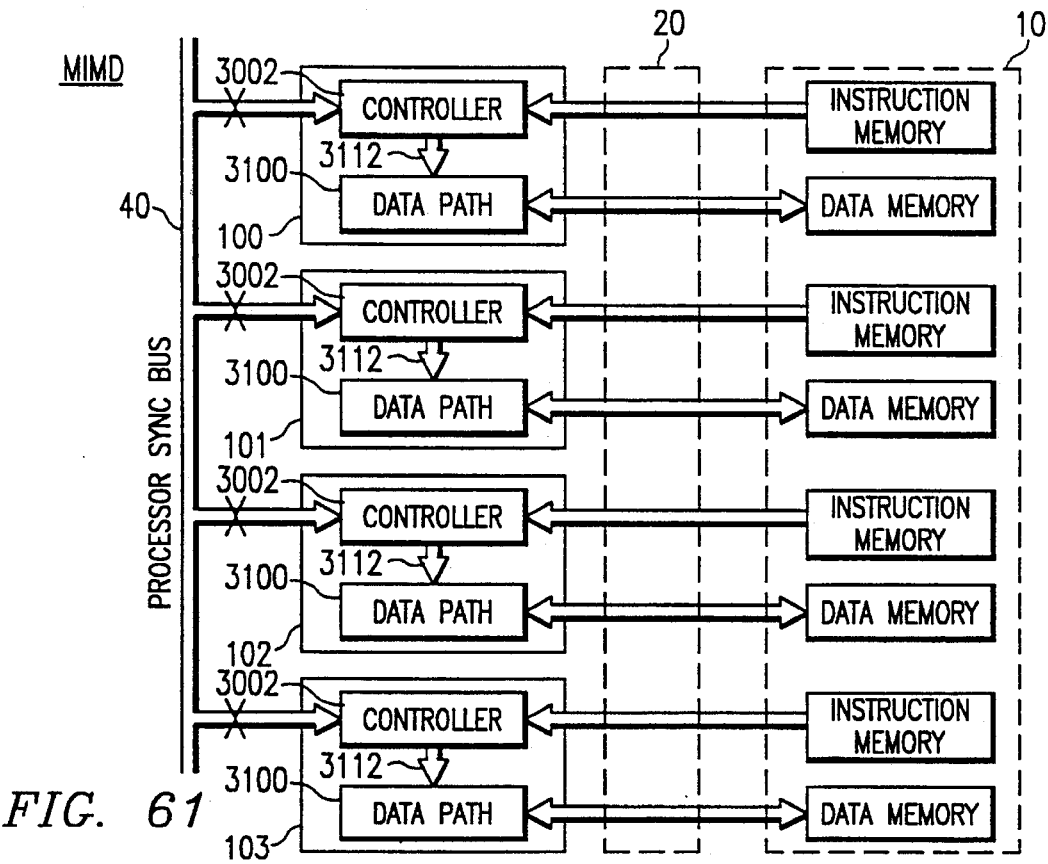
FIG. 61 shows the organization of processors, instruction memories and data memories for the MIMD mode of this invention.

In the SIMD configuration of FIG. 60, a single instruction stream is used to control multiple data paths. In the general SIMD case, such as shown in FIG. 60, there is only one controller for the multiple data paths. FIG. 61 shows an embodiment of the system which is the subject of this invention, where the system is configured to behave in a MIMD mode. Via the crossbar 20, each parallel processor (100, 101, 102, or 103) can each use a memory within the memory space 10 as its instruction memory. The controller 3002 of each parallel processor thus can get its own different instruction stream. The synchronization signals in bus 40 are ignored by each parallel processor that is configured to be in the MIMD mode of operation. Since each controller can control via control signals 3112 a different data path 3100 and each data path can have access to a different memory via the crossbar, the system can operate in a MIMD mode.

Figure 62:
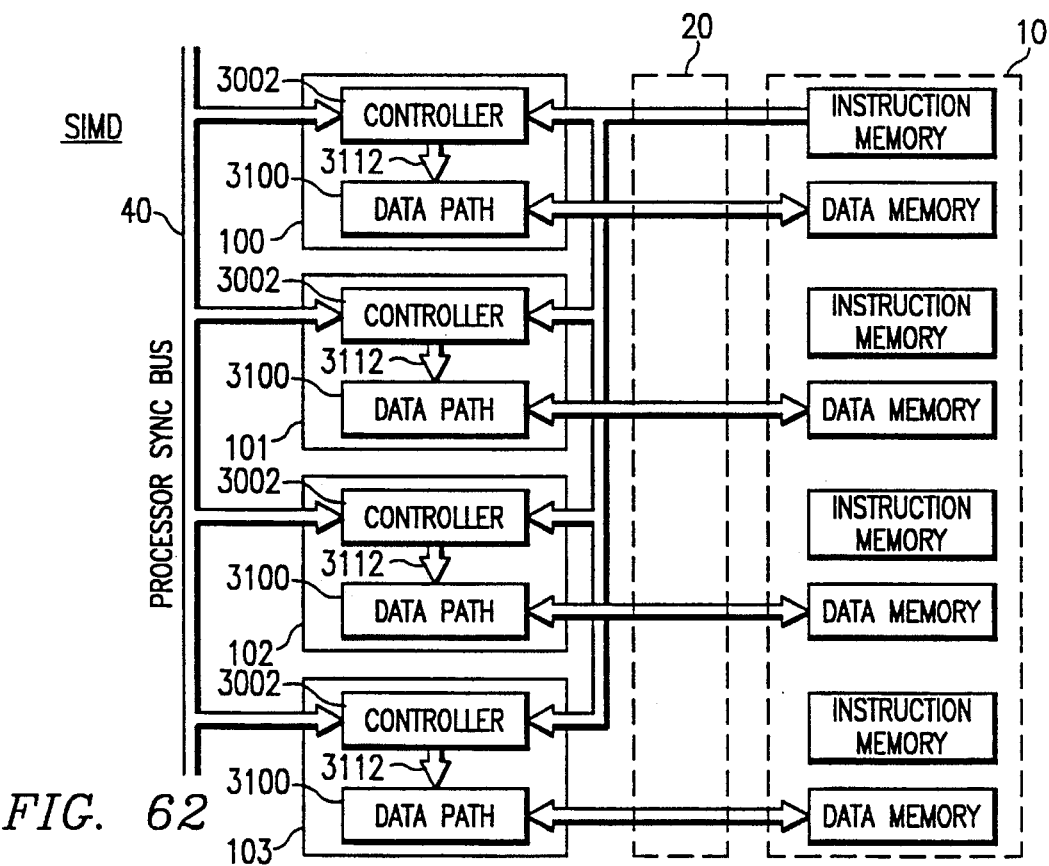
FIG. 62 shows the organization of processors, instruction memories and data memories for the SIMD mode of this invention.

FIG. 62 shows the same hardware of FIG. 61, however, the parallel processors have been configured in a SIMD mode. In this mode, a single instruction memory is connected to all processors as described in the discussion related to FIG. 28. With each of the SIMD organized parallel processors receiving the same instruction, each controller will issue generally the same control signals. For example, there may be differences in control signals due to data dependencies which must be taken account of. The synchronization signals in bus 40 serve two purposes: first they are used to get the parallel processors all started on the same instruction when transitioning from MIMD to SIMD operation, and second once started in SIMD operation they keep the parallel processor from getting out of step due to events that may not affect all processors equally (for example if two processors access the same memory, the conflict resolution logic will allow one of the processors to access the memory before the other one). Thus while there are multiple controllers, the net system result will be the same as that of the conventional SIMD organization of FIG. 60. As has been previously described, some of the memories used as instruction memories in the MIMD mode are now free for use as data memories in the SIMD mode if necessary.

Figure 63:
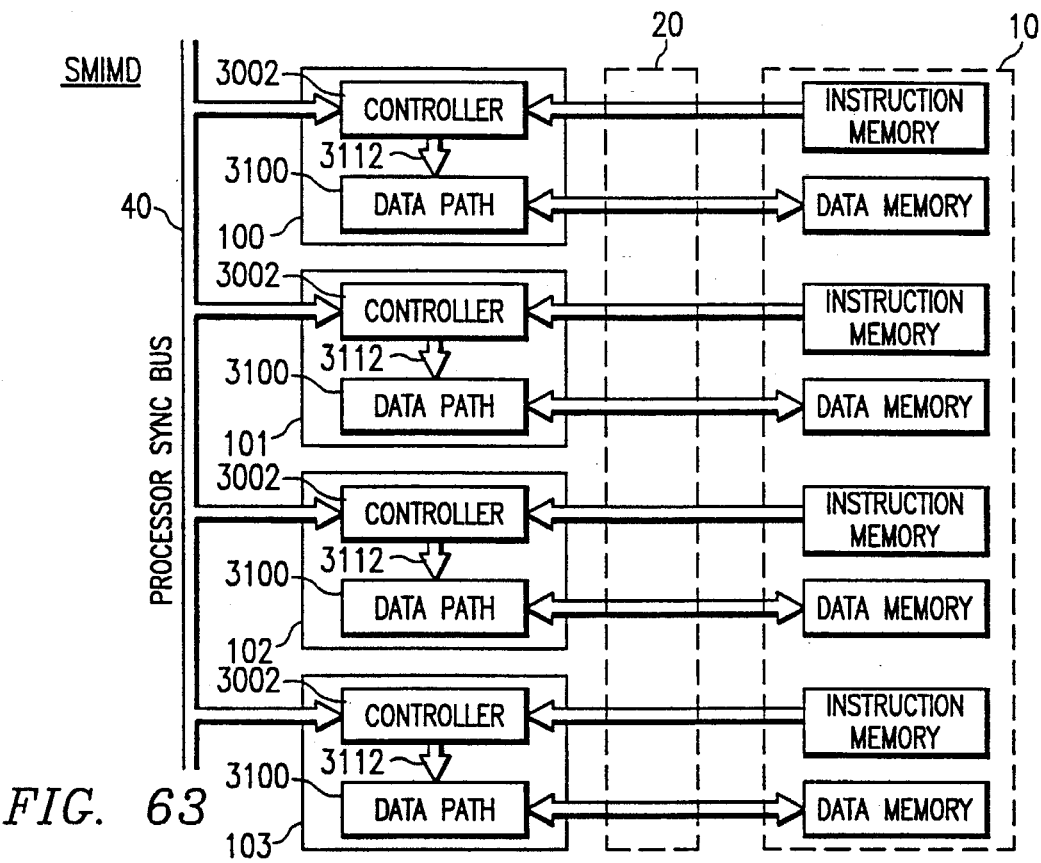
FIG. 63 shows the organization of processors, instruction memories and data memories for the synchronized MIMD mode of this invention.

FIG. 63 shows the same hardward of FIGS. 61 and 62 but configured for synchronized MIMD operation. In this mode, each processor can execute different instructions, but the instructions are kept in step with each other by the synchronization signals of bus 40. Typically in this mode of operation only a few of the instructions will differ between the processors, and it will be important to keep the processor accesses to memory in the same relative order.

Figure 64:
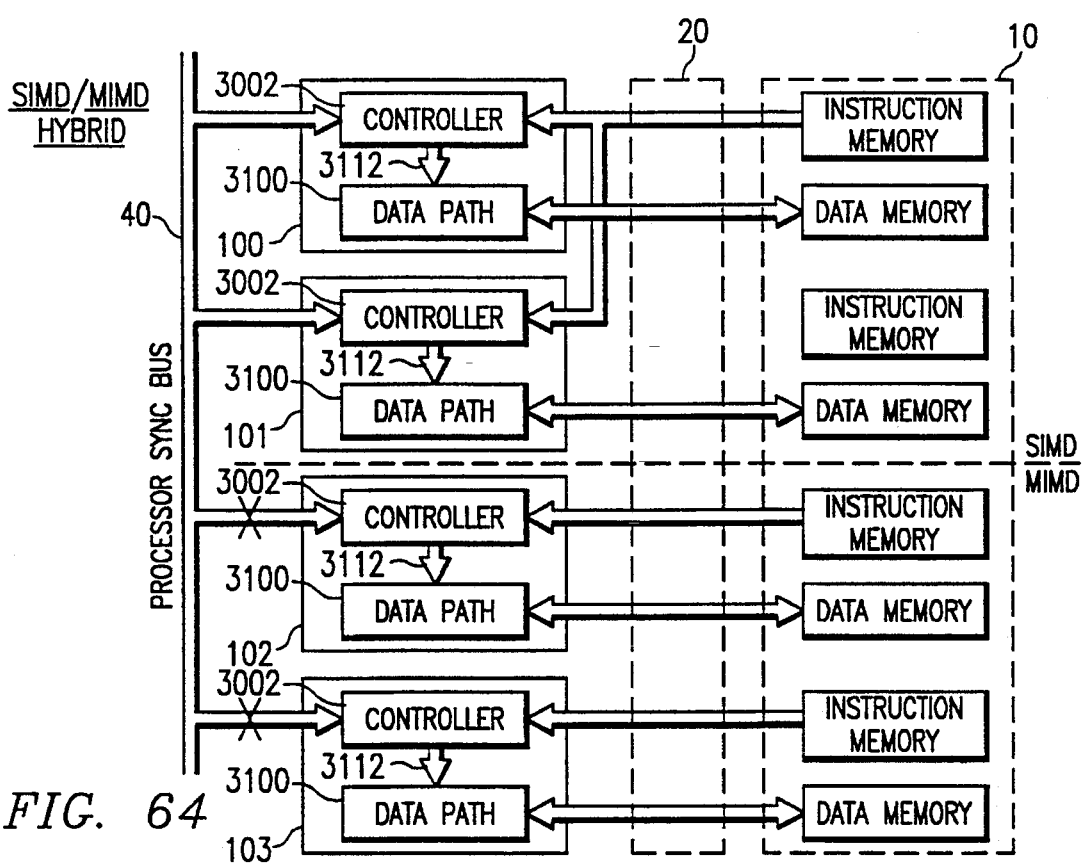
FIG. 64 shows the organization of processors, instruction memories and data memories for one example of a mixed SIMD/MIMD mode of this invention.

FIG. 64 illustrates one of many other variations of how the same hardware as that in FIG. 61, 62, and 63 can be configured. In this example, processors 100 and 101 have been configured in SIMD operation by sharing a common instruction memory and by utilizing the synchronization signals of bus 40. Processors 102 and 103 are utilizing separate instruction memories and are ignoring the synchronization signals of bus 40 and are thus running in MIMD mode. It should be noted that many other variations of the allocation of processors to MIMD, SIMD, or synchronized MIMD could be performed, and that any number of the processors could be allocated to any of the 3 modes.

Preferred Embodiment Features

Various important features of the preferred embodiment are summarized below.

A multi-processing system is shown with n processors, each processor operable from instruction sets provided from a memory source for controlling a number of different processes, which rely on the movement of data to or from one or more addressable memories with m memory sources each having a unique addressable space, where m is greater than n and having a switch matrix connected to the memories and connected to the processors and with circuitry for selectively and concurrently enabling the switch matrix on a processor cycle by cycle basis for interconnecting any of the processors with any of the memories for the interchange between the memories and the connected processors of instruction sets from one or more addressable memory spaces and data from other addressable memory spaces.

A processing system is shown with a plurality of processors, arranged to operate independent from each other from instructions executed on a cycle-by-cycle basis, with the system having a plurality of memories and circuitry for interconnecting any of the processors and any of the memories and including circuitry for interconnecting any of the processors and any of the memories and including circuitry for arranging a group of the processors into the SIMD operating mode where all of the processors of the group operate from the same instruction and circuitry operable on a processor cycle-by-cycle basis for changing at least some of the processors from operation in the SIMD operating mode to operation in the MIMD operational mode where each processor of the MIMD group operates from separate instructions provided by separate instruction memories.

An image processing system is shown with n processors, each processor operable from instruction streams provided from a memory source for controlling a number of different processes, which processes rely on the movement of data from m addressable memories each having a unique addressable space, and wherein m is greater than n and with a switch matrix connected to the memories and connected to the processors and including circuitry for selectively and concurrently interconnecting any of the processors with any of the memories so that the processors can function in a plurality of operational modes, each mode having particular processor memory relationships; and including an interprocessor communication bus for transmitting signals from any processor to any other selected processor for effecting said operational mode changes.

A multi-processing system is further shown comprising n processors, each processor operable from an instruction stream provided from a memory source for controlling a process, said process relying on the movement of data to or from m addressable memories; each memory source having an addressable space and a switch matrix having links connected to the memories and connected to the processors; and including circuitry for splitting at least one of the links of the switch matrix for selectively and concurrently interconnecting any of the processors with any of the memories for the interchange between the memories and the connected processors of instruction streams from one or more memory addressable spaces and data from other addressable memory spaces.

A processing system is shown having a plurality of processors, each processor capable of executing its own instruction stream with control circuitry associated with each of the processors for establishing which of the processors are to be synchronized therewith and with instruction responsive circuitry associated with each processor for determining the boundary of instructions which are to be synchronized with the other synchronized processors and for setting a flag between such boundaries; and including circuitry in each processor for establishing a ready to execute mode; and control logic associated with each processor for inhibiting the execution of any instruction in the processor's instruction stream while each flag is set in the processor until all of the other processors established by the processor as being synchronized with the processor are in a ready to execute mode.

A multi-processing system is shown with m memories, each memory having a unique addressable space, with the total addressable space of the m memories defined by a single address word having n bits; and a memory address generation circuit for controlling access to addressable locations with the m memories according to the value of the bits of said address word; and with addition circuitry having carryover signals between bits for accepting an index value to be added to an existing address word to specify a next address location; and with circuitry operative for diverting the carryover signals from certain bits of said word which would normally be destined to toggle a next adjacent memory address word bit so that said carryover signal instead toggles a remote bit of the memory address word.

A circuit for indicating the number of "ones" in a binary string, the circuit having an AND gate having first and second inputs and an output; an XOR gate having first and second inputs and an output, the first input thereof connected to the first input of the AND gate, the second input connected to the second input of the AND gate; and where the second inputs of the AND and XOR gates receive one bit of the binary string and the output of XOR gate produces an output binary number representative of the number of "ones" in the bit of the binary string.

A multi-processing system is shown with n processors operable from instruction streams provided from a memory source for controlling a number of different processes, said processes relying on the movement of data from one or more addressable memories; and with m memory sources, each having a unique addressable space, some of the memories adapted to share instruction streams for the processors and the others of the memories adapted to store data for the processors; and with a switch matrix for establishing communication links between the processors and the memories, the switch matrix arranged with certain links providing dedicated communication between a particular processor and a particular one of the memories containing the instruction streams; and with circuitry for rearranging certain matrix links for providing data access to memories previously used for instructions, and circuitry concurrently operative with the rearranging circuitry for connecting all of the processors to a particular one of the certain links so that instructions from the instruction memory associated with the certain link are communicated to all of the system processors.

An imaging system having an image input, each image having a plurality of pixels, each pixel capable of having a plurality of data bits associated therewith; a memory; an image bus for transporting pixels from each image at the input to the memory; and circuitry for interpreting received images in accordance with parameters stored in the memory, the interpreting resulting from the parameters being applied to the pixels of each received image.

A switch matrix is arranged for interconnecting a plurality of first ports with a plurality of second ports, the switch matrix having: a plurality of vertical buses, each bus associated with a particular one of the first ports; and a plurality of individually operable crosspoints; and a plurality of horizontal buses connected to the second ports for connecting, via enabled ones of the cross points, one of the first ports and any one of the second ports and including circuitry at each crosspoint, associated with each vertical bus for handling contention between competing ones of the second ports for connection to said vertical bus.

Summary

Although the present invention has been described with respect to a specific preferred embodiment thereof, various changes and modifications may be suggested by one skilled in the art, and it is intended that the present invention encompass such changes and modifications as fall within the scope of the appended claims. Also, it should be understood that while emphasis has been placed on image processing the system described herein can as well be used for graphics, signalling processing, speech, sonar, radar and other high density real time processing. High definition TV and computing systems are a natural for this architecture.

APPENDIX

| Condition Codes | | | | Description | Flags |
|---|---|---|---|---|---|
| 0 | 0 | 0 | 0 | Unconditional | Don't care |
| 0 | 0 | 0 | 1 | Lower than, Carry | C |
| 0 | 0 | 1 | 0 | Lower than or same | $C + Z$ |
| 0 | 0 | 1 | 1 | Higher than | $\bar{C}.\bar{Z}$ |
| 0 | 1 | 0 | 0 | Higher than or same, No Carry | $\bar{C}$ |
| 0 | 1 | 0 | 1 | Equal, Zero | Z |
| 0 | 1 | 1 | 0 | Not equal, Not zero | $\bar{Z}$ |
| 0 | 1 | 1 | 1 | Less than | $(N.\bar{V}) + (\bar{N}.V)$ |
| 1 | 0 | 0 | 0 | Less than or equal | $(N.\bar{V}) + (\bar{N}.V) + Z$ |
| 1 | 0 | 0 | 1 | Greater than | $(N.V.\bar{Z}) + (\bar{N}.\bar{V}.\bar{Z})$ |
| 1 | 0 | 1 | 0 | Greater than or equal | $(N.V.) + (\bar{N}.\bar{V})$ |
| 1 | 0 | 1 | 1 | Positive | $\bar{N}.\bar{Z}$ |
| 1 | 1 | 0 | 0 | Negative | N |
| 1 | 1 | 0 | 1 | Non-negative | $\bar{N}$ |
| 1 | 1 | 1 | 0 | Overflow | V |
| 1 | 1 | 1 | 1 | No overflow | $\bar{V}$ |

CONDITION CODES SUMMARY

| scodes/dcodes | |
|---|---|
| 000:D0–D7 | 100:C0–C7 |
| 001:P0–P7 | 101:L0–L7 |
| 010:A0–A7 | 110:Q0–Q7 |
| 011:X0–X7 | 111:M0–M7 |

| | | |
|---|---|---|
| P0:MFLAGS | C0:LC1 | L0:LE1 |
| P1:OPTIONS | C1:LC2 | L1:LE2 |
| P2:SYNC/PP# | C2:LC3 | L2:LE3 |
| P3:INTEN | C3:RC1 | L3:LS |
| P4:INTPW | C4:RC2 | L4:reserved |
| P5:SR | C5:RC3 | L5:reserved |
| P6:RNT | C6:reserved | L6:reserved |
| P7:PC | C7:reserved | L7:reserved |

APPENDIX-continued

REGISTER CODES SUMMARY

| 2 bits | | | | | 4 bits | | | |
|---|---|---|---|---|---|---|---|---|
| 0 0 | = * | 0 0 0 | 0 = 3op | | 1 0 0 | 0 = push1/pop1 | | |
| 0 1 | = X + m | 0 0 0 | 1 = X + m | | 1 0 0 | 1 = I + m | | |
| 1 0 | = −1m | 0 0 1 | 0 = PushRet | | 1 0 1 | 0 = move | | |
| 1 1 | = 1 + m | 0 0 1 | 1 = X − m | | 1 0 1 | 1 = I − m | | |
| | | 0 1 0 | 0 = +X | | 1 1 0 | 0 = +I | | |
| | | 0 1 0 | 1 = +Xm | | 1 1 0 | 1 = +Im | | |
| | | 0 1 1 | 0 = −X | | 1 1 1 | 0 = −I | | |
| | | 0 1 1 | 1 = −Xm | | 1 1 1 | 1 = −Im | | |

ADDRESSING MODE CODES SUMMARY

Absolute                                                         ABS

Syntax      ABS    src,dst
Operation    |src|→dst
Operands

D,D         With parallel transfers
     any,any    No parallel transfers

Routing

```
   A    B    C    D    E                A    B  C   D E
   ─    ─    ─    ─    ─                │    │  │   │ │
   0   src   0    —    —                └──▶ B.S.│   │ │
                                              − │ + │ │
                                              ALU  MPY
```

Encoding    31      27      22    19   16      11      8      5       0

| 0 0 0 0 | ..... | src | dst | Parallel transfers | | | |
|---|---|---|---|---|---|---|---|
| 0 0 0 0 | ..... | src | dst | 0 0 0 0 0 | scde | dcde | 0 0 0   0 0 0 |

Descripton    The absolute value of src is loaded into dst.
Status Bits    N - Set to 0.
                 C - Unaffected.
                 V - 1 if an overflow occurs, 0 otherwise.
                 Z - 1 if zero result generated, 0 otherwise.
M Bits        Unaffected
Examples

Add                                                           ADD

Syntax      ADD      src1,src2,dst
Operation    src1 + src2→dst
Operands

D,D,D           With parallel transfers
     any,D,any     No parallel transfers
     D,any,any     No parallel transfers
     D,I,D           No parallel transfers
     any,I,src1     No parallel transfers Routing

```
   A    B     C    D    E                A    B  C   D E
   ─    ─     ─    ─    ─                │    │  │   │ │
   0   src2  src1  —    —                └──▶ B.S.│   │ │
                                              − │ + │ │
                                              ALU  MPY
```

Encoding    31 30    27      22      19   16 15      11      8      5      2    0

| 1 | src2 | ..... | src1 | dst | Parallel transfers | | | |
|---|---|---|---|---|---|---|---|---|
| 1 | src2 | ..... | src1 | dst | 0 0 0 0 0 | scde1 | dcde | scde2   0 0 0 |
| 0 1 1 1 | | ..... | src1 | dst | H | 16 bit immediate | | |
| 0 0 1 1 | | ..... | code | dst | H | 16 bit immediate | | |

Description    The sum of src1 and src2 is loaded into dst. The immediate is assumed to be
                  unsigned, and can be either the high or low half-word.
Status Bits    N - 1 if negative result generated, 0 otherwise.
                  C - 1 if a carry occurs, 0 otherwise.

APPENDIX-continued

V - 1 if an overflow occurs, 0 otherwise.
            Z - 1 if zero result generated, 0 otherwise.
M Bits     Unaffected
Examples

Add with Carry                             ADDC

Syntax      ADDC   src1,src2,dst
Operation   src1 + src2 + C→dst
Operands
            D,D,D       With parallel transfers
            any,D,any    No parallel transfers
            D,any,any    No parallel transfers
            D,I,D        No parallel transfers
            any,I,src1   No parallel transfers Routing

| A | B | C | D | E |
|---|---|---|---|---|
| 0 | src2 | src1 | — | — |

```
     A    B C   D E
     |    | |   | |
     └──> B.S.
          - | +
          ALU  MPY
           |    |
```

Encoding   3130   27      22     19  1615    11      8     5    2   0

| 1 | src2 | ..... | src1 | dst | Parallel transfers ||||
|---|------|-------|------|-----|-------|------|-------|-----|
| 1 | src2 | ..... | src1 | dst | 00000 | scde1 | dcde | scde2 | 000 |
| 0111 | | ..... | src1 | dst | H | 16 bit immediate ||||
| 0011 | | ..... | code | dst | H | 16 bit immediate ||||

Description   The sum of src1 and src2 and the Carry flag is loaded into dst. The
               immediate is assumed to be unsigned, and can be either the high or low
               half-word.
Status Bits   N - 1 if negative result generated, 0 otherwise.
               C - 1 if a carry occurs, 0 otherwise.
               V - 1 if an overflow occurs, 0 otherwise.
               Z - 1 if zero result generated, 0 otherwise.
M Bits      Unaffected
Examples

Add Multiple bytes/half-words                    ADDM

Syntax      ADDM   src1,src2,dst
Operation   src1 ++++/++/+ src2→dst
Operands
            D,D,D       With parallel transfers
            any,D,any    No parallel transfers
            D,any,any    No parallel transfers
            D,I,D        No parallel transfers
            any,I,src1   No parallel transfers Routing

| A | B | C | D | E |
|---|---|---|---|---|
| 0 | src2 | src1 | — | — |

```
     A    B C   D E
     |    | |   | |
     └──> B.S.
          - | +
          ALU  MPY
           |    |
```

Encoding   3130   27      22     19  1615    11      8     5    2   0

| 1 | src2 | ..... | src1 | dst | Parallel transfers ||||
|---|------|-------|------|-----|-------|------|-------|-----|
| 1 | src2 | ..... | src1 | dst | 00000 | scde1 | dcde | scde2 | 000 |
| 0111 | | ..... | src1 | dst | H | 16 bit immediate ||||
| 0011 | | ..... | code | dst | H | 16 bit immediate ||||

Descripton   The ALU bits in the OPTIONS register are used to spit the ALU into four
              seperate bytes, two seperate half-words, or one word. The sum of each
              individual portion of src1 and src2 is loaded into dst. The individual carries APPENDIX-continued are stored into the 4, 2 or 1 least-significant M bits respectively. The
immediate is assumed to be unsigned, and can be either the high or low
half-word.

Status Bits  N - Unaffected
C - Unaffected
V - Unaffected
Z - 1 if zero result generated, 0 otherwise.
M Bits       The carries from the individual adds are stored in the least-significant 4,
2 or 1 M bits, according to the ALU option bit values.
Examples

AND

Syntax       AND   src1,src2,dst
Operation    src1 AND src2→dst
Operands
D,D,D          With parallel transfers
any,D,any      No parallel transfers
D,any,any      No parallel transfers
D,I,D          No parallel transfers
any,I,src1     No parallel transfers Routing

| A | B | C | D | E |
|---|---|---|---|---|
| 0 | src2 | src1 | — | — |

```
A       B C   D E
        | |   | |
 └─►  B.S. |   | |
      - |  | + | |
       ALU   MPY
        |     |
```

Encoding  3130  27  22  19  1615  11  8  5  2  0

| 1 | src2 | ..... | src1 | dst | Parallel transfers |       |       |      |     |
|---|------|-------|------|-----|--------------------|-------|-------|------|-----|
| 1 | src2 | ..... | src1 | dst | 0 0 0 0 0 | scde1 | dcde | scde2 | 0 0 0 |
| 0 1 1 1 | ..... | src1 | dst | H | 16 bit immediate |
| 0 0 1 1 | ..... | code | dst | H | 16 bit immediate |

Description  The AND of src1 and src2 is loaded into dst. The immediate can be either
the high or low half-word.
Status Bits  N - Unaffected
C - Unaffected
V - Unaffected
Z - 1 if zero result generated, 0 otherwise.
M Bits       Unaffected
Examples

AND with Complement                                                                ANDN Syntax       ANDN  src1,src2,dst
Operation    src1 AND (NOT src2)→dst
Operands
D,D,D          With parallel transfers
any,D,any      No parallel transfers
D,any,any      No parallel transfers
D,I,D          No parallel transfers
any,I,src1     No parallel transfers Routing

| A | B | C | D | E |
|---|---|---|---|---|
| 0 | src2 | src1 | — | — |

```
A       B C   D E
        | |   | |
 └─►  B.S. |   | |
      - |  | + | |
       ALU   MPY
        |     |
```

Encoding  3130  27  22  19  1615  11  8  5  2  0

| 1 | src2 | ..... | src1 | dst | Parallel transfers |       |       |      |     |
|---|------|-------|------|-----|--------------------|-------|-------|------|-----|
| 1 | src2 | ..... | src1 | dst | 0 0 0 0 0 | scde1 | dcde | scde2 | 0 0 0 |
| 0 1 1 1 | ..... | src1 | dst | H | 16 bit immediate |
| 0 0 1 1 | ..... | code | dst | H | 16 bit immediate |

APPENDIX-continued

| | |
|---|---|
| Description | The AND of src1 with the 1s complement of src2 is loaded into dst. The immediate can be either the high or low half-word. |
| Status Bits | N - Unaffected<br>C - Unaffected<br>V - Unaffected<br>Z - 1 if zero result generated, 0 otherwise. |
| M Bits | Unaffected |
| Examples | |

Conditional Branch relative to PC          BRcond

| | |
|---|---|
| Syntax | BRcond    24 bit immediate |
| Operation | 24 bit Immediate + PC conditionally loaded into PC |
| Operands | I    No parallel transfers |

Routing

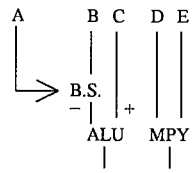

Encoding

```
31      27    23                              0
 0 0 1 0 | cond. |      24 bit immediate
```

| | |
|---|---|
| Description | The 24 bit immediate is added to the 24 bit Program Counter, and conditionally returned to the PC. |
| Status Bits | N - Unaffected<br>C - Unaffected<br>V - Unaffected<br>Z - Unaffected |
| M Bits | Unaffected |
| Examples | |

Clear Bit          CLRB

| | | |
|---|---|---|
| Syntax | CLRB    src1,src2,dst | |
| Operation | src1[src2] := 0, src1'→dst | |
| Operands | D,D,D | With parallel transfers |
| | any,D,any | No parallel transfers |
| | D,any,any | No parallel transfers |
| | D,I,D | No parallel transfers |
| | any,I,src1 | No parallel transfers |

Routing

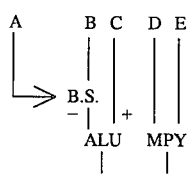

Encoding

```
3130  27      22    19  1615     11    8      5   2  0
  1 |src2|.....| src1 | dst |   Parallel transfers
  1 |src2|.....| src1 | dst | 00000 | scde1 | dcde | scde2 | 000
 0111 |.....| src1 | dst | H |      16 bit immediate
 0011 |.....| code | dst | H |      16 bit immediate
```

| | |
|---|---|
| Description | The bit within src1 pointed to by the least-significant 5-bits of src2 is set to zero. The result is loaded into dst. Only the least-significant 5 bits of the immediate are significant. |
| Status Bits | N - Unaffected<br>C - Unaffected<br>V - Unaffected<br>Z - 1 if zero result generated, 0 otherwise. |
| M Bits | Unaffected |
| Examples | |

Compare          CMP

Syntax    CMP    src1,src2

APPENDIX-continued

| | | |
|---|---|---|
| Operation | src1 − src2, status bits set on result. | |
| Operands | | |
| | D,D | With parallel transfers |
| | any,D | No parallel transfers |
| | D,any | No parallel transfers |
| | D,I | No parallel transfers |
| | any,I | No parallel transfers |

Routing

```
 A    B    C    D    E            A   B C   D E
 ─    ─    ─    ─    ─            │   │ │   │ │
 0   src2 src1  —    —            └─> B.S.
                                      ─│ │+
                                      ALU MPY
                                       │   │
```

Encoding  3130  27  22  19  1615  11  8  5  2  0

| 1 | src2 | ..... | src1 | 0 0 0 | Parallel transfers | | | | |
|---|------|-------|------|-------|--------------------|---|---|---|---|
| 1 | src2 | ..... | src1 | 0 0 0 | 0 0 0 0 0 | scde1 | 0 0 0 | scde2 | 0 0 0 |
| 0 1 1 1 | | ..... | src1 | 0 0 0 | H | 16 bit immediate | | | |
| 0 0 1 1 | | ..... | code | src1 | H | 16 bit immediate | | | |

| | |
|---|---|
| Description | src2 is subtracted from src1, but the result is not loaded into any destination. The status bits are set according to the result. The immediate is assumed to be unsigned, and can be either the high or low half-word. |
| Status Bits | N - 1 if negative result generated, 0 otherwise.<br>C - 1 if a carry occurs, 0 otherwise.<br>V - 1 if an overflow occurs, 0 otherwise.<br>Z - 1 if zero result generated, 0 otherwise. |
| M Bits | Unaffected |
| Examples | |

Compare Multiple bytes/half-words  CMPM

| | | |
|---|---|---|
| Syntax | CMPM src1,src2 | |
| Operation | src1 ----/--/- src2, M bits set on result(s). | |
| Operands | | |
| | D,D | With parallel transfers |
| | any,D | No parallel transfers |
| | D,any | No parallel transfers |
| | D,I | No parallel transfers |
| | any,I | No parallel transfers |

Routing

```
 A    B    C    D    E            A   B C   D E
 ─    ─    ─    ─    ─            │   │ │   │ │
 0   src2 src1  —    —            └─> B.S.
                                      ─│ │+
                                      ALU MPY
                                       │   │
```

Encoding  3130  27  22  19  1615  11  8  5  2  0

| 1 | src2 | ..... | src1 | 0 0 0 | Parallel transfers | | | | |
|---|------|-------|------|-------|--------------------|---|---|---|---|
| 1 | src2 | ..... | src1 | 0 0 0 | 0 0 0 0 0 | scde1 | 0 0 0 | scde2 | 0 0 0 |
| 0 1 1 1 | | ..... | src1 | 0 0 0 | H | 16 bit immediate | | | |
| 0 0 1 1 | | ..... | code | src1 | H | 16 bit immediate | | | |

| | |
|---|---|
| Description | The ALU bits in OPTIONS are used to split the ALU into four seperate bytes, two seperate half-words, or one word. The portions of src2 are subtracted from src1 and then each result is compared with zero. The individual zero bits are stored into the 4, 2 or 1 least-significant M bits repectively. Carry flag is loaded into dst. The immediate is assumed to be unsigned, and can be either the high or low half-word. |
| Status Bits | N - Unaffected<br>C - Unaffected<br>V - Unaffected<br>Z - 1 if zero result generated, 0 otherwise. |
| M Bits | The zero bits of the individual compares are stored into th 4, 2 or 1 least-significant M bits, according to the ALU option bits. |

APPENDIX-continued

Examples

Divide Iteration | | | | | | DIVI
Syntax | DIVI   src1,src2,(src1)
Operation | If src1 − src2 < 0, then src1 := src1 × 2, else src1 := ((src1 − src2) × 2) + 1
Operands

| | |
|---|---|
| D,D,src1 | With parallel transfers |
| any,D,src1 | No parallel transfers |
| D,any,src1 | No parallel transfers |
| D,I,src1 | No parallel transfers |
| any,I,src1 | No parallel transfers |

Routing

| A | B | C | D | E |
|---|---|---|---|---|
| 0 | src2 | src1 | — | — |

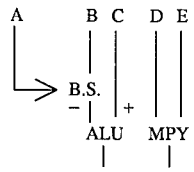

Encoding   3130   27   22   19   1615   11   8   5   2   0

| 1 | src2 | ..... | src1 | 0 0 0 | Parallel transfers | | | |
|---|---|---|---|---|---|---|---|---|
| 1 | src2 | ..... | src1 | 0 0 0 | 0 0 0 0 0 | scde1 | 0 0 0 | scde2 | 0 0 0 |
| 0 1 1 1 | | ..... | src1 | 0 0 0 | H | 16 bit immediate | | |
| 0 0 1 1 | | ..... | code | src1 | H | 16 bit immediate | | |

Description | src2 is subtracted from src1. If the result is negative then src1 is left-shifted by one bit, and a zero is inserted into bit 0. This is then loaded into src1. If however the result is zero or positive then the result of the subtraction is left-shifted one bit and a 1 is inserted into bit 0. This is then loaded into src1. The immediate is assumed to be unsigned, and can be either the high or low half-word.
Status Bits | N - Unaffected
 | C - Unaffected
 | V - Unaffected
 | Z - Unaffected
M Bits | Unaffected
Examples Idle until interrupted | | | | IDLE
Syntax | IDLE
Operation | wait for an enabled interrupt
Operands

| | |
|---|---|
| None | With parallel transfers |

Encoding   31   27   22   19   16   0

| 0 0 0 0 | ..... | 0 0 0 | 0 0 0 | Parallel transfers |
|---|---|---|---|---|

Description | Instruction waits until an enabled interrupt occurs before proceding. If parallel transfers are coded then they will happen after the interrupt has occurred, but before the interrupt routine is executed.
Status Bits | N - Unaffected.
 | C - Unaffected.
 | V - Unaffected.
 | Z - Unaffected.
M Bits | Unaffected
Examples Lock MIMD PPs together | | | LCK
Syntax | LCK
Operation | wait for MIMD PPs to synchronise
Operands

| | |
|---|---|
| None | With parallel transfers |

Encoding   31   27   22   19   16   0

| 0 0 0 0 | ..... | 0 0 0 | 0 0 0 | Parallel transfers |
|---|---|---|---|---|

Description | This instruction is used to begin a piece of MIMD synchronised PP code. It will cause the PP to wait until all the PPs indicated by 1s in the SYNC register are in sync with each other. The following instructions will then APPENDIX-continued be fetched in-step with the other MIMD PPs. (Execution of the Address and Execute pipeline stages will occur as each successive instruction is synchronously fetched). ULCK will terminate synchronous code execution.

Status Bits  N - Unaffected.
C - Unaffected.
V - Unaffected.
Z - Unaffected.
M Bits  Unaffected
Examples Conditional Load                                                                 LDcond
Syntax      LDcond    *An(mode),dst
Operation   *src conditionally→dst
Operands
            A0–A7(mode{g },<Dn,An,Xn,Pn>) No parallel Data Unit operation.
            Addressing modes    pre- or post-indexing
                                +/– 3 bit immediate or +/– an indeX register
                                modify Address register, or leave unaltered Encoding    31      27      232221    18    1615    1110    8    5    2    0

| 0 1 1 0 | cond. | 0 | N | 0 0 0 | 0 0 | 0 | mod | 0 | cde | A | dst | Imm/X |

Description  This instruction will conditionally load a Dn, An, Xn or Pn register from
             an indirect address generated from any Address register. (Mn, Qn, Cn or
             Ln cannot be directly loaded from memory except with a POP instruction).
             If specifying an immediate, then +/– 0 to 7 are available. If
             specifying an index register, then it must be in the same Address sub-unit as
             the Address register. If the address is non-aligned, then this will load only
             the lower byte(s). Note that if a register modify is specified then this will
             happen unconditionally. Only the actual load is conditional. In addition to
             the normal condition codes the condition "never" is also available. This
             allows Address register modify but without loading a register.
Status Bits  N - Unaffected.
C - Unaffected.
V - Unaffected.
Z - Unaffected.
M Bits  Unaffected
Examples Conditional Load Immediate                                                       LDIcond
Syntax      LDIcond    16-bit immediate,dst
Operation   16-bit immediate conditionally loaded into dst
Operands
            I,any    No parallel transfers Routing                                           A    B  C    D E
                                                  |    |  |    | |
            A      B      C      D      E         └→ B.S.
            ─      ─      ─      ─      ─            –│ │+│  │││
            0     src     0      —      —             ALU   MPY
                                                       │     │

Encoding    31      27      2322      19   1615                        0

| 0 1 1 0 | cond. | 1 | dcde | dst | S | 16 bit immediate |

Description  The 17-bit signed immediate is loaded into dst only if cond is true. The sign
             bit is extended through to bit 31.
Status Bits  N - Unaffected.
C - Unaffected.
V - Unaffected.
Z - Unaffected.
M Bits  Unaffected
Examples Load Loop Start or Program Counter                                               LDLS,LDPC
Syntax      LD    24-bit immediate,dst
Operation   24-bit immediate loaded into dst
Operands
            I,LS    No parallel transfers
            I,PC    No parallel transfers Encoding    31                23                                    0

| 0 0 0 1 1 1 1 | . | 24 bit immediate |

| Description | Load the 24-bit immediate into either the Loop Start address register, or the Program Counter. |
|---|---|
| Status Bits | N - Unaffected. |
| | C - Unaffected. |
| | V - Unaffected. |
| | Z - Unaffected. |
| M Bits | Unaffected |
| Examples | |

Conditional Load and Load                                                                LD‖LDcond

| Syntax | LDcond    *Am(mode),dst1‖LD *An(mode),dst2 |
|---|---|
| Operation | {I *src1 conditionally {s.} dst1, *src2 conditionally→dst2} |
| Operands | |
| | cond  A0–A3(mode{g} ,Dm  A4–A7(mode),Dn )   No parallel Data Unit operation. |
| Addressing modes | post-increment by 1 with Address register modify |
| | pre-decrement by 1 with Address register modify |
| | post-increment by A reg's associated indeX register with Address register modify |
| | indirect without indexing |

Encoding  31     27    232221    18  1615        1110   8 7  5    2 0

| 0 1 1 0 | cond. | 0 | N | 0 0 0 | 0 0 | 1 | mdg | mdl | 0 | A47 | 0 | A03 | Dg | Dl |

| Description | This instruction will conditionally load dst1 via the Global bus from an indirect address generated from an Address register in the Global sub-unit (A0–A3). In parallel with this it will conditionally (same condition) load dst2 via the Local bus from an indirect address generated from an Address register in the Local sub-unit (A4–A7). Indirect, post-increment by 1, pre-decrement by 1 and post-increment by X addressing modes are supported independantly on the two buses. The indeX register(s) used have the same subscript(s) as the Address register(s). The dsts must be D registers. Note that if register modifies are specified then these will happen unconditionally. Only the actual loads are conditional. In addition to the normal condition codes the condition "never" is also available. This allows Address register modifies but without loading registers. |
|---|---|
| Status Bits | N - Unaffected. |
| | C - Unaffected. |
| | V - Unaffected. |
| | Z - Unaffected. |
| M Bits | Unaffected |
| Examples | |

Conditional Load and Store                                                               LD‖STcond

| Syntax | LDcond    *Am(mode),dst1‖ST    src2,*An(mode) |
|---|---|
| Operation | {I *src1 conditionally {s.} dst1, src2 conditionally {s.} *dst2} |
| Operands | |
| | cond  A0–A3(mode {g},Dm  Dn,A4–A7(mode) )   No parallel Data Unit operation. |
| Addressing modes | post-increment by 1 with Address register modify |
| | pre-decrement by 1 with Address register modify |
| | post-increment by A reg's associated indeX register with Address register modify |
| | indirect without indexing |

Encoding  31     27    232221    18  1615        1110   8 7  5    2 0

| 0 1 1 0 | cond. | 0 | N | 0 0 0 | 0 0 | 1 | mdg | mdl | 0 | A47 | 1 | A03 | Dg | Dl |

| Description | This instruction will conditionally load dst1 via the Global bus from an indirect address generated from an Address register in the Global sub-unit (A0–A3). In parallel with this it will conditionally (same condition) store src2 via the Local bus to an indirect address generated from an Address register in the Local sub-unit (A4–A7). Indirect, post-increment by 1, pre-decrement by 1 and post-increment by X addressing modes are supported independantly on the two buses. The indeX register(s) used have the same subscript(s) as the Address register(s). dst1 and src2 must be D registers. Note that if register modifies are specified then these will happen unconditionally. Only the actual loads and stores are conditional. In addition to the normal condition codes the condition "never" is also available. This allows Address register modifies but without loading or storing anything. |
|---|---|
| Status Bits | N - Unaffected. |
| | C - Unaffected. |
| | V - Unaffected. |
| | Z - Unaffected. |

APPENDIX-continued

M Bits     Unaffected
Examples

Load Upper Conditionally                                                   LDUcond
Syntex     LDUcond     *An(mode),dst
Operation     *src conditionally→dst
Operands A0–A7(mode{g   },Dn )   No parallel Data Unit operation.
    Addressing modes     pre- or post-indexing
                                    +/– 3 bit immediate or +/– an indeX register
                                    modify Address register, or leave unaltered Encoding     31     27       232221     18   1615      1110     8     5     2     0

| 0 1 1 0 | cond. | 0 | N | 0 0 0 | 1 0 | 0 | mod | 0 | cde | A | dst | Imm/X |

Description     For use with non-aligned addresses. Conditionally loads the upper portion
                    of a PP register from an indirect non-aligned address generated from any
                    Address register. The destination PP register must be a D register. (Non-
                    aligned loads are not supported to any other PP registers). If specifying an
                    immediate then +/– 0 to 7 are available. If specifying an index
                    register then it must be in the same Address sub-unit as the Address Note
                    that if register modify is specified then this will happen unconditionally.
                    Only the actual load is conditional. In addition to the normal condition
                    codes the condition "never" is also available. This allows Address
                    register modify but without loading a register.register.
Status Bits     N - Unaffected.
                    C - Unaffected.
                    V - Unaffected.
                    Z - Unaffected.
M Bits     Unaffected
Examples Left-most 1                                                                          LM1
Syntax     LM1     src,dst
Operation     bit number of left-most 1 in src→dst
Operands D,D        With parallel transfers
    any,any     No parallel transfers Routing

```
                                              A    B C   D E
                                              |    | |   | |
        A   B   C   D   E                     └─>  B.S. |+|
        ─   ─   ─   ─   ─                          -| | |
        0  src  0   —   —                          ALU MPY
                                                    |   |
```

Encoding     31       27     22   19   16       11       8       5        0

| 0 0 0 0 | ..... | src | dst | Parallel transfers |

| 0 0 0 0 | ..... | src | dst | 0 0 0 0 0 | scde | dcde | 0 0 0 | 0 0 0 |

Description     The bit number of the left-most 1 in src is loaded into dst.
Status Bits     N - Unaffected.
                    C - Unaffected.
                    V - Unaffected.
                    Z - 1 if src contained all zeros, 0 otherwise.
M Bits     Unaffected
Examples D to D Register Move                                                 MOV
Syntax     MOV     src,dst
Operation     src→dst
Operands D,D     With parallel transfers Routing

```
                                              A    B C   D E
                                              |    | |   | |
        A   B   C   D   E                     └─>  B.S. |+|
        ─   ─   ─   ─   ─                          -| | |
        —  src  —   —   —                          ALU MPY
                                                    |   |
```

APPENDIX-continued

Encoding

| 31 | 27 | 22 | 19 | 16 | 0 |
|---|---|---|---|---|---|
| 0000 | ..... | src | dst | Parallel transfers | |

Description  Any D register src is moved to any D register dst.
Status Bits  N - 1 if src is negative, 0 otherwise
             C - Unaffected.
             V - Unaffected.
             Z - 1 if src in zero, 0 otherwise
M Bits       Unaffected
Examples Conditional Move                                                    MOVcond
Syntax       MOVcond   src,dst
Operation    src conditionally→dst
Operands
             cond any,any   No parallel Data Unit operation.

Encoding

| 31 | 27 | 23 22 21 | 18 | 16 | 11 | 8 | 5 | 2 | 0 |
|---|---|---|---|---|---|---|---|---|---|
| 0110 | cond. | 0 N 000 | 00 | 01010 | scde | dcde | src | dst | |

Description  This instruction will conditionally move any register src to any other
             register dst.
Status Bits  N - Unaffected.
             C - Unaffected.
             V - Unaffected.
             Z - Unaffected.
M Bits       Unaffected
Examples Signed Multiply                                                     MPY
Syntax       MPY   src1,src2,dst
Operation    src1 × src2→dst
Operands
             D,D,D        With parallel transfers
             any,D,any    No parallel transfers
             D,any,any    No parallel transfers
             D,I,D        No parallel transfers
             any,I,src1   No parallel transfers Routing

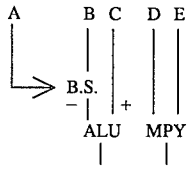

| A | B | C | D | E |
|---|---|---|---|---|
| — | — | — | src1 | src2 |

Encoding

| 31 30 | 27 | 22 | 19 | 16 | 11 | 8 | 5 | 2 | 0 |
|---|---|---|---|---|---|---|---|---|---|
| 1 src2 | ..... | src1 | dst | Parallel transfers | | | | | |
| 1 src2 | ..... | src1 | dst | 00000 | scde1 | dcde | scde2 | 000 | |
| 0111 | ..... | src1 | dst | H | 16 bit immediate | | | | |
| 0011 | ..... | code | dst | H | 16 bit immediate | | | | |

Description  The 32-bit product of the signed 16 LS bits of src1 and the signed 16 LS
             bits of src2 is loaded into dst. The immediate is assumed to be a signed 16-
             bit quantity.
Status Bits  N - 1 if negative result generated, 0 otherwise.
             C - Unaffected
             V - Unaffected
             Z - 1 if zero result generated, 0 otherwise.
M Bits       Unaffected
Examples Unsigned Multiply                                                   MPYU
Syntax       MPYU  src1,src2,dst
Operation    src1 × src2→dst
Operands
             D,D,D        With parallel transfers
             any,D,any    No parallel transfers
             D,any,any    No parallel transfers APPENDIX-continued

| | | |
|---|---|---|
| D,I,D | No parallel transfers | |
| any,I,src1 | No parallel transfers | |

Routing

```
                                    A    B  C   D E
                                    |    |  |   | |
 A    B    C    D     E             └─→ B.S.   | |
 ─    ─    ─   src1  src2               ─|  |+ | |
                                         ALU  MPY
                                         |    |
```

Encoding  31   27   22   19  16                                0

| 1 | src2 | ..... | src1 | dst | Parallel transfers | | | |
|---|------|-------|------|-----|--------------------|---|---|---|
| 1 | src2 | ..... | src1 | dst | 00000 | scde1 | dcde | scde2 | 000 |
| 0 1 1 1 | ..... | | src1 | dst | H | 16 bit immediate | | | |
| 0 0 1 1 | ..... | | code | dst | H | 16 bit immediate | | | |

Description   The 32-bit product of the unsigned 16 LS bits of src1 and the unsigned 16
              LS bits of src2 is loaded into dst. The immediate is assumed to be an
              unsigned 16-bit quantity.
Status Bits   N - Unaffected
              C - Unaffected
              V - Unaffected
              Z - 1 if zero result generated, 0 otherwise.
M Bits        Unaffected
Examples Multiply with Parallel Add                                            MPY||ADD
Syntax     MPY    src1,src2,dst1||ADD src3,dst2
Operation  src1 × src2→dst1,dst2 + src3→dst2
Operands
           D4–7,D0–3,D2–5,D0–3,D2–5   With parallel transfers Routing

```
                                    A    B  C   D E
                                    |    |  |   | |
 A    B    C    D     E             └─→ B.S.   | |
 0   src3  dst2  src1  src2              ─|  |+ | |
                                         ALU  MPY
                                         |    |
```

Encoding  31      2726  24  22  20  18  16                     0

| 1 1 0 0 | 0 | sc3 | ds2 | sc1 | sc2 | ds1 | Parallel transfers |
|---------|---|-----|-----|-----|-----|-----|--------------------|

Description   The 32-bit product of the signed 16 LS bits of src1 and the signed 16 LS
              bits of src2 is loaded into dst1. In parallel, the sum of src3 and dst2 is
              generated and loaded into dst2. Status bits are set according to the add
              result. The register range of the operands is subject to revision.
Status Bits   N - 1 if negative result generated, 0 otherwise.
              C - 1 if carry occurs, 0 otherwise
              V - 1 if overflow occurs, 0 otherwise
              Z - 1 if zero result generated, 0 otherwise.
M Bits        Unaffected
Examples Multiply with Parallel Shift and Add                                  MPY||SADD
Syntax     MPY    src1,src2,dst1||SADD src3,dst2
Operation  src1 × src2→dst1,dst2 + (src3 shifted by predefined amount)→dst2
Operands
           D4–7,D0–3,D2–5,D0–3,D2–5   With parallel transfers Routing

```
                                    A    B  C   D E
                                    |    |  |   | |
 A    B    C    D     E             └─→ B.S.   | |
pre  src3  dst2  src1  src2              ─|  |+ | |
                                         ALU  MPY
                                         |    |
```

APPENDIX-continued

Encoding

| 31 | 2726 | 24 | 22 | 20 | 18 | 16 | 0 |
|---|---|---|---|---|---|---|---|
| 1 1 0 1 | 1 | sc3 | ds2 | sc1 | sc2 | ds1 | Parallel transfers |

Description  The 32-bit product of the signed 16 LS bits of src1 and the signed 16 LS
bits of src2 is loaded into dst1. In parallel, src3, shifted by a predetermined
shift amount contained in the OPTIONS register, is added to dst2. The
result is loaded into dst2. Status bits are set according to the add result.
The register range of the operands is subject to revision.

Status Bits  N - 1 if negative result generated, 0 otherwise.
C - 1 if carry occurs, 0 otherwise
V - 1 if overflow occurs, 0 otherwise
Z - 1 if zero result generated, 0 otherwise.

M Bits  Unaffected

Examples

Multiply with Parallel Shift and Subtract                                MPY‖SSUB
Syntax      MPY    src1,src2,dst1‖SSUB src3,dst2
Operation   src1 × src2→dst1,dst2 − (src3 shifted by predefined amount)→dst2
Operands
            D4–7,D0–3,D2–5,D0–3,D2–5   With parallel transfers Routing

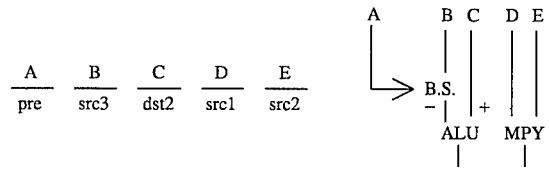

Encoding

| 31 | 2726 | 24 | 22 | 20 | 18 | 16 | 0 |
|---|---|---|---|---|---|---|---|
| 1 1 0 1 | 1 | sc3 | ds2 | sc1 | sc2 | ds1 | Parallel transfers |

Description  The 32-bit product of the signed 16 LS bits of src1 and the signed 16 LS
bits of src2 is loaded into dst1. In parallel, src3, shifted by a predetermined
shift amount contained in the OPTIONS register, is subtracted from dst2.
The result is loaded into dst2. Status bits are set according to the subtract
result. The register range of the operands is subject to revision.

Status Bits  N - 1 if negative result generated, 0 otherwise.
C - 1 if carry occurs, 0 otherwise
V - 1 if overflow occurs, 0 otherwise
Z - 1 if zero result generated, 0 otherwise.

M Bits  Unaffected

Examples

Multiply with Parallel Subtract                                         MPY‖SUB
Syntax      MPY    src1,src2,dst1‖SUB src3,dst2
Operation   src1 × src2→dst1,dst2 − src3→dst2
Operands
            D4–7,D0–3,D2–5,D0–3,D2–5   With parallel transfers Routing

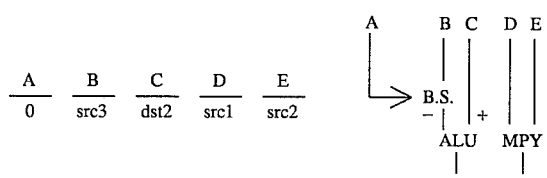

Encoding

| 31 | 2726 | 24 | 22 | 20 | 18 | 16 | 0 |
|---|---|---|---|---|---|---|---|
| 1 1 0 0 | 0 | sc3 | ds2 | sc1 | sc2 | ds1 | Parallel transfers |

Description  The 32-bit product of the signed 16 LS bits of src1 and the signed 16 LS
bits of src2 is loaded into dst1. In parallel, the src3 is subtracted from dst2
and the result loaded into dst2. Status bits are set according to the subtract
result. The register range of the operands is subject to revision.

Status Bits  N - 1 if negative result generated, 0 otherwise.
C - 1 if carry occurs, 0 otherwise
V - 1 if overflow occurs, 0 otherwise
Z - 1 if zero result generated, 0 otherwise.

M Bits  Unaffected

APPENDIX-continued

Examples

Merge Multiple bytes/half-words                                                                 MRGM
Syntax       MRGM    src1,src2,dst
Operation    src1 <merge> src2→dst
Operands
             D,D,D         With parallel transfers
             any,D,any     No parallel transfers
             D,any,any     No parallel transfers
             D,I,D         No parallel transfers
             any,I,src1    No parallel transfers Routing

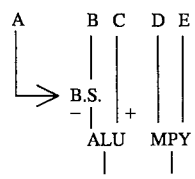

Encoding

| 31 30 | 27 | 22 | 19 | 16 15 | 11 | 8 | 5 | 2 | 0 |
|---|---|---|---|---|---|---|---|---|---|
| 1 src2 | ..... | src1 | dst | Parallel transfers ||||||
| 1 src2 | ..... | src1 | dst | 0 0 0 0 0 | scde1 | dcde | scde2 | 0 0 0 ||
| 0 1 1 1 | ..... | src1 | dst | H | 16 bit immediate |||||
| 0 0 1 1 | ..... | code | dst | H | 16 bit immediate |||||

Description   The ALU bits in the OPTIONS register are used to split the ALU into
              four seperate bytes, two seperate half-words, or one word. The 4, 2 or 1
              least-significant M bits respectively are used to multiplex the individual
              portions of src1 and src2 into dst. Where an M bit is a 1 the portion of the
              result comes from src2, and where the M bit is a 0 the portion of the result
              comes from src1. The immediate is assumed to be unsigned, and can be
              either the high or low half-word.
Status Bits   N - Unaffected
              C - Unaffected
              V - Unaffected
              Z - 1 if zero result generated, 0 otherwise.
M Bits        Unaffected
Examples NAND                                                                                            NAND
Syntax       NAND    src1,src2,dst
Operation    src1 NAND src2→dst
Operands
             D,D,D         With parallel transfers
             any,D,any     No parallel transfers
             D,any,any     No parallel transfers
             D,I,D         No parallel transfers
             any,I,src1    No parallel transfers Routing

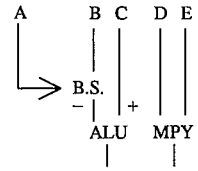

Encoding

| 31 30 | 27 | 22 | 19 | 16 15 | 11 | 8 | 5 | 2 | 0 |
|---|---|---|---|---|---|---|---|---|---|
| 1 src2 | ..... | src1 | dst | Parallel transfers ||||||
| 1 src2 | ..... | src1 | dst | 0 0 0 0 0 | scde1 | dcde | scde2 | 0 0 0 ||
| 0 1 1 1 | ..... | src1 | dst | H | 16 bit immediate |||||
| 0 0 1 1 | ..... | code | dst | H | 16 bit immediate |||||

Description   The NAND of src1 and src2 is loaded into dst. The immediate can be
              either the high or low half-word.
Status Bits   N - Unaffected
              C - Unaffected
              V - Unaffected
              Z - 1 if zero result generated, 0 otherwise.

APPENDIX-continued

| | |
|---|---|
| M Bits | Unaffected |
| Examples | |

Negate                                                                                                 NEG

| | | |
|---|---|---|
| Syntax | NEG src,dst | |
| Operation | 2s complement of src→dst | |
| Operands | | |
| | D,D | With parallel transfers |
| | any,any | No parallel transfers |

Routing

```
                                    A       B C   D E
                                    |       | |   | |
   A    B    C    D    E            └─> B.S.| |   | |
   ─   ───   ─   ───  ───                 ─ | +   | |
   0   src   0    —    —                 ALU    MPY
                                          |      |
```

Encoding

| 31 | 27 | 22 | 19 | 16 | 11 | 8 | 5 | 2 | 0 |
|---|---|---|---|---|---|---|---|---|---|
| 0000 | ..... | src | dst | Parallel transfers | | | | | |
| 0000 | ..... | src | dst | 00000 | scde | dcde | 000 | 000 | |

| | |
|---|---|
| Description | The 2s complement of src is loaded into dst. |
| Status Bits | N - 1 if negative result generated, 0 otherwise. |
| | C - 1 if a borrow occurs, 0 otherwise. |
| | V - 1 if an overflow occurs, 0 otherwise. |
| | Z - 1 if zero result generated, 0 otherwise. |
| M Bits | Unaffected |
| Examples | |

Negate with Borrow                                                          NEGB

| | | |
|---|---|---|
| Syntax | NEGB src,dst | |
| Operation | (2s complement of src) − C→dst | |
| Operands | | |
| | D,D | With parallel transfers |
| | any,any | No parallel transfers |

Routing

```
                                    A       B C   D E
                                    |       | |   | |
   A    B    C    D    E            └─> B.S.| |   | |
   ─   ───   ─   ───  ───                 ─ | +   | |
   0   src   0    —    —                 ALU    MPY
                                          |      |
```

Encoding

| 31 | 27 | 22 | 19 | 16 | 11 | 8 | 5 | 2 | 0 |
|---|---|---|---|---|---|---|---|---|---|
| 0000 | ..... | src | dst | Parallel transfers | | | | | |
| 0000 | ..... | src | dst | 00000 | scde | dcde | 000 | 000 | |

| | |
|---|---|
| Description | The 2s complement of src is decremented by 1 if the carry bit is set, and the result is loaded into dst. |
| Status Bits | N - 1 if negative result generated, 0 otherwise. |
| | C - 1 if a borrow occurs, 0 otherwise. |
| | V - 1 if an overflow occurs, 0 otherwise. |
| | Z - 1 if zero result generated, 0 otherwise. |
| M Bits | Unaffected |
| Examples | |

NOP                                                                                                        NOP

| | |
|---|---|
| Syntax | NOP |
| Operation | No operation |
| Operands | None |

Encoding

| 31 | 27 | | 16 | 11 | | 0 |
|---|---|---|---|---|---|---|
| 0110 | XXXXXXXXXXX | | 00000 | XXXXXXXXXXX | | |

| | |
|---|---|
| Description | No operation. It is actually coded as a conditional transfer, but where the transfer is the operand qualifier for a data unit. Only the indicated bits are decoded, the rest are don't care. |
| Status Bits | N - Unaffected. |

APPENDIX-continued

```
             C - Unaffected.
             V - Unaffected.
             Z - Unaffected.
M Bits       Unaffected
Examples
```

NOR

```
Syntax       NOR    src1,src2,dst
Operation    src1 NOR src2→dst
Operands
             D,D,D          With parallel transfers
             any,D,any      No parallel transfers
             D,any,any      No parallel transfers
             D,I,D          No parallel transfers
             any,I,src1     No parallel transfers
```

Routing

```
A    B      C    D    E              A     B  C   D E
―    ――     ――   ―    ―                    │  │   │ │
0    src2   src1 ―    ―              └─► B.S.│   │ │
                                          ─ │  + │ │
                                          ALU   MPY
                                           │     │
```

Encoding  31 30   27   22   19 16 15   11   8   5   2   0

| 1 | src2 | ..... | src1 | dst | Parallel transfers |     |       |     |
|---|------|-------|------|-----|--------------------|-----|-------|-----|
| 1 | src2 | ..... | src1 | dst | 0 0 0 0 0 | scde1 | dcde | scde2 | 0 0 0 |

| 0 1 1 1 | ..... | src1 | dst | H | 16 bit immediate |
| 0 0 1 1 | ..... | code | dst | H | 16 bit immediate |

Description  The NOR of src1 and src2 is loaded into dst. The immediate can be either
             the high or low half-word.
Status Bits  N - Unaffected
             C - Unaffected
             V - Unaffected
             Z - 1 if zero result generated, 0 otherwise.
M Bits       Unaffected
Examples

NOT

```
Syntax       NOT    src,dst
Operation    (NOT src)→dst
Operands
             D,D       With parallel transfers
             any,any   No parallel transfers
```

Routing

```
A    B    C    D    E                A     B  C   D E
―    ――   ―    ―    ―                      │  │   │ │
0    src  0    ―    ―                └─► B.S.│   │ │
                                          ─ │  + │ │
                                          ALU   MPY
                                           │     │
```

Encoding  31      27    22   19   16   11   8   5   2   0

| 0 0 0 0 | ..... | src | dst | Parallel transfers |     |     |     |
|---------|-------|-----|-----|--------------------|-----|-----|-----|
| 0 0 0 0 | ..... | src | dst | 0 0 0 0 0 | scde | dcde | 0 0 0 | 0 0 0 |

Description  The 1s complement of src is loaded into dst.
Status Bits  N - Unaffected.
             C - Unaffected.
             V - Unaffected.
             Z - 1 if zero result generated, 0 otherwise.
M Bits       Unaffected
Examples

Number of 1s                                                              NUM1
Syntax       NUM1   src,dst
Operation    the number of 1s in src→dst APPENDIX-continued Operands
    D,D    With parallel transfers
    any,any    No parallel transfers Routing

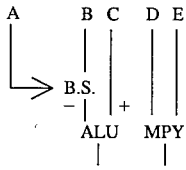

| A | B | C | D | E |
|---|---|---|---|---|
| 0 | src | 0 | — | — |

Encoding    31    27    22    19    16    11    8    5    2    0

| 0 0 0 0 | ..... | src | dst | Parallel transfers | | | |
|---------|-------|-----|-----|--------|------|-----|-----|
| 0 0 0 0 | ..... | src | dst | 0 0 0 0 0 | scde | dcde | 0 0 0 | 0 0 0 |

Description    The number of 1s within src is counted and the result is loaded into dst.
Status Bits    N - Unaffected.
                C - Unaffected.
                V - Unaffected.
                Z - 1 if src contained all zeros, 0 otherwise.
M Bits    Unaffected
Examples OR                                                                                                                                                  OR
Syntax    OR    src1,src2,dst
Operation    src1 OR src2→dst
Operands
    D,D,D    With parallel transfers
    any,D,any    No parallel transfers
    D,any,any    No parallel transfers
    D,I,D    No parallel transfers
    any,I,src1    No parallel transfers Routing

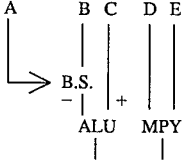

| A | B | C | D | E |
|---|---|---|---|---|
| 0 | src2 | src1 | — | — |

Encoding    31 30    27    22    19    16 15    11    8    5    2    0

| 1 | src2 | ..... | src1 | dst | Parallel transfers | | | |
|---|------|-------|------|-----|--------|-------|------|-----|
| 1 | src2 | ..... | src1 | dst | 0 0 0 0 0 | scde1 | dcde | scde2 | 0 0 0 |
| 0 1 1 1 | | ..... | src1 | dst | H | 16 bit immediate | | | |
| 0 0 1 1 | | ..... | code | dst | H | 16 bit immediate | | | |

Description    The OR of src1 and src2 is loaded into dst. The immediate can be either
                the high or low half-word.
Status Bits    N - Unaffected
                C - Unaffected
                V - Unaffected
                Z - 1 if zero result generated, 0 otherwise.
M Bits    Unaffected
Examples OR with Complement                                                                       ORN
Syntax    ORN    src1,src2,dst
Operation    src1 OR (NOT src2)→dst
Operands
    D,D,D    With parallel transfers
    any,D,any    No parallel transfers
    D,any,any    No parallel transfers
    D,I,D    No parallel transfers
    any,I,src1    No parallel transfers

APPENDIX-continued

Routing

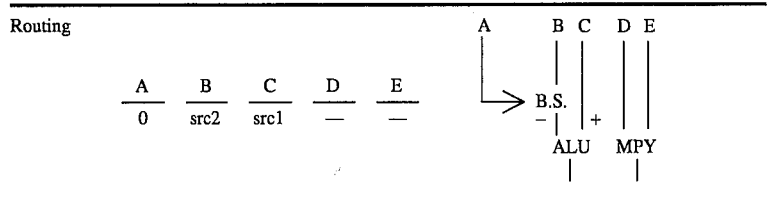

Encoding

| 31 30 | 27 | 22 | 19 | 16 15 | 11 | 8 | 5 | 2 | 0 |
|---|---|---|---|---|---|---|---|---|---|
| 1 | src2 | ..... | src1 | dst | Parallel transfers ||||||
| 1 | src2 | ..... | src1 | dst | 0 0 0 0 0 | scde1 | dcde | scde2 | 0 0 0 |
| 0 1 1 1 | ..... | src1 | dst | H | 16 bit immediate |||||
| 0 0 1 1 | ..... | code | dst | H | 16 bit immediate |||||

Description   The OR of src1 with the 1s complement of src2 is loaded into dst. The immediate can be either the high or low half-word.

Status Bits   N - Unaffected
C - Unaffected
V - Unaffected
Z - 1 if zero result generated, 0 otherwise.

M Bits   Unaffected

Examples

Conditional POP                                                                 POPcond Syntax   POPcond   dst
Operation   *A7(1 + m) conditionally→dst
Operands cond <Mn,Qn,Cn,Ln>   No parallel Data Unit operation.

Encoding   31   27   23 22 21   18   16 15   11 10   8   5   2   0

| 0 1 1 0 | cond. | 0 | N | 0 0 0 | 0 0 | 0 | 1 0 0 0 | 0 | cde | 1 1 1 | dst | 0 0 1 |

Description   This instruction will conditionally POP from the stack into a Mn, Qn, Cn or Ln register. (Note that the assembler may support POPs to the other registers which can be supported with the normal LDcond instruction). The stack pointer A7 is post-incremented. Note that the Stack Pointer is unconditionally modified. Only the register load is conditional. In addition to the normal condition codes the condition "never" is also available. This allows the Stack Pointer to be incremented without actually popping into a register.

Status Bits   N - Unaffected.
C - Unaffected.
V - Unaffected.
Z - Unaffected.

M Bits   Unaffected

Examples

Push Return Address                                                             PRET Syntax   PRET
Operation   {I RET {s.} *A7(−1m) conditionally)
Operands
none   No parallel Data Unit operation.

Encoding   31   27   23   16   11   8   5   2   0

| 0 1 1 0 | uncond. | 0 0 0 0 0 0 0 | 0 0 0 1 0 | 0 0 1 | 1 1 1 | 0 1 1 | 0 0 1 |

Description   The value within the RET register is pushed onto the stack if the PC was loaded by either of the two previous instructions. This allows conditional calls to be supported. Theoretically this opcode format allows conditional conditional pushes of RET, but this won't be supported by the assembler.

Status Bits   N - Unaffected.
C - Unaffected.
V - Unaffected.
Z - Unaffected.

M Bits   Unaffected

Examples

Conditional PUSH                                                                PUSHcond Syntax   PUSHcond   src
Operation   src conditionally→*A7(−1m)

APPENDIX-continued

Operands  
    cond <Mn,Qn,Cn,Ln  No parallel Data Unit operation.

Encoding    31   27    232221   18   1615    1110   8     5   2   0

| 0 1 1 0 | cond. | 0 | N | 0 0 0 | 0 0 | 0 | 1 0 0 0 | 1 | cde | 1 1 1 | dst | 0 0 1 |

Description  This instruction will conditionally PUSH from a Mn, Qn, Cn or Ln register to the stack. (Note that the assembler may support PUSHs of the other registers which can be supported with the normal STcond instruction). The stack pointer A7 is pre-decremented. Note however that the Stack Pointer is unconditionally modified. Only the register store is conditional. In addition to the normal condition codes the condition "never" is also available. This allows the Stack Pointer to be incremented without actually pushing anything onto the stack.

Status Bits  N - Unaffected.  
    C - Unaffected.  
    V - Unaffected.  
    Z - Unaffected.  
M Bits  Unaffected  
Examples Right-most 1                                                                                                     RM1  
Syntax  RM1  src,dst  
Operation  bit number of right-most 1 in src→dst  
Operands D,D    With parallel transfers  
    any,any  No parallel transfers Routing

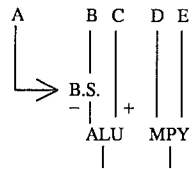

Encoding    3130   27   22  19  16      11      8     5    2  0

| 0 0 0 0 | ..... | src | dst | Parallel transfers |
| 0 0 0 0 | ..... | src | dst | 0 0 0 0 0 | scde | dcde | 0 0 0 | 0 0 0 |

Description  The bit number of the right-most 1 in src is loaded into dst.  
Status Bits  N - Unaffected.  
    C - Unaffected.  
    V - Unaffected.  
    Z - 1 if src contained all zeros, 0 otherwise.  
M Bits  Unaffected  
Examples Rotate                                                                                                     ROT  
Syntax  ROT  src1,src2,dst  
Operation  src1 rotated left by amount in src2→dst  
Operands D,D,D       With parallel transfers  
    any,D,any   No parallel transfers  
    D,any,any   No parallel transfers  
    D,I,D       No parallel transfers  
    any,I,src1  No parallel transfers Routing

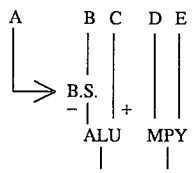

APPENDIX-continued

Encoding

| 3130 | 27 | 22 | 19 | 1615 | 11 | 8 | 5 | 2 | 0 |
|---|---|---|---|---|---|---|---|---|---|
| 1 src2 | ..... | src1 | dst | Parallel transfers | | | | | |
| 1 src2 | ..... | src1 | dst | 0 0 0 0 0 | scde1 | dcde | scde2 | 0 0 0 | |
| 0 1 1 1 | ..... | src1 | dst | H | 16 bit immediate | | | | |
| 0 0 1 1 | ..... | code | dst | H | 16 bit immediate | | | | |

Description   src1 is left-rotated by the amount in the least-significant 5 bits of src2. The result is loaded into dst. Only the least-significant 5 bits of the immediate are significant.
Status Bits   N - Unaffected
C - Set to the last value roated out. 0 if rotated by 0.
V - Unaffected
Z - 1 if zero result generated, 0 otherwise.
M Bits   Unaffected
Examples Shift and Add                                                                                                          SADD
Syntax        SADD   src1,src2,dst
Operation     src1 + (src2 shifted by pre-defined amount)→dst
Operands
              D,D,D        With parallel transfers
              any,D,any    No parallel transfers
              D,any,any    No parallel transfers
              D,I,D        No parallel transfers
              any,I,src1   No parallel transfers Routing

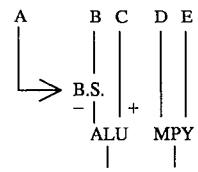

| A | B | C | D | E |
|---|---|---|---|---|
| pre | src2 | src1 | — | — |

Encoding

| 3130 | 27 | 22 | 19 | 1615 | 11 | 8 | 5 | 2 | 0 |
|---|---|---|---|---|---|---|---|---|---|
| 1 src2 | ..... | src1 | dst | Parallel transfers | | | | | |
| 1 src2 | ..... | src1 | dst | 0 0 0 0 0 | scde1 | dcde | scde2 | 0 0 0 | |
| 0 1 1 1 | ..... | src1 | dst | H | 16 bit immediate | | | | |
| 0 0 1 1 | ..... | code | dst | H | 16 bit immediate | | | | |

Description   src2 is shifted by the pre-defined shift amount in the OPTIONS register. This is then added to src1 and the result loaded into dst. The immediate is assumed to be unsigned, and before shifting, can be either the high or low half-word.
Status Bits   N - 1 if negative result generated, 0 otherwise.
C - 1 if a carry occurs, 0 otherwise.
V - 1 if an overflow occurs, 0 otherwise.
Z - 1 if zero result generated, 0 otherwise.
M Bits   Unaffected
Examples Set Bit                                                                                                                 SETB
Syntax        SETB   src1,src2,dst
Operation     src1[src2] := 1, src1'→dst
Operands
              D,D,D        With parallel transfers
              any,D,any    No parallel transfers
              D,any,any    No parallel transfers
              D,I,D        No parallel transfers
              any,I,src1   No parallel transfers Routing

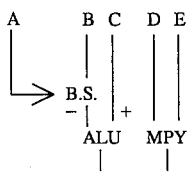

| A | B | C | D | E |
|---|---|---|---|---|
| src2 | 1 | src1 | — | — |

APPENDIX-continued

Encoding

| 3130 | 27 | 22 | 19 | 1615 | 11 | 8 | 5 | 2 | 0 |
|---|---|---|---|---|---|---|---|---|---|
| 1 src2 | ..... | | src1 | dst | Parallel transfers | | | | |
| 1 src2 | ..... | | src1 | dst | 0 0 0 0 0 | scde1 | dcde | scde2 | 0 0 0 |
| 0 1 1 1 | ..... | | src1 | dst | H | 16 bit immediate | | | |
| 0 0 1 1 | ..... | | code | dst | H | 16 bit immediate | | | |

Description  The bit within src1 pointed to by the least-significant 5-bits of src2 is set to one. The result is loaded into dst. Only the least-significant 5 bits of the immediate are significant.
Status Bits  N - Unaffected
C - Unaffected
V - Unaffected
Z - Set to 0?
M Bits  Unaffected
Examples Shift Left (Logical)                                                                 SL
Syntax       SL  src1,src2,dst
Operation    src1 shifted left by src2, 0 fill→dst
Operands
             D,D,D        With parallel tranfers
             any,D,any    No parallel transfers
             D,any,any    No parallel transfers
             D,I,D        No parallel transfers
             any,I,src1   No parallel transfers Routing

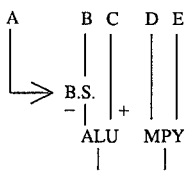

Encoding

| 3130 | 27 | 22 | 19 | 1615 | 11 | 8 | 5 | 2 | 0 |
|---|---|---|---|---|---|---|---|---|---|
| 1 src2 | ..... | | src1 | dst | Parallel transfers | | | | |
| 1 src2 | ..... | | src1 | dst | 0 0 0 0 0 | scde1 | dcde | scde2 | 0 0 0 |
| 0 1 1 1 | ..... | | src1 | dst | H | 16 bit immediate | | | |
| 0 0 1 1 | ..... | | code | dst | H | 16 bit immediate | | | |

Description  src1 is shifted left by the amount indicated in the least-significant 5 bits of src2. The least-significant bits are zero filled. The result is loaded into dst. Only the least-significant 5 bits of the immediate are significant.
Status Bits  N - Unaffected
C - Set to the last value shifted out. 0 if shift amount was 0.
V - Unaffected
Z - 1 if zero result generated, 0 otherwise.
M Bits  Unaffected
Examples Shift Right Arithmetic                                                               SRA
Syntax       SRA src1,src2,dst
Operation    src1 shifted right by src2, sign extended→dst
Operands
             D,D,D        With parallel transfers
             any,D,any    No parallel transfers
             D,any,any    No parallel transfers
             D,I,D        No parallel transfers
             any,I,src1   No parallel transfers Routing

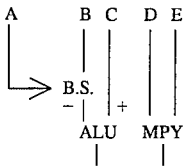

APPENDIX-continued

Encoding

| 3130 | 27 | 22 | 19 | 1615 | 11 | 8 | 5 | 2 | 0 |
|---|---|---|---|---|---|---|---|---|---|
| 1 src2 | ..... | src1 | dst | Parallel transfers | | | | | |
| 1 src2 | ..... | src1 | dst | 0 0 0 0 0 | scde1 | dcde | scde2 | 0 0 0 | |
| 0 1 1 1 | ..... | src1 | dst | H | 16 bit immediate | | | | |
| 0 0 1 1 | ..... | code | dst | H | 16 bit immediate | | | | |

Description    src1 is shifted right by the amount indicated in the least-significant 5 bits of src2. The sign-bit is copied into the most-significant bits. The result is loaded into dst. Only the least-significant 5 bits of the immediate are significant.

Status Bits
N - 1 if negative result generated, 0 otherwise.
C - Set to the last value shifted out. 0 if shift amount was 0.
V - Unaffected
Z - 1 if zero result generated, 0 otherwise.

M Bits    Unaffected

Examples

Shift Right Logical    SRL
Syntax    SRL    src1,src2,dst
Operation    src1 shifted right by src2, 0 fill→dst
Operands
    D,D,D    With parallel transfers
    any,D,any    No parallel transfers
    D,any,any    No parallel transfers
    D,I,D    No parallel transfers
    any,I,src1    No parallel transfers Routing

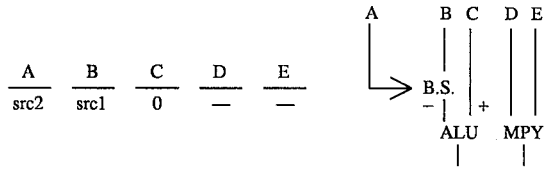

Encoding

| 3130 | 27 | 22 | 19 | 1615 | 11 | 8 | 5 | 2 | 0 |
|---|---|---|---|---|---|---|---|---|---|
| 1 src2 | ..... | src1 | dst | Parallel transfers | | | | | |
| 1 src2 | ..... | src1 | dst | 0 0 0 0 0 | scde1 | dcde | scde2 | 0 0 0 | |
| 0 1 1 1 | ..... | src1 | dst | H | 16 bit immediate | | | | |
| 0 0 1 1 | ..... | code | dst | H | 16 bit immediate | | | | |

Description    src1 is shifted right by the amount indicated in the least-significant 5 bits of src2. The most-significant bits are zero filled. The result is loaded into dst. Only the least-significant 5 bits of the immediate are significant.

Status Bits
N - Unaffected
C - Set to the last value shifted out. 0 if shift amount was 0.
V - Unaffected
Z - 1 if zero result generated, 0 otherwise.

M Bits    Unaffected

Examples

Shift and Subtract
Syntax    SSUB    src1,src2,dst
Operation    src1 − (src2 shifted by pre-defined amount)→dst
Operands
    D,D,D    With parallel transfers
    any,D,any    No parallel transfers
    D,any,any    No parallel transfers
    D,I,D    No parallel transfers
    any,I,src1    No parallel transfers APPENDIX-continued Routing

```
                                A   B C  D E
  A     B     C    D    E       │   │ │  │ │
 ───   ───   ───   ─    ─       └─> B.S.
 pre   src2  src1                   -│ │+
                                   ALU MPY
```

Encoding

| 31 30 | 27 | 22 | 19 | 16 15 | 11 | 8 | 5 | 2 | 0 |
|---|---|---|---|---|---|---|---|---|---|
| 1 | src2 | ..... | src1 | dst | Parallel transfers ||||
| 1 | src2 | ..... | src1 | dst | 0 0 0 0 0 | scde1 | dcde | scde2 | 0 0 0 |
| 0 1 1 1 | ..... | src1 | dst | H | 16 bit immediate ||||
| 0 0 1 1 | ..... | code | dst | H | 16 bit immediate ||||

Description   src2 is shifted by the pre-defined shift amount in the OPTIONS register.
              This is then subtracted from src1 and the result loaded into dst. The
              immediate is assumed to be unsigned, and before shifting, can be either the
              high or low half-word.
Status Bits   N - 1 if negative result generated, 0 otherwise.
              C - 1 if a carry occurs, 0 otherwise.
              V - 1 if an overflow occurs, 0 otherwise.
              Z - 1 if zero result generated, 0 otherwise.
M Bits        Unaffected
Examples Conditional Store
Syntax      STcond    dst,*An(mode)
Operation   src conditionally→*dst
Operands
            cond A0–A7(mode{g },<Dn,An,Xn,Pn> )   No parallel Data Unit
                                                  operation.
            Addressing modes   pre- or post-indexing
                               +/– 3 bit immediate or +/– an indeX register
                               modify Address register, or leave unaltered Encoding

| 31 | 27 | 23 22 21 | 18 | 16 15 | 11 10 | 8 | 5 | 2 | 0 |
|---|---|---|---|---|---|---|---|---|---|
| 0 1 1 0 | cond. | 0 N 0 0 0 | 0 0 0 | mod | 1 cde | A | dst | Imm/X ||

Description   This instruction will conditionally store a Dn, An, Zn or Pn register to an
              indirect address generated from any Address register. (Mn, Qn, Cn or Ln
              cannot be directly stored to memory except with a PUSH instruction). If
              specifying an immediate then +/– 0 to 7 are available. If specifying an
              index register then it must be in the same Address sub-unit as the Address
              register. If the address is non-aligned, then this will store only the lower
              byte(s). Note that if a register modify is specified then this will happen
              unconditionally. Only the actual store is conditional. In addition to the
              normal condition codes the condition "never" is also available. This allows
              Address register modify but without storing a register.
Status Bits   N - Unaffected.
              C - Unaffected.
              V - Unaffected.
              Z - Unaffected.
M Bits        Unaffected
Examples Conditional Store & Load
Syntax      STcond    src1,*Am(mode)|LD    *An(mode),dst2
Operation   {I src1 conditionally {s.} *dst1, *src2 conditionally→dst2}
Operands
            cond Dm,A0–A3(mode{g }  A4–A7(mode),Dn )   No parallel Data Unit
                                                       operation.
            Addressing modes   post-increment by 1 with Address register modify
                               pre-decrement by 1 with Address register modify
                               post-increment by A reg's associated indeX register
                                 with Address register modify
                               indirect without indexing Encoding

| 31 | 27 | 23 22 21 | 18 | 16 15 | 11 10 | 8 | 5 | 2 | 0 |
|---|---|---|---|---|---|---|---|---|---|
| 0 1 1 0 | cond. | 0 N 0 0 0 | 0 0 1 | mdg mdl | 1 A47 | 0 A03 | Dg | Dl ||

APPENDIX-continued

| | |
|---|---|
| Description | This instruction will conditionally store src1 via the Global bus to an indirect address generated from an Address register in the Global sub-unit (A0–A3). In parallel with this it will conditionally (sum condition) load dst2 via the Local bus from an indirect address generated from an Address register in the Local sub-unit (A4–A7). Indirect, post-increment by 1, pre-decrement by 1 and post-increment by X addressing modes are supported independantly on the two buses. The indeX register(s) used have the same subscript(s) as the Address register(s). src1 and dst2 must be D registers. Note that if register modifies are specified then these will happen unconditionally. Only the actual store and load are conditional. In addition to the normal condition codes the condition "never" is also available. This allows Address register modifies but without loading or storing anything. |
| Status Bits | N - Unaffected.<br>C - Unaffected.<br>V - Unaffected.<br>Z - Unaffected. |
| M Bits | Unaffected |
| Examples | |

Conditional Store & Store
Syntax     STcond     src1,*Am(mode)||ST     src2,*An(mode)
Operation     {I src1 conditionally {s.} *dst1, src2 conditionally {s.} *dst2}
Operands cond Dm,A0–A3(mode{g }    Dn,A4–A7(mode) )  No parallel Data Unit operation.
    Addressing modes    post-increment by 1 with Address register modify
                            pre-decrement by 1 with Address register modify
                            post-increment by A reg's associated indeX register
                            with Address register modify
                            indirect without indexing Encoding    31     27       232221      18    1615       1110    8      5     2    0

| 0 1 1 0 | cond. | 0 | N | 0 0 0 | 0 0 | 1 | mdg | mdl | 1 | A47 | 1 | A03 | Dg | Dl |

| | |
|---|---|
| Description | This instruction will conditionally store src1 via the Global bus to an indirect address generated from an Address register in the Global sub-unit (A0–A3). In parallel with this it will store src2 via the Local bus to an indirect address generated from an Address register in the Local sub-unit (A4–A7). Indirect, post-increment by 1, pre-decrement by 1 and post-increment by X addressing modes are supported independantly on the two buses. The indeX register(s) used have the same subscript(s) as the Address register(s). src1 and src2 must be D registers. Note that if register modifies are specified then these will happen unconditionally. Only the actual stores are conditional. In addition to the normal condition codes the condition "never" is also available. This allows Address register modifies but without storing anything. |
| Status Bits | N - Unaffected.<br>C - Unaffected.<br>V - Unaffected.<br>Z - Unaffected. |
| M Bits | Unaffected |
| Examples | |

Store Upper Conditionally                                                                                  STUcond
Syntax       STUcond    src,*An(mode)
Operation   src→*dst
Operands <Dn,An,Xn,Pn>,A0–A7(mode{g } ) No parallel Data Unit operation.
    Addressing modes    pre- or post-indexing
                            +/− 3 bit immediate or +/− an indeX register
                            modify Address register, or leave unaltered Encoding    31     27       232221      18    1615       1110    8      5     2     0

| 0 1 1 0 | cond. | 0 | N | 0 0 0 | 1 0 | 0 | mod | 1 | cde | A | dst | Imm/X |

| | |
|---|---|
| Description | For use with non-aligned addresses. Conditionally stores the upper portion of a PP register to an indirect non-aligned address generated from any Address register. The source register must be one of Dn, An, Xn or Pn. (Non-aligned stores are not supported for any other PP registers). Note that if register modify is specified then this will happen unconditionally. Only the actual store is conditional. In addition to the normal condition codes the condition "never" is also available. This allows Address register modify but without loading a register. If specifying an immediate then +/− 0 to 7 are available. If specifying an index register then it must be in the same Address sub-unit as the Address register. |

APPENDIX-continued

Status Bits  N - Unaffected.
C - Unaffected.
V - Unaffected.
Z - Unaffected.
M Bits       Unaffected
Examples Subtract
Syntax       SUB  src1,src2,dst
Operation    src1 − src2→dst
Operands D,D,D        With parallel transfers
any,D,any    No parallel transfers
D,any,any    No parallel transfers
D,I,D        No parallel transfers
any,I,src1   No parallel transfers Routing

```
                              A    B  C   D E
                              |    |  |   | |
  A   B    C    D  E          └─>B.S.
  ─   ──── ──── ── ──             −|  +
  0   src2 src1 ── ──              |
                                  ALU  MPY
                                   |    |
```

Encoding   3130 27    22  19 1615  11        8    5      2    0

| 1 | src2 | ..... | src1 | dst | Parallel transfers            |
| 1 | src2 | ..... | src1 | dst | 00000 | scde1 | dcde | scde2 | 000 |
| 0111 | ..... | src1 | dst | H | 16 bit immediate |
| 0011 | ..... | code | dst | H | 16 bit immediate |

Description  src2 is subtracted from src1 and the result is loaded into dst. The immediate
is assumed to be unsigned, and can be either the high or low half-word.
Status Bits  N - 1 if negative result generated, 0 otherwise.
C - 1 if a carry occurs, 0 otherwise.
V - 1 if an overflow occurs, 0 otherwise.
Z - 1 if zero result generated, 0 otherwise.
M Bits       Unaffected
Examples Syntax       SUBB  src1,src2,dst
Operation    src1 − src2 − C→dst
Operands D,D,D        With parallel transfers
any,D,any    No parallel transfers
D,any,any    No parallel transfers
D,I,D        No parallel transfers
any,I,src1   No parallel transfers Routing

```
                              A    B  C   D E
                              |    |  |   | |
  A   B    C    D  E          └─>B.S.
  ─   ──── ──── ── ──             −|  +
  0   src2 src1 ── ──              |
                                  ALU  MPY
                                   |    |
```

Encoding   3130 27    22  19 1615  11        8    5      2    0

| 1 | src2 | ..... | src1 | dst | Parallel transfers            |
| 1 | src2 | ..... | src1 | dst | 00000 | scde1 | dcde | scde2 | 000 |
| 0111 | ..... | src1 | dst | H | 16 bit immediate |
| 0011 | ..... | code | dst | H | 16 bit immediate |

Description  (src2 + the Carry bit) is subtracted from src1 and the result is loaded into
dst. The immediate is assumed to be unsigned, and can be either the high or
low half-word.
Status Bits  N - 1 if negative result generated, 0 otherwise.
C - 1 if a borrow occurs, 0 otherwise.

APPENDIX-continued

|  |  |
|---|---|
| | V - 1 if an overflow occurs, 0 otherwise. |
| | Z - 1 if zero result generated, 0 otherwise. |
| M Bits | Unaffected |
| Examples | |
| Syntax | SUBM   src1,src2,dst |
| Operation | src1 ----/--/- src2→dst |
| Operands | |
| | D,D,D         With parallel transfers |
| | any,D,any    No parallel transfers |
| | D,any,any    No parallel transfers |
| | D,I,D          No parallel transfers |
| | any,I,src1    No parallel transfers |

Routing

| A | B | C | D | E |
|---|---|---|---|---|
| 0 | src2 | src1 | — | — |

```
         A    B  C   D E
         |    |  |   | |
         └──► B.S.
              -|  |+ |  |
              ALU    MPY
              |      |
```

Encoding     3130   27     22     19   1615    11     8     5     2   0

| 1 | src2 | ..... | src1 | dst | Parallel transfers | | | |
|---|---|---|---|---|---|---|---|---|
| 1 | src2 | ..... | src1 | dst | 0 0 0 0 0 | scde1 | dcde | scde2 | 0 0 0 |
| 0 1 1 1 | | ..... | src1 | dst | H | 16 bit immediate | | | |
| 0 0 1 1 | | ..... | code | dst | H | 16 bit immediate | | | |

| Description | The ALU bits in the OPTIONS register are used to split the ALU into four seperate bytes, two seperate half-words, or one word. Each portion of src2 is subtracted from the corresponding portion of src1, and the result(s) stored in dst. The individual borrows are stored into the 4, 2 or 1 least-significant M bits respectively. The immediate is assumed to be unsigned, and can be either the high or low half-word. |
|---|---|
| Status Bits | N - Unaffected |
| | C - Unaffected |
| | V - Unaffected |
| | Z - 1 if zero result generated, 0 otherwise. |
| M Bits | The borrows from the individual subtractions are stored in the least-significant 4, 2 or 1 M bits, according to the ALU option bit values. |
| Examples | |
| Syntax | TSTB   src1,src2,dst |
| Operation | src1[src2] is tested for 1 |
| Operands | |
| | D,D,D         With parallel transfers |
| | any,D,any    No parallel transfers |
| | D,any,any    No parallel transfers |
| | D,I,D          No parallel transfers |
| | any,I,src1    No parallel transfers |

Routing

| A | B | C | D | E |
|---|---|---|---|---|
| src2 | 1 | src1 | — | — |

```
         A    B  C   D E
         |    |  |   | |
         └──► B.S.
              -|  |+ |  |
              ALU    MPY
              |      |
```

Encoding     3130   27     22     19   1615    11     8     5     2   0

| 1 | src2 | ..... | src1 | 0 0 0 | Parallel transfers | | | |
|---|---|---|---|---|---|---|---|---|
| 1 | src2 | ..... | src1 | 0 0 0 | 0 0 0 0 0 | scde1 | 0 0 0 | scde2 | 0 0 0 |
| 0 1 1 1 | | ..... | src1 | 0 0 0 | H | 16 bit immediate | | | |
| 0 0 1 1 | | ..... | code | src1 | H | 16 bit immediate | | | |

| Description | The bit within src1 pointed to by the least-significant 5-bits of src2 is tested for one. The Z status bit is set to 1 if the bit was zero, 0 otherwise. Only the least-significant 5 bits of the immediate are significant. |
|---|---|

| | | |
|---|---|---|
| Status Bits | N - Unaffected | |
| | C - Unaffected | |
| | V - Unaffected | |
| | Z - 1 if bit was zero, 0 otherwise | |
| M Bits | Unaffected | |
| Examples | | |
| Syntax | ULCK | |
| Operation | unlock MIMD PPs from each other | |
| Operands | | |
| | None | With parallel transfers |

Routing

```
                                        A    B C   D E
                                        |    | |   | |
    A    B    C    D    E               └─→ B.S.   | |
    ─    ─    ─    ─    ─                    -| |+ | |
                                            ALU   MPY
                                             |     |
```

Encoding    31    27    22   19   16                    0

| 0000 | ..... | 000 | 000 | Parallel transfers |
|---|---|---|---|---|

| | |
|---|---|
| Description | Instruction unlocks the MIMD PPs from each other. They then resume independent instruction execution on the next instruction fetch. |
| Status Bits | N - Unaffected. |
| | C - Unaffected. |
| | V - Unaffected. |
| | Z - Unaffected. |
| M Bits | Unaffected |
| Examples | |

| | | |
|---|---|---|
| Syntax | XNOR  src1,src2,dst | |
| Operation | src1 XNOR src2→dst | |
| Operands | | |
| | D,D,D | With parallel transfers |
| | any,D,any | No parallel transfers |
| | D,any,any | No parallel transfers |
| | D,I,D | No parallel transfers |
| | any,I,src1 | No parallel transfers |

Routing

```
                                        A    B C   D E
                                        |    | |   | |
    A    B    C    D    E               └─→ B.S.   | |
    0   src2 src1  ─    ─                    -| |+ | |
                                            ALU   MPY
                                             |     |
```

Encoding   3130   27    22    19   1615   11    8    5    2   0

| 1 | src2 | ..... | src1 | dst | Parallel transfers | | | |
|---|---|---|---|---|---|---|---|---|
| 1 | src2 | ..... | src1 | dst | 00000 | scde1 | dcde | scde2 | 000 |
| 0111 | ..... | src1 | dst | H | 16 bit immediate | | | |
| 0011 | ..... | code | dst | H | 16 bit immediate | | | |

| | |
|---|---|
| Description | The exclusive NOR of src1 and src2 is loaded into dst. The immediate can be either the high or low half-word. |
| Status Bits | N - Unaffected |
| | C - Unaffected |
| | V - Unaffected |
| | Z - 1 if zero result generated, 0 otherwise. |
| M Bits | Unaffected |
| Examples | |

| | | |
|---|---|---|
| Syntax | XOR  src1,src2,dst | |
| Operation | src1 XOR src2→dst | |
| Operands | | |
| | D,D,D | With parallels transfers |
| | any,D,any | No parallel transfers |
| | D,any,any | No parallel transfers |

APPENDIX-continued

|  |  |
|---|---|
| D,I,D | No parallel transfers |
| any,I,src1 | No parallel transfers |

Routing

```
                              A    B  C   D E
                                   |  |   | |
     A    B     C    D   E         |  |   | |
     ─    ───   ───  ─   ─    └─> B.S.
     0    src2  src1               ─│  │+ │ │
                                    ALU   MPY
                                     │     │
```

Encoding  3130  27  22  19 1615  11  8  5  2  0

| 1 | src2 | ..... | src1 | dst | Parallel transfers |  |  |  |
|---|------|-------|------|-----|---|---|---|---|
| 1 | src2 | ..... | src1 | dst | 0 0 0 0 0 | scde1 | dcde | scde2 | 0 0 0 |
| 0 1 1 1 | ..... | src1 | dst | H | 16 bit immediate |
| 0 0 1 1 | ..... | code | dst | H | 16 bit immediate |

Description  The exclusive OR of src1 and src2 is loaded into dst. The immediate can be
either the high or low half-word.
Status Bits  N - Unaffected
C - Unaffected
V - Unaffected
Z - 1 if zero result generated, 0 otherwise.
M Bits  Unaffected
Examples Syntax  ||LD    *An(mode),dst
Operation  *src→dst
Operands A0–A7(mode{g },<Dn,An,Xn,Pn> )  With parallel Data Unit
operation
Addressing modes  pre- or post-indexing
+/− 3 bit immediate or +/− an indeX register
modify Address register, or leave unaltered Encoding  31   27   232221  18   1615   1110  8  5  2  0

| Data Unit operation | 0 | mod | 0 | cde | A | dst | Imm/X |

Description  In parallel with a (D register) Data Unit operation will load a Dn, An, Xn
or Pn register from an indirect address generated from any Address
register. (Mn, Qn, Cn or Ln cannot be directly loaded from memory
except with a ||POP instruction). If specifying an immediate then +/− 0
to 7 are available. If specifying an index register then it must be in the
same Address sub-unit as the Address register. If the address is non-
aligned, then this will load only the lower byte(s).
Status Bits  N - Unaffected.
C - Unaffected.
V - Unaffected.
Z - Unaffected.
M Bits  Unaffected
Examples Syntax  ||LD    *Am(mode),dst1||LD    *An(mode),dst2
Operation  *src1→dst1||*src2→dst2
Operands A0–A3(mode{g },Dm A4–A7(mode),Dn )  With parallel Data Unit
operation, or
Addressing modes  post-increment by 1 with Address register modify
pre-decrement by 1 with Address register modify
post-increment by A reg's associated indeX register
with Address register modify
indirect without indexing Encoding  31   27   232221  18   1615   1110  8 7  5  2  0

| Data Unit operation | 1 | mdg | mdl | 0 | A47 | 0 | A03 | Dg | Dl |

Description  In parallel with a (D register) Data Unit operation, will load dst1 via the
Global bus from an indirect address generated from an Address register
in the Global sub-unit (A0–A3). In parallel with this it will load dst2 via
the Local bus from an indirect address generated from an Address register
in the Local sub-unit (A4–A7). Indirect, post-increment by 1, pre-

APPENDIX-continued decrement by 1 and post-increment by X addressing modes are supported independently on the two buses. The indeX register(s) used have the same subscript(s) as the Address register(s). The dsts must be D registers.

Status Bits
N - Unaffected.
C - Unaffected.
V - Unaffected.
Z - Unaffected.

M Bits Unaffected
Examples

Syntax ‖LD  *Am(mode),dst1‖ST    src2,*An(mode)
Operation *src1→dst1‖src2→*dst2
Operands A0–A3(mode{g },Dm,Dn,A4–A7(mode) ) With parallel Data Unit
                                    operation, or
Addressing modes   post-increment by 1 with Address register modify
                   pre-decrement by 1 with Address register modify
                   post-increment by A reg's associated indeX register
                   with Address register modify
                   indirect without indexing Encoding  31   27   232221   18   1615      1110   8 7  5   2 0

| Data Unit operation | 1 | mdg | mdl | 0 | A47 | 1 | A03 | Dg | Dl |
| --- | --- | --- | --- | --- | --- | --- | --- | --- | --- |

Description In parallel with a (D register) Data Unit operation, will load dst1 via the Global bus from an indirect address generated from an Address register in the Global sub-unit (A0–A3). In parallel with this it will store src2 via the Local bus to an indirect address generated from an Address register in the Local sub-unit (A4–A7). Indirect, post-increment by 1, pre-decrement by 1 and post-increment by X addressing modes are supported independantly on the two buses. The indeX register(s) used have the same subscript(s) as the Address register(s). dst1 and src2 must be D registers.

Status Bits
N - Unaffected.
C - Unaffected.
V - Unaffected.
Z - Unaffected.

M Bits Unaffected
Examples

Syntax ‖MOV  src,dst
Operation src→dst
Operands any,any   With parallel Data Unit operation Encoding  31   27   232221    16       11     8    5   2 0

| Data Unit operation | 0 1 0 1 0 | scde | dcde | src | dst |
| --- | --- | --- | --- | --- |

Description In parallel with a (D register) Data Unit operation, will move any register src to any other register dst.
Status Bits
N - Unaffected.
C - Unaffected.
V - Unaffected.
Z - Unaffected.

M Bits Unaffected
Examples

Syntax ‖POP   dst
Operation *A7(1 + m)→dst
Operands

<Mn,Qn,Cn,Ln>    With parallel Data Unit operation

Encoding  31   27   232221   18   1615    1110   8    5   2  0

| Data Unit operation | 0 | 1 0 0 0 | 0 | cde | 1 1 1 | dst | 0 0 1 |
| --- | --- | --- | --- | --- | --- | --- | --- |

Description In parallel with a (D register) Data Unit operation, will POP from the stack into a Mn, Qn, Cn or Ln register. (Note that the assembler may support ‖POPs to the other registers which can be supported with the normal ‖LD instruction). The stack pointer A7 is post-incremented.
Status Bits
N - Unaffected.
C - Unaffected.
V - Unaffected.
Z - Unaffected.

M Bits Unaffected

APPENDIX-continued

| | |
|---|---|
| Examples | |
| Syntax | ‖PRET |
| Operation | {I RET {s.} *A7(−1m) conditionally} |
| Operands | none   With parallel Data Unit operation. |

Encoding

| 31 | | 16 | 11 | 8 | 5 | 2 | 0 |
|---|---|---|---|---|---|---|---|
| Data Unit operation | | 00010 | 001 | 1 1 1 | 0 1 1 | 0 0 1 | |

| | |
|---|---|
| Description | In parallel with a (D register) Data Unit operation, the value within the RET register is pushed onto the stack if the PC was loaded by either of the two previous instructions. This allows conditional calls to be supported. |
| Status Bits | N - Unaffected.<br>C - Unaffected.<br>V - Unaffected.<br>Z - Unaffected. |
| M Bits | Unaffected |
| Examples | |
| Syntax | ‖PUSH   src |
| Operation | src→*A7(−1m) |
| Operands | <Mn,Qn,Cn,Ln>   With parallel Data Unit operation |

Encoding

| 31 | 27 | 232221 | 18 | 1615 | 1110 | 8 | 5 | 2 | 0 |
|---|---|---|---|---|---|---|---|---|---|
| Data Unit operation | | | | 0 1 0 0 0 | 1 | cde | 1 1 1 | dst | 0 0 1 |

| | |
|---|---|
| Description | In parallel with a (D register) Data Unit operation, will PUSH from a Mn, Qn, Cn or Ln register to the stack. (Note that the assembler may support ‖PUSHs of the order registers which can be supported with the normal ‖ST instruction). The stack pointer A7 is pre-decremented. |
| Status Bits | N - Unaffected.<br>C - Unaffected.<br>V - Unaffected.<br>Z - Unaffected. |
| M Bits | Unaffected |
| Examples | |
| Syntax | ‖ST   src,*An(mode) |
| Operation | src→*dst |
| Operands | A0–A7(mode{g  },<Dn,An,Xn,Pn> ) With parallel Data Unit operation<br>Addressing modes   pre- or post-indexing<br>   +/− 3 bit immediate or +/− an indeX register<br>   modify Address register, or leave unaltered |

Encoding

| 31 | 27 | 232221 | 18 | 1615 | 1110 | 8 | 5 | 2 | 0 |
|---|---|---|---|---|---|---|---|---|---|
| Data Unit operation | | | | 0 | mod | 1 | cde | A | dst | Imm/X |

| | |
|---|---|
| Description | In parallel with a (D register) Data Unit operation will store a Dn, An, Xn or Pn register to an indirect address generated from any Address register. (Mn, Qn, Cn or Ln cannot be directly stored to memory except with a ‖PUSH instruction). If specifying an immediate then +/− 0 to 7 are available. If specifying an index register then it must be in the same Address sub-unit as the Address register. If the address is non-aligned, then this will store only the lower byte(s). |
| Status Bits | N - Unaffected.<br>C - Unaffected.<br>V - Unaffected.<br>Z - Unaffected. |
| M Bits | Unaffected |
| Examples | |
| Syntax | ‖ST   src1,*Am(mode)‖LD   *An(mode),dst2 |
| Operation | src1→*dst1‖*src2→dst2 |
| Operands | Dm,A0–A3(mode{g  }A4–A7(mode),Dn )   With parallel Data Unit operation, or<br>Addressing modes   post-increment by 1 with Address register modify<br>   pre-decrement by 1 with Address resister modify<br>   post-increment by A reg's associated indeX register with Address register modify |

APPENDIX-continued indirect without indexing

Encoding

| 31 27 | 23 22 21 | 18 | 16 15 | 11 10 | 8 | 5 | 2 0 |
|---|---|---|---|---|---|---|---|
| Data Unit operation | 1 mdg mdl | 1 | A47 | 0 | A03 | Dg | Dl |

Description
: In parallel with a (D register) Data Unit operation, will store src1 via the Global bus to an indirect address generated from an Address register in the Global sub-unit (A0–A3). In parallel with this it will load dst2 via the Local bus from an indirect address generated from an Address register in the Local sub-unit (A4–A7). Indirect, post-increment by 1, pre-decrement by 1 and post-increment by X addressing modes are supported independantly on the two buses. The indeX register(s) used have the same subscript(s) as the Address register(s). src1 and dst2 must be D registers.

Status Bits
: N - Unaffected.
  C - Unaffected.
  V - Unaffected.
  Z - Unaffected.

M Bits
: Unaffected

Examples

Syntax
: ||ST   src1,*Am(mode)||ST        src2,*An(mode)

Operation
: src1→*dst1||src2→*dst2

Operands
: Dm,A0–A3(mode{g } Dn,A4–A7(mode) )   With parallel Data Unit operation, or Addressing modes
: post-increment by 1 with Address register modify
  pre-decrement by 1 with Address register modify
  post-increment by A reg's associated indeX register with Address register modify
  indirect without indexing Encoding

| 31 27 | 23 22 21 | 18 | 16 15 | 11 10 | 8 | 5 | 2 0 |
|---|---|---|---|---|---|---|---|
| Data Unit operation | 1 mdg mdl | 1 | A47 | 0 | A03 | Dg | Dl |

Description
: In parallel with a (D register) Data Unit operation, will store src1 via the Global bus to an indirect address generated from an Address register in the Global sub-unit (A0–A3). In parallel with this it will store src2 via the Local bus to an indirect address generated from an Address register in the Local sub-unit (A4–A7). Indirect, modes are supported independantly on the two buses. The indeX register(s) used have the same subscript(s) as the Address register(s). src1 and src2 must be D registers.

Status Bits
: N - Unaffected.
  C - Unaffected.
  V - Unaffected.
  Z - Unaffected.

M Bits
: Unaffected

Examples

What is claimed is:

1. An address generator comprising:

a plurality of address registers;

a plurality of index address registers;

a modulo register storing therein a plurality of carry break indicators;

an arithmetic unit having a first input connected to said plurality of address registers, a second input connected to said plurality of index address registers, said arithmetic unit further connected to said modulo register, said arithmetic unit forming an arithmetic combination of data stored in a selected one of said plurality of address registers and data stored in a selected one of said plurality of index address registers, said arithmetic unit generating a normal carry between a particular bit and a next more significant bit if a corresponding carry break indicator stored in said modulo register has a first digital state and breaking any carry between said particular bit and said next more significant bit if said corresponding carry break indicator stored in said modulo register has a second digital state opposite to said first digital state;

a plurality of data registers for storing data; and a bus connected to said modulo register and said plurality of data registers for moving data from an instruction specified one of said plurality of data registers to said modulo register in response to a register move instruction specifying one of said plurality of data registers as a source and said modulo register as said destination.

2. The address generator of claim 1, wherein:

said first digital state of said carry break indicator is "0"; and said second digital state of said carry break indicator is "1".

3. The address generator of claim 1, wherein:

said arithmetic unit adds data stored in said selected one of said plurality of address registers to data stored in said selected one of said plurality of index address registers.

4. The address generator of claim 1, wherein:

said arithmetic unit subtracts data stored in said selected one of said plurality of index address registers from data stored in said selected one of said plurality of address registers.

5. The address generator of claim 1, wherein:

said arithmetic combination of said arithmetic unit is stored in said selected one of said plurality of address registers.

6. The address generator of claim 1, further comprising:

a qualifier register storing a modulo qualifier bit; and said arithmetic unit generating a normal carry between a particular bit and a next more significant bit regardless of whether said corresponding carry break indicator is in said first, state or said second state if said modulo qualifier bit is in a third digital state, and generating a normal carry between a particular bit and a next more significant bit if said corresponding carry break indicator stored in said modulo register has said first digital state and breaking any carry between said particular bit and said next more significant bit if said corresponding carry break indicator stored in said modulo register has said second digital if said modulo qualifier bit is in a fourth digital state opposite to said third digital state.

7. The address generator of claim 6, wherein:

said third digital state of said modulo qualifier bit is "0"; and said fourth digital state of said modulo qualifier bit is "1".

8. The address generator of claim 1, further comprising:

a plurality of data registers for storing data; and a bus connected to said modulo register and said plurality of data registers for moving data from said modulo register to an instruction specified one of said plurality of data registers in response to a register move instruction specifying said modulo register as a source and one of said plurality of data registers as said destination.

9. The address generator of claim 1, further comprising:

a data port for transferring data with a data memory;

a stack pointer register storing an address of a data stack; and a data bus connected to said modulo register and said data port for pushing data from said modulo register to said data port for storage at an addressable memory storage location corresponding to said address stored in said stack pointer in response to a register push instruction specifying said modulo register as a source.

10. The address of claim 1, further comprising:

a data port for transferring data with a data memory;

a stack pointer register storing an address of a data stack; and a data bus connected to said modulo register and said data port for popping data from said data port from addressable memory storage location corresponding to said address stored in said stack pointer to said modulo register in response to a register pop instruction specifying said modulo register as a destination.

11. An address generator comprising:

a plurality of address registers;

a plurality of index address registers;

a plurality of qualifier registers, each of said plurality of qualifier registers corresponding to one of said plurality of address registers, each qualifier register storing a modulo qualifier bit;

a modulo register storing therein a plurality of carry break indicators; and an arithmetic unit having a first input connected to said plurality of address registers, a second input connected to said plurality of index address registers, said arithmetic unit further connected to said modulo register and to said plurality of qualifier registers, said arithmetic unit forming an arithmetic combination of data stored in a selected one of said plurality of address registers and data stored in a selected one of said plurality of index registers, said arithmetic unit generating a normal carry between a particular bit and a next more significant bit regardless of whether said corresponding carry break indicator is in said first state or said second state, if said modulo qualifier bit of said qualifier register corresponding to said selected one of said plurality of address registers is in a third digital state, and generating a normal carry between a particular bit and a next more significant bit if said corresponding carry break indicator stored in said modulo register has said first digital state and breaking any carry between said particular bit and said next more significant bit if said corresponding carry break indicator stored in said modulo register has said second digital, if said modulo qualifier bit stored in said qualifier register corresponding to said selected one of said address registers is in a fourth digital state opposite to said third digital state.

12. The address generator of claim 11, wherein:

said first digital state of said carry break indicator is "0"; and said second digital state of said carry break indicator is "1".

13. The address generator of claim 11, wherein:

said third digital state of said modulo qualifier bit is "0"; and said fourth digital state of said modulo qualifier bit is "1".

14. The address generator of claim 11, wherein:

said arithmetic unit adds data stored in said selected one of said plurality of address registers to data stored in said selected one of said plurality of index address registers.

15. The address generator of claim 11, wherein:

said arithmetic unit subtracts data stored in said selected one of said plurality of index address registers from data stored in said selected one of said plurality of address registers.

16. The address generator of claim 11, wherein:

said arithmetic combination of said arithmetic unit is stored in said selected one of said plurality of address registers.

17. The address generator of claim 11, further comprising:

a plurality of data registers for storing data; and a bus connected to said plurality of qualifier registers and said plurality of data registers for moving data from an instruction specified one of said plurality of data registers to an instruction specified one of said qualifier registers in response to a register move instruction specifying one of said plurality of data registers as a source and one of said plurality of qualifier registers as said destination.

18. The address generator of claim 11, further comprising:

a plurality of data registers for storing data; and a bus connected to said plurality of qualifier registers and said plurality of data registers for moving data from an instruction specified one of said qualifier registers to an instruction specified one of said plurality of data registers in response to a register move instruction specifying one of said plurality of qualifier registers as a source and one of said plurality of data registers as said destination.

19. The address generator of claim 11, further comprising:

a data port for transferring data with a data memory;

a stack pointer register storing an address of a data stack; and a data bus connected to said plurality of qualifier registers and said data port for pushing data from an instruction specified one of said qualifier registers to said data port for storage at an addressable memory storage location corresponding to said address stored in said stack pointer in response to a register push instruction specifying one of said plurality of qualifier registers as a source.

20. The address of claim 11, further comprising:

a data port for transferring data with a data memory;

a stack pointer register storing an address of a data stack; and a data bus connected to said modulo register and said data port for popping data from said data port from addressable memory storage location corresponding to said address stored in said stack pointer to said modulo register in response to a register pop instruction specifying one of said qualifier registers as a destination.

21. An address generator comprising:

a plurality of address registers;

a plurality of index address registers;

a modulo register storing therein a plurality of carry break indicators;

an arithmetic unit having a first input connected to said plurality of address registers, a second input connected to said plurality of index address registers, said arithmetic unit further connected to said modulo register, said arithmetic unit forming an arithmetic combination of data stored in a selected one of said plurality of address registers and data stored in a selected one of said plurality of index address registers, said arithmetic unit generating a normal carry between a particular bit and a next more significant bit if a corresponding carry break indicator stored in said modulo register has a first digital state and breaking any carry between said particular bit and said next more significant bit if said corresponding carry break indicator stored in said modulo register has a second digital state opposite to said first digital state;

a plurality of data registers for storing data; and a bus connected to said modulo register and said plurality of data registers for moving data from said modulo register to an instruction specified one of said plurality of data registers in response to a register move instruction specifying said modulo register as a source and one of said plurality of data registers as said destination.

22. The address generator of claim 21, wherein:

said first digital state of said carry break indicator is "0"; and said second digital state of said carry break indicator is "1".

23. The address generator of claim 21, wherein:

said arithmetic unit adds data stored in said selected one of said plurality of address registers to data stored in said selected one of said plurality of index address registers.

24. The address generator of claim 21, wherein:

said arithmetic unit subtracts data stored in said selected one of said plurality of index address registers from data stored in said selected one of said plurality of address registers.

25. The address generator of claim 21, wherein:

said arithmetic combination of said arithmetic unit is stored in said selected one of said plurality of address registers.

26. The address generator of claim 21, further comprising:

a qualifier register storing a modulo qualifier bit; and said arithmetic unit generating a normal carry between a particular bit and a next more significant bit regardless of whether said corresponding carry break indicator is in said first state or said second state if said modulo qualifier bit is in a third digital state, and generating a normal carry between a particular bit and a next more significant bit if said corresponding carry break indicator stored in said modulo register has said first digital state and breaking any carry between said particular bit and said next more significant bit if said corresponding carry break indicator stored in said modulo register has said second digital if said modulo qualifier bit is in a fourth digital state opposite to said third digital state.

27. The address generator of claim 26, wherein:

said third digital state of said modulo qualifier bit is "0"; and said fourth digital state of said modulo qualifier bit is "1".

28. The address generator of claim 21, further comprising:

a data port for transferring data with a data memory;

a stack pointer register storing an address of a data stack; and a data bus connected to said modulo register and said data port for pushing data from said modulo register to said data port for storage at an addressable memory storage location corresponding to said address stored in said stack pointer in response to a register push instruction specifying said modulo register as a source.

29. The address of claim 21, further comprising:

a data port for transferring data with a data memory;

a stack pointer register storing an address of a data stack; and a data bus connected to said modulo register and said data port for popping data from said data port from addressable memory storage location corresponding to said address stored in said stack pointer to said modulo register in response to a register pop instruction specifying said modulo register as a destination.

30. An address generator comprising:

a plurality of address registers;

a plurality of index address registers;

a modulo register storing therein a plurality of carry break indicators; and an arithmetic unit having a first input connected to said plurality of address registers, a second input connected to said plurality of index address registers, said arithmetic unit further connected to said modulo register, said arithmetic unit forming an arithmetic combination of data stored in a selected one of said plurality of address registers and data stored in a selected one of said plurality of index address registers, said arithmetic unit generating a normal carry between a particular bit and a next more significant bit if a corresponding carry break indicator stored in said modulo register has a first digital state and breaking any carry between said particular bit and said next more significant bit if said corresponding carry break indicator stored in said modulo register has a second digital state opposite to said first digital state;

a data port for transferring data with a data memory;

a stack pointer register storing an address of a data stack; and a data bus connected to said modulo register and said data port for pushing data from said modulo register to said data port for storage at an addressable memory storage location corresponding to said address stored in said stack pointer in response to a register push instruction specifying said modulo register as a source.

31. The address generator of claim 30, wherein:

said first digital state of said carry break indicator is "0"; and said second digital state of said carry break indicator is "1".

32. The address generator of claim 30, wherein:

said arithmetic unit adds data stored in said selected one of said plurality of address registers to data stored in said selected one of said plurality of index address registers.

33. The address generator of claim 30, wherein:

said arithmetic unit subtracts data stored in said selected one of said plurality of index address registers from data stored in said selected one of said plurality of address registers.

34. The address generator of claim 30, wherein:

said arithmetic combination of said arithmetic unit is stored in said selected one of said plurality of address registers.

35. The address generator of claim 30, further comprising:

a qualifier register storing a modulo qualifier bit; and said arithmetic unit generating
 a normal carry between a particular bit and a next more significant bit regardless of whether said corresponding carry break indicator is in said first state or said second state if said modulo qualifier bit is in a third digital state, and
 generating a normal carry between a particular bit and a next more significant bit if said corresponding carry break indicator stored in said modulo register has said first digital state and breaking any carry between said particular bit and said next more significant bit if said corresponding carry break indicator stored in said modulo register has said second digital if said modulo qualifier bit is in a fourth digital state opposite to said third digital state.

36. The address generator of claim 35, wherein:

said third digital state of said modulo qualifier bit is "0"; and said fourth digital state of said modulo qualifier bit is "1".

37. The address of claim 30, further comprising:

a data port for transferring data with a data memory;

a stack pointer register storing an address of a data stack; and a data bus connected to said modulo register and said data port for popping data from said data port from addressable memory storage location corresponding to said address stored in said stack pointer to said modulo register in response to a register pop instruction specifying said modulo register as a destination.

38. An address generator comprising:

a plurality of address registers;

a plurality of index address registers;

a modulo register storing therein a plurality of carry break indicators; and an arithmetic unit having a first input connected to said plurality of address registers, a second input connected to said plurality of index address registers, said arithmetic unit further connected to said modulo register, said arithmetic unit forming an arithmetic combination of data stored in a selected one of said plurality of address registers and data stored in a selected one of said plurality of index address registers, said arithmetic unit generating a normal carry between a particular bit and a next more significant bit if a corresponding carry break indicator stored in said modulo register has a first digital state and breaking any carry between said particular bit and said next more significant bit if said corresponding carry break indicator stored in said modulo register has a second digital state opposite to said first digital state;

a data port for transferring data with a data memory;

a stack pointer register storing an address of a data stack; and a data bus connected to said modulo register and said data port for popping data from said data port from addressable memory storage location corresponding to said address stored in said stack pointer to said modulo register in response to a register pop instruction specifying said modulo register as a destination.

39. The address generator of claim 38, wherein:

said first digital state of said carry break indicator is "0"; and said second digital state of said carry break indicator is "1".

40. The address generator of claim 38, wherein:

said arithmetic unit adds data stored in said selected one of said plurality of address registers to data stored in said selected one of said plurality of index address registers.

41. The address generator of claim 38, wherein:

said arithmetic unit subtracts data stored in said selected one of said plurality of index address registers from data stored in said selected one of said plurality of address registers.

42. The address generator of claim 38, wherein:

said arithmetic combination of said arithmetic unit is stored in said selected one of said plurality of address registers.

43. The address generator of claim 38, further comprising:

a qualifier register storing a modulo qualifier bit; and said arithmetic unit generating
 a normal carry between a particular bit and a next more significant bit regardless of whether said corresponding carry break indicator is in said first state or said second state if said modulo qualifier bit is in a third digital state, and
 generating a normal carry between a particular bit and a next more significant bit if said corresponding carry break indicator stored in said modulo register has said first digital state and breaking any carry between said particular bit and said next more significant bit if said corresponding carry break indicator stored in said modulo register has said second digital if said modulo qualifier bit is in a fourth digital state opposite to said third digital state.

44. The address generator of claim 43, wherein:

said third digital state of said modulo qualifier bit is "0"; and said fourth digital state of said modulo qualifier bit is "1".

* * * * *